United States Patent
Rose et al.

(10) Patent No.: US 10,065,309 B2
(45) Date of Patent: Sep. 4, 2018

(54) TOUCH SENSITIVE ROBOTIC GRIPPER

(71) Applicant: Quality Manufacturing Inc., Winchester, KY (US)

(72) Inventors: Jeffrey A. Rose, Lexington, KY (US); James Adam Rose, Lexington, KY (US); Stephen D. Rose, Lexington, KY (US); Raymond Cooper, Irvine, KY (US); Jeffrey John Sweda, Lexington, KY (US)

(73) Assignee: QUALITY MANUFACTURING INC., Winchester, KY (US)

( * ) Notice: Subject to any disclaimer, the term of this patent is extended or adjusted under 35 U.S.C. 154(b) by 21 days.

(21) Appl. No.: 15/430,042

(22) Filed: Feb. 10, 2017

(65) Prior Publication Data

US 2017/0182657 A1    Jun. 29, 2017

Related U.S. Application Data

(60) Division of application No. 14/485,180, filed on Sep. 12, 2014, now Pat. No. 9,605,952, and a
(Continued)

(51) Int. Cl.
  *G05B 15/00*    (2006.01)
  *G05B 19/00*    (2006.01)
(Continued)

(52) U.S. Cl.
  CPC ......... *B25J 9/1612* (2013.01); *B25J 15/0028* (2013.01); *B25J 15/10* (2013.01);
(Continued)

(58) Field of Classification Search
  None
  See application file for complete search history.

(56) References Cited

U.S. PATENT DOCUMENTS

| 702,117 A | 6/1902 | Taylor |
| 1,802,281 A | 4/1931 | Shimer |

(Continued)

FOREIGN PATENT DOCUMENTS

| CN | 1798629 A | 7/2006 |
| CN | 101109094 | 1/2008 |

(Continued)

OTHER PUBLICATIONS

Pratt, Dr. Gill et al., "DARPA Robotics Challenge Proposers' Day," Apr. 16, 2012, pp. 1-80.
(Continued)

*Primary Examiner* — Bhavesh V Amin
(74) *Attorney, Agent, or Firm* — Stoel Rives, LLP

(57) ABSTRACT

A displacement measuring cell may be used to measure linear and/or angular displacement. The displacement measuring cell may include movable and stationary electrodes in a conductive fluid. Electrical property measurements may be used to determine how far the movable electrode has moved relative to the stationary electrode. The displacement measuring cell may include pistons and/or flexible walls. The displacement measuring cell may be used in a touch-sensitive robotic gripper. The touch-sensitive robotic gripper may include a plurality of displacement measuring cells mechanically in series and/or parallel. The touch-sensitive robotic gripper may be include a processor and/or memory configured to identify objects based on displacement measurements and/or other measurements. The processor may determine how to manipulate the object based on its identity.

29 Claims, 80 Drawing Sheets

Related U.S. Application Data continuation-in-part of application No. 13/790,801, filed on Mar. 8, 2013, now Pat. No. 9,205,567.

(60) Provisional application No. 61/895,174, filed on Oct. 24, 2013, provisional application No. 61/767,130, filed on Feb. 20, 2013, provisional application No. 61/709,822, filed on Oct. 4, 2012, provisional application No. 61/683,324, filed on Aug. 15, 2012, provisional application No. 61/673,114, filed on Jul. 18, 2012, provisional application No. 61/655,949, filed on Jun. 5, 2012, provisional application No. 61/608,407, filed on Mar. 8, 2012.

(51) Int. Cl.
  *B25J 9/16* (2006.01)
  *B25J 15/00* (2006.01)
  *B25J 15/10* (2006.01)
  *G06F 19/00* (2018.01)

(52) U.S. Cl.
  CPC ............ *Y10S 901/31* (2013.01); *Y10S 901/46* (2013.01); *Y10S 901/47* (2013.01)

(56) References Cited

U.S. PATENT DOCUMENTS

| | | | |
|---|---|---|---|
| 3,945,892 | A | 3/1976 | James et al. |
| 3,999,904 | A | 12/1976 | Raymond |
| 4,001,556 | A | 1/1977 | Folchi et al. |
| 4,013,535 | A | 3/1977 | White |
| 4,067,093 | A | 1/1978 | Schumacher et al. |
| 4,241,816 | A | 12/1980 | Hubrecht et al. |
| 4,323,850 | A | 4/1982 | Dawson et al. |
| 4,481,815 | A | 11/1984 | Overton |
| 4,492,949 | A | 1/1985 | Peterson et al. |
| 4,499,784 | A | 2/1985 | Shum |
| 4,555,953 | A | 12/1985 | Dario et al. |
| 4,572,564 | A | 2/1986 | Cipolla |
| 4,588,348 | A | 5/1986 | Beni et al. |
| 4,615,512 | A | 10/1986 | Hoke |
| 4,638,670 | A | 1/1987 | Moser |
| 4,651,074 | A * | 3/1987 | Wise ............ B25J 13/084 250/227.21 |
| 4,745,844 | A | 5/1988 | Larsen |
| 4,766,389 | A | 8/1988 | Rhoades et al. |
| 4,770,455 | A | 9/1988 | Collins, Jr. |
| 4,817,440 | A | 4/1989 | Curtin |
| 4,823,071 | A | 4/1989 | Ding et al. |
| 4,841,224 | A | 6/1989 | Chalupnik et al. |
| 4,845,457 | A | 7/1989 | Nakanishi |
| 4,886,467 | A | 12/1989 | Peveto |
| 4,896,914 | A | 1/1990 | Stevens |
| 4,908,574 | A | 3/1990 | Rhoades et al. |
| 4,936,743 | A | 6/1990 | Stoss |
| 4,980,646 | A | 12/1990 | Zemel |
| 4,991,491 | A | 2/1991 | Neumann |
| 5,003,517 | A | 3/1991 | Greer, Jr. |
| 5,011,207 | A | 4/1991 | Stevens |
| 5,025,126 | A | 6/1991 | Hansen |
| 5,092,645 | A | 3/1992 | Okada |
| 5,114,300 | A | 5/1992 | Shahinpoor et al. |
| 5,114,859 | A | 5/1992 | Kagenow |
| 5,125,759 | A | 6/1992 | Chun |
| 5,233,293 | A | 8/1993 | Huang et al. |
| 5,403,057 | A | 4/1995 | Sugito et al. |
| 5,407,185 | A | 4/1995 | Zehnpfennig et al. |
| 5,413,454 | A | 5/1995 | Movsesian |
| 5,565,625 | A | 10/1996 | Howe et al. |
| 5,602,487 | A | 2/1997 | Manku |
| 5,793,640 | A | 8/1998 | Wu et al. |
| 5,897,156 | A | 4/1999 | Hayard et al. |
| 5,911,158 | A | 6/1999 | Henderson et al. |
| 5,920,015 | A | 7/1999 | Hallberg et al. |
| 5,959,455 | A | 9/1999 | Brown |
| RE36,498 | E | 1/2000 | Howe et al. |
| 6,011,627 | A | 1/2000 | Mulligan et al. |
| 6,042,965 | A | 3/2000 | Nestler et al. |
| 6,067,862 | A | 5/2000 | Murray et al. |
| 6,082,196 | A | 7/2000 | Nonoyama et al. |
| 6,086,060 | A | 7/2000 | Berthold |
| 6,114,862 | A | 9/2000 | Tartagni et al. |
| 6,191,723 | B1 | 2/2001 | Lewis |
| 6,209,443 | B1 | 4/2001 | Perez |
| 6,444,488 | B2 | 9/2002 | Charrier et al. |
| 6,445,053 | B1 | 9/2002 | Cho |
| 6,448,621 | B1 | 9/2002 | Thakur |
| 6,484,068 | B1 | 11/2002 | Yamamoto et al. |
| 6,496,021 | B2 | 12/2002 | Tartagni et al. |
| 6,538,410 | B2 | 3/2003 | Mori et al. |
| 6,586,810 | B2 | 7/2003 | Thakur |
| 6,591,685 | B2 | 7/2003 | Kraetzl et al. |
| 6,604,426 | B2 | 8/2003 | Kraetzl |
| 6,661,239 | B1 | 12/2003 | Ozick |
| 6,684,754 | B2 | 2/2004 | Corner |
| 6,707,290 | B2 | 3/2004 | Nyce et al. |
| 6,724,201 | B2 | 4/2004 | Sato et al. |
| 6,764,373 | B1 | 7/2004 | Osawa et al. |
| 6,909,940 | B2 | 6/2005 | Hellman et al. |
| 6,922,158 | B2 | 7/2005 | Ymker |
| 6,938,938 | B2 | 9/2005 | Risle et al. |
| 6,995,649 | B2 | 2/2006 | Nugent |
| 7,118,601 | B2 | 10/2006 | Yasui et al. |
| 7,168,758 | B2 | 1/2007 | Bevan et al. |
| 7,212,007 | B2 | 5/2007 | Yasuda et al. |
| 7,219,551 | B2 | 5/2007 | Suzuki |
| 7,331,094 | B2 | 2/2008 | Berninger |
| 7,498,758 | B2 | 3/2009 | Baba et al. |
| 7,570,065 | B2 | 8/2009 | Harish et al. |
| 7,591,165 | B2 | 9/2009 | Papakostas et al. |
| 7,610,811 | B1 | 11/2009 | Wang et al. |
| 7,658,119 | B2 | 2/2010 | Loeb et al. |
| 7,734,375 | B2 | 6/2010 | Buehler et al. |
| 7,878,075 | B2 * | 2/2011 | Johansson ............... B25J 13/084 73/862.046 |
| 7,904,200 | B2 | 3/2011 | Takenaka et al. |
| 7,938,038 | B2 | 5/2011 | Sugawara et al. |
| 7,951,477 | B2 | 5/2011 | Wood et al. |
| 8,012,100 | B2 | 9/2011 | Ward |
| 8,033,189 | B2 | 10/2011 | Hayakawa et al. |
| 8,079,278 | B2 | 12/2011 | Xi et al. |
| 8,081,299 | B2 | 12/2011 | Kim et al. |
| 8,097,986 | B2 | 1/2012 | Kimura et al. |
| 8,126,592 | B2 | 2/2012 | Saunders et al. |
| 8,173,285 | B2 | 5/2012 | Dougherty |
| 8,181,540 | B2 | 5/2012 | Loeb et al. |
| 8,235,732 | B2 | 8/2012 | Garascia et al. |
| 8,341,158 | B2 | 12/2012 | Acharya |
| 8,342,440 | B2 | 1/2013 | Papanikolopoulos et al. |
| 8,364,312 | B2 | 1/2013 | Tobey |
| 8,415,957 | B2 | 4/2013 | Huang et al. |
| 8,446,157 | B2 | 5/2013 | Fröjd |
| 8,485,576 | B2 | 7/2013 | Melville et al. |
| 8,515,579 | B2 | 8/2013 | Alcazar et al. |
| 9,205,567 | B2 | 12/2015 | Rose et al. |
| 2002/0007230 | A1 | 1/2002 | Ueno et al. |
| 2004/0102274 | A1 | 5/2004 | Tesar |
| 2004/0186626 | A1 | 9/2004 | Tsukamoto et al. |
| 2004/0197179 | A1 | 10/2004 | Achkire et al. |
| 2005/0187657 | A1 | 8/2005 | Hashimoto et al. |
| 2005/0283043 | A1 | 12/2005 | Sisk |
| 2006/0207978 | A1 * | 9/2006 | Rizun ............... A61B 34/70 219/121.83 |
| 2008/0187391 | A1 | 8/2008 | Mimken |
| 2009/0088896 | A1 | 4/2009 | Tobey |
| 2010/0004778 | A1 * | 1/2010 | Arimatsu ............... B25J 9/1697 700/214 |
| 2013/0233116 | A1 | 9/2013 | Rose et al. |
| 2014/0147240 | A1 * | 5/2014 | Noda ............... B25J 9/0018 414/751.1 |

(56) References Cited

U.S. PATENT DOCUMENTS

| | | | | |
|---|---|---|---|---|
| 2014/0214209 | A1* | 7/2014 | Sugiura | G01B 17/00 700/259 |
| 2015/0019013 | A1* | 1/2015 | Rose | G01L 1/16 700/258 |
| 2017/0182657 | A1* | 6/2017 | Rose | B25J 9/1612 |

FOREIGN PATENT DOCUMENTS

| | | |
|---|---|---|
| EP | 0 582 731 A1 | 2/1994 |
| GB | 2434840 B | 10/2011 |
| JP | 06-151997 | 5/1994 |
| JP | 07-197928 A | 8/1995 |
| JP | 2003-159689 A | 6/2003 |
| WO | WO 9314386 A1 | 7/1993 |
| WO | WO 2009/058359 A1 | 5/2009 |
| WO | WO 2010/133006 A1 | 11/2010 |
| WO | WO 2012/049535 A1 | 4/2012 |

OTHER PUBLICATIONS

Brockett, Roger W. et al., "Robotic Manipulation: Harvard Robotics Laboratory," http://hrl.harvard.edu/manipulation/, © 2003-2004 Harvard Robotics Laboratory and the authors, 2 pgs.

Ferrier, Nicola J. et al., "Reconstructing the Shape of a Deformable Membrane from Image Data," The International Journal of Robotics Research, vol. 19, No. 8, Aug. 2000, © 2000 Sage Publications, Inc., pp. 1-22.

Vásárhelyi, Gábor, "The Design of Tactile Sensors and Their Elastic Cover," Péter Pázmány Catholic University, Faculty of Information Technology, Multidisciplinary Technical Sciences Doctoral School, Budapest 2007, pp. 1-19.

Condliffe, Jamie, "This Robotic Finger Is More Sensitive Than Yours," http://gizmodo.com/5919516/this-robotic-finger-is-rnore-sensitive-than-yours, Jun. 19, 2002, 4 pgs.

Dunham, Katie, "USC Viterbi researchers work on a robot's touch," USC News, http://news.usc.edu/, Jun. 20, 2012, 3 pgs.

"Demystifying Piezoresistive Pressure Sensors," http://www.maximintegrated.com/app-notes/index.mvp/id/871, Jul. 17, 2002, 7 pgs.

"Piezoresistive Sensors," Chapter 6, LiuCh06v3.qxd, http://www.mech.northwestern.edu/FOM/LiuCh06v3_072505.pdf, Jul. 25, 2005, pp. 207-244.

Cook, Phillip, "How to Make an Ag/AgCl Reference Electrode—YouTube," uploaded Jul. 31, 2008, http://www.youtube.com/watch?v=JOR8DWH2PXE, 2 pgs.

Malkin, Robert A. et al., "Construction of a very high-density extracellular electrode array," American Journal of Physiology—Heart and Circulatory Physiology, submitted Aug. 9, 1999, accepted in final form Dec. 29, 1999, http://ajpheart.physiology.org/content/279/1/H437.full, 12 pgs.

Valdés-Ramírez, G. et al., "Design and Construction of Solid State Ag/AgCl Reference Electrodes Through Electrochemical Deposition of Ag and AgCl Onto a Graphite/Epoxy Resin-Based Composite. Parte 1: Electrochemical Deposition of Ag Onto a Graphite/Epoxy Resin-Based Composite," International Journal of Electrochemical Science, 6 (2011), http://www.electrochemsci.org/papers/vol6/6040971.pdf, pp. 971-987.

"The Silver/Silver Chloride Reference Electrode," Tanner's General Chemistry, http://tannerm.com/ag_ref.htm, © 2008 Tanner McCarron and Weston McCarron, 6 pgs.

"A new highly stable silver/silver-chloride electrode," Medical & Biological Engineering & Computing, http://resources.metapress.com/pdf-preview.axd?code=hl731174r737v716&size=largest, Nov. 1977, 1 pg.

Ansuini, Frank J. et al., "Factors Affecting the Accuracy of Reference Electrodes," Cathodic & Anodic Protection, reprinted from Materials Performance, vol. 33, No. 11, Nov. 1994, © 1994 NACE International, pp. 14-17.

"pH, Theory and Practice," http//www.radiometer-analytical.com/pdf/ph_theory.pdf, © Radiometer Analytical SAS, France, 2007-11G, 38 pgs.

Ross, Jordan, "Liquid metal thermal interface materials by Indium Corporation," http://www.indium.com/thermal-interface-materials/other/liquid-metal/, ©1996-2013 Indium Corporation, 3 pgs.

Dickey, Michael D. et al., "Eutectic Gallium—Indium (EGaIn): A Liquid Metal Alloy for the Formation of Stable Structures in Microchannels at Room Temperature**," http://gmwgroup.harvard.edu/pubs/pdf/1014.pdf, © 2008 WILEY-VCH GmbH & Co. KGaA, Weinheim, pp. 1097-1104.

"Dielectric Constant Measurement of Solid Materials," Application Note 380-1, Using HP 1645 1B Dielectric test fixture, http://www.hpmemory.org/an/pdf/an_380-1.pdf, © 1998 Hewlett-Packard Company, 8 pgs.

"Pololu robotics forum—View topic—Concept; 3-way mobile joint," http://forum.pololu.com/viewtopic.php?f=1&t=819, Feb. 22, 2008, pp. 1-8.

Trinkel, Bud, Fluid Power Ebook Edition 1, eBooks content from Hydraulics & Pneumatics, http://hydraulicspneumatics.com/ebooks/fluid-power-ebook-edition-1-0, Jun. 25, 2007, 4 pgs.

Trinkel, Bud, Fluid Power Ebook Edition 2, eBooks content from Hydraulics & Pneumatics, http://hydraulicspneumatics.com/ebooks/fluid-power-ebook-edition-2-0, Jun. 25, 2007, 3 pgs.

"Book 2, Chapter 19: Rotary actuators, Other Technologies content from Hydraulics & Pneumatics," http://hydraulicspneumatics.com/other-technologies/book-2-chapter-19-rotary-actuators, May 19, 2010, 16 pgs.

International Search Report and Written Opinion for PCT/US2013/029798 filed Mar. 8, 2013, and dated Aug. 23, 2013, 20 pgs.

Atsuo Takanishi, Biped humanoid robot group, WABIAN-2R (2006-), Copyright (C) 2009, last update Nov. 30, 2010.

Takanishi Laboratory, Biped Humanoid Robot, Research Paper, Copyright (C) 2010, last update Nov. 17, 2010.

Moll, A Self-sealing Fiber-reinforced Composite, Journal of Composite Materials, vol. 0, No. 00/2009, © The Author(s), 2009, published Jan. 5, 2010.

Non-Final Office Action for U.S. Appl. No. 13/854,710, filed Apr. 1, 2013, and dated Nov. 20, 2014, 19 pgs.

Non-Final Office Action for U.S. Appl. No. 13/790,801, filed Mar. 8, 2013, and dated Apr. 8, 2015, 35 pgs.

Notice of Allowance and Fee(s) Due for U.S. Appl. No. 13/854,710, filed Apr. 1, 2013, and dated Apr. 16, 2015, 5 pgs.

Notice of Allowance and Fee(s) Due for U.S. Appl. No. 13/854,710, filed Apr. 1, 2013, and dated Aug. 28, 2015, 6 pgs.

Non-Final Office Action for U.S. Appl. No. 13/854,693, filed Apr. 1, 2013, and dated Oct. 6, 2015, 22 pgs.

Notice of Allowance and Fee(s) Due for U.S. Appl. No. 13/790,801, filed Mar. 8, 2013, and dated Oct. 29, 2015, 14 pgs.

Notice of Allowance and Fee(s) Due for U.S. Appl. No. 13/854,693, filed Apr. 1, 2013, and dated Apr. 20, 2016, 11 pgs.

Non-Final Office Action for U.S. Appl. No. 14/485,180, filed Sep. 12, 2014, and dated Apr. 21, 2016, 41 pgs.

Notice of Allowance and Fee(s) Due for U.S. Appl. No. 14/485,180, filed Sep. 12, 2014, and dated Jan. 23, 2017, 8 pgs.

* cited by examiner

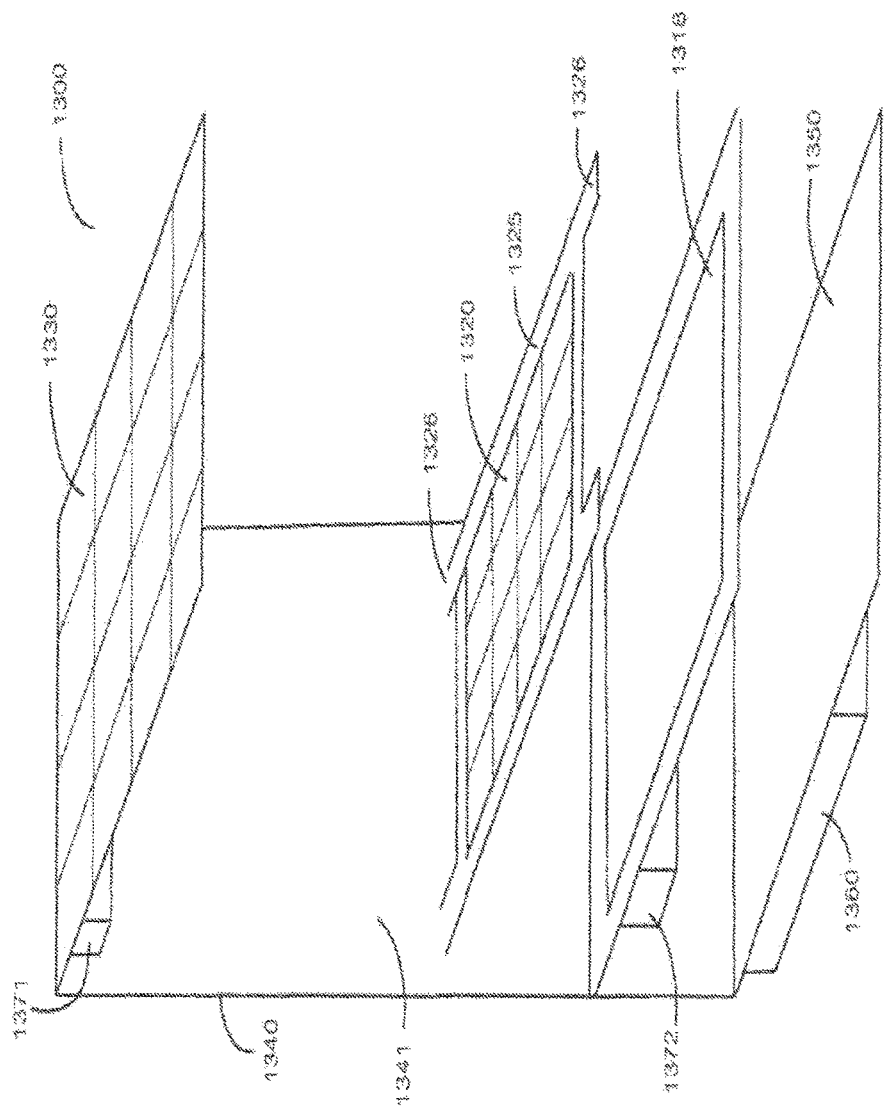

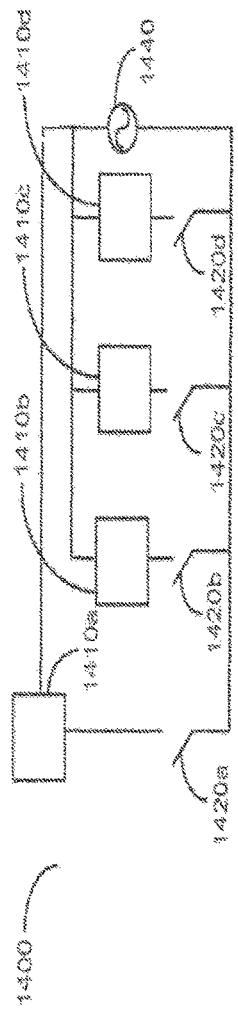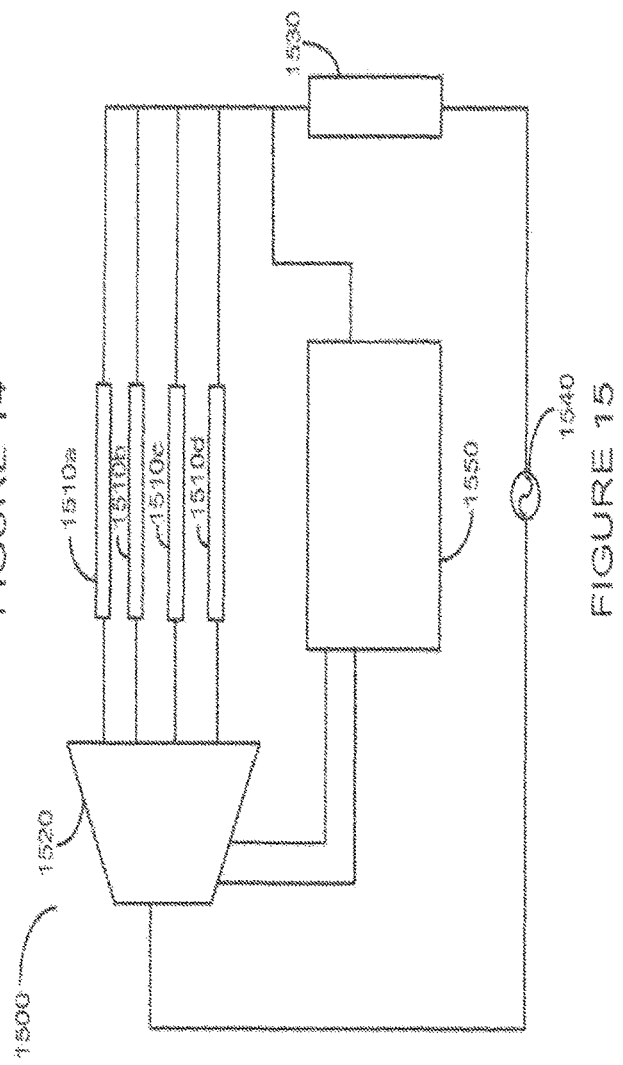
FIGURE 14
FIGURE 15

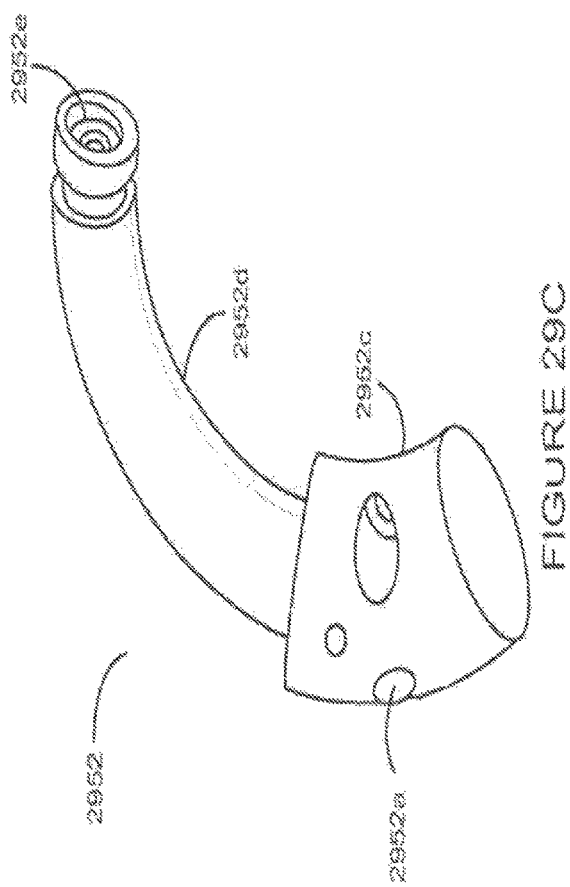
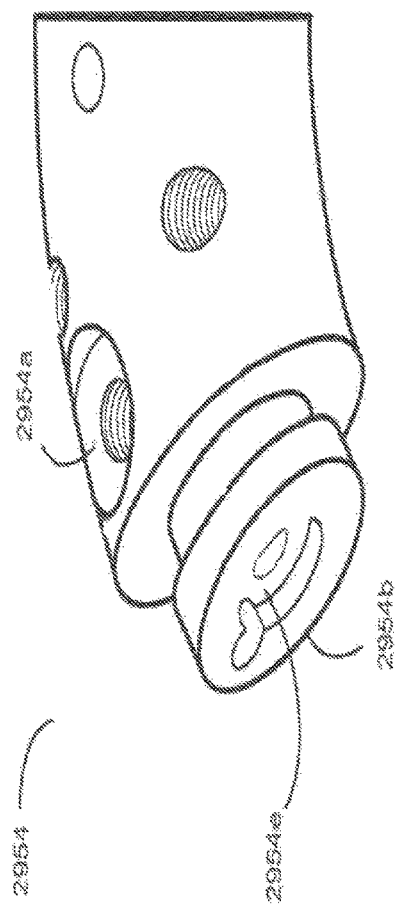

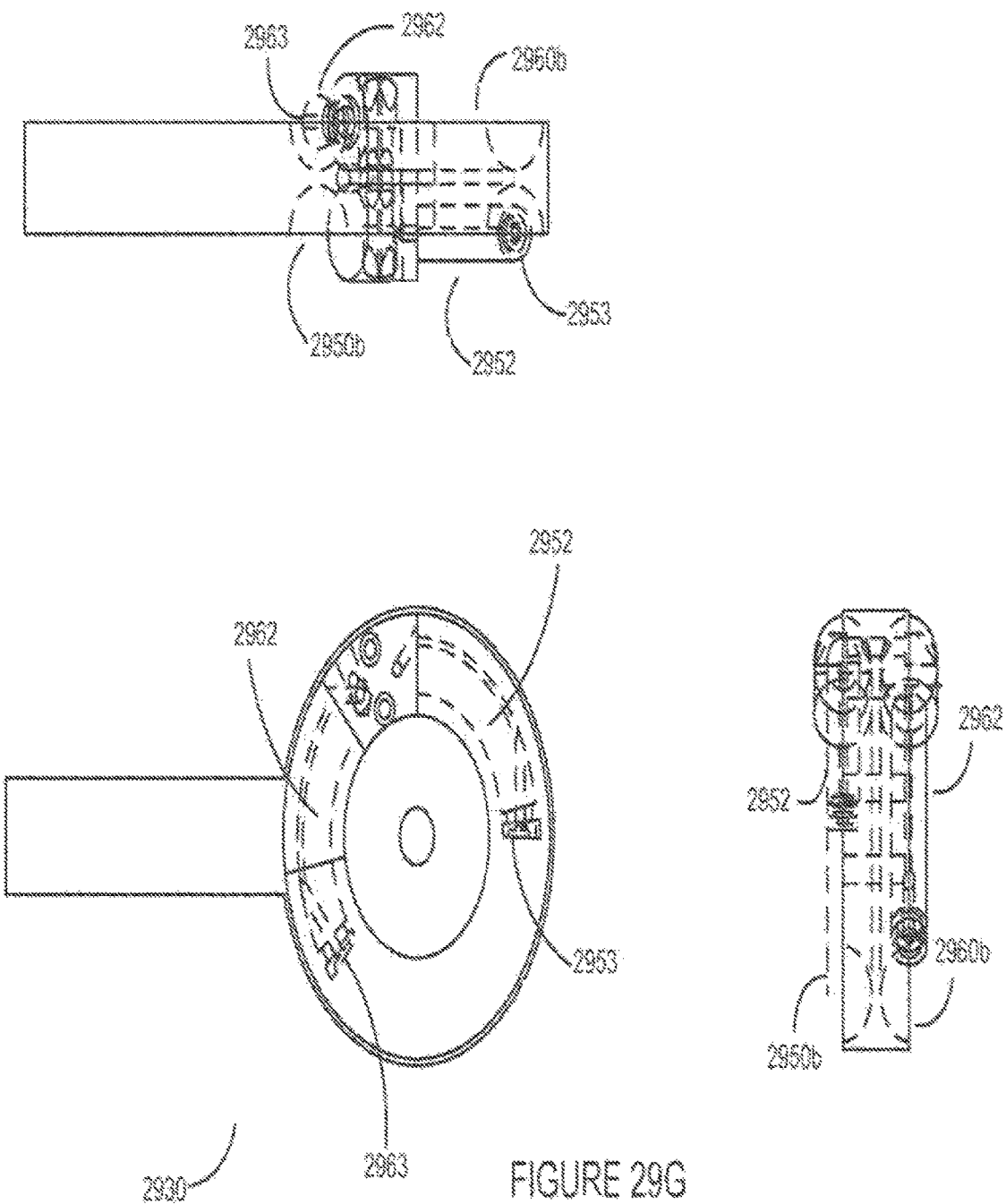

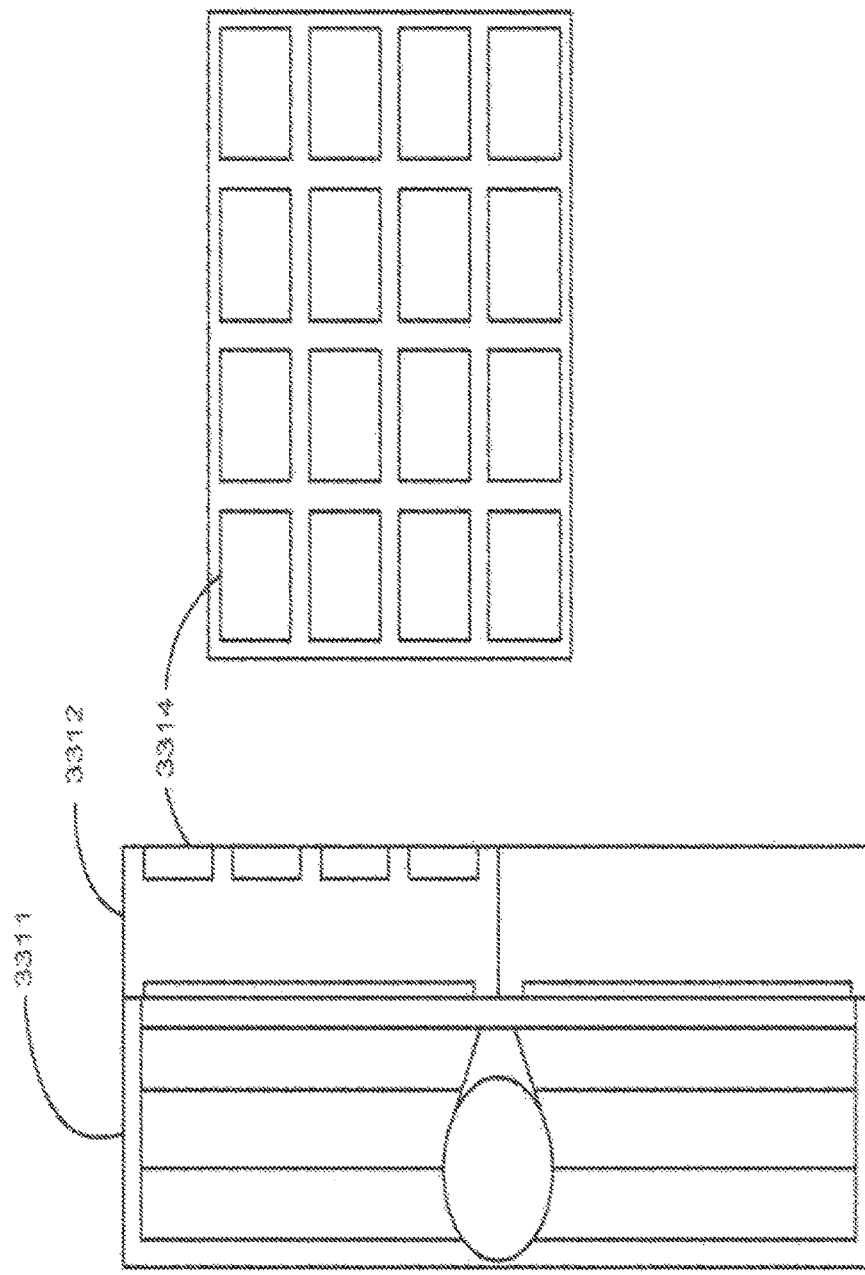

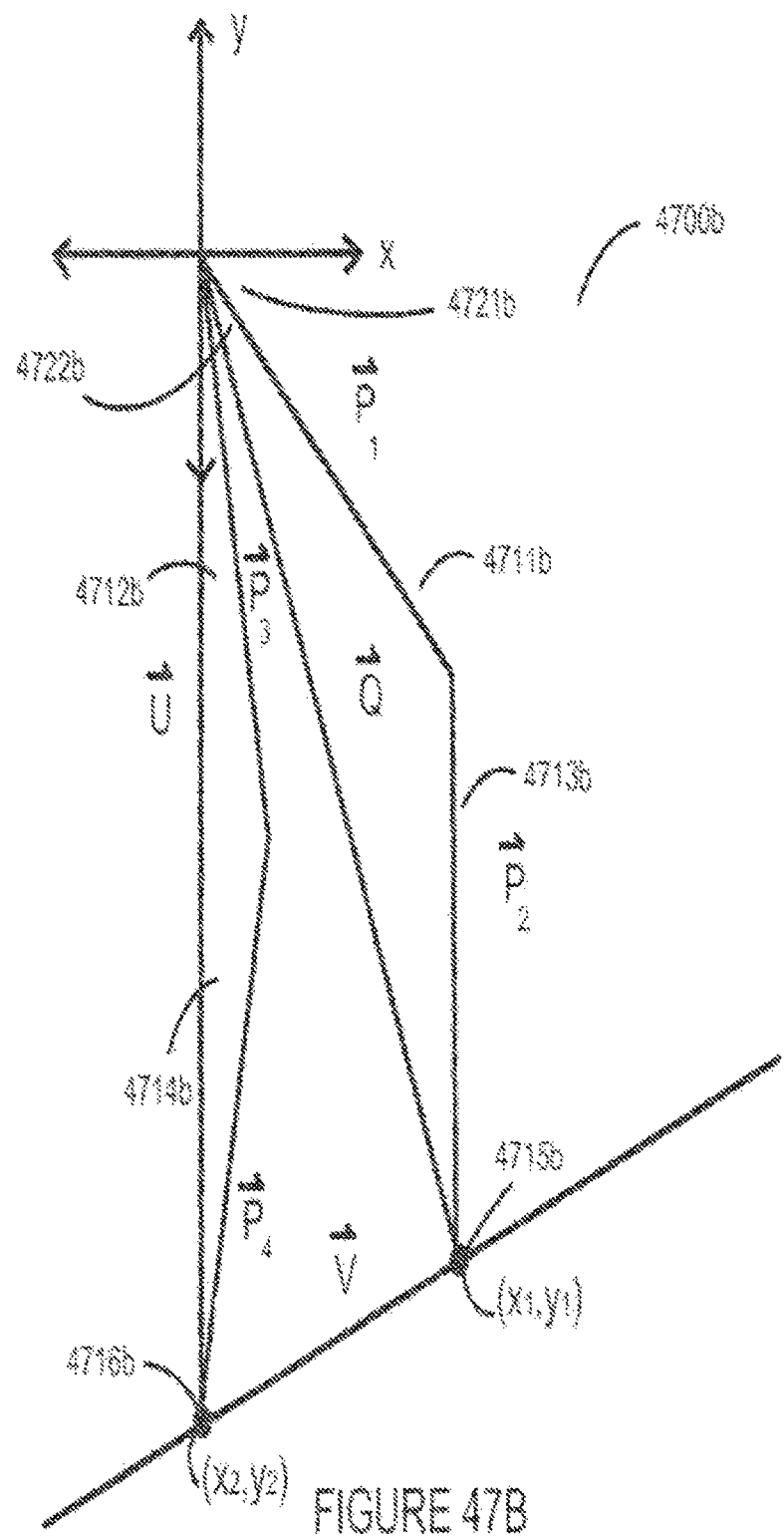

TOUCH SENSITIVE ROBOTIC GRIPPER

RELATED APPLICATIONS

This application is a divisional of and claims priority to U.S. patent application Ser. No. 14/485,180 filed Sep. 12, 2014, and entitled "Touch Sensitive Robotic Gripper," which claims priority to U.S. Provisional Patent Application Ser. No. 61/895,174 filed Oct. 24, 2013 and entitled "Touch Sensitive Robotic Gripper" and is a continuation-in-part of U.S. patent application Ser. No. 13/790,801, filed Mar. 8, 2013 and entitled "Touch Sensitive Robotic Gripper," now issued as U.S. Pat. No. 9,205,567 on Dec. 8, 2015, which claims priority to U.S. Provisional Patent Applications Ser. Nos. 61/608,407 filed Mar. 8, 2012 and entitled "Touch Sensitive Robotic Gripper"; 61/655,949 filed Jun. 5, 2012 and entitled "Touch Sensitive Robotic Gripper"; 61/673,114 filed Jul. 18, 2012 and entitled "Touch Sensitive Robotic Gripper"; 61/683,324 filed Aug. 15, 2012 and entitled "Robot Power Source"; 61/709,822 filed Oct. 4, 2012 and entitled "Robot Power Source"; and 61/767,130 filed Feb. 20, 2013 and entitled "Robot Skeletal Components", all of which are hereby incorporated by reference herein in their entirety.

TECHNICAL FIELD

This disclosure relates to control systems for robots and robotic grippers.

BRIEF DESCRIPTION OF THE DRAWINGS

FIG. 13 is a cross-section view of a sensor array.
FIG. 14 is a schematic diagram of a sensor comprising control circuitry and a sensor array without internal, insulating walls.
FIG. 15 is a schematic diagram of a sensor comprising a control multiplexer and a sensor array without internal, insulating walls.
FIGS. 24A and 24B are cross-section views of skin panels configured to power a robot, such as a robotic gripper or the like.
FIGS. 29C and 29D are front perspective views of the piston and the end cap that may be used in a rotational hydraulic joint.
FIGS. 29E-29H are cross-section views of the center and outer shafts and the rotational hydraulic joint assembled therefrom.
FIG. 33D is a schematic diagram of an embodiment of the linear displacement sensors in a link between the joints of the fingers.

FIG. 47B is a schematic diagram of a vector model that may be used by the processor to calculate the foot positions and slope along a direction of travel using vectors.

DETAILED DESCRIPTION OF PREFERRED EMBODIMENTS

Robotic systems have become increasingly common in automated manufacturing. Some such systems comprise what are known as end effect grippers. Robotic systems including end effect grippers often manipulate an object to a desired location. In many instances, it is critical for proper assembly or fabrication that the object be placed exactly in the desired location. However, known gripping systems are only able to accurately manipulate an object to a desired location if that object is inserted into the gripper at a precise location. This requires that the object be manually positioned and the gripper be manually closed about the object. The manual positioning and closing requires additional time and labor.

A gripping system may use sensors and one or more processors to generate a more sophisticated understanding of an object being grasped by the gripping system. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, microcontroller or other customized or programmable device. In some embodiments, the processor may be comprised of more than one general purpose device and/or special purpose device. The gripping system may also include a memory containing instructions or data. The memory may include static RAM, dynamic RAM, flash memory, ROM, CD-ROM, disk, tape, magnetic, optical, or other computer storage media. In some embodiments, the processor and/or memory may control multiple gripping systems and/or receive measurements from sensors. The gripping systems may be connected to the processor and memory by wires, a wired or wireless network, or other means of communication.

Touch Sensor

Figure 1A:
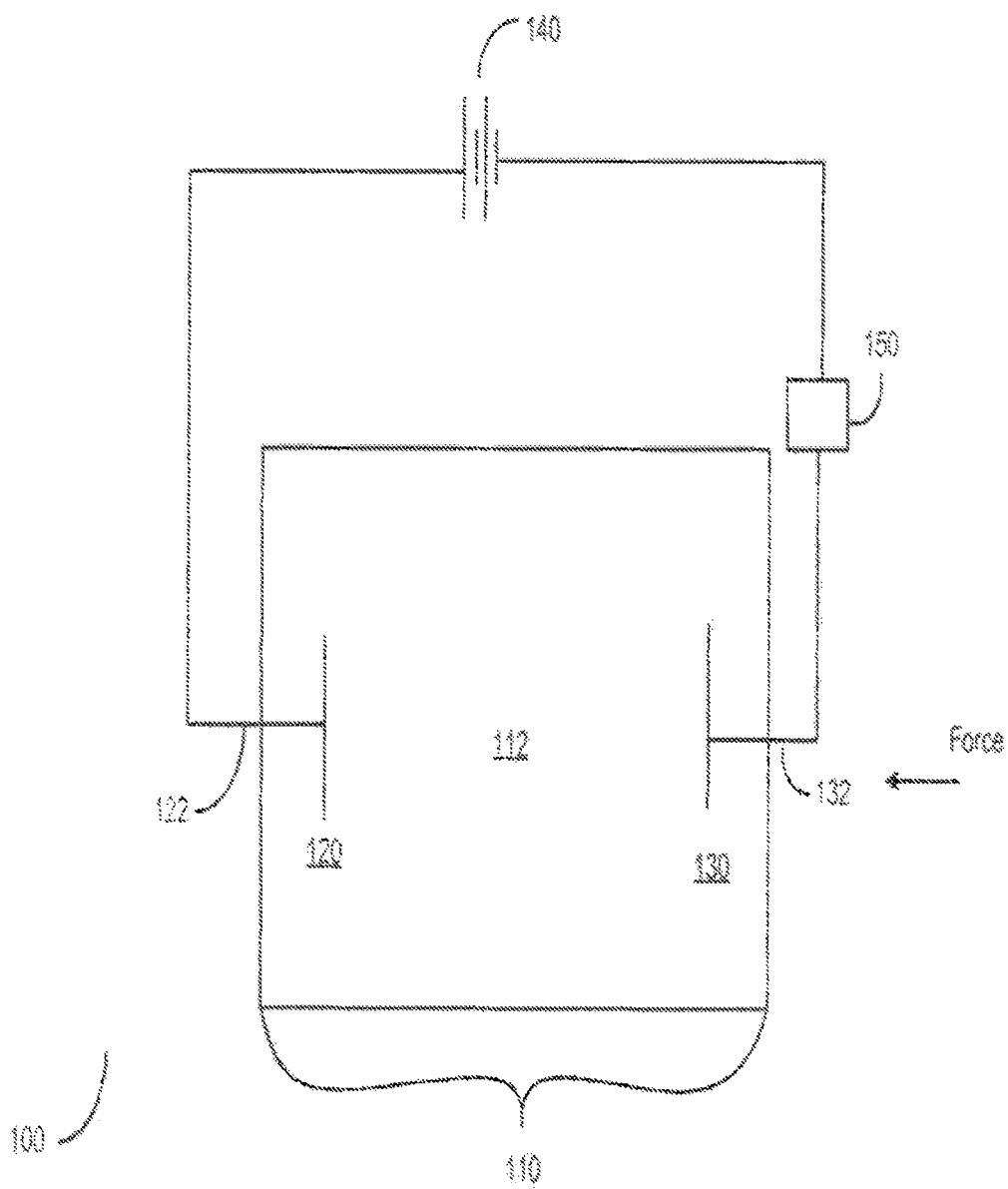
FIGS. 1A and 1B illustrate a touch sensor.

FIG. 1A illustrates a single touch sensor 100 that may be used to describe an object being grasped by a gripping system. The sensor comprises a sensing cell 110 that contains a stationary electrode 120 and a movable electrode 130. The sensing cell 110 is filled with a conductive fluid 112. The conductive fluid 112 may convey charge between the electrodes 120, 130 to prevent a potential difference between the electrodes from causing an accumulation of charge. A dielectric fluid may optionally be used instead of a conductive fluid. Dielectric and conductive fluids may be referred to as electrically operative fluids. A power source 140 is connected to the two electrodes 120, 130 to form a completed circuit through the conductive fluid.

The movable electrode 130 is capable of changing position relative to the stationary electrode 120. When an object presses against the touch sensor, the movable electrode 130 will be pushed towards the stationary electrode 120. As the movable electrode changes position, the resistance, impedance, and other properties of the circuit will change. The resistance, as measured with a voltage meter, is dependent on the distance between the electrodes 120, 130. When the distance between electrodes 120, 130 is largest, the resistance, or impedance, of the circuit will be at a maximum. For many conductive fluids 112, the relationship between distance and impedance or resistance will be approximately exponentially decaying, linear, or the like. Alternatively or in addition, a capacitance between the electrodes may change as the distance between the electrodes changes. An electrical property measuring device 150 may be used to measure the changes in properties of the circuit as the movable electrode 130 changes position. The measurements from the electrical property measuring device 150 may be used to determine the distance between electrodes 120, 130.

Many different types of electrical property measuring devices 150 and configurations of the circuit are possible. In the illustrated embodiment, the power source 140 is a constant voltage source and the electrical property measuring device 150 is an ammeter in the configuration illustrated. However, the touch sensor 100 could be reconfigured to have a constant current power source and a voltmeter set up in parallel with the sensing cell 110. An ohmmeter could be used as both the power source and the measuring device. A resistor or other circuit component could be placed in parallel or series with the sensing cell 110, which would allow an ammeter to be used with a constant current source or a voltmeter to be used with a constant voltage source. A voltmeter could measure the voltage drop across a series resistor to determine the electrical properties of the sensing cell. For a circuit with a changing capacitance, a capacitance meter could be used to measure the capacitance, and/or the capacitor voltage, capacitor current, and/or capacitor impedance could be measured. The power source may supply direct current or alternating current. The power source may also apply power at regular sampling intervals or have a duty cycle of less than 100%. In an embodiment, an AC power source is used to reduce electrolysis at voltages above the electrolysis voltage. Alternatively, a DC power source may be used when the voltage across the cell is maintained below the electrolysis voltage. For water and aqueous solutions, the electrolysis voltage may be approximately 1.23 volts. A high voltage (e.g., greater than 20, 50, 100, etc. volts) may be applied across a cell to increase resolution. The higher voltage may be digitized in sections. The high AC voltage may cut the amplitude into small sections by filtering successive portions, by using a high voltage analog-to-digital converter (ADC), by applying a voltage divider network, etc. The voltage may be measured in successive ranges of 0 to 10 volts for digitizing the analog measurements.

Those of skill in the art will recognize other possible circuits that would allow an electrical property measuring device 150 to measure changes in the position of the flexible, movable electrode. Any measurement of voltage, current, impedance, or resistance can be converted to another measurement using Ohm's law of V=IR. For more complicated systems, Kirchhoff's circuit laws may also be needed to perform the conversion. The cell may be modeled as an electrolytic capacitor with a capacitor and resistor series equivalent circuit. More complicated circuit models may include additional resistors and capacitors and/or inductors in series and/or parallel.

Many different kinds of conductive fluid 112 are possible including water mixed with sodium chloride, calcium chloride, sodium acetate, potassium iodide, or any other salt that creates an electrolyte when mixed with water; vinegar; gallium; gallium alloys; wood's metal; gallium aluminum alloy; sodium potassium alloy; and sulfuric acid. In general, the conductive fluid 112 may comprise any salt, acid, and/or base. Non-toxic electrolytes, as specified in material safety data sheets, from vendors such as Alfa Aesar, including acetates, sulfates, and chlorides in aqueous solution, may be used in some embodiments. Non-toxic antifreeze, such as propylene glycol or glycerol, and/or toxic antifreeze, such as ethylene glycol may be added to water-based conductive fluids. Alternatively, or in addition, an organic inhibitor may be added to or used as the conductive fluid to prevent the growth of organic substances. For example, a conductive fluid may include Type I purified water may be used with a non-conductive organic inhibitor and/or an antifreeze as the primary additives. Many conductive fluids are commercially available including: Indium Corporation's Gallium Alloy 46L with a melting point of 7.6 degrees Celsius; Rotometal's Gallinstan with a melting point of −19 degrees Celsius. These metals become liquid at warm temperatures and offer high conductivity. Potassium chloride is available commercially from sources, such as Cole-Parmer KCL 3M with saturated AgCl. The choice of conductive fluid 112 may depend on the cost, safety, and precision desired. Gallium alloys and sodium potassium alloy may be expensive. Sodium potassium alloy reacts violently with air when heated, but then forms an oxide coating that inhibits further reaction. Gallium aluminum alloy reacts violently with water releasing hydrogen gas and does not have any inhibiting activity. Additionally, the choice of conductive fluid 112 will affect the requirements of the power source 140 and electrical property measuring device 150.

A highly conductive fluid may consume more energy unless a low voltage source 140 is used. A more resistive fluid may consume more energy when a constant current source is used. A more sensitive electrical property measuring device 150 may also be required for more highly conductive fluids. The impedance of the cell may be controlled by controlling the solute electrolyte ratio to the volume, or molar concentration, of the aqueous solution with additives. In an embodiment, the conductive fluid 112 may have a resistance in the kilohms (e.g., between 1 kilohm and 250 kilohms). Fluids with different resistivities may be used for different sensor types, such as sensors with flexible walls versus sensors with pistons. A conductive elastomer foam, gel, or powder may be used in some embodiments in place of a conductive liquid, however the electrode arrangement is retained regardless of the conductive media. An alternative distance sensor design may include a linear potentiometer. Examples of linear potentiometers include the 3046 line of potentiometers from Bourns. In such an embodiment, a spring may be attached to one end of the shaft to apply a known pressure to an object. However, potentiometers may have size and cost disadvantages.

The electrodes 120, 130 comprise flat plates in the illustrated embodiment. Wires 122, 132 connect the flat plates with the power source 140 and electrical property measuring device 150. The electrodes 120, 130 may be made of conductive material such as copper, silver, aluminum, platinum, graphite, carbon, or any other conductive material known in the art. The size of the electrodes 120, 130 will depend on the size and geography of the object to be grasped by the gripping system. For very small or complicated objects, the flat plates may have a surface area on the order of $10^{-4}$ square inches.

Figure 1B:
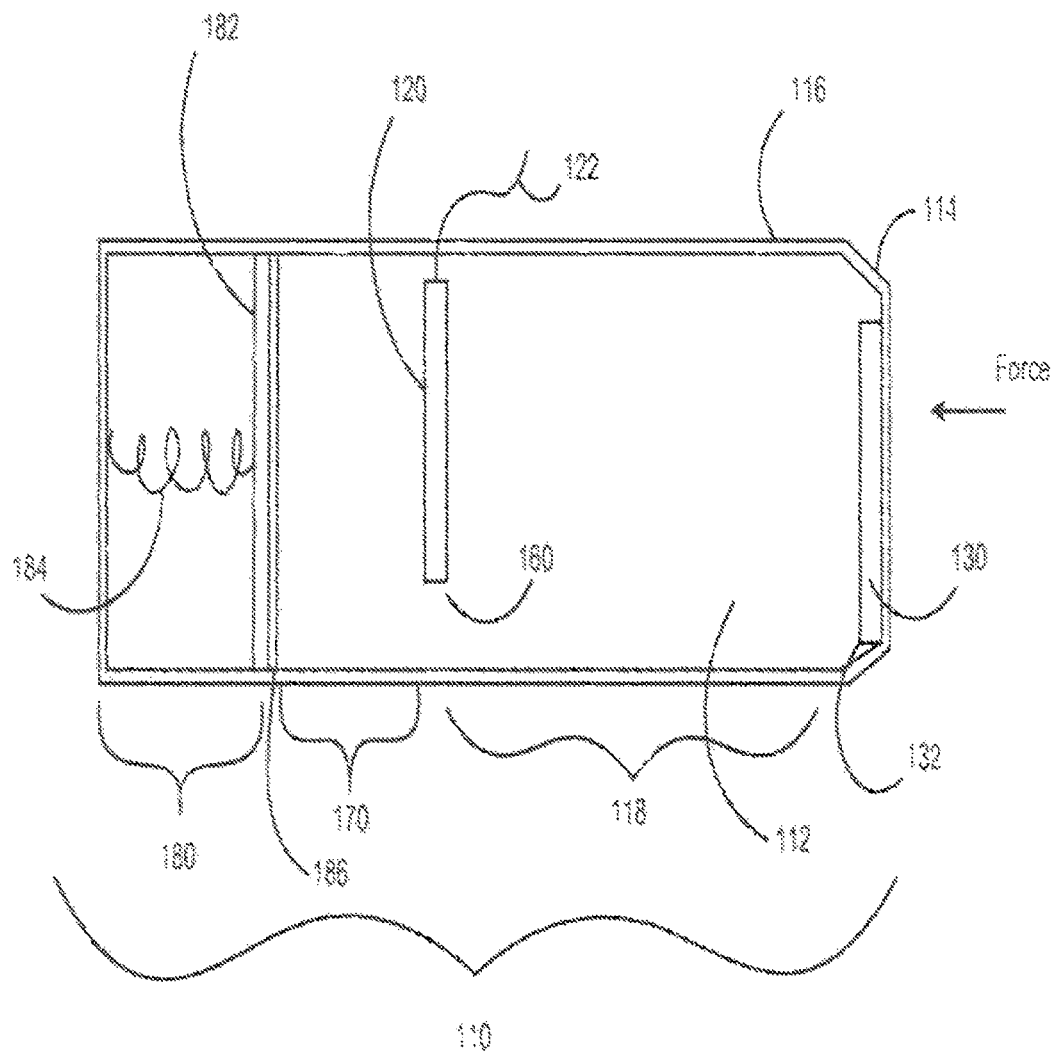

FIG. 1B illustrates the structure of the sensing cell 110 in more detail. The movable electrode 130 is attached to a flexible silicon wall 114. The remainder of the sensing cell wall 116 is made from a thermoset or thermoplastic, a flexible wire cable, an elastomer, such as silicon rubber, or the like. The stationary electrode 120 further comprises a baffle 160 that allows the conductive fluid 112 (or a dielectric fluid) to escape into reservoir 170 as the movable electrode 130 is compressed towards the stationary electrode 120. A pressure controller 180 may allow the conductive fluid 112 to escape into the reservoir 170 when the movable electrode 130 is compressed. The pressure controller 180 forces the conductive fluid 112 back into the sensing chamber 118 when the movable electrode 130 is no longer compressed. The conductive fluid 112 may be incompressible to prevent compression of the movable electrode from changing electrical properties of the conductive fluid.

In this embodiment, the pressure controller 180 may comprise a metal plate 182 and a mechanical spring 184 that applies pressure to the metal plate 182 in accordance with Hooke's law. A silicon layer 186 may be affixed to the metal plate 182. Alternatively, the silicon layer 186 may act as a mechanical spring without the metal plate 182. The silicon layer 186 may seal the back end of the reservoir 170 from possible leaks or loss of conductive fluid 112. In other embodiments, a hydraulic or pneumatic spring may be used in place of the mechanical spring 184. The mechanical spring may be a simple elastomer spring effect, a fluid flow controlled by a pressure regulator, or the like. The pressure controller 180 may also comprise a pressure measuring device and/or pressure regulating device that determines the pressure of the conductive fluid 112. The pressure measuring device may measure the movement of the metal plate 182 and/or the silicon layer 186, or the pressure measuring device may use other methods known in the art to determine the pressure of the conductive fluid 112. The pressure controller 180 may comprise a piezoresistive pressure transducer (not shown) in contact with the metal plate 182, the silicon layer 186, and/or the flexible walls 114. The piezoresistive pressure transducer may be attached to the metal plate 182 and in contact with the silicon layer 186. The piezoresistive sensor may be used to measure shear forces on the cell. In some embodiments, the pressure may be determined by measuring the in-line pressure of the hydraulic system.

Materials besides silicon may be used for the flexible wall 114 in other embodiments. The flexible wall may conform to the structure of the object being grasped and may be nonconductive. Suitable materials may include latex, plastics, natural and synthetic rubbers, and silicones. Because the flexible wall 114 will be used to grasp the object, the material for the flexible wall 114 may be selected to have a high coefficient of friction with the object intended to be grasped. In some embodiments, it may also be desirable that the movable electrode 130 be flexible as well. In those embodiments, the movable electrode may comprise conductive polymers, such as conductive or doped silicon or fluorosilicone. Alternatively, metal electrodes may be used where the metal electrode is thin enough to flex, or the metal electrode has a small enough surface area to contour to the surface of the object being gripped.

Sensor Array

Figure 2:
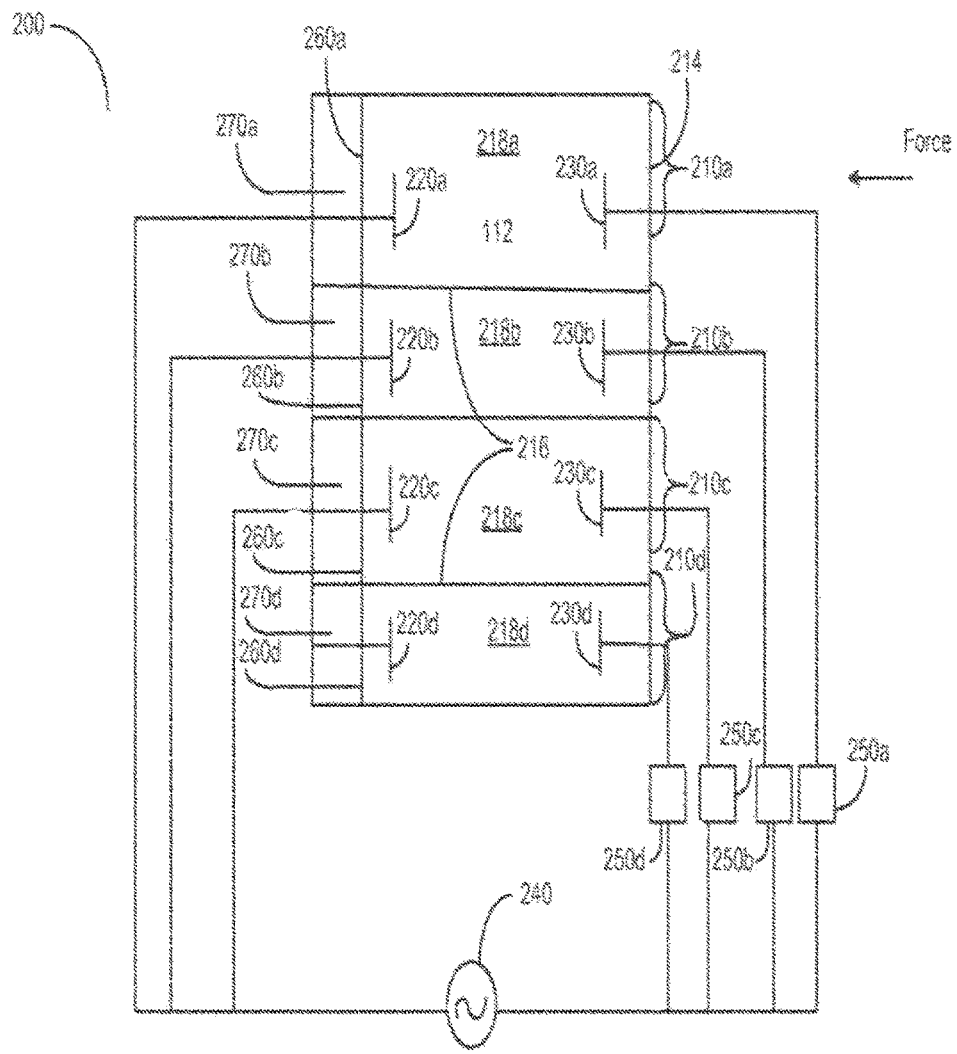
FIG. 2 illustrates an array of touch sensing cells.

FIG. 2 illustrates an array of sensing cells 200 that may be used to measure the different areas of an object pressing the individual sensing cells 210$a,b,c,d$. Each sensing cell 210$a,b,c,d$ in the array is connected to its own electrical property measuring device 250$a,b,c,d$. The illustrated array 200 will produce a two dimensional set of measurements of the object touching the array 200. The array 200 can detect the length of the object and the length of various components of the object and the depth of the object and the depth of various components of the object. By stacking additional sensor cells on top of or below the array 200 (into or out of the figure), an array could be created that will create a three dimensional set of measurements of the object. The width of the object and the width of various components of the object may be detected in this configuration. Whether an array sensing two dimensions or three dimensions is used will depend on the application of the gripper. Also, depending on the sensing needs, the array may contain very few sensors or may contain many thousands of sensors.

Each sensing cell 210$a,b,c,d$ comprises a baffle 260$a,b,c,d$ and a reservoir 270$a,b,c,d$. As shown in this embodiment, the stationary electrodes 220$a,b,c,d$ may be separate from the baffles 260$a,b,c,d$. The movable electrodes 230$a,b,c,d$ may be attached to a flexible wall 214. In this embodiment, the sensing cells 210$a,b,c,d$ are separated from each other by the thermoset, thermoplastic, or elastomer walls 216. In other embodiments, conductive fluid 112 may be allowed to flow between reservoirs 270$a,b,c,d$ or a common reservoir may be shared by all the sensing cells 210$a,b,c,d$. Additionally, embodiments may have sensing chambers 218$a,b,c,d$ not separated by the thermoset or thermoplastic walls 216. However, this may create cross conductivity between movable electrodes 230$a,b,c,d$ and stationary electrodes 220$a,b,c,d$ in different sensing cells 210$a,b,c,d$. In some embodiments, a single plate may comprise the stationary electrodes 220$a,b,c,d$ or the stationary electrodes 220$a,b,c,d$ may be electrically coupled with one another. In these embodiments, the electrical property measuring devices 250$a,b,c,d$ and circuits may be configured to measure an electrical property of a single movable electrode 230$a,b,c,d$. For example, ammeters may be placed between the power source 240 and the movable electrodes 230$a,b,c,d$ rather than between the stationary electrodes 220$a,b,c,d$ and the power source 240.

Grippers

Figure 3:
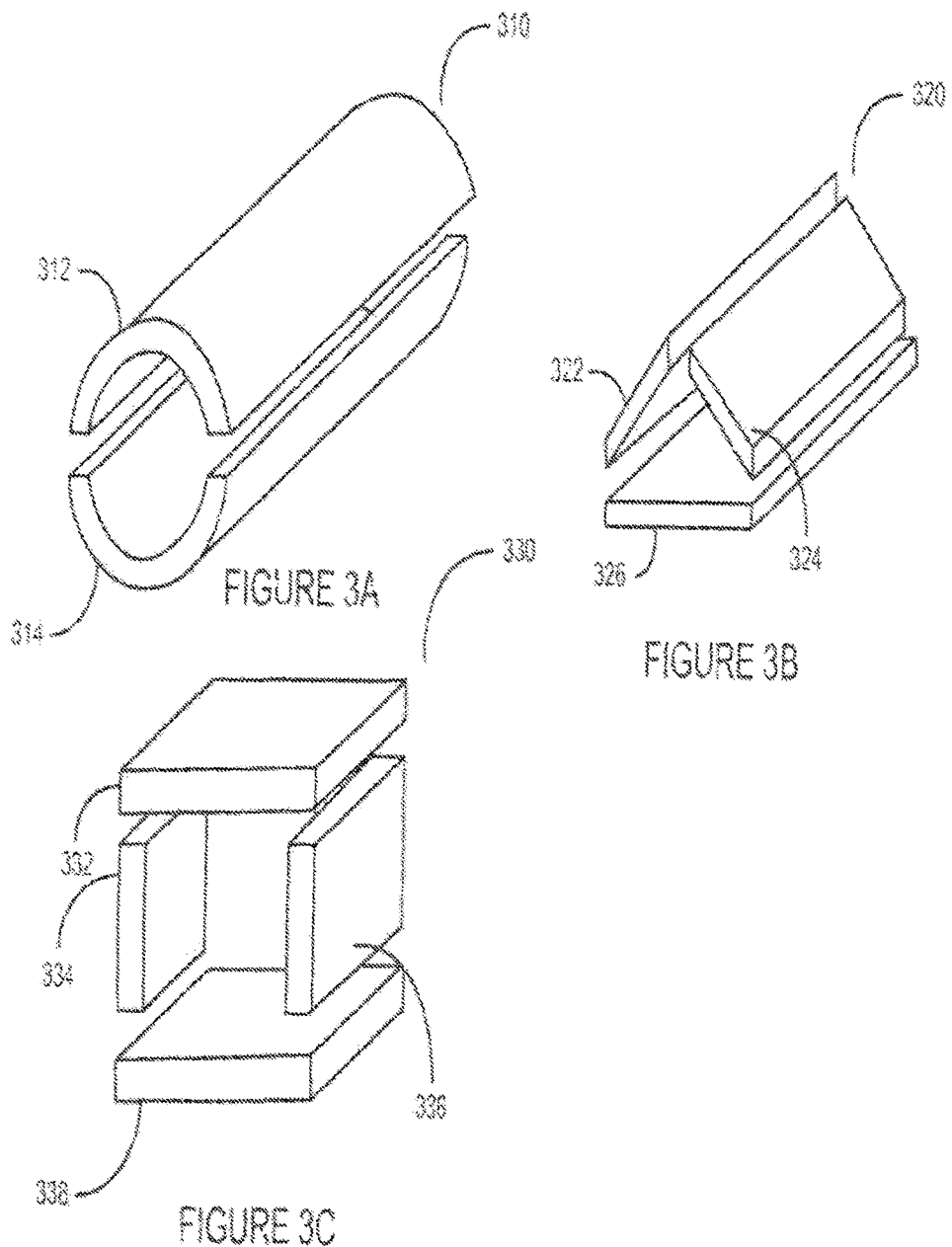
FIGS. 3A-3C illustrate embodiments of grippers.

FIGS. 3A, 3B, and 3C illustrate various embodiments of grippers that may comprise sensor arrays 200. Grippers may have two 310, three 320, or four 330 gripping members. Those of skill in the art will recognize how to make grippers comprising more than four gripping members. In some embodiments, a sensor array 200 may be placed on the inside, outside, or both inside and outside of a preexisting gripping member depending on the gripper's function. For those grippers meant to grasp the outside of an object, the sensor arrays 200 may be placed on the inside of the gripping members. For those grippers meant to grasp an object from the inside, for example grabbing a container or bottle from the inside, the sensor arrays 200 may be placed on the outside of the gripping members. In other embodiments, the gripping member is formed entirely from the sensor array 200 with the flexible wall 214 and thermoset or thermoplastic walls 216 defining the shape and structure of the gripping member. The movable electrodes 230$a,b,c,d$ are located on the side of the gripping member that is meant to come in contact with the object being grasped. For gripping members that may contact objects on both sides, sensing cells 210$a,b,c,d$ may face both directions. In other embodiments, a single sensing cell may have a stationary electrode with movable electrodes on each side of it.

For a gripper with two gripping members 310, half-cylindrical gripping members 312, 314 may provide more contact area with the object being grasped. In other embodiments, the two gripping members may each be flat, one may be flat with the other half-cylindrical, or they may be any other shapes that would maximize contact area with the object being grasped. The shape will depend on the particular object to be grasped. A gripper with three gripping members 320 may be configured such that the gripping members 322, 324, 326 are flat and approximately form the sides of a triangle. The triangle may be equilateral, isosceles, or obtuse. For any triangle, at least two of the angles formed between the gripping members will need to be acute. The gripping members 322, 324, 326 may also be shapes other than flat depending on the object to be grasped. Similarly, a gripper with four gripping members 330 may have flat gripping members 332, 334, 336, 338 that approximately form the sides of a square. However, it 330 may also form other quadrilaterals and may have gripping members 332, 334, 336, 338 that are shapes other than flat. Those of skill in the art will recognize other shapes including three dimensional shapes, for example a hemisphere, that may be approximately formed by the configuration of a given number of gripping members. Any of the above described embodiments of gripper members, whether round, triangular, or square, can have one or more additional members (not shown) that can move perpendicular relative to the movement of the gripping members. The additional members may then move inside the square, triangular, or round shapes to measure the dimensions of the object from a third axes in order to create a more complete three-dimensional profile of the object being grasped. The additional members would enter between the two members 312, 314, three members 322, 324, 326, or four members 332, 334, 336, 338 shown in FIGS. 3A, 3B, and 3C, respectively.

The gripping members 312, 314 are designed to be moved relative to one another so that they 312, 314 may grasp an object. When the gripping members 312, 314 are closest to each other or grasping an object, the gripper 310 may be described as closed. When the gripping members 312, 314 are furthest from each other, the gripper 310 may be described as open. Actuators controlling the position of the gripping members 312, 314 may open and close the gripper 310. Also, dowel rods and guide pins may control the path of the gripping members 312, 314 to ensure that they are aligned correctly. High precision guide pins may be used when very accurate positioning is required. The actuator movement may be accomplished with pneumatic, hydraulic, or electric motors or other means known in the art. An electric motor and lead screw may be used to produce linear actuation of the gripping members 312, 314.

In addition, the gripper may be controlled by actuators that change the linear position of the gripper among a three dimensional space. Additional actuators may also allow rotation of the gripper along one or more axes. These actuators may precisely control the movement of the gripper and object being grasped to allow for high precision assembly, fabrication, insertion, manufacturing, surgery, measurement or other known uses for automated grippers.

Gripping Systems

Figure 4:
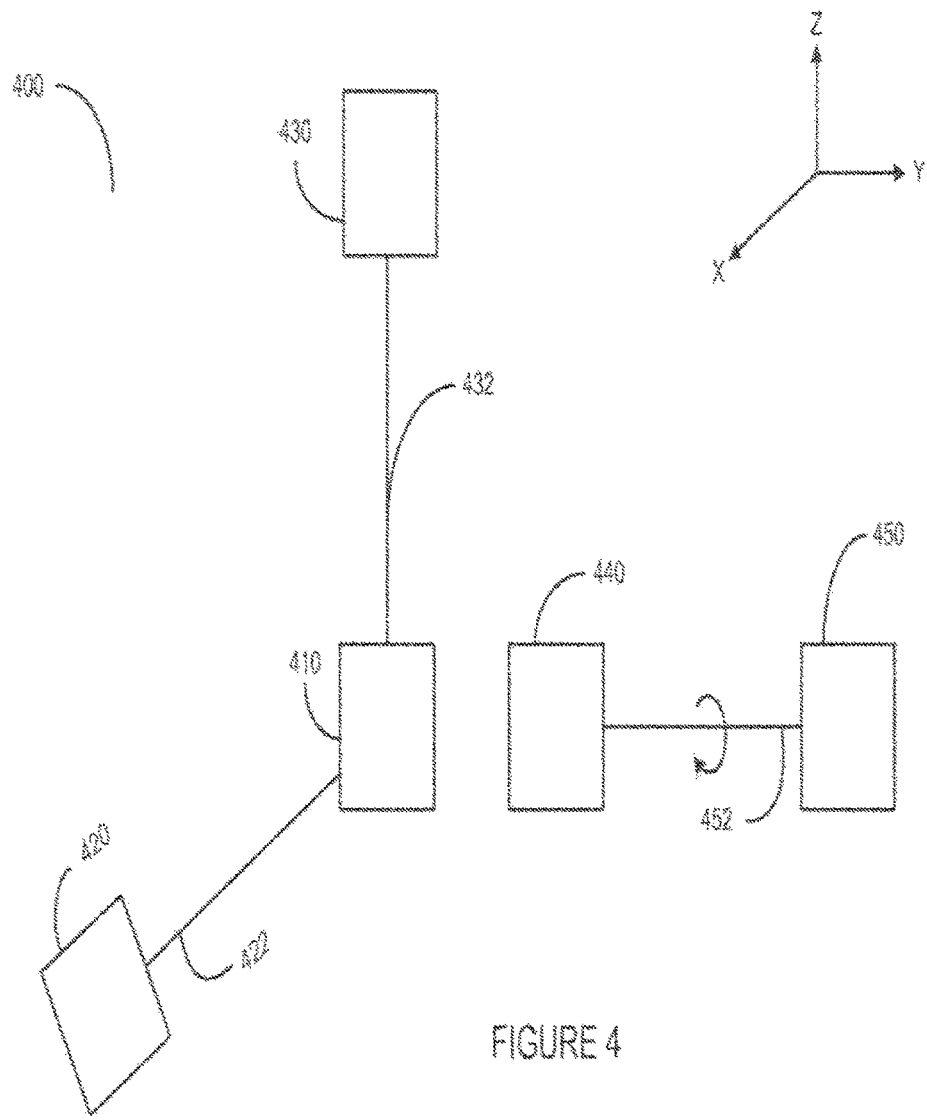
FIG. 4 illustrates a system for controlling the location and orientation of grippers.

FIG. 4 illustrates a system 400 for manipulating one or more grippers 410, 440 after at least one gripper 410 has closed on an object. Although two grippers 410, 440 are shown in this embodiment, the second gripper 440 may be replaced by other tools known in the art such as tools for drilling, milling, powder coating, assembly, or other operations. In this embodiment, the gripper 410 grasping the object may be moved along the X and Z axes. Actuators 420, 430 (e.g., servos) may use lead screws 422, 432 to control the movement of the gripper 410 along these axes.

The second gripper 440 may move only along the Y axis and may be controlled by an actuator 450 and lead screw 452. Another actuator (not shown) may also rotate the second gripper 440 about the Y axis. This may allow for an object held by the first gripper 410 to be screwed into an object held by the second gripper 440. Even though, in the illustrated embodiment, each gripper 410, 440 is only limited to movement along some axes, the grippers 410, 440 may move relative to each other along all axes. Thus, the system 400 can correct for offsets in location along the X, Y, or Z axes. In other embodiments, each gripper 410, 440 may be able to move along all the axes and rotate about all the axes. In some embodiments, the second gripper 440 is a conventional gripper and the first gripper 410 is a touch sensitive gripper. Other "off-the-shelf" robotic systems may be used that control the gripper with 4 to 6 axes of manipulation. Exemplary "off-the-shelf" systems include the Kuka AG's KR series, or manipulators, such as Fanuc Robotics Industrial Robots, may be incorporated into the gripper actuation. Robotic systems, such as the Fanuc M-1iA, may incorporate movement of a single gripper into a three motor X-Y-Z axis control system. An alternative control scheme may use a single hydraulic motor to control three hydraulic joints.

Figure 5:
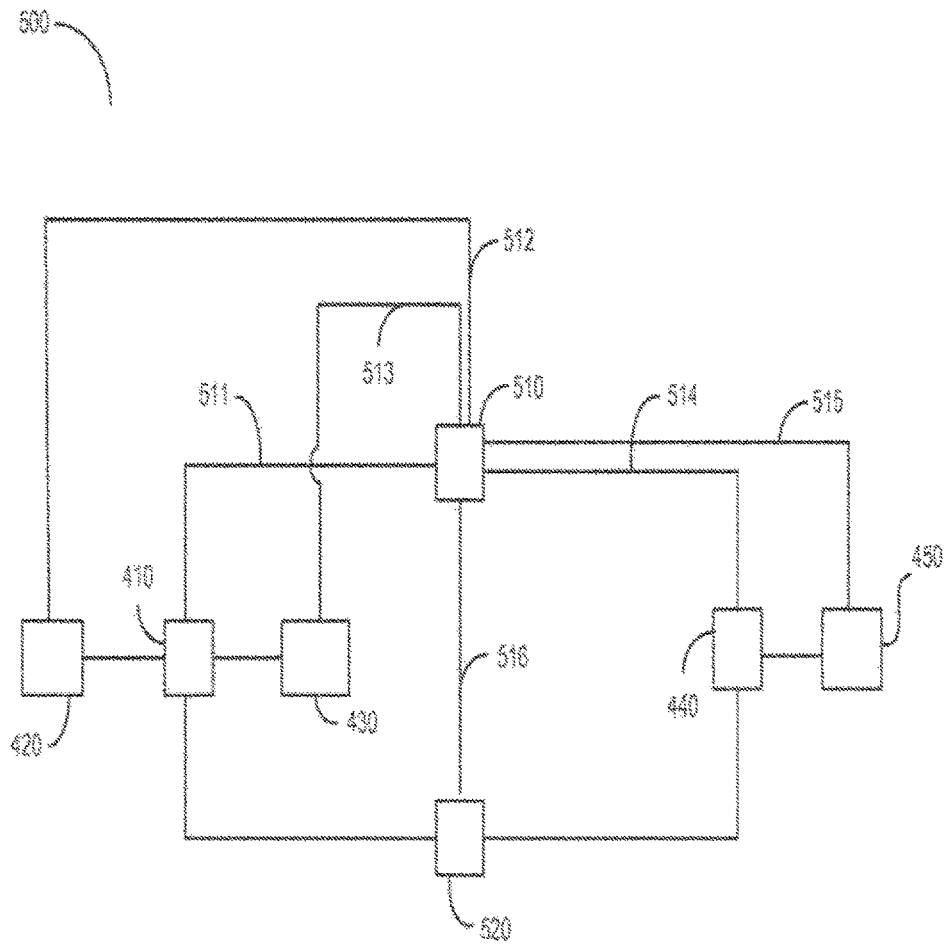
FIG. 5 illustrates a gripping system that controls the closing, location, and orientation of grippers based on information from touch sensors.

FIG. 5 illustrates a touch sensitive robotic gripping system 500 with a processor 510 for controlling the system. The gripping system 500 may be a component of a complete robotic system (not shown), which may include vision systems, proximity detection, safety shut-off, computer integration, programmable logic controllers (PLCs), LIDAR, computer geographic modeling, and/or robotic arms. The complete robotic system may be autonomous, semi-autonomous, or operator controlled. In the illustrated embodiment, a hydraulic system 520 is controlled by the processor 510 with wire 516. The hydraulic system 520 may be used to open and close the grippers 410, 440, regulate pressure on reservoirs 270 collectively or individually, regulate pressure control valves, and control direction fluid valves. The pressure and fluid control valves may be regulated using pulse width modulation. The electrical property measurements and pressure measurements may be sent from the grippers 410, 440 to the processor 510 over wires 511, 514. The processor 510 also may control the actuators 420, 430, 450 using wires 512, 513, 515, which allows the processor 510 to modify the location of the grippers 410, 440. Alternatively, the actuators 420, 430, 450 may be linear or radial hydraulic actuators and the wires 512, 513, 515 may control pressure and fluid directional valves. In other embodiments, the processor 510 may control components and receive measurements wirelessly or through other known methods of communication.

The processor 510 may receive sampled and quantized measurement data regarding the object that it is gripping from electrical property measuring devices 250$a,b,c,d$, and pressure measurement devices in each gripping member 410, 440. Shear sensors (not shown) and temperature sensor (not shown) in each gripping member 410, 440 may send measurements to the processor 510. The processor 510 may convert this sampled data into a geographic model of the object being grasped. The processor 510 may compare this model with a diagram of the object stored in a memory. Objects may be recognized by comparing geographic shapes and/or blueprints stored in the memory to measured dimensions and/or computer generated geographic shapes of grasped objects. In an embodiment, one or more neural networks may perform the comparison. Geographic shapes of objects may be stored along with operations that may be performed with these shapes. Objects may be compared to two and/or three dimensional prints and/or representations stored in the memory by design programs, such as Auto-CAD.

A vision system may create a model and compare the model to a 3D computer-aided design (CAD) drawing to determine an object and its pose (e.g., it's position and orientation). One such system is disclosed in U.S. Pat. No. 7,680,300 to Chang et al. The gripper may be positioned to grasp an object based on a model generated by a vision system that teaches the location of an object relative to the gripper system. The gripper grabs and models the object, compares the gripper model to the vision model and/or the CAD drawing, and determines the pose of the object in the robotic hand. The model created by the vision system, the CAD drawing, and the gripper model can give robotic systems eye-hand coordination. The high frequency and sensitivity of measurements by the sensors in the hand can give higher spatial and/or temporal resolutions than vision systems and may create a super resolution of the object in the hand. The object model may be created and recognized with programs such as are available from the Point Cloud Library. The robotic hands may be instructed to grasp an object in a commanded position. A method of commanding a grasp pose is disclosed in U.S. Patent Application Publication No. 2013/0041502 of Shi et al. The interaction of the gripper and vision system may allow the gripper to grasp an object with a commanded pose, and the sensors described herein may determine the precise pose of the object in the robotic hand. Then, the processor 510 decides how to properly manipulate the object using the actuators 420, 430, 450 based on this information. The processor may control a robot with a robot-specific operating system, such as the MoveIt! operating system available from the Robot Operating System.

The raw measurement data may be sampled and quantized before it is transferred to the processor 510. The rate of sampling may depend on what the gripping system 500 is being used for. The raw measurement data may be sampled many thousands of times per second when the manner in which the object is grasped is important. Whereas if the orientation only needs to be determined once, the processor 510 may sample only a few times per second or once per object being grasped. The time for the processor 510 to manipulate the sampled data may also determine how often the raw measurement data is sampled. The processor may only sample the measurement data when it is has completed the previous calculation and is ready to perform another calculation. In some embodiments, the grasping of an object may cause one or more movable electrode 230 to tilt at an angle to the stationary electrodes 220. As a result, the measured distance between electrodes 220, 230 may increase as the electrodes 230 tilt. Accordingly, modeling, handling, and/or the like can be improved by knowing the angle of the electrodes during measurement of distance, capacitance, resistance, etc. The processor and/or custom hardware may be configured to measure and/or determine the angle of the electrodes. A higher sampling rate may be required in embodiments and/or configurations where tilting is possible to enable to the processor to detect and correct for tilt error. To detect tilting, the processor may monitor the displacement measurements for instantaneous and/or unexpected changes. Small point electrodes may be used to eliminate the possibility of electrodes tilting. The number of point electrodes may be well over 100 per square inch. In some embodiments, the pressure measurement data and electrical property measurement data may be sampled at different rates.

The number of bits per sample (quantization) will also depend on the application of the gripper system. For more precise measurements or systems where a wide fluctuation in measurements is possible, 32, 64, or higher bit samples may be required. The quantization rate may also be limited by the sensitivity of the measuring devices 250. For less sensitive measuring devices, there may be little or no benefit to using more than 16 or 8 bits per sample. In some embodiments, the measuring devices 250 may perform the sampling and quantization as part of the measurement process. In other embodiments, the processor 510 or another component performs the sampling and quantizing. The sampled and quantized measurement data may be stored in the memory.

For the processor 510 to convert the sampled measurement data into a geographic model of an object, the processor 510 may first calibrate the measurement data to displacements. In some embodiments, the sampled electrical property measurements (e.g., voltage, capacitance, current, resistance, impedance, etc.) may be converted to displacement measurements by moving the movable electrodes 230 to a known distance so the processor can determine the value of the electrical property measurements received at that distance. A set of data points may be generated by measuring the electrical property across a series of displacements separated by known increments (e.g., separated by equidistant increments). The processor may create a linear fit for the entire set of detected calibration values or it may create a linear interpolation between each pair of detected values. In other embodiments, a non-linear function may be used to fit the detected calibration values or interpolate between detected values. A set of discrete data points, a fit for the data points, and/or one or more interpolations for the data points may be referred to as an electrical property measurement to displacement curve. Alternatively, to calibrate the gripper, a flat object or object shaped similarly to the gripping member may be slowly closed upon by the gripper. The processor 510 may use the information received from this process to map electrical property measurements to a linear or non-linear distance scale with arbitrary units, and/or a distance to voltage scale may be created. Each measurement may be mapped to a discrete value. The number of steps used by the processor 510 when quantizing the electrical property measurements may depend on the distance and measurement increments. The minimum discrete increment (e.g., minimum step) may be selected to correspond to a desired displacement measurement resolution. For example, to measure a distance of 0.750 inches with an accuracy of 0.001 inches, the processor 510 may subdivide the voltage range into 750 quantized steps with each step corresponding to a 0.001-inch increment. The processor 510 may calibrate each sensor cell 210 individually, or it 510 may use an average calibration for all sensor cells 210. In some embodiments, a temperature sensor may allow the processor 510 to further calibrate for the temperature of the conductive fluid 112. The temperature sensor may be in contact with the movable electrode, stationary electrode, the chamber, a portion of the chamber near a contact surface, fluid lines, and/or fluid reservoirs to determine fluid temperature. The electrical property measurement to displacement curve may take temperature as an input and output a temperature-corrected displacement. Alternatively, or in addition, the processor 510 may be configured to make predetermined corrections to the electrical property measurement to displacement curve based on temperature variations from a calibrated temperature, and/or calibration may include determining a plurality of electrical property measurement to displacement curves for different temperatures. The temperature measurements may be used to adjust the electrical property measurements input to the electrical property measurement to displacement curve and/or to adjust the displacement computed from the electrical property measurement to displacement curve. The sensor array 200 may also, or instead, include a temperature stabilization device (not shown) configured to deliver and/or remove heat from the conductive fluid 112 (e.g., a temperature stabilization device in line with and/or thermodynamically coupled to a hydraulic pump, a reservoir, and/or the like).

A diagram of the object to be grasped may be stored in a memory accessible by the processor 510. The diagram may be created by an AutoCAD design program. An object may be stored in the memory in multiple ways. Measurements or other data about the size and shape of the object may be directly loaded into the memory by a user or another computer system, or object recognition software may be employed. Alternatively, the gripper 410 may be manually closed on the object one or more times with the object set at a different predefined orientation each time. Further, if the gripper 410 and/or pressure controller 180 is controlled using hydraulic or pneumatic means, the pressure exerted by the gripper 410 and/or the pressure of the conductive fluid 112 may be adjusted manually. The processor 510 then generates a diagram of the object based on the measurements from the sensor array 200. The diagram may then be stored in the memory by the processor 510.

Once the processor 510 has been calibrated and a diagram and/or shape has been stored in the memory, the gripping system 500 may start manipulating objects. Objects may be fed to the gripper 410 with a vibrating hopper machine, conveyor belt, or other means known in the art. An optical, vision, and/or acoustic system may detect the location of the object to be grasped. A vision system may additionally create a model and provide a match and pose to the stored diagram, which may be a CAD drawing. The object may also or instead trigger a microswitch alerting the gripping system 500 to the presence of the object. The processor 510 may then move the gripper 410 to the expected location of the object and attempt to grasp the object. Once the gripper is in the proper location, the processor 510 may close the gripper 410 on the object. If the object is fragile or only a limited pressure may be applied to the object, the processor 510 may monitor pressure measurements and/or electrical property measurements to determine how far to close the gripper 410 on the object. The processor 510 may also monitor the electrical property measurement data received from individual sensing cells 210 in some embodiments. If the electrodes 220, 230 are too close or touching, a sensing cell may draw too much current and damage or drain the power source 240. The processor stops closing the gripper 410 if the electrodes 220, 230 of any sensing cell 210 are too close. In other embodiments, the circuit may be designed to prevent too much current draw or a porous insulating material may be placed in the sensing cell 210 that allows the conductive fluid 112 to flow but prevents the electrodes 220, 230 from touching. In such a system, the electrodes may touch to create a base calibration by short-circuiting the cell to measure the input supply voltage.

When the object is grasped, it may be in an unknown position and orientation within the gripper. The processor 510 then uses the data from the electrical property measuring device to create a geographic model of the object. In some embodiments, the processor 510 may create several geographic models of the object as it is being grasped. In other embodiments, the processor 510 may create only a single geographic model of the object once the gripper 410 has finished closing on the object. The processor 510 may create the geographic model by converting the sampled data into displacements, detecting edges and boundaries between wider and thinner portions of the object, placing sampled data directly into an array, or using any other known means to describe an object. Programs from the Point Cloud Library may be used to describe an object. The type of geographic model generated by the processor 510 may depend on the type of diagram saved in the memory. The geographic model may be defined in a manner that simplifies comparison with the diagram saved in the memory.

Various methods may be used to compare the diagram in the memory with the geographic model of the object generated by the processor 510 to determine the orientation and position of the object. If the model comprises edges and boundaries, the processor 510 may try to align those edges and boundaries with diagram features. For distances, the processor 510 may try to match those distances with anticipated or measured distances in the diagram. To find a match, the processor 510 may attempt to minimize the mean square error between the geographic model and the diagram; it 510 may attempt to minimize the maximum error between any point in the geographic model and the corresponding point in the diagram; or it 510 may use any other method known in the art of minimizing error. In some embodiments, the processor 510 will determine that a match could not be found if the error cannot be reduced below a certain threshold or confidence level. The processor 510 may attempt to drop the object and grasp it again or send a signal to a human operator if a match is not found.

If a way to match the model to the diagram is found, the processor 510 then determines the manipulations required to make the geographic model match a desired orientation and location stored in the memory. In some embodiments, the diagram comprises the desired orientation and location. In other embodiments, the desired orientation and location are stored separately. The object may not be centered in the gripper, so the processor 510 will need to compensate for the offset of the object. The object may also be rotated along one or more axes relative to the diagram. The processor 510 may then rotate the grippers 410, 440 and move the grippers 410, 440 laterally until the object is in the proper position using the actuators 420, 430, 450.

In some embodiments, a touch sensitive gripper may place the object in a conventional gripper that requires precise placement of the object. In other embodiments, the corrections may occur during the normal movement of the grippers 410, 440, if the grippers 410, 440 are required to move the object as part of the grippers' 410, 440 function. In some embodiments, the processor 510 may be trained as to the proper orientation and location for the object as well as the proper movement of the object through manual movement of the grippers 410, 440 and actuators 420, 430, 450. The processor 510 then saves this information to the memory. In some of these embodiments, the processor 510 may exactly follow the movements taught to it. In other embodiments, the processor 510 may be instructed to save one or a few locations and orientations and it uses the most efficient movement to progress to each location and orientation. In still other embodiments, the processor 510 may perform an activity such as screwing a bolt or moving in a sawing motion once it reaches a desired location and orientation. Once the activity is complete, the processor 510 may repeat the process again. Complicated operations, such as assembly, may require that objects located in more than one gripper be positioned with respect to each other. Complicated operations on objects may arrange the objects' poses with respect to one another, and the operations may be manipulated with the aid of a Computer Aided Manufacturing (CAM) system that compensates for object pose based on CAD drawings of one or more objects and the models generated by the grippers securing those objects. Each repetition may be referred to as a cycle. The processor 510 may be programmed to perform a predetermined number of cycles.

Diagrams of several different types of objects may be stored in the memory at a single time. The processor 510 may attempt to match an object being grasped against all the diagrams in the memory. The processor 510 may be programmed using computer code in the memory to perform different functions based on the object detected. The processor 510 may be instructed to assemble different objects held in different grippers 410, 440 together. In an embodiment, the processor 510 sorts objects into different locations based on the type of object detected. In other embodiments, the processor 510 may be designed to cycle through a series of different tasks for the same object. In the manufacturing context, grippers 410, 440 may have multiple locations to insert bolts and/or to fabricate, weld, and/or assemble components. The processor 510 may have the grippers 410, 440 insert a bolt into, or perform another manufacturing operation at, each location before beginning again at the first location. The processor 510 may attempt to find a correct part by having the grippers 410, 440 grasp multiple objects and release those that do not match the desired object. The processor 510 may move the grippers 410, 440 randomly or systematically after it releases an incorrect object and attempts to find a new object. Common sensors, such as piezoresistive, capacitive proximity, inductive, optical, infrared, ultrasonic, laser, vision, stereo vision, or Merkel tactile cells, may assist in sensing the object and/or in the manufacturing operation. Additional sensors may be located on or off the grippers.

Sensor Cell Comprising a Piston

Figure 6A:
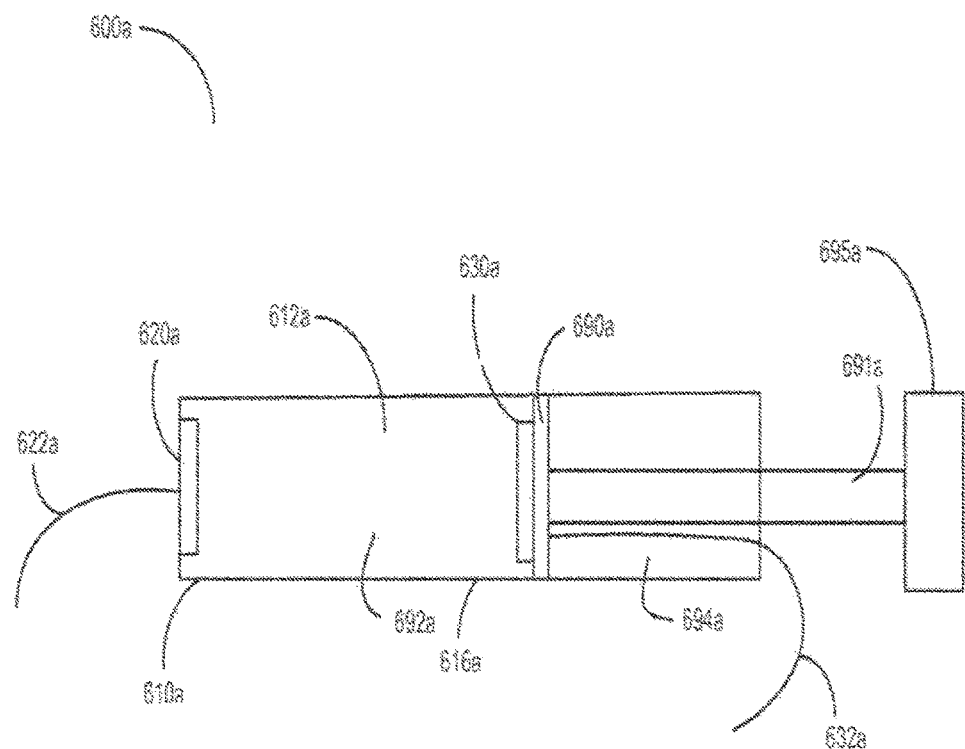
FIGS. 6A and 6B are cross-section and side views of a touch sensor comprising a sensor cell comprising a piston assembly.
Figure 6B:
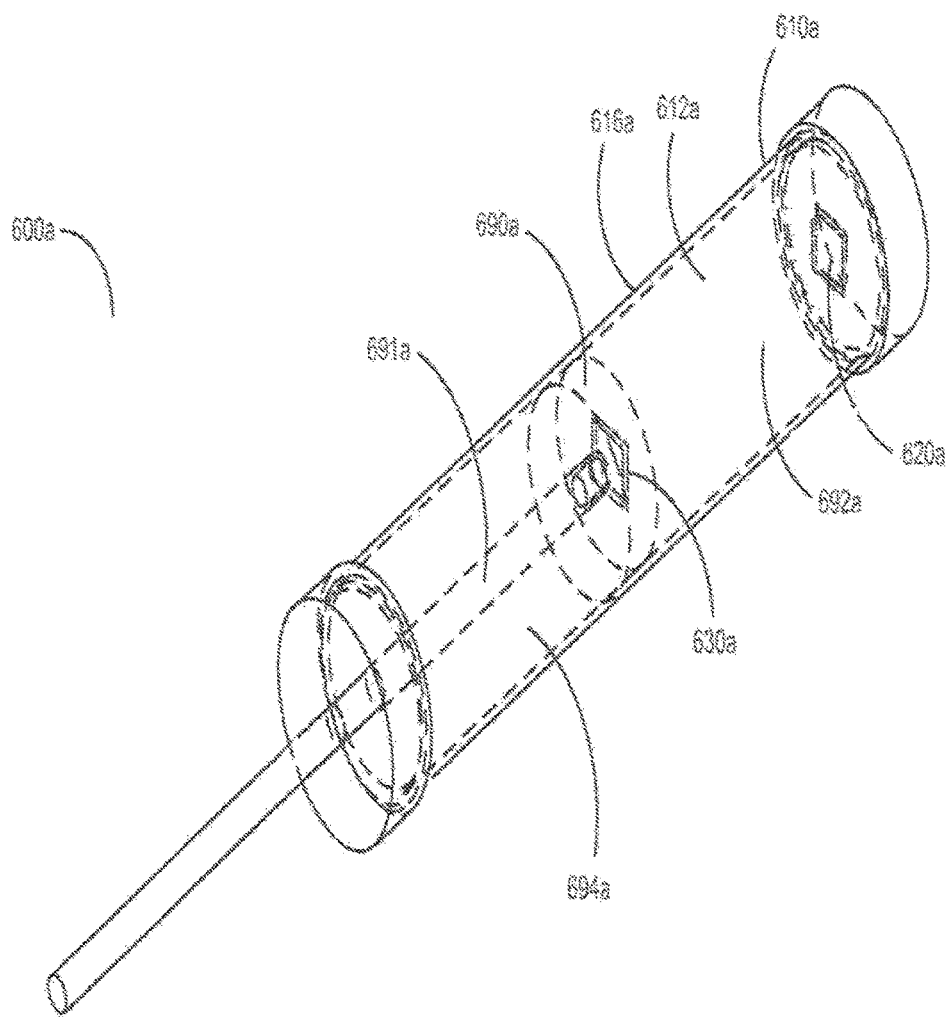

FIGS. 6A and 6B are cross-section and side views of a touch sensor 600a comprising a sensor cell 610a that uses a piston assembly. The piston assembly comprises a piston rod 691a, which is affixed to a piston 690a and a contact head 695a that contacts an object of interest. The sensor cell comprises two chambers: a piston extension chamber 692a and a piston retraction chamber 694a. In the illustrated embodiment, each chamber 692a, 694a contains a conductive fluid 612a that can be added to or removed from the chamber 692a, 694a via one or more reservoirs (not shown) and pumps (not shown). Alternatively, a dielectric fluid may be used. The pumps (not shown) extend or retract the piston 690a by adding or removing fluid. In other embodiments, one chamber may comprise a fluid, while the other does not and/or there may be only one pump, and/or a bidirectional valve may or may not be used with or without an electro hydraulic servo valve. A positive displacement pump may be used to increase the precision of the movement. A positive displacement pump may be able to move a fixed amount of fluid that corresponds to a linear displacement of a piston in a single and/or multiple hydraulic cylinders. FIGS. 6A and 6B illustrate a single acting hydraulic cylinder. In embodiments, the cylinder may be dual actuating, or a counter single actuating cylinder may be used for linear position control.

The sensor cell 610a may further comprise a stationary electrode 620a at a proximal end of the sensor cell 610a and a movable electrode 630a. The movable electrode 630a may be affixed to the piston 690a. This configuration may allow the electrodes 620a, 630a to measure the distance moved by the piston 690a during extension or retraction. Both electrodes 620a, 630a are in the extension chamber 692a in the illustrated embodiment, but they could also or instead be placed in the retraction chamber 694a in other embodiments. Both electrodes 620a, 630a may be insert molded into the end cap and piston, respectively, to prevent leaking through the lead wires of the electrodes.

The illustrated electrodes 620a, 630a are flat plates. The electrodes 620a, 630a may be made of conductive material such as copper, silver, gold, aluminum, silver chloride, tungsten, tantalum, columbium, titanium, molybdenum, gallium, conductive ink, platinum, carbon, or the like. The conductive fluid 612a may comprise a salt, such as sodium chloride, calcium chloride, potassium chloride, sodium acetate, or the like, dissolved in water; vinegar; gallium; wood's metal; gallium alloys, such as gallium aluminum alloy or eutectic gallium-indium alloy; sodium potassium alloy; or sulfuric acid. Non-toxic antifreeze, such as propylene glycol or glycerol, and/or toxic antifreeze, such as ethylene glycol may be added to water-based conductive fluids. The conductive fluid 612a may also comprise a material similar to the electrodes 620a, 630a to prevent leaching. For example, the conductive fluid 612a may be potassium chloride saturated with silver chloride for silver or silver chloride electrodes 620a, 630a. Some very corrosive conductive fluids 612a, such as gallium-indium alloy or other liquid metals, may dissolve most metals. The electrodes 620a, 630a may comprise a material with a high resistance to corrosion, such as tungsten or tantalum, or a material resistant to corrosion, such as columbium, titanium, or molybdenum, in those embodiments. In some embodiments, fluid in the chamber 692a, 694a not containing electrodes 620a, 630a will be non-conductive. In other embodiments, both chambers 692a, 694a will share a common reservoir containing the conductive fluid 612a. As before, the electrodes 620a, 630a may be powered by alternating or direct current.

The walls 616a, piston 690a, and piston rod 691a may be made from a nonconductive material such as polycarbonate, other hard polymers, or the like. In some embodiments, the walls 616a may be a conductive material, such as titanium, steel, aluminum, or the like, covered with a layer of nonconductive material or a sleeve of nonconductive material to insulate them from the electrodes 620a, 630a. Because materials like silver chloride decompose when exposed to ultraviolet (UV) or other specific frequencies of light, the walls 616a may comprise a material that blocks UV light or light of other specific frequencies. For corrosive conductive fluids 612a, the walls 616a may be selected to be a polymer or a metal that is resistant to corrosion.

Additionally, the walls 616a may be selected to be a material resistant to damage from external elements. This may allow the sensor cell 610a to come in contact with hazardous materials. The sensor cell 610a may even be inserted into oil filled cylinders such as are used in the construction equipment industry for bulldozers and the like. The sensor cell 610a can range in size from very small, such as nanofabricated sensor cells, to very large, such as multiple meters in width or length or larger, depending on the selected application.

In the illustrated embodiment, wires 622a, 632a are coupled to the electrodes 620a, 630a, and the wire 632a passes through the retraction chamber 694a and out of the distal end of the sensor cell 600a. In other embodiments, the wire 632a passes through the extension chamber 692a and the proximal end of the sensor cell 600a. In embodiments where parts of the piston 690a, piston rod 691a, and walls 616a are conductive, these elements may act as a portion of the wire 632a. The wire 632a of the movable electrode 630a may run through the center of the piston 690a to make an external connection. Special care may need to be taken in connecting the wire to the movable electrode. The wire may run through the center of the piston shaft to connect to the movable electrode, but the wire may need to move with the piston. In an embodiment, the wire connecting the movable electrode to the control circuitry includes a conductive spring wrapped around the piston rod. The spring can extend and contract with the movement of the shaft. The conductive spring wire may include one end that penetrates through to the center of the piston shaft and another that exits the cylinder walls to connect to the control and measuring circuitry. In an embodiment, the connection to the circuitry may be a wire molded into the cylinder wall that exits close to the wire from stationary electrode.

The wires 622a, 632a may be powered by a power source (not shown) and connected to an electrical property measuring device (not shown) like in touch sensor 100. The electrical property measuring device measures electrical characteristics corresponding to the distance the piston 690a is extended and may comprise a current shunt, a precision resistor, a Wheatstone bridge, or the like. A capacitor may be used in series with the sensor as a high pass filter to eliminate or reduce DC offset The touch sensor 600a may comprise additional measuring devices, such as a piezoresistive pressure sensor (not shown) and/or a polyvinylidene fluoride (PVDF) film sensor (not shown). The piezoresistive pressure sensor may be placed in one or both chambers 692a, 694a or in the reservoir to determine the pressure of the conductive fluid 612a. The PVDF film sensor may be affixed to the contact head 695a. The PVDF film sensor may be used to measure contact with an object of interest or vibrations of the object, such as when the object is moving tangentially to the contact head 695a. The PVDF film sensor may also be used as a shear sensor to detect movement of the object tangential to the contact head 695a. A common contact surface may be a continuous sheet shared by a plurality of sensor cells 600a. For example, the common contact surface may comprise a skin covering the plurality of sensor cells 600a to prevent contaminants from entering between cells 600a. Accordingly, a PVDF film sensor, such as a shear sensor, may be a small portion of the overall contact area of the contact surface.

The touch sensor 600a may be controlled by a processor (not shown) and/or computer software stored in a memory (not shown). The processor may also be coupled to an output device (not shown), such as a digital read out, monitor, speaker, printer, or the like, and an input device (not shown), such as a mouse, keyboard, touch screen, microphone, or the like, to allow an operator to control the touch sensor 600a. Alternatively, the computer software may be configured to autonomously control movement of the touch sensor 600a. The processor may control a pump (not shown), proportional valves, and/or directional valves to add or remove fluid 612a to the extension and/or retraction chambers 692a, 694a. The pump may be a positive displacement pump configured to trap a fixed volume of fluid and discharging the fixed volume from an outlet. The positive displacement pump may allow the piston 690a to be moved in fixed and/or measurable increments. The pump may comprise plastic and/or a non-conductive material to insulate the pump from the conductive fluid 612a.

Figure 6C:
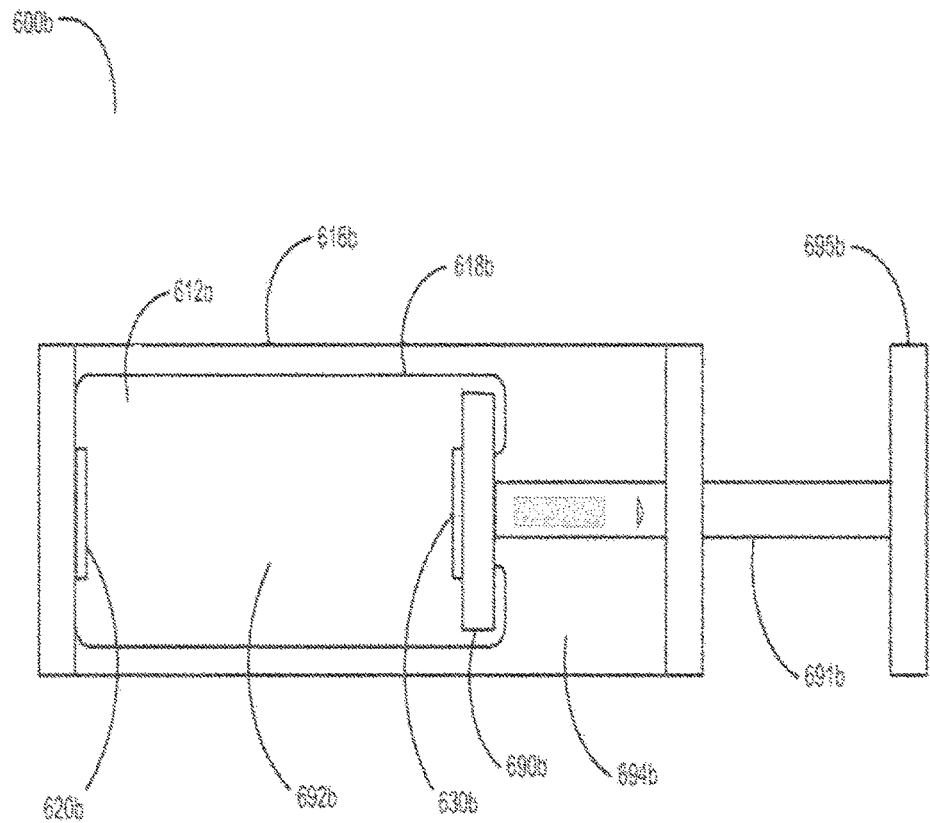
FIG. 6C is a cross-section view of a touch sensor comprising a sensor cell including a bladder and a piston assembly.

FIG. 6C is a cross-section view of a touch sensor 600b comprising a bladder 618b and a piston assembly. Like the touch sensor 600a without a bladder, the touch sensor 600b may include stationary and movable electrodes 620b, 630b; extension and retraction chambers 692b, 694b; a piston rod 691b, a piston head 690b, and a contact head 695b; conductive fluid 612b; and cell walls 616b. The cell walls 616b may define a cylinder-shaped cavity. Wires (not shown) may be insert injection molded into the cell walls 616b, the piston head 690b, and/or the piston rod 691b.

A bladder 618b may enclose the extension chamber 692b to prevent the conductive fluid 612b from leaking. The retraction chamber 694b may contain a gas and not a liquid. In some embodiments, a single bladder contains the conductive hydraulic fluid. A force on the piston contact head may act as a spring to remove fluid from the single chamber. In an embodiment, the extension and/or retraction chambers 692b, 694b may each include a bladder 618b and/or bellows. Alternatively, a single bladder and/or bellows may enclose the extension and/or retraction chambers 692b, 694b and may be attached to both sides of the piston 690b. Smaller sensor cells may be particularly prone to leaking if bladders and/or bellows are not included. The bladder 618b and/or bellows may be an insulating sleeve to insulate cell walls 616b from the conductive fluid 612b. The bladder 618b and/or bellows may comprise surgical rubber, neoprene, latex, a composite rubber, hydrogenated nitrile butadiene rubber (HNBR), and/or the like. The bladder 618b may be reinforced with, for example, nylon or Kevlar®. The reinforcement material may include strands parallel to the longitudinal axis of the extension chamber and/or may include a fiber mesh. The reinforcement material may allow a higher operating pressure to be used by preventing fluid from expanding the bladder 618b. The bladder 618b and/or bellows may be configured to fold inside itself and around the piston 690b and/or to roll up as it is compressed. The bladder 618b may completely seal the fluid 612b without the use of O-rings and may eliminate the possibility of leaking under normal circumstances. The bladder 618b may be fitted into a sleeve and/or inner liner (not shown) that moves with the bladder 618b to prevent counter rotational friction that might result from rotation of the cavity walls relative to the bladder 618b.

Additional springs, acting as wires, may run from the piston head to create an electrical coupling for circuitry on the piston head. Several wires may run from the head to electrically couple external circuitry to electronic components attached to the piston head. For example, a multiplexer may be attached to the piston head, which may require seven wires (e.g., seven springs), in an embodiment.

Figure 6D:
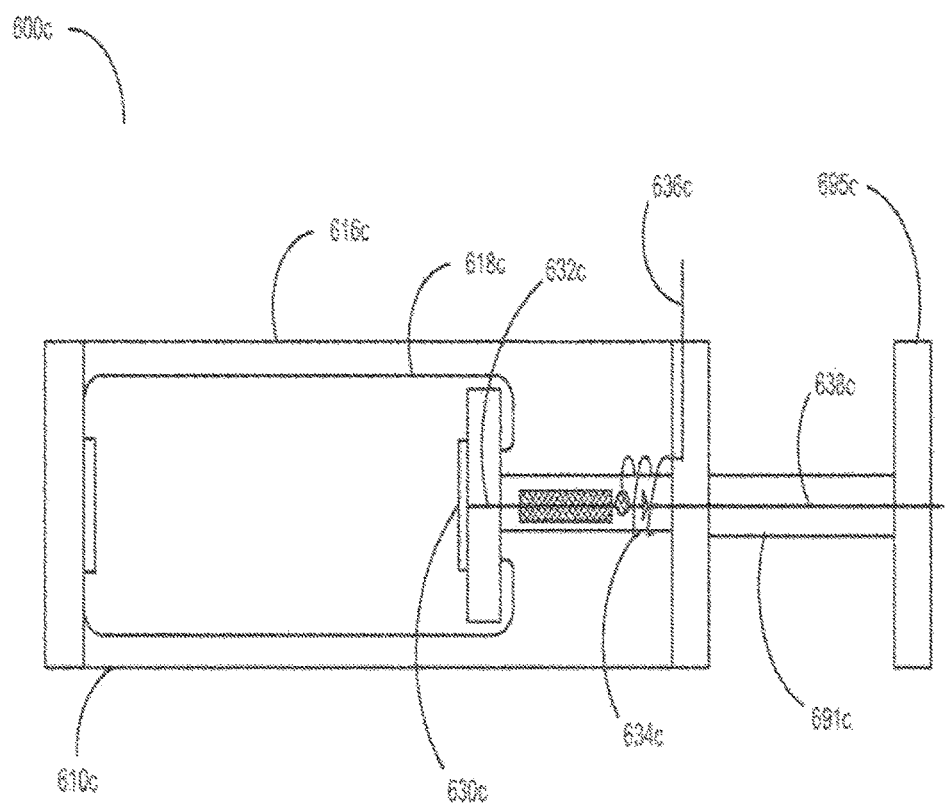
FIG. 6D is a cross-section view of a touch sensor that includes a spring configured to act as a wire.

FIG. 6D is a cross-section view of a touch sensor 600c that includes a spring 634c configured to act as a wire. A wire 632c coupled to the movable electrode 630c may run through the center of a piston shaft 691c and may exit a distance from the piston shaft 691c so that it does not interfere with the rolling of a bladder 618c. The wire 632c may be electrically and/or mechanically coupled to the spring 634c. The spring 634c may expand and contract as the piston moves and may connect to a wire 636c that may be inside the piston chamber walls 616c. In an embodiment, the spring 634c may be coupled to a stationary wire located inside the cylinder housing 610c. Additional wires 638c may run from contact sensors (not shown) located on the contact head 695c. The additional wires from the contact sensors may run through the center of the piston shaft 691c to couple to and/or be a part of the spring 634c (e.g., the section on the outside of the piston shaft 691c). Multiple wires from the contact sensors on the contact head 695c may be connected to the spring 634c. The wires may include connections to multiplexers, wave generators (e.g., sine wave generators), controls, sensor lead wires, and/or the like. In some embodiments, a gripper may include a plurality of hydraulic actuators with pistons, and each hydraulic actuator may be configured as illustrated.

Figure 6E:
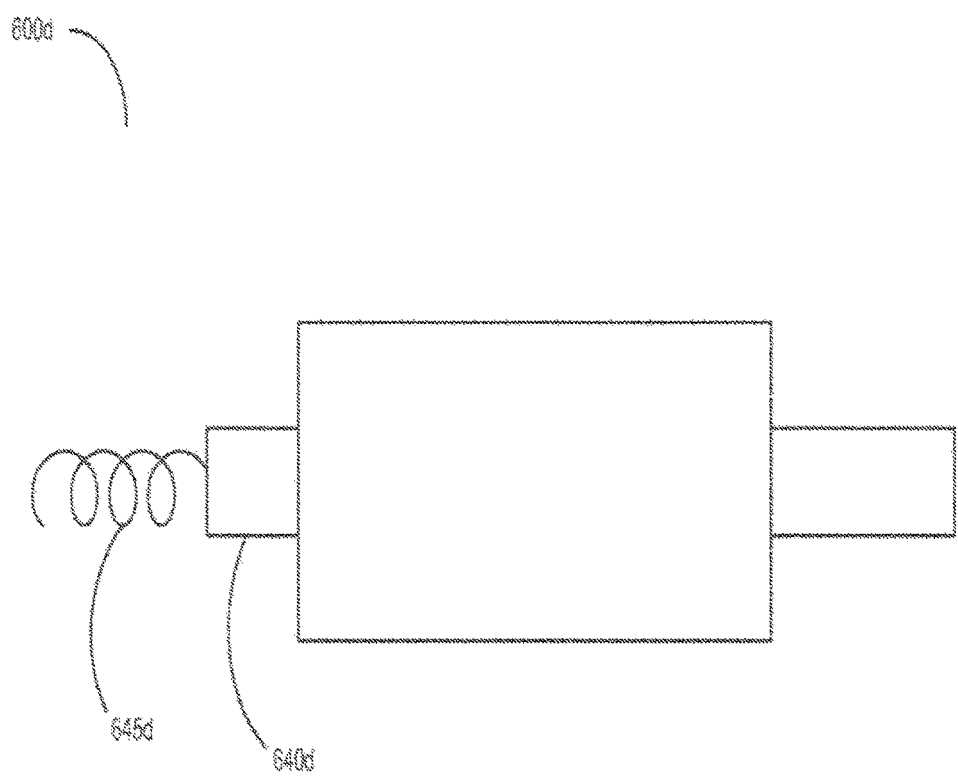
FIG. 6E is a schematic diagram of a touch sensor that includes a spring attached to one end of a shaft of the touch sensor.

FIG. 6E is a schematic diagram of a touch sensor 600d that includes a spring 645d attached to one end of a shaft 640d of the touch sensor 600d. The spring 645d may be configured to provide a known pressure and/or force to an object in contact with the touch sensor 600d. For example, the spring 645d may be a constant-force spring in some embodiments. The spring 645d may improve accuracy and/or repeatability of measurements by the touch sensor 600d. The touch sensor 600d may include a linear hydraulic sensor cell, or the touch sensor 600d may include a linear potentiometer as an alternative to the linear hydraulic sensor cell.

There are many ways to move the movable electrode relative to the stationary electrode while changing the volume of electrically operative fluid separating them. Sensor cells 610a with pistons and sensor cells 110 without pistons are exemplary embodiments that are not intended to be restrictive. Variations on these embodiments and/or embodiments that have not been explicitly disclosed are also contemplated. For example, a stationary electrode may be affixed to a piston, and a movable electrode may be affixed to a housing configured to interact with an object.

Sensor Array Comprising Parallel and Series Sensor Cells

Figure 7:
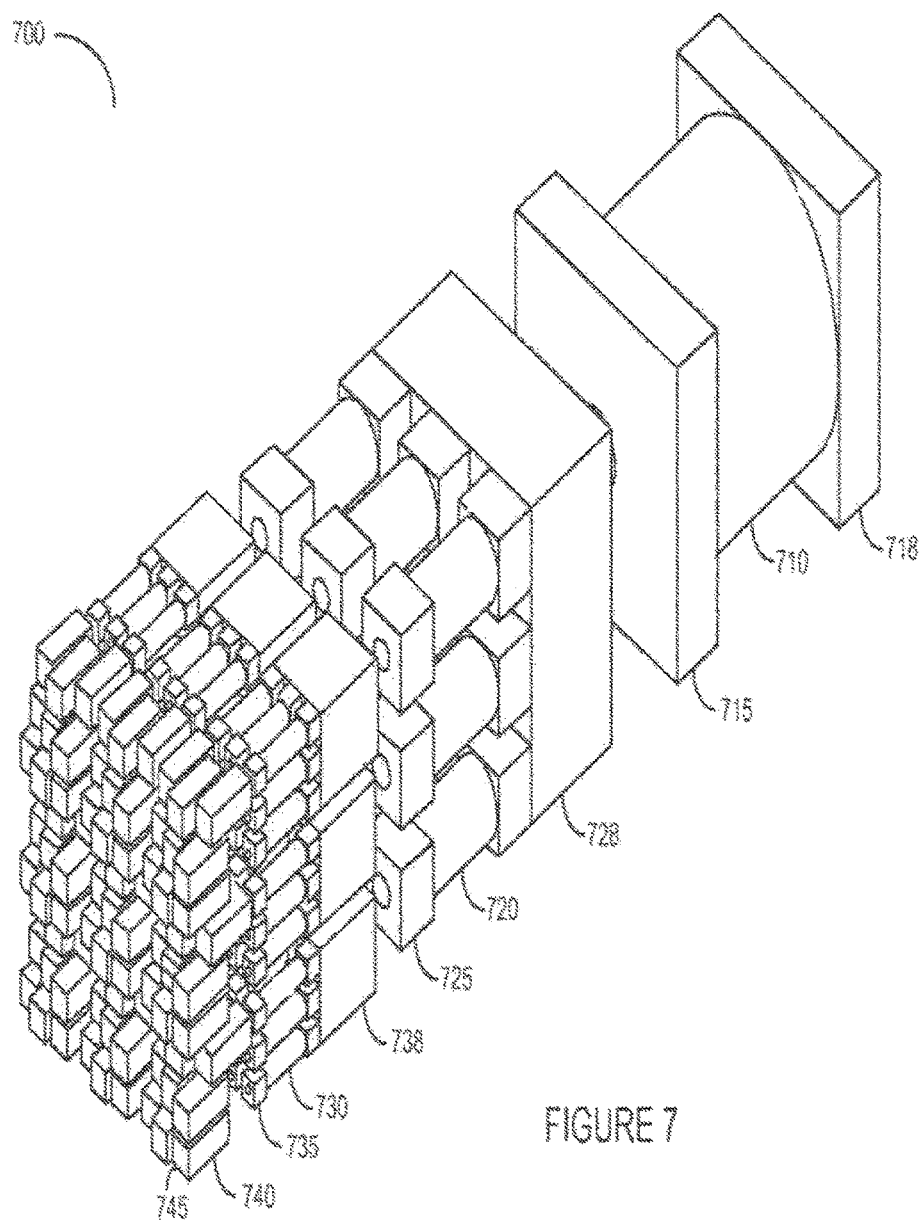
FIG. 7 is a side view of a touch sensor comprising a plurality of piston sensor cells arranged in parallel and series with one another.

FIG. 7 is a side view of a touch sensor 700 comprising a plurality of layers of sensor cells 710, 720, 730, 740 arranged in parallel and series with one another. Some of the illustrated layers of sensor cells 710, 720, 730 comprise pistons (not shown) and operate in the manner of sensor cell 610a. Other layers of sensor cells 740 may comprise an array of sensor cells with flexible walls, such as sensor cell 110 and 200. In alternate embodiments, only sensor cells 110, only sensor cells 610, or a different combination of the two may be used instead. A first sensor cell 710 is disposed at the proximal end of the sensor 700 and is the largest of the plurality of sensor cells 710, 720, 730, 740. In the illustrated embodiment, the largest sensor is 1 inch by 1 inch. In other embodiments, it may be larger or smaller based on the particular application. A plurality of medium sized sensor cells 720 may be in series with the largest sensor cell 710; a plurality of small sized sensor cells 730 may be in series with the medium sensor cells 720; and a plurality of the final layer of contact sensor cells 740 may be in series with the small sensor cells 730. The final layer of contact sensor cells 740 may be configured to grasp, contact, and/or interact with an object. The final, small, and medium sensor cells 740, 730, 720 may be disposed on the contact heads of the small sensor cells 730, medium sensor cells 720, and largest sensor cell 710 respectively. One of the sensor cells 740 in the final layer may be considered to be mechanically in series with any sensors cells 710, 720, 730 in previous layers that can adjust the position of the one in the final layer. Sensor cells 710, 720, 730, 740 may be considered to be mechanically in parallel if neither one's movement affects the other's position and/or if the sensor cells 710, 720, 730, 740 are in the same layer.

In the illustrated embodiment, there are nine small sensor cells 730 per medium sensor cell 720 and nine medium sensor cells 720 per large sensor cell 710, which gives a nine-to-one ratio of sensor cells between levels. As a result, the medium sensor cells 720 may be approximately 0.3 inches by 0.3 inches and the small sensor cells 730 may be approximately 0.1 inches by 0.1 inches. In other embodiments, the ratio may be larger or smaller than nine-to-one, or the large-to-medium ratio may not be the same as the medium-to-small ratio. The final sensor cells 740 may have a one-to-one ratio with the small sensor cells 730. In other embodiments, this ratio may be larger or smaller. As can be seen in the illustrated embodiment, ratios of sensor cells from one layer to the next may vary across layers. Alternatively, the ratio may be constant across all layers. Although four layers of sensor cells 710, 720, 730, 740 in series are illustrated, a greater or fewer number of layers in series may be used in other embodiments. There are also many possible shapes for the contact heads 715, 725, 735, 745 of the sensor cells such as square, circular, triangular, hexagonal, or the like. By stacking the piston sensor cells 710, 720, 730, a travel length of the piston in each sensor cell 710, 720, 730 can be reduced. For example, the largest sensor cell 710 may have a travel length of 0.5 inches, the medium sensor cells 720 may each have a travel length of 0.25 inches, and the smallest sensor cells 730 may each have a travel length of 0.125 inches. This allows for a total travel length of 0.875 inches without requiring a large travel length for the smallest sensors 730. In the illustrated embodiment, the total length of the three layers 710, 720, 730 is 2 inches.

The large number of sensor cells 710, 720, 730, 740 can result in a significant number of wires (not shown) for measurement and control of each sensor cell and a significant number of electrical property measuring devices (not shown). The number of wires and electrical property measuring devices may be reduced by multiplexing together the signals on the wires from the sensor cells 710, 720, 730, 740. The signals may be time division multiplexed in a fixed order, or a processor may control the multiplexing. The multiplexing may be performed using integrated circuits or by mechanical means. For integrated circuits, chips may be placed on the bases 718, 728, 738 of each layer of the piston sensor cells 710, 720, 730. The final layer of contact sensor cells 740 may include an integrated circuit inside the contact sensor cells 740 for multiplexing. In some embodiments, only some layers or sensor cells 710, 720, 730, 740 are multiplexed. One or more amplifiers may be used before or after the multiplexers to create greater precision and to mitigate noise. Amplifiers may also be necessary for low resistance conductive fluids, such as gallium alloys. Additionally, one or more ADCs may be used before or after multiplexing the signals from measurement wires to sample and quantize the signals. Analog or digital demultiplexing may be used in various embodiments to separate the signals. The touch sensor 700 may be a modular design that can be stacked in length and/or height. The touch sensor 700 may be affixed into gripper jaws or fingers in any configuration to enable a flexible design to grasp various sized and shaped objects. The touch sensor 700 may be designed with a single flexible skin on the final sensor layer 740. A plurality of touch sensor 700 may be stacked as complete units with each module having a separate skin covering the final sensor layer 740. The touch sensor 700 may be designed with thin walls and may be closely stacked to prevent contaminants from entering between the modules and to reduce the area that is not measuring the object geography. The total thickness separating individual cells may be 0.020 inches or less including the walls.

Figure 8A:
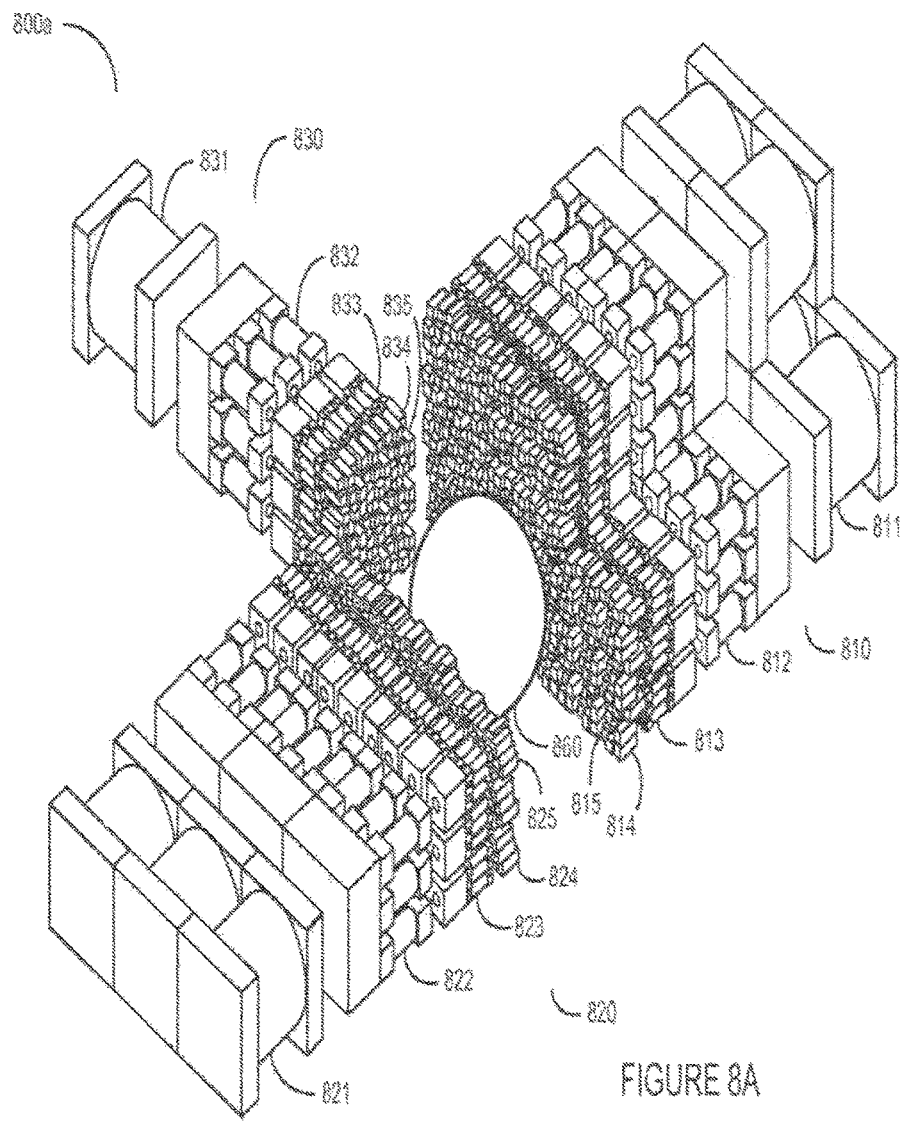
FIGS. 8A and 8B are side views of a touch sensitive gripping system comprising a plurality of opposing touch sensor arrays.
Figure 8B:
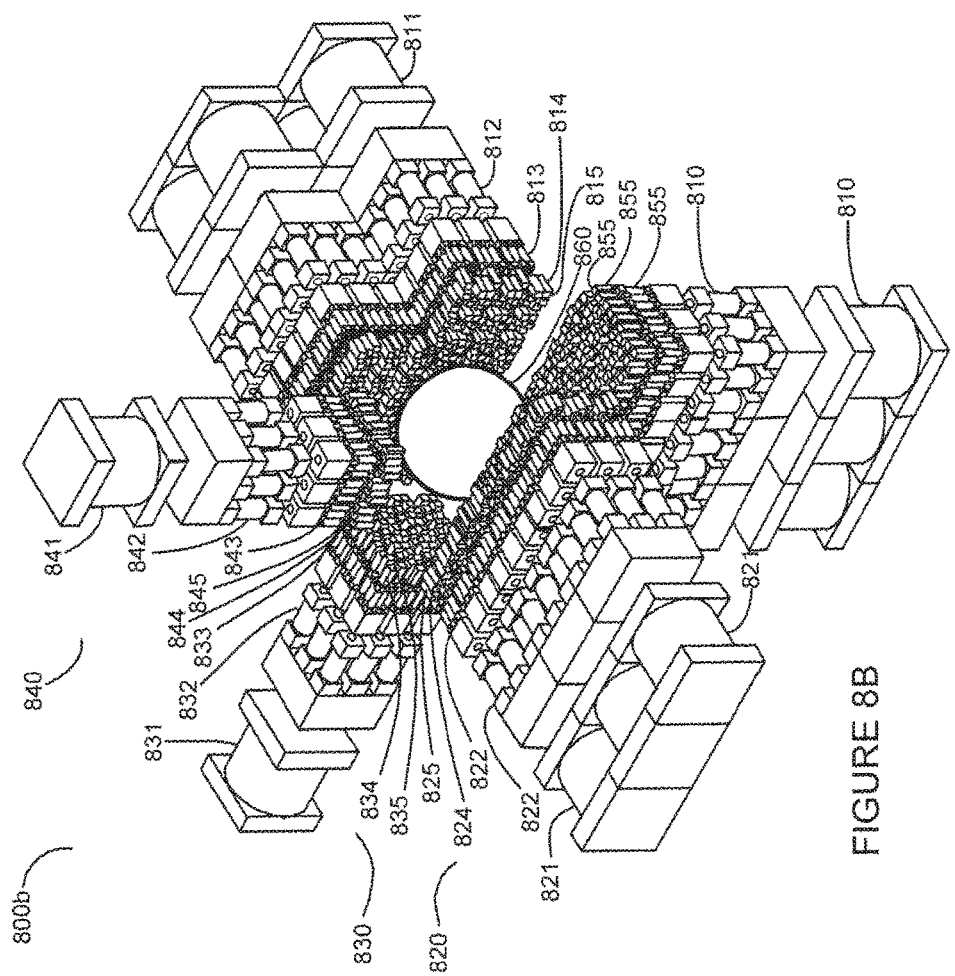

FIGS. 8A and 8B are side views of a touch sensitive gripping systems 800a and 800b comprising a plurality of opposing touch sensor arrays. The touch sensitive gripping arrays 800a and 800b may be used to grasp an object 860. Like the touch sensor array 700, each touch sensor array 810, 820, 830, 840, 850 may comprise a first layer 811, 821, 831, 841, 851; a second layer 812, 822, 832, 842, 852; a third layer 813, 823, 833, 843, 853; and a fourth layer 814, 824, 834, 844, 854. A final contact layer (not shown) may also be added in some embodiments. The final contacts in each touch sensor array 810, 820, 830, 840, 850 may all be physically connected together by a single insulating wall and/or skin, or the final contacts may be separated into sections corresponding to the cross sectional area of any of the first layer 811, 821, 831, 841, 851, the second layer 812, 822, 832, 842, 852, the third layer 813, 823, 833, 843, 853, the fourth layer 814, 824, 834, 844, 854, or the final layer. The insulating wall and/or skin may comprise silicon rubber or the like. The single insulating wall and/or skin may increase the stability of the extended pistons and/or keep contaminants from entering between the sensor cells.

In some touch sensor arrays 810, 820, 850, the first layer 811, 821, 851 may comprise a plurality of sensor cells. In the illustrated embodiment, the first and second touch sensor arrays 810, 820 and the fourth and fifth touch sensor arrays 840, 850 directly oppose one another. The third touch sensor array 830 may be at a right angle to the first and second sensor arrays 810, 820. The fourth and fifth sensor arrays 840, 850 may be at right angles to the first and second sensors arrays 810, 820, as well as the third sensor array 830. The sensor arrays 810, 820, 830 in the gripping array 800a may lie in a two-dimensional plane. In the gripping array 800b, five sensor arrays 810, 820, 830, 840, 850 may occupy a three-dimensional space. In other embodiments, there may be a greater of fewer numbers of sensor arrays 810, 820, 830, 840, 850 in one, two, or three dimensions. For example, there may be two, four, or six touch sensor arrays and/or modules at right angles to each other and/or opposing each other. The touch sensor arrays 810, 820, 830, 840, 850 may also be at 60 degree angles from one another and form a triangular shape. The illustrated embodiment is configured to grasp objects from the outside, but other embodiments may be configured to grasp an object from inside.

Figure 9:
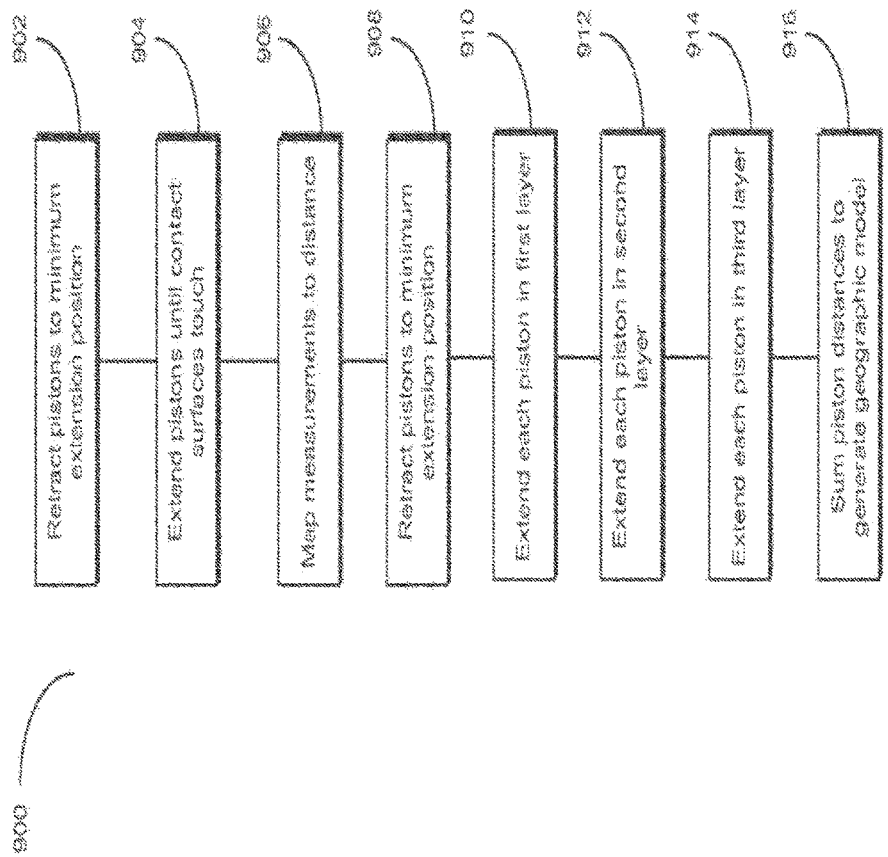
FIG. 9 is a flow diagram of a method for calibrating a touch sensor and grasping an object.

FIG. 9 is a flow diagram of a method 900 for calibrating a touch sensitive gripping system 800a and grasping an object 860. A similar method may be used for gripping system 800b. Before grasping the object 860, the touch sensitive gripping system 800a may be calibrated by fully retracting 902 the pistons (not shown) in each sensor cell to a minimum extension position, which may require grasping a mechanical device. The minimum extension position may correspond with a mechanical stop, a fill limit for the reservoir, full extension or retraction of the pistons, and/or the electrodes touching. Next, the pistons in the sensor cells in each layer 811, 812, 813, 821, 822, 823, 831, 832, 833 may be extended 904 until the contact surfaces 815, 825, 835 of the sensor arrays 810, 820, 830 are touching each other. This is the maximum extension position for the sensor arrays 810, 820, 830, which may be regulated by contact pressure. In some embodiments, extension may precede retraction. The touch sensor 800a may be calibrated by mapping 906 the measured minimum and maximum extension positions to displacement. The calibration may comprise determining a measured electrical property to displacement curve, such as a voltage to distance curve. A voltage to distance curve and/or a digital calibration of voltage to distance may be created for each sensor in the sensor arrays 810, 820, 830, 840, 850. In some embodiments, the displacement between the maximum and minimum extension positions can be measured and input to a processor (not shown) to define physical measurement units for a displacement being measured. In other embodiments, the displacement being measured may be expressed as a fraction or percentage of the displacement between the minimum and maximum extension positions. Displacements may be expressed relative to the maximum extension position and/or relative to the minimum extension position.

Once the gripping system 800a is calibrated, it may be used to grasp the object 860. The sensor cells in every layer 811, 812, 813, 821, 822, 823, 831, 832, 833 of the sensor arrays 810, 820, 830 may start by being retracted 908 to the minimum extension position. Each piston in the first layer 811, 821, 831 may be extended 910 until the object 860 is contacted by a contact surface 815, 825, 835 in series with each piston in the first layer 811, 821, 831, or each piston reaches the maximum extension position. In some embodiments, each piston may continue to extend after initial contact until a predetermined maximum pressure is measured by a pressure sensor for each sensor cell 811, 821, 831. In other embodiments, only the sensor cells in one layer may have pressure sensors, and the pistons may be extended until a pressure sensor in a sensor cell in series with the piston reaches a predetermined threshold. Multiple sensor cells may also be connected to a single pressure regulator and/or hydraulic pump, and extension may be limited by the in-line pressure detected by the regulator and/or pump. The pressure may be regulated to the cells, individually or collectively, by one or more hydraulic valves. In a single acting piston with a bladder, the pistons may retract by the pressure exerted from contact with an object, which may cause a spring-like action. Only the extension may be controlled by the hydraulic pump. The pistons may all extend simultaneously.

Once every piston in the first layer 811, 821, 831 has extended until contact with the object 860 has been made with sufficient pressure, or every piston has reached the maximum extension point, the gripping system 800a may begin extending 912 the pistons in the second layer 812, 822, 832. Again, every piston may be extended until the object 860 is contacted with sufficient pressure by a contact surface 815, 825, 835 in series with each piston in the second layer 812, 822, 832 or until the pistons reach their maximum extension point.

The third layer 813, 823, 833 may be extended 914 until a contact surface in series with every piston in the third layer 813, 823, 833 makes contact with sufficient pressure or reaches its maximum extension point. In those embodiments where the processor controls multiplexing, the processor may speed operation by only multiplexing measurement and control of sensor cells that have not yet made contact with the object 860 with sufficient pressure. In some embodiments, the pistons may all be pressure regulated by the same pumping and reservoir system using single or multiple control valves to control selected piston pressure so that simultaneous extension results until sufficient contact pressure is indicated by a pressure feedback loop. Pressure feedback may be received from piezoresistive sensors (not shown) in the back of the contact surfaces 815, 825, 835. In certain embodiments, one pump may be used per series array. Thus, multiple layers 811, 812, 813, 821, 822, 823, 831, 832, 833 may be extended simultaneously in some embodiments.

Once each piston has finished being extended, the processor may calculate 916 the position of each contact point with the object 860. This can be done by taking the displacement the flexible wall has moved in the fourth layer 814, 824, 834 and adding the displacements traveled by each piston in the third layer 813, 823, 833; the second layer 812, 822, 832; and the first layer 811, 821, 831 in series with that piston. The plurality of total displacements calculated may be used to generate a geographic model of the object 860 and/or to determine the object's specific location and orientation in the gripping system 800a. The geographic model may include a differential volume and/or perimeter determined from the movement of the sensor cells relative to the calibrated reference points. A predetermined area of each sensor cell may be multiplied by the displacement traveled by the sensor cell to determine a corresponding volume. A plurality of volumes may be summed to determine a total volume, and/or the geographic model may be assembled from volumes determined for each sensor cell. The object 860 can be manipulated based on the geographic model generated and the location determined. For additional objects, the gripping system 800a may be recalibrated using steps 902, 904, and 906, or the gripping system 800a can jump to step 908 and skip calibration.

Sensor Array with Sensors not Separated by Insulating Walls

Figure 10:
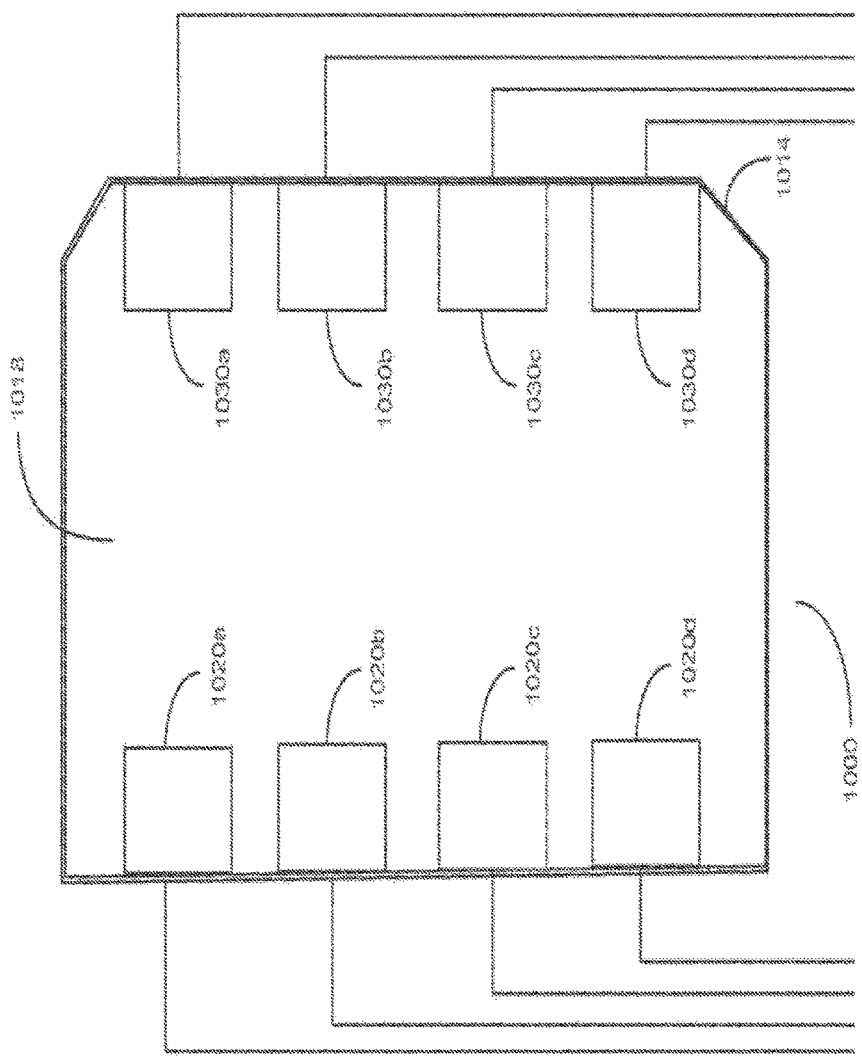
FIG. 10 is a cross-section view of a sensor array comprising a plurality of electrodes, not separated by insulating walls.

FIG. 10 is a cross-section view of a sensor array 1000 comprising a plurality of electrodes 1020a-d, 1030a-d not separated by insulating walls. A single sensing chamber 1018 containing a conductive fluid comprises all the electrodes 1020a-d, 1030a-d allowing electrical energy to conduct between any stationary electrode 1020a-d and any movable electrode 1030a-d. Like sensing cell 110, the movable electrodes 1030a-d may be embedded in a flexible substrate 1014. The movable electrodes 1030a-d then move as the flexible substrate 1014 is pressed against an object to grip that object. The flexible substrate 1014 may comprise latex, plastics, natural and/or synthetic rubbers, and/or silicones. The connections to the movable electrodes 1030a-d may also be embedded in the flexible substrate 1014 to prevent their exposure to the conductive fluid. In some embodiments, the electrodes 1020a-d, 1030a-d may comprise conductive ink. The conductive ink may be printed with an inkjet printer or the like onto the flexible substrate 1014. The conductive ink may be coated with silver, silver chloride, tungsten, or tantalum using vapor deposition, chemical deposition, etching, electrolysis, dipping, or the like. The deposited material may prevent the conductive ink from being in contact with the conductive fluid thus protecting the conductive ink from corrosive conductive fluids. In other embodiments, the connections to the movable electrodes may be by conductive silicon. The conductive silicon can be molded into the non-conductive flexible substrate. Alternatively, or in addition, a fine line of silver spheres may be laid on a silicon substrate, and a silicon layer may be applied to cover and insulate the silver spheres. In some embodiments, the stationary electrodes 1020a-d may be replaced with a single, large electrode that interacts with all of the movable electrodes 1030a-d. The stationary electrodes 1020a-d may be connected to a multiplexer (not shown) to cycle through each of the electrodes 1020a-d. The movable electrodes 1030a-d may be connected to the same multiplexer and/or a separate multiplexer. A processor may switch through the electrode pairs 1020a, 1030a; 1020b, 1030b; 1020c, 1030c; 1020d, 1030d in sequence to create a closed circuit through each pair. In an embodiment with two multiplexers, the multiplexers may cycle together and/or a common select signal may be sent to both multiplexers to ensure that opposing pairs of electrodes 1020a-d, 1030a-d are activated, or the stationary electrode may be a single electrode in common to all the movable electrodes 1030a-d.

Figure 11:
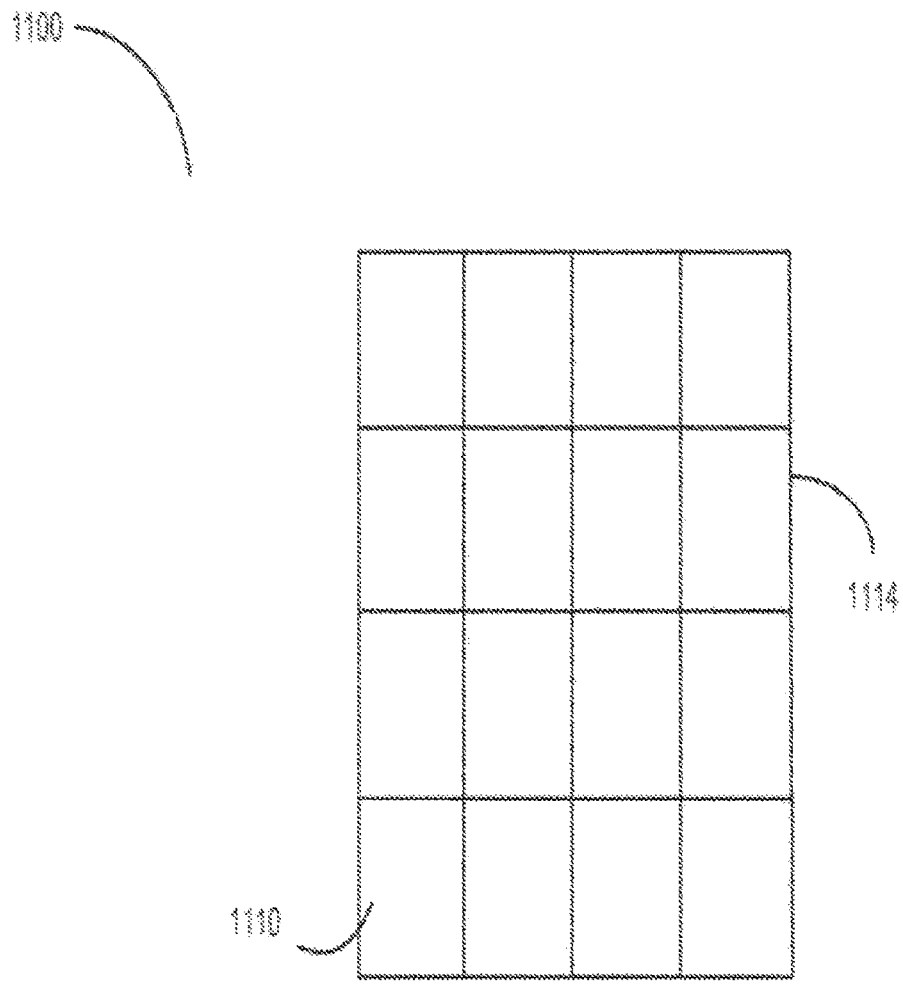
FIG. 11 is an overhead view of a sensor array without internal, insulating walls.

FIG. 11 is an overhead view of a sensor array 1100 without internal, insulating walls. The sensor array 1100 comprises 16 individual sensing elements 1110 in a two-dimensional array. The sensor 1100 may contain fewer than 16 sensing elements 1110, or it may contain hundreds of sensing elements. Each sensing element 1110 may comprise a piston (not shown) with a movable electrode (not shown) on it, or the movable electrodes may be affixed directly to a flexible substrate 1114. Thus, a sensor array without internal, insulating walls may be implemented either with flexible walls like sensor array 200 or with pistons like the layers of sensors 710, 720, 730. In some embodiments of touch sensors 700, the final layer 740 may comprise a sensor array 1100 without insulating walls. Similarly, the fourth layers 814, 824, 834, 844, 854 in touch sensitive gripping systems 800a and 800b may be implemented by sensor arrays 1100 without insulating walls. The flexible substrate 1114 may be made of latex; plastics; natural and synthetic rubbers, such as silicon rubber; silicones; and the like. The flexible substrate 1114 may be molded into a substrate that covers various arrays 1100 attached to multiple series arrays, such as the series arrays in the gripping system 800b.

Figure 12A:
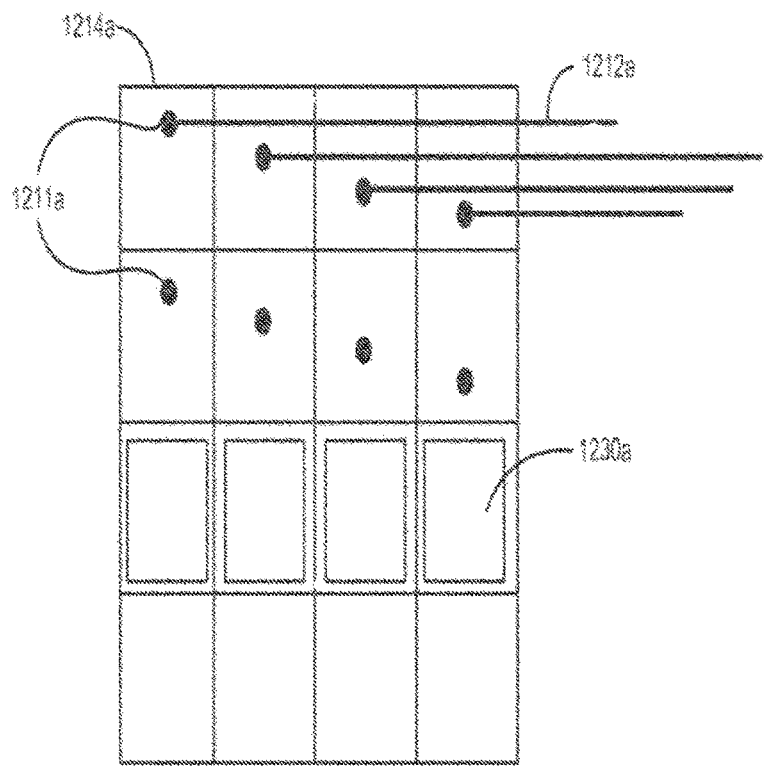
FIG. 12A is a bottom view of a flexible substrate for a sensor array without internal, insulating walls.

FIG. 12A is a bottom view of a flexible substrate 1214a for a sensor array 1200a without internal, insulating walls. The flexible substrate may be a silicon rubber, such as Xiameter RTV-4232-T2 HDCA available from Dow Corning Corp. or the like. The flexible substrate 1214a may include a plurality of contact points 1211a (also referred to herein as "lands"). The contact points 1211a may include a conductive material, such as conductive ink, which may be inkjet printed onto the flexible substrate 1214a. A plurality of wires 1212a may provide external connections to electrodes 1230a. The plurality of wires 1212a may also be inkjet printed onto the substrate 1214a. The wires and electrodes may be incorporated into a Flexible Printed Circuit (FPC), and the FPC may be molded into the contact material. Alternatively, or in addition, the contact points 1211a and wires 1212a may be conductive silicon, such as Choform-5513 available from Parker Chomerics, dispensed onto a flexible silicon substrate. In the illustrated embodiment, the plurality of wires 1212a may all exit the inside of the sensor array 1200a on the same side. The plurality of wires 1212a may be covered with an insulator such that only the contact points 1211a remain exposed, which may be accomplished through a two part molding process. The movable electrodes 1230a may then be attached to the contact points 1211a, such as by conductive silicon adhesive.

Figure 12B:
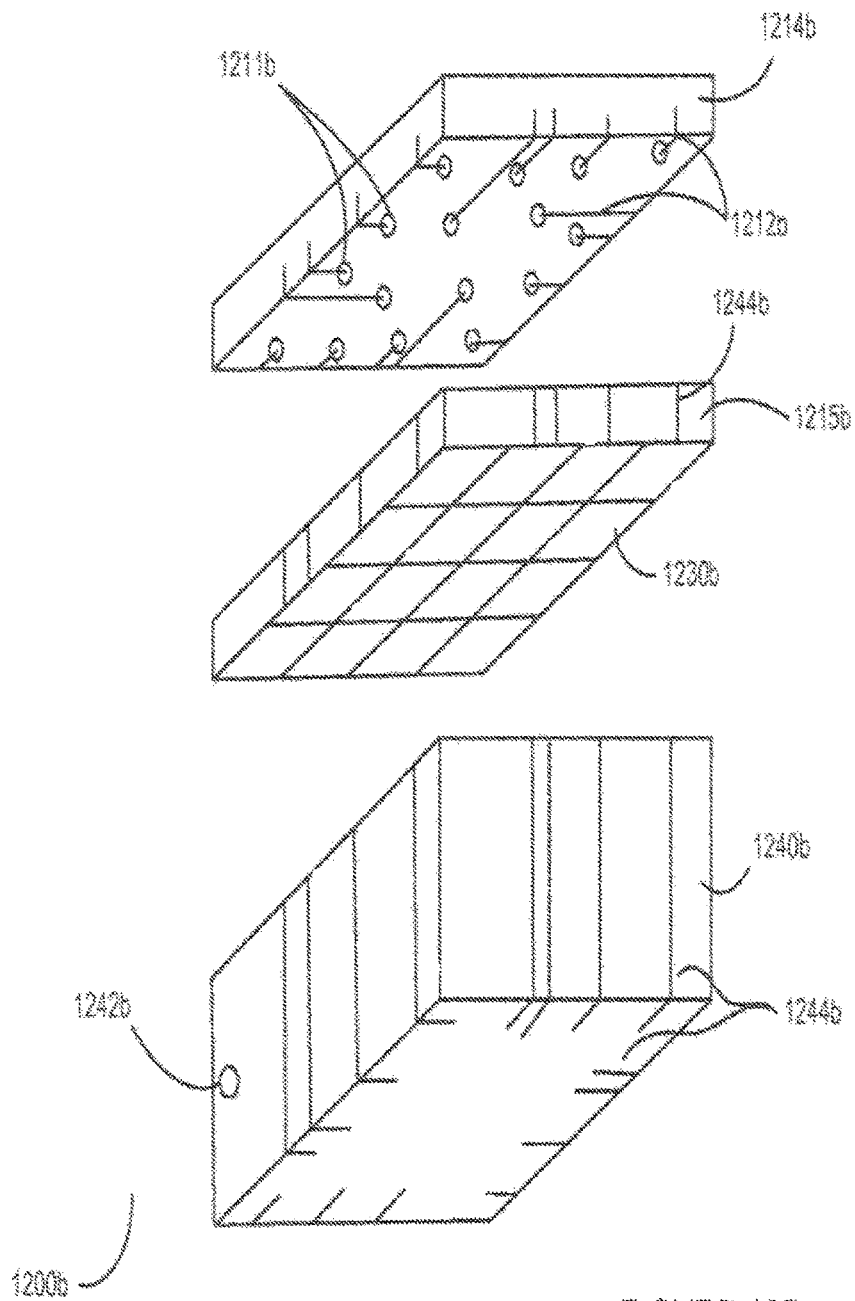
FIG. 12B is a front perspective view of an alternate embodiment of a sensor array without internal insulating walls.

FIG. 12B is a front perspective view of an alternate embodiment of a sensor array 1200b without internal insulating walls. In an embodiment, the dimensions of the sensor array 1200b are 0.25 inches by 0.25 inches by 0.25 inches. Larger sizes maybe constructed to cover robotic fingers, the complete inside of jawed grippers/vices, or the like. Unlike the sensor array 1200a, the plurality of wires 1212b may exit the inside of the sensor array 1200b on a plurality of different sides. A plurality of contact points 1211b and the plurality of wires 1212b may be inkjet printed onto a flexible substrate 1214b, or they may be made of dispensed conductive silicon. The flexible substrate 1214b may comprise silicon. An additional substrate layer 1215b may cover the wires 1212b and leave only the contact points 1211b exposed. Movable electrodes 1230b may be attached to the exposed contact points 1211b. In an embodiment, the movable electrodes 1230b may be inkjet printed onto the exposed contact points 1211b, and/or conductive silicon and/or metal electrodes may be attached with conductive silicon to the exposed contact points 1211b.

The flexible substrate 1214b and additional substrate layer 1215b may be attached to a sensor array body 1240b. The flexible substrate 1214b, additional substrate layer 1215b, and the sensor array body may include external wires 1244b along the outside edges. The external wires 1244b may be dispensed conductive silicon and/or inkjet printed onto the exteriors of the flexible substrate 1214b, additional substrate layer 1215b, and sensor array body 1240b before and/or after the flexible substrate 1214b, additional substrate layer 1215b, and sensor array body 1240b have been attached to one another. The external wires 1244b may be coupled to a multiplexer (not shown) and may be coated in an insulating material. The insulating material may be hard polytetrafluoroethylene (e.g., Teflon®), such as is produced by Chem Processing Inc. or American Durafilm, and/or Xiameter Silicon. Alternatively, or in addition, the plurality of wires 1212b and/or the external wires 1244b may be flexible flat wire/cable and may be attached to the flexible substrate 1214b, additional substrate layer 1215b, and/or sensor array body 1240b. Flexible flat wire/cable may be available from Z-Axis Connector Company, DIY Trade, or Mouser Electronics.

The wires may be part of an insulated FPC with only the flexible electrodes exposed. In an embodiment, conductive silicon wires may be molded to the substrate 1214b, and the additional insulator material 1215b may be molded in a three part molding process. The silicon substrate layers 1214b, 1215b may all have the same elasticity to prevent pulling of the electrodes as the wires and the substrate elongate and move. The center section of the sensor array 1200b may be cutout to allow insertion of the stationary electrode, bladder, circuitry, etc. (e.g., into the positions seen in FIG. 13). In an embodiment, the fixed electrode is inserted into the sensor body 1240b and bolted to the substrate holding the bladder to create a fluid space between the bladder and the fixed electrode.

A fill hole 1242b may allow a conductive or dielectric fluid to be added to the sensor array 1200b after it has been sealed. A fill hose (not shown) may be coupled to the fill hole 1242b to add the fluid. The sensor array 1200b may be spun in a centrifuge with the fill hose still attached to remove air bubbles though the fill hose. Once any air bubbles have been removed, the fill hole 1242b may be sealed, for example, with matching substrate.

FIG. 13 is a cross-section view of a sensor array 1300. In the illustrated embodiment, the sensor array 1300 includes 16 movable electrodes 1330 and 16 stationary electrodes 1320. Alternatively, more or fewer electrodes 1320, 1330 may be included in other embodiments, and/or the stationary electrodes 1320 may be a single electrode of area equal to or less than the sum of the areas of the 16 movable electrodes 1330. The electrodes 1320, 1330 may include a conductive material, such as silver, conductive ink, platinum, any previously discussed conductive material, or the like. The movable electrodes 1330 may be inkjet printed and/or attached to a flexible substrate (not shown) as discussed above. The stationary electrodes 1320 may be attached to a stationary electrode housing 1325. The stationary electrode housing 1325 may be made of a high Young's Modulus non-conductive material, such as carbon-fiber-reinforced plastic. The flexible substrate and/or stationary electrode housing 1325 may be electrically and/or mechanically coupled to one or more sidewalls 1340. The one or more sidewalls 1340 may include one or more printed circuit boards (PCBs) 1341, such as single-sided and/or double-sided PCBs, and/or flexible silicon substrates. The sidewalls 1340 may be made of a flexible material, such as flat wire/cable, silicon rubber, flexible PCB, or the like. On contact pressure with an object, the sidewalls 1340 may flex and allow the movable electrodes 1330 to move close to the stationary electrodes 1320. In an embodiment, two opposing sidewalls 1340 may include PCBs 1341, silicon rubber with embedded wires, and/or flexible cable, and another two sidewalls 1340 may not include PCBs 1341, wires, and/or flexible cables. Other sidewalls enclosing the sensor array 1300 may also be flexible. The one or more sidewalls 1340 may electrically couple the stationary and/or movable electrodes 1320, 1330 to a base plate 1350. The base plate 1350 may include a double-sided PCB configured to electrically couple the stationary and/or movable electrodes 1320, 1330 to a multiplexer 1360. The base plate 1350 may include through holes and/or vias to couple the electrodes 1320, 1330 to the multiplexer 1360. The multiplexer 1360 may be electrically coupled with measuring and/or processing components (not shown) as discussed above.

The sensor array 1300 may be filled with an electrically operative fluid (not shown). The stationary electrode housing 1325 may include offsets 1326 that support the stationary electrode housing 1325. The offsets 1326 may space the stationary electrode housing 1325 from the walls 1340 to create a baffle and allow fluid to flow around the stationary electrode housing 1325. A bladder 1318 may be included to prevent leaking of the electrically operative fluid. The bladder 1318 may be designed with a lower Young's Modulus than the sidewalls 1340. In an embodiment, the sidewalls 1340 may include silicon rubber with a greater thickness, and the bladder 1318 may include silicon rubber of a lesser thickness. The bladder 1318 may be configured to allow expansion of the bladder as the fluid is displaced so that the sidewalls 1340 do not bulge. The sidewalls 1340 may include a material with a Young's Modulus higher than the bladder 1318 and/or a material thicker than the bladder 1318 with the same Young's Modulus as the bladder to prevent deformation of the sidewalls. The offsets 1326 and bladder 1318 may permit displacement of the electrically operative fluid so that the flexible substrate can conform to an object (not shown). The thickness and/or elastic modulus of the bladder 1318 may be selected to allow sufficient displacement for the flexible substrate to conform to the shape of the object. A similar substance may be included in both the flexible substrate and the bladder 1318, e.g. silicon rubber. The bladder 1318 and flexible substrate may be a similar size and thickness in some embodiments. Alternatively, a bladder 1318 thinner than the flexible substrate may reduce side bulging of the flexible substrate.

The sensor array 1300 may also include a shear sensor 1371, a pressure sensor 1372, and a temperature sensor (not shown). The shear sensor 1371 may be in contact with the flexible substrate and/or movable electrodes 1330 and detect shear force on the opposite side of the flexible substrate. The shear sensor 1371 may be perpendicular to the electrodes 1330 and/or parallel to the one or more sidewalls 1340. In some embodiments, more than one shear sensor 1371 may be used to detect shear force in multiple directions and/or locations. The shear sensor 1371 may be a PVDF film sensor, a piezoresistive sensor, or the like. The pressure sensor 1372 may be in contact with the bladder 1318 and/or the electrically operative fluid. A probe for the temperature sensor may be attached to the one or more sidewalls 1340, in hydraulic fluid lines (not shown), in contact with the flexible substrate, in contact with the object, in contact with the bladder 1318, in contact with the stationary and/or movable electrodes 1320, 1330, and/or in contact with the electrically operative fluid. Electrical lead wires (not shown) may couple the shear sensor 1371, pressure sensor 1372, and/or temperature sensor to the one or more sidewalls 1340. The one or more sidewalls 1340 and/or the multiplexer 1360 may transmit sensor measurements to the processor.

Insert injection molding may be used to form the walls 1340. The walls 1340 may encompass flexible cables, conductive silicon rubber, and/or inkjet printed electrical wires, the base plate 1350, and the offsets 1326 and may circumscribe the sensors 1371, 1372, the electrodes 1320, 1330, and the bladder. The offsets 1326 may be attached to the flexible cables, and/or the offsets 1326 may be insert injection molded into the sidewalls 1340. In an embodiment, the walls 1340, base plate 1350, bladder 1318, PCBs 1341, stationary electrode housing 1325, and the flexible substrate are coupled to each other by silicon rubber. The offsets 1326, the bladder and bladder housing 1318, and the PCBs 1341 add support to the sidewalls 1340. The sensor array may include combination of rigid and flexible PCBs 1341, which may be in the sidewalls 1340 and/or the base plate 1350. The electrical lead wires to the shear sensor 1371, pressure sensor 1372, temperature sensor, movable and/or stationary electrodes 1320, 1330, and the like may be covered by a moldable plastic, such as a thermoplastic, during the injection molding. The moldable plastic may electrically insulate any electrical connections other than the electrodes 1320, 1330 from coming into contact with the electrically operative fluid.

FIG. 14 is a schematic diagram of a sensor 1400 comprising control circuitry and a sensor array without internal, insulating walls. The control circuitry may control power to the electrode pairs 1410*a-d* to allow for accurate measurement. Each electrode pair 1410*a-d* may be controlled by a switch 1420*a-d* that determines whether or not power from a power source 1440 flows to that electrode pair 1410*a-d*. The switches 1420*a-d* may be implemented as field effect transistors made from silicon, gallium arsenide, carbon nanotubes, or the like. A field effect transistor may have its source connected to the power source 1440 and its drain coupled to one of the electrode pairs 1410*a-d*. The switches 1420*a-d* may be embedded in or on the flexible substrate or may be located away from the electrode pairs 1410*a-d*. For example, a field effect transistor made from carbon nanotubes may be particularly resistant to damage from flexing of the flexible substrate. Thin film metal may be used to electrically couple the switches 1420*a-d* with the electrode pairs 1410*a-d*.

In some embodiments, the switches 1420*a-d* may only allow one pair of electrodes 1410*a-d* to be powered at a time, such as only directly opposing electrodes. In the illustrated embodiment, each movable electrode (not shown) is paired with a stationary electrode (not shown) opposite to it. A processing unit or the like may cycle which switch 1420*a-d* is enabled until the displacement between every electrode pair 1410*a-d* has been measured. Internal impedances of the circuitry may control the maximum sampling rate that still allows for accurate measurements. In some embodiments, the switches 1420*a-d* may be coupled with the movable electrodes. In other embodiments, the switches 1420*a-d* may be coupled with the stationary electrodes. Some embodiments may have switches 1420*a-d* for both the stationary and movable electrodes. Non-opposing electrodes may be enabled to measure shear force on the gripping surface (not shown). The circuit may comprise one or more multiplexers (not shown) to consolidate signals to a single measuring device (not shown) or there may be a measuring device for each electrode pair 1410*a-d*. Signals may also be amplified and filtered before or after multiplexing. Consolidated signals may be demultiplexed before sampling and relay to a processing unit or the processing unit may be programmed to properly interpret multiplexed signals.

FIG. 15 is a schematic diagram of a sensor 1500 comprising a control multiplexer 1520 and a senor array without internal, insulating walls. The multiplexer 1520 may allow power to be supplied to only a selected electrode pair 1510*a-d*. In the illustrated embodiment, the stationary electrodes (not shown) are electrically coupled with each other. Alternatively or additionally, the movable electrodes (not shown) may also be coupled with each other. In other embodiments, a single stationary electrode may interact with all of the movable electrodes, or the stationary electrodes and movable electrodes may not be coupled to each other. A first multiplexer (not shown) may be connected to the stationary electrodes, and a second multiplexer (not shown) may be connected to the movable electrodes. Alternatively, a single multiplexer may switch through the pairs of stationary and movable electrodes. A current shunt 1530 may allow a voltage relative to ground to be measured by a processing unit 1550. In other embodiments, a Wheatstone bridge may be used to measure resistance rather than the current shunt 1530.

In the illustrated embodiment, the processing unit 1550 controls the multiplexer 1520. In some embodiments, the processing unit 1550 may comprise a microprocessor (not shown) and an integrated circuit, such as an FPGA, ASIC, or the like (not shown). The multiplexer 1520 may be implemented in the integrated circuit or may be an off the shelf ASIC controlled by the integrated circuit. The integrated circuit may also comprise an ADC to measure the voltage across the current shunt 1530. The integrated circuit may also be able to efficiently handle parallel computations to convert voltage measurements to displacements before outputting the displacements to the microprocessor with a high bandwidth link. This may allow the integrated circuit to manage the control circuitry and perform lower level calculations, while the processor uses the preprocessed data received from the integrated circuit to perform higher level modeling. Carbon nanotube integrated circuits embedded into the flexible substrate may comprise all or part of the switches, electrodes, microprocessor, multiplexer, and/or demultiplexer. Microfluidic channels may be used for electrodes with very small contact areas to enhance electrical coupling between the conductive fluid and the stationary and movable electrodes.

Determining Relative Permittivity and/or Resistivity of an Object

A gripping system may be used to measure a capacitance across an object being gripped. Because the distance between the capacitor plates is known, a relative permittivity of the object may be determined from the capacitance. In some embodiments, determining the relative permittivity may comprise computing a dielectric constant for the object. Alternatively or additionally, a resistance of the object being gripped may be measured. Measurements of the length of the object and the area of the object from the gripping system may be used with the measured resistance to determine a resistivity of the object. In some embodiments, the relative permittivity may be determined for insulators, the resistivity may be determined for conductors, and the relative permittivity and/or resistivity may be determined for semiconductors.

The relative permittivity and/or resistivity may be used to identify the composition of an object by comparing the determined/measured value to known values for various materials or to previously measured values for various objects. Once the material of the object is known, properties of the object or the weight of the object may be predicted from the material. The relative permittivity and/or resistivity may also be used to determine the purity of an object or the existence of hazardous materials on the object. These determinations may be beneficial in the semiconductor industry and the like. The additional data from measuring the relative permittivity and/or resistivity may allow for better process control, increased efficiency, and superior products.

Figure 16A:
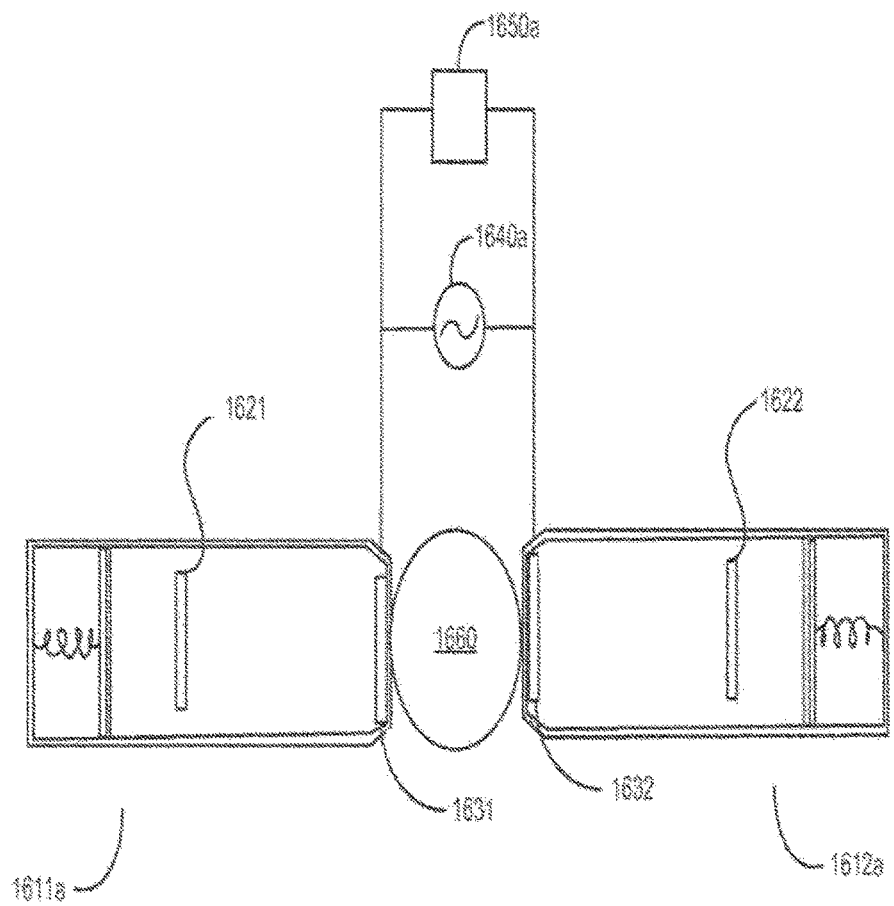
FIG. 16A is a schematic diagram of a relative permittivity sensor comprising opposing sensor cells.

FIG. 16A is a schematic diagram of a relative permittivity sensor 1600*a* comprising opposing sensor cells 1611*a*, 1612*a*. The opposing sensor cells 1611*a*, 1612*a* may comprise pistons and/or flexible walls. In the illustrated embodiment, the movable electrodes 1631, 1632 may be used as plates of a capacitor with an object 1660 acting as the dielectric for the capacitor. In other embodiments, the fixed electrodes 1621, 1622 or both the fixed and movable electrodes 1621, 1622, 1631, 1632 may be used as the plates of the capacitor. A separate voltage line may be supplied to the movable electrodes 1631, 1632, or one or more switches may be used to change between displacement measuring and capacitance measuring.

In some embodiments, displacement measuring may not be performed during capacitance measuring, and the fixed electrodes 1621, 1622 may be at the same voltage as the movable electrodes 1631, 1632 or allowed to float. Correspondingly, opposing movable electrodes 1631, 1632 may be at the same voltage, one may be allowed to float during displacement measurement, and/or the opposing electrodes 1631, 1632 are not energized at the same time during displacement measurement to prevent capacitive interference. In embodiments, the object 1660 may be ejected by applying a voltage of the same polarity to both movable electrodes 1631, 1632 or may be attracted in between the electrodes 1631, 1632 when a voltage is applied across the electrodes 1631, 1632. This may be used to grab or release an object, such as when using micromachinery.

In some embodiments, the sensor 1600a may use only one pair of directly opposing electrodes. Alternatively, a predetermined plurality of electrodes and/or non-directly opposing electrodes may be used. For example, measuring permittivity of hollow objects with directly opposing electrodes may require an excessively large voltage, so electrodes angled relative to one another may be selected in such instances. Alternatively, the shape of the object 1660 may cause the movable electrodes 1631, 1632 to be angled rather than directly opposing one another. The angles may be between 0 degrees and 180 degrees in some embodiments and between −180 degrees and 180 degrees in others. For angled plates, the electric field may arch through the object 1660. The arching of the electric field may depend on the thickness and material of the object 1660. The voltage may be increased until the electric field extends out of the object 1660. When the permittivity is detected to be that of air and/or there is a change in permittivity from that of the object 1660, an edge of the object 1660 may be indicated. In alternate embodiments, edge detection may be performed by changing one plate of the capacitor to a different sensor cell's movable electrode until the permittivity of air is detected.

Detecting changes in the permittivity of an object 1660 can be used to determine a thickness of an object wall. Various capacitor plate arrangements may be used to detect changes in permittivity. The capacitor plates may be arranged in close proximity, such as a series capacitor plate alignment, to cause the electric field to form an arch between the capacitor plates. A measured capacitance of the arching field may depend on the permittivity of each material through which the field passes, such as an object wall and a material behind the object wall like water or air. For example, a small electric field applied to a glass of water by series plate capacitors may first penetrate through the glass. As the electric field is increased, the electric field may penetrate through the water and the glass. A change in capacitance as the electric field is increased may indicate the electric field is passing through a material with a different permittivity value.

The electric field between capacitor plates may create an arch with the series plate alignment. Increasing the voltage from a low value to a high value across the capacitor may cause the electric field to project from one layer of the object to another layer of different material as the arching electric field is increased. The capacitor voltage may also be monitored in order to determine changes in materials. Changes in the shape of the voltage curve may also be used to indicate the thickness of the different layers of object materials. The change in dielectric constant of the various materials of the object may cause ripples in the voltage-time curve as a function of increasing voltage. Comparing these changes to stored values may be used to determine the wall thickness of an object.

The voltage across a capacitor may be expressed using the equation:

$$V = \frac{1}{C}\int_0^t i(\tau)d\tau + V(0) \tag{1}$$

wherein V is the voltage across the capacitor at time t, V(0) is the voltage across the capacitor at time 0, C is the capacitance value of the capacitor, and i(τ) is the current into and out of the capacitor. The impedance of the capacitor may be expressed as:

$$Z = \frac{1}{j\omega C} = -\frac{j}{2\pi f C} \tag{2}$$

wherein Z is the impedance of the capacitor, j^2=−1, ω is the angular frequency, f is the ordinary frequency, and C is the capacitance value of the capacitor. The capacitor voltage, current, and/or impedance may be used to detect changes in the dielectric constant as the voltage and/or frequency is increased to project through the different layers of the object. Monitoring the shape of the voltage curve may predict the wall thickness and materials of the object. Different voltage and/or frequency curves may be stored in the processor for comparison to the measured curve.

The permittivity values for various substances, including substances with multiple layers of different materials, may be stored for comparison with measured values using a processor. A combined equivalent permittivity value may be computed from the measured capacitance. The combined equivalent permittivity value may be dependent on the permittivity values of each material through which the electric field passes. Alternatively or in addition, the processor may calculate a permittivity profile by comparing a change in applied voltage and/or frequency relative to a change in capacitance. The combined equivalent permittivity and/or permittivity profile may then be compared to the stored permittivity values and/or stored permittivity profiles to determine the thickness of the object wall and/or to determine the materials of which the object 1660 is comprised. Determining the thickness of the object wall may be important for regulating pressure. The pressure exerted on an object 1660 by a gripper may be controlled through feedback of various information. The feedback may include the object's material, the wall thickness, change in voltage, change in impedance, change in frequency, and/or the change in permittivity as the electric field projects through a wall and encounters another material.

A power source 1640a and measuring device 1650a may be used to measure the capacitance, capacitor impedance, and/or capacitor voltage across the object 1660. In some embodiments, the power source 1640a and measuring device 1650a may be a single device. In other embodiments, additional electrodes (not shown) may be used to create a plurality of capacitor circuits, which may be controlled by multiplexers and/or demultiplexers (not shown). The capacitance, capacitor impedance, and/or capacitor voltage may be measured by applying a direct current (DC) voltage and measuring current and/or a charging time; applying a constant current and measuring a rate of voltage change and/or a charging time; applying an alternating current (AC) and measuring the resulting voltage; applying an AC voltage and measuring the resulting current; applying and varying the frequency of an alternating current and measuring the capacitor voltage; applying and varying the frequency of an alternating voltage and measuring the capacitor current; using a bridge circuit; or the like. With either a constant voltage AC source or constant current AC source, the magnitude, the phase, and/or a complex representation of the resulting current or voltage can be measured. A variable frequency switching power supply may be used to provide DC and AC power at various frequencies, power, and/or voltage. Because properties may vary substantially with frequency, the power source 1640a and measuring device 1650a may have wide programmable frequency ranges. In some embodiments, several measurements may be averaged to increase accuracy. The voltage applied in any of the above measurement systems may be low to avoid exceeding the breakdown voltage of the object 1660 or generating too much heat in the object 1660, which may mostly be a problem for AC powered measurements.

In some embodiments, a plurality of capacitances across the object may be measured at a corresponding plurality of frequencies. The frequencies may be varied from zero (DC) to $10^{15}$ Hertz or higher in embodiments. This may comprise sweeping from low frequency to high frequency. Similarly, the voltage across the movable electrodes 1631, 1632 may be increased over a plurality of values during measurements. The measurements may also be used to determine the dielectric relaxation and/or dissipation factor of the material. The permittivity of a material may also depend on the length of time the material is exposed to an electric field as well as the temperature of the material. Capacitances may be measured for multiple exposure times, and a temperature of the dielectric may be measured. A Capacitive-to-Digital Converter, such as the AD7746 Capacitive-to-Digital Converter from Analog Devices, may be used for material property measuring (e.g., high accuracy capacitive sensing).

A relative permittivity of the object may be determined from the one or more measured capacitances. In some embodiments, the relative permittivity may be computed using a processor. Because walls, air gaps, and the like are in between the movable electrodes 1631, 1632 and can contribute to the capacitance measurement, the sensor 1600a may be calibrated initially to account for the permittivity of these sensor components before determining the relative permittivity of the object. Alternatively, air gaps may be reduced or eliminated by applying a liquid to the robotic gripper. In some embodiments, the liquid may comprise a polar solvent, such as water. Due to the higher permittivity of water, capacitance measurements may be increased, allowing more precise measurements at lower voltages. To calibrate the sensor 1600a, the sensor cells 1611a, 1612a first may be brought together until they are touching. One or more capacitances of the sensor components may then be measured at one or more frequencies.

The relative permittivity of the sensor components may be determined according to the equation:

$$C = \frac{\varepsilon_{sensor}\varepsilon_0 A}{d_{sensor}} \tag{3}$$

wherein $\varepsilon_{sensor}$ is the relative permittivity of the sensor components, $d_{sensor}$ is the distance between the movable electrodes, $\varepsilon_0$ is the vacuum permittivity, and A is the area of the electrodes 1631, 1632. In some embodiments, the vacuum permittivity and electrode area may be predetermined values, and the value $\varepsilon_{sensor}/d_{sensor}$ for each frequency may be stored to account for the sensor components. The permittivity of sensor components may be determined during step 904 of the displacement calibration. In other embodiments, the sensor cells 1611a, 1612a may be separated by a predetermined displacement during computation of the relative permittivity for sensor components and/or $\varepsilon_{sensor}$ may be stored. Equation 3 comprises units from the International System of Units (SI). In other embodiments, Gaussian units or other unit systems may be used to calculate permittivity. In Gaussian units, the dielectric constant k may be computed according to the equation:

$$C = \frac{k_{sensor} A}{4\pi d_{sensor}} \tag{3a}$$

The relative permittivity of the object 1660 may then be computed from a measured capacitance using the equation:

$$C = \frac{\varepsilon_0 A}{\frac{d_{object}}{\varepsilon_{object}} + \frac{d_{sensor}}{\varepsilon_{sensor}}} \tag{4}$$

which can be rewritten:

$$\varepsilon_{object} = \frac{d_{object}}{\frac{\varepsilon_0 A}{C} - \frac{d_{sensor}}{\varepsilon_{sensor}}} \tag{5}$$

wherein $d_{sensor}$ is the distance between the electrodes attributable to sensor components, $\varepsilon_{object}$ is the relative permittivity of the object 1660, and $d_{object}$ is the distance between the electrodes attributable to the object. If the sensor cells 1611a, 1612a were touching when computing the relative permittivity of the sensor components, then $d_{sensor}$ in equation 3 may be approximately $d_{sensor}$ in equation 5 and $\varepsilon_{sensor}/d_{sensor}$ may be directly inserted into equation 5. Distance measurements made according to the previously discussed methods may be used as the distance $d_{object}$. Because all other values are known, $\varepsilon_{object}$ can then be computed.

The computation of the relative permittivity may also compensate for air gaps between the sensor cells 1611a, 1612a. The permittivity of an object 1660 with air gaps may be computed according to the equations:

$$\varepsilon_{object} = \frac{1}{1 - \left(1 - \frac{C_{air}}{C_{object+air}}\right)\frac{d_{plates}}{d_{object}}} \tag{6}$$

wherein the permittivity of air is assumed to be one, $d_{plates}$ is the distance between the plates including both the air gap and width of the object, $C_{object+air}$ is the measured capacitance with the object 1660 in place, and $C_{air}$ is the measured capacitance at distance $d_{plates}$ with the object 1660 not in place. If $C_{air}$ is not measured, equation 6 can also be computed as:

$$\varepsilon_{object} = \cfrac{1}{1 - \left(1 - \cfrac{\varepsilon_0 A}{d_{plates} C_{object+air}}\right) \cfrac{d_{plates}}{d_{object}}} \quad (6a)$$

Equation 6 can then be combined with equation 4 to compute the relative permittivity while accounting for air gaps and sensor components, yielding the equation:

$$\varepsilon_{object} = \cfrac{1}{1 - \left(1 - \cfrac{C_{air}}{C_{object+air}}\right)\left(\cfrac{d_{walls}}{d_{object}} - \cfrac{d_{sensor}}{d_{object}\varepsilon_{sensor}}\right)} \quad (7)$$

wherein $d_{walls}$ is the distance between the sensor cell 1611a, 1612a flexible substrate walls (i.e., the sum of $d_{walls}$ and $d_{sensor}$ is the total distance between the electrodes 1631, 1632).

A dissipation factor for the object 1660 may also be measured in some embodiments. The dissipation factor may also be corrected for air gaps and sensor components. For a measurement with air gaps, the dissipation factor can be computed according to the equation:

$$D_{object} = D_{object+air} + \varepsilon_{object}(D_{object+air} - D_{air})\left(\cfrac{d_{plates}}{d_{object}} - 1\right) \quad (8)$$

wherein $D_{object}$ is the dissipation factor of the object 1660, $D_{object+air}$ is the measured dissipation factor with the object in place, and $D_{air}$ is the measured dissipation factor with the object not in place.

When the size of the air gap and/or size of the object is not known or hard to measure, the permittivity of the object 1660 and/or the dissipation factor may be computed using the Two-Fluid Method. Under the Two-Fluid Method, the capacitance of the object may be measured while in each of two different fluids. Then the capacitance of each individual fluid may be measured. In some embodiments, one of the fluids may be air. The second fluid may be selected to have known and stable dielectric properties and not react with the test object. The dielectric constant of the object may then be computed according to the equation:

$$\varepsilon_{object} = \varepsilon_{air} \cfrac{C_{object+fluid}C_{object+air}(C_{fluid} - C_{air}) - C_{fluid}C_{air}(C_{object+fluid} - C_{object+air})}{C_{air}(C_{object+air}C_{fluid} - C_{object+fluid}C_{air})} \quad (9)$$

wherein $\varepsilon_{air}$ the relative permittivity of air, $C_{object+air}$ is the measured capacitance of the is object when placed in air, $C_{air}$ is the measured capacitance of the air with the object not in place, $C_{object+fluid}$ is the measured capacitance of the object when placed in the second fluid, and $C_{fluid}$ is the measured capacitance of the second fluid with the object not in place.

The calculated relative permittivity of the object 1660 may then be compared to known values to determine the material of the object 1660. The known permittivity values for various materials may be saved in a memory, a database, or the like. Permittivity values for materials may include permittivity values for compounds and/or composite materials. Each material may have a plurality of permittivity values saved for different possible frequencies, temperatures, electrode angles, voltages, and times of exposure to an electric field. Alternatively, permittivity values for a default temperature and/or electrode angle may be saved and permittivity values for other temperatures and/or electrode angles may be computed from the default value. As previously discussed for displacement measurements, continuous monitoring of the electrodes 1631, 1632 during displacement measuring can be used to correct the effect of the angled electrodes on the displacement. The dielectric relaxation and/or dissipation factor for the material may also be calculated and saved in some embodiments.

A most likely material may then be selected by comparing measured values to corresponding saved values to find a best fit and/or minimize the error between the saved values and the measured values. The sensor 1600a may continuously attempt to identify the material starting at lowest possible voltage, current, and frequency values, so as to minimize the amount of energy applied to the object 1660. The voltage, current, and/or frequency may be increased incrementally either separately or together to measure the values of the capacitor as a function of the change in voltage, current, and/or frequency. The sensor 1600a may stop when a certainty or error in its decision reaches a predetermined threshold. In some embodiments, the sensor may use only the lowest possible voltage, current, and frequency to identify the object 1660.

In embodiments, the saved permittivity values may be acquired through direct measurements of known materials using the sensor 1600a. The sensor 1600a may not need to be calibrated in some embodiments when direct measurements of the permittivity values are made. In other embodiments, the permittivity values may be acquired from third parties or measured in a laboratory. Laboratory measurements may be made using an off-the-shelf measurement device, such as Hewlett-Packard's HP 16451B. Alternatively, laboratory measured permittivity values for a plurality of frequencies, temperatures, and exposure times may be stored initially, and measured permittivity values may be used to update corresponding values or may be extrapolated to provide additional values for that material. Permittivity values may be measured for compounds that do not have readily available data.

Measured values may be used to determine deviations from an ideal capacitor, such as leakage; parasitic effects; breakdown voltage; temperature deviations; inherent inductance, resistance, or dielectric loss; and the like. Linear deviations, such as leakage and parasitic effects, can be dealt with by adding virtual circuit components when computing capacitance from measured circuit properties, such as magnitude and/or phase of voltage, current, and the like. Non-linear deviations, such as breakdown voltage, may be saved separately and referenced when analyzing measured circuit properties. Then, the power source may be controlled to remain below the breakdown voltage. For linear deviations that change the capacitance value, such as temperature, or for parasitic effects that are non-uniform over varying frequency, such as inherent inductance, resistance, or dielectric losses, the deviations can be accommodated by saving the amount of deviation for specific temperature or frequency values and/or by modifying the saved permittivity values. The temperature deviation may be saved as a capacitance deviation of parts per million per degree Celsius and may be negative or positive.

Permittivity values for different purity levels of a material or for objects that have hazardous materials on them may also be saved. The purity level of the object 1660 or existence of hazardous materials may then be monitored continuously throughout the manufacturing process. If the sensor 1600a detects impurities or hazardous material, it may alert an operator or sound an alarm. The dielectric constant of the object 1660 may be that of a chemical compound in these instances.

Once the material of the object 1660 is known, the pressure of a gripper comprising the sensor 1600a may be adjusted to ensure sufficient friction to hold the object while also ensuring the object 1660 is not damaged by the gripper. In some embodiments, the pressure of the gripper may initially be minimal. Then, the sensor 1600a may determine the material of the object. Once the material is known, properties, such as density, compressive strength, wall thickness, and the like for the material may be determined. Material properties may be saved in the memory or database storing the permittivity values. From the determined density, wall thickness, compound, and size measurements of the object 1660, a weight of the object 1660 may be determined. The gripper may then determine the pressure to be applied to the object 1660 and increase the applied pressure to that value. In some embodiments, the gripper may apply the minimum pressure necessary to handle the object 1660. If the minimum pressure necessary to manipulate the object may damage the object 1660, the gripper may notify an operator, nonetheless apply the minimum pressure required for manipulation, and/or apply the maximum pressure that will not damage the object. For operations where the objects 1660 are a known size, a predetermined pressure may be saved.

Some energy may remain in the object 1660 after the voltage differential has been removed from the movable electrodes 1631, 1632 due to polarization of the dielectric. In some embodiments, the stored energy in the object 1660 may be dissipated once the relative permittivity is determined. To do so, the electrodes 1621, 1622, 1631, 1632 may be switched back to measuring displacement. Because both plates of the capacitor are resistively tied to ground, any stored potential energy in the object 1660 may be dissipated. In alternate embodiments, both plates of the capacitor may be switched to ground for a predetermined period of time. If the capacitor remains charged for a long period of time, it may not completely discharge when briefly discharged due to dielectric absorption (also referred to as soakage or battery action). To avoid dielectric absorption, the capacitor may be charged for only a limited time, and/or the length of time for any of the above methods of discharge may be determined based on the length of time the capacitor remains charged.

Figure 16B:
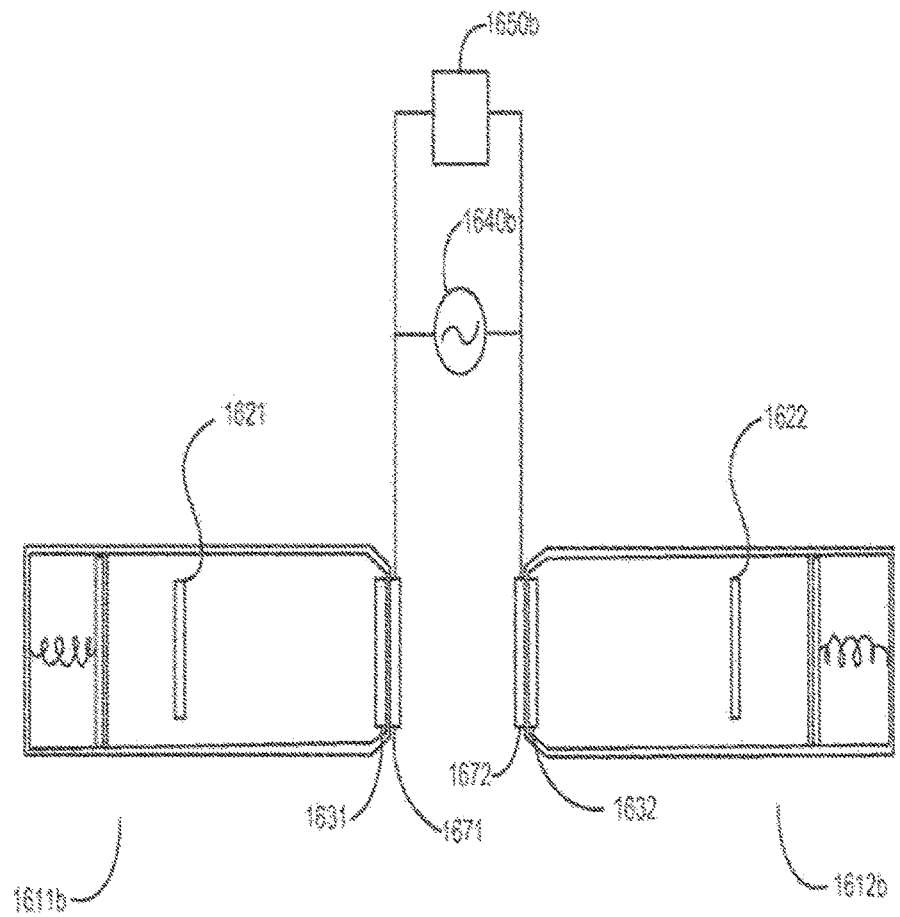
FIG. 16B is a schematic diagram of a resistivity sensor comprising opposing sensor cells.

FIG. 16B is a schematic diagram of a resistivity sensor 1600b comprising opposing sensor cells 1611b, 1612b. The resistivity sensor 1600b may be configured in a manner similar to the relative permittivity sensor 1600a, but each sensor cell 1611b, 1612b may comprise an additional external electrode 1671, 1672. In some embodiments, the external electrodes 1671, 1672 may be thin metal, conductive elastomer, conductive polymer, or thin film on the outside of the sensor cells 1611b, 1612b that can electrically couple to an object (not shown). A power source 1640b and electrical property measuring device 1650b may measure the resistance of the object in any of the manners previously discussed for measuring resistance of the conductive fluid between the electrodes 1621, 1622, 1631, 1632. In some embodiments, the electrical property measuring device 1650b may be used for measuring resistance of the object, measuring permittivity of the object, measuring capacitance between the displacement sensing electrodes 1621, 1622, 1631, 1632 (when a dielectric fluid is used for displacement measurement), and/or for measuring resistance of the conductive fluid between the electrodes 1621, 1622, 1631, 1632. The resistivity measuring device may also be used to discharge potential energy stored in the object due to capacitance and/or resistance measurements.

Once the resistance is measured, the resistivity of the material may be computed using the equation:

$$\rho = \frac{RA}{l} \tag{10}$$

wherein $\rho$ is the resistivity of the material, R is the measured resistance, A is the cross-sectional area of the object between the external electrodes 1671, 1672, and l is the distance between the external electrodes 1671, 1672. As with relative permittivity, the distance between the external electrodes may be determined from the displacement measurements made according to previously discussed methods. The area may be determined by characterizing the geometry of the object. In some embodiments, one or more additional sensor arrays (not shown) perpendicular to the sensor cells 1611b, 1612b may be used to determine the area of the object. Alternatively, additional sensor cells (not shown) parallel to the sensor cells 1611b, 1612b may use pressure sensors measuring pressure of the conductive fluid to detect the edges of the object. The determined resistivity may be compared to saved resistivity values to identify the object's material in a manner similar to comparing permittivity values. Corrections to the measured resistance may be made for internal sensor component resistances, temperature variations, and the like. Alternatively or additionally, resistivity values for a plurality of temperatures or a temperature coefficient may be saved.

Gallium Oxide Contacts

Gallium Oxide ($Ga_2O_3$) may be used to form a contact to which an electrode may be attached, such as for small sensors on the millimeter to micrometer scale or less. The Gallium Oxide contacts may be used with piston based sensor cells 610 and/or flexible wall sensor cells 110. The Gallium Oxide contacts may be used with sensor arrays with or without internal insulating walls to separate sensors, such as the sensor arrays 1000 or 1100. To create the contact, first, a microfluidic channel, such as a cylinder, chamber, or the like, may be filled with a gallium alloy using an applied pressure from, for example, a pump and/or capillary forces. The microfluidic channel may have at least one opening and may be filled until the gallium alloy reaches the opening.

The area outside the opening may comprise Argon gas to prevent the gallium from reacting with other elements. The pressure applied to the gallium alloy may be kept below a threshold where the gallium alloy would flow beyond the opening. The surface tension of the gallium alloy may form a round shape and/or the gallium alloy may be molded into a desired shape. Gallium oxide may then be caused to form on the gallium alloy. The gallium oxide may be formed through various methods: oxygen may be added to or replace the argon gas and the gallium alloy may be heated while in contact with the oxygen; the gallium oxide may be formed by precipitating neutralization of acidic or basic solution of gallium salt; gallium nitrate may be thermally decomposed; reaction of trimethylgallium and oxygen may be used to form a thin film of gallium oxide covering the gallium alloy; pure gallium may be used to cover the gallium alloy using sputtering or the like with the gallium oxide formed from the pure gallium; or the like.

Once a sufficiently sized layer of gallium oxide has been formed, a movable electrode may be coated onto the gallium oxide film, and/or the gallium oxide may be used as a movable electrode. In some embodiments, the movable electrode may be subdivided into multiple electrodes sharing the gallium alloy liquid in common. One or more fixed electrodes may be mounted on the other end of the microfluidic channel in a configuration similar to the sensor array 1000 and/or the sensor array 1100. In some embodiments, the electrodes may be tungsten, tantalum, columbium, titanium, molybdenum or the like. The electrodes may be attached using sputtering, ink jet printing, screen-printing, deposition, etching, or the like.

The electrodes may be connected with a wire to an integrated circuit on or off the sensor cell 110, 610 to apply power and/or measure electrical properties of the sensor cell 110, 610. Then, the electrode may be covered with an insulating and nonconductive material to prevent accidental electrical contact. Another layer of gallium oxide may be applied on top of the electrode, or silicon rubber may be applied to the electrode. The gallium oxide or silicon rubber may be added using sputtering, ink jet printing, screen-printing, deposition, etching, or the like. The sensor cells constructed according to this method may be connected in series with additional sensor cells and/or in series with an electric motor and/or configured into modules, such as the touch sensor 700 or the touch sensor 800.

Weight Measurement

The gripper may measure the mass or weight of the object. The mass or a density computed from the mass may allow a more accurate determination of the composition of the object. The gripper may measure the mass by releasing the object on a scale or balance and re-grasping the object once the measurement is complete. Alternatively, the gripper may be integrated into a balance or scale. The weight or mass of the object may be computed by subtracting the weight of the gripper without the object from the weight with the object, zeroing the balance or scale to account for the gripper weight, or the like. The balance or scale may be an analytical balance, an analytical scale, a strain gauge scale, or the like. A strain gauge may comprise a beam with a length-sensitive electrical resistor. Variations in the resistance due to deflections of the beam may be measured to determine the weight or mass.

Packaging of Grippers and Sensors

Various packages are possible for the grippers and sensors discussed herein. In a gripping system, multiple grippers and/or tools may interact with each other. For example, one gripper may hold an object while another gripper performs a manufacturing operation on the object. The manufacturing operation may be screwing two objects together, inserting the object into something else, or other specific manufacturing operations. Alternatively, one gripper may transfer an object to another specialized gripper to perform a specific operation. For example, an object may be grasped from the outside by a first gripper and then transferred to a gripper that grasps from the inside, which will allow for insertion of the object and the like.

In some embodiments, the gripper may be packaged to perform a predetermined operation. In other embodiments, the packaging may be designed to perform a more universal functionality. The packaging for the gripper may be similar to a human hand in shape and/or function. For a hand shaped gripper, sensors may be embedded into the fingers and palm. Alternatively, the sensors may be mounted on a holding fixture to indicate the object's location. Various tasks may be performed by a gripper with predetermined packaging or a universally packaged gripper, such as grasping, securing, measuring, manipulating, and/or recognizing object. Various properties may be measured to recognize the object, such as dimensions, weight or mass, dielectric constant, dissipation factor, dielectric relaxation, resistivity, and the like. Such measurements may allow for a good approximation of the object's properties, which may allow for more accurate manipulation. Multiple sensors may share a common conductive fluid and/or insulating flexible walls in some embodiments. By using a single insulating flexible wall over many cells, pistons and shafts of movable electrodes may be stabilized, contaminants may be eliminated between sensors, and performance of a robotic hand may be improved. Alternatively, or in addition, the contact cells may be stacked closely together to eliminate contaminants and reduce the area of the sensor walls that contain the sensors and do not perform electrical functions. The walls of the sensors may be minimized to minimize the area between electrical sensors.

Figure 17:
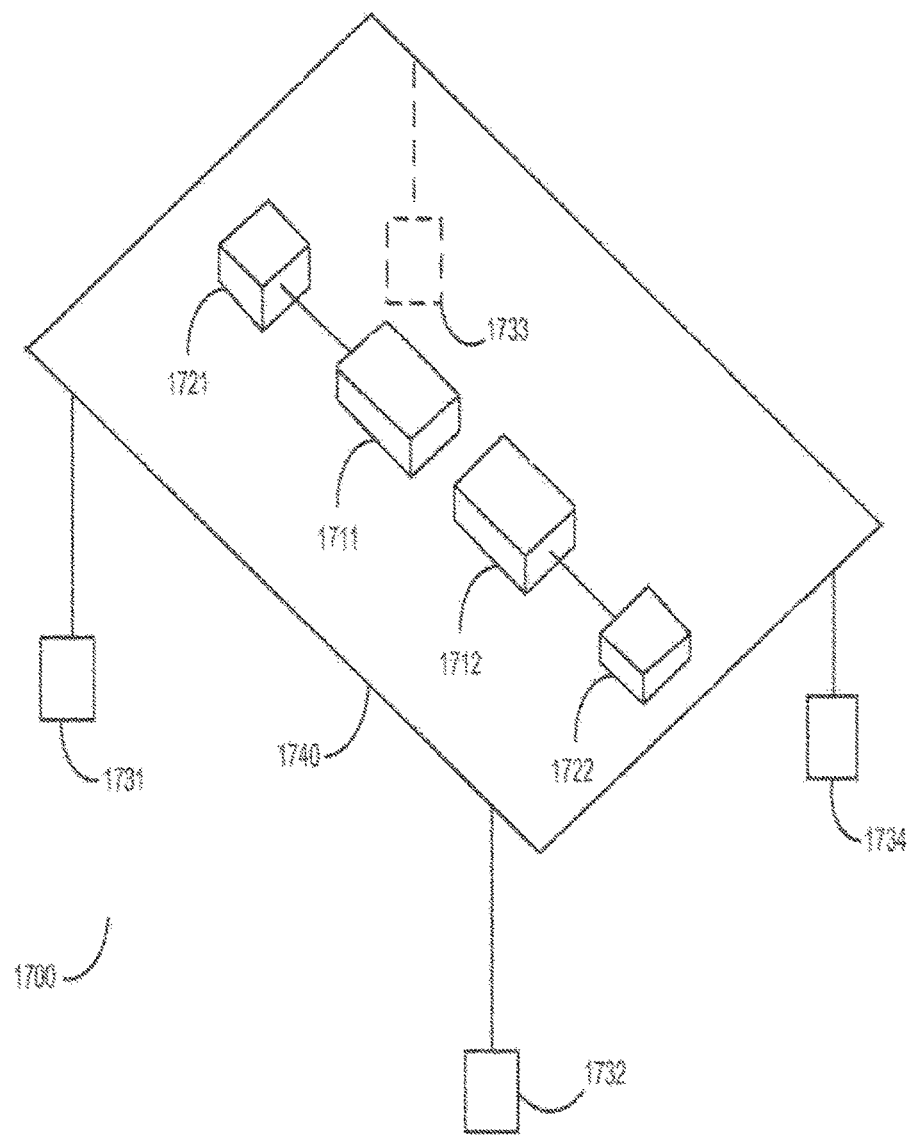
FIG. 17 is a schematic diagram of a gripper package comprising electric motors in series with displacement sensors.

FIG. 17 is a schematic diagram of a gripper package 1700 comprising actuators 1721, 1722 (e.g., electric motors, linear hydraulic actuators, or the like) in series with displacement sensors 1711, 1712. In the illustrated embodiments, there may be two displacement sensors 1711, 1712 and/or arrays of displacement sensors and two corresponding actuators 1721, 1722, but one to six displacement sensors or more, each containing one or more modules and/or each with corresponding electric motors, may be used in other embodiments. The actuators 1721, 1722 may be electric motors able to position the displacement sensors 1711, 1712 very accurately with lead screws through small incremental movements of measurable displacements. The actuators 1721, 1722 and displacement sensors 1711, 1712 may be mounted on a rotating indexing table and/or a table 1740 that can adjust the angle of the object. Actuators 1731, 1732, 1733, 1734 (e.g. electric motors) located at the edges of the table 1740 may adjust the table 1740. Such tables may be available from Hass Automation Inc. and IntelLiDrives Inc.

The distance of the movement of the lead screw may be added to the movement of the displacement sensors to compute the total movement of each sensor. The displacement sensors 1711, 1712 may comprise multiple sensor cells in parallel and series with each other, and the sensor cells in series may be summed to compute the movement of the displacement sensors. The total displacement may be used to calculate the geometry of an object being grasped. For very small objects, including microelectromechanical systems (MEMS) and microfluidic devices, the displacement sensors 1711, 1712 may comprise a single layer of sensor cells. The sensor cells in the single layer may share a single flexible wall subdivided into multiple electrodes as illustrated in FIG. 11. Feedback from pressure sensors in the displacement sensors 1711, 1712 and/or the displacement calculations may be used to accurately control movement of the actuators 1721, 1722, such as electric motors and lead screws, to a millionth of an inch. Calibration and measurements may be performed in a manner similar to method 900.

In other embodiments, the displacement sensors 1711, 1712 may be attached to the end of robotic arms (not shown)

as end effectors. The robotic arms may be able to move the displacement sensors 1711, 1712 to multiple locations on an object. This may allow displacement measurements to be made around the entire object to completely map the surface of the object. Alternatively, measurements may be made until a material of the object is determined. A rotating indexing machine (not shown) may also or alternatively be used to rotate the displacement sensors 1711, 1712 and/or the object for measuring and manipulation. For rotating robotic arms, the distance displaced by the displacement sensors 1711, 1712 through robotic arm movement may be computed according to the equation:

$$S = \Theta r \quad (11)$$

wherein S is the distance displaced, θ is the angle in radians, and r is the radius of the rotation. The net displacement in two orthogonal axes may be computed according to the equations:

$$S_X = r \cos \Theta \quad (12a)$$

$$S_Y = r \sin \Theta \quad (12b)$$

wherein $S_X$ is the net displacement in a first axis and $S_Y$ is the displacement is the net displacement in a second orthogonal axis. Robotic arms may be available from KUKA Robotics Corp., Yaskawa Motoman Robotics, and FANUC Robotics, and indexing machines may include the TR Series from Ganro Industrial Corp. Alternatively, a radially moving hydraulic joint may be used.

The displacement sensors 1711, 1712 may also be incorporated into the hands (not shown) of a robot (not shown). The sensors may be located on all sides of the robotic hands. Two hands from separate arms may be used to enclose an object for pattern recognition, displacement measurements, capacitance measurements, and material determinations. The hands may further comprise fingers (not shown) that can be inserted into smaller places. In some embodiments, the hands and/or fingers on each hand may directly oppose one another to make measurements. In other embodiments, the hands and/or fingers may be at known angles. For performing capacitance measurements and the like, circuits from each hand may run to a common location, such as a controller or base station (not shown) to complete the circuit.

Figure 18:
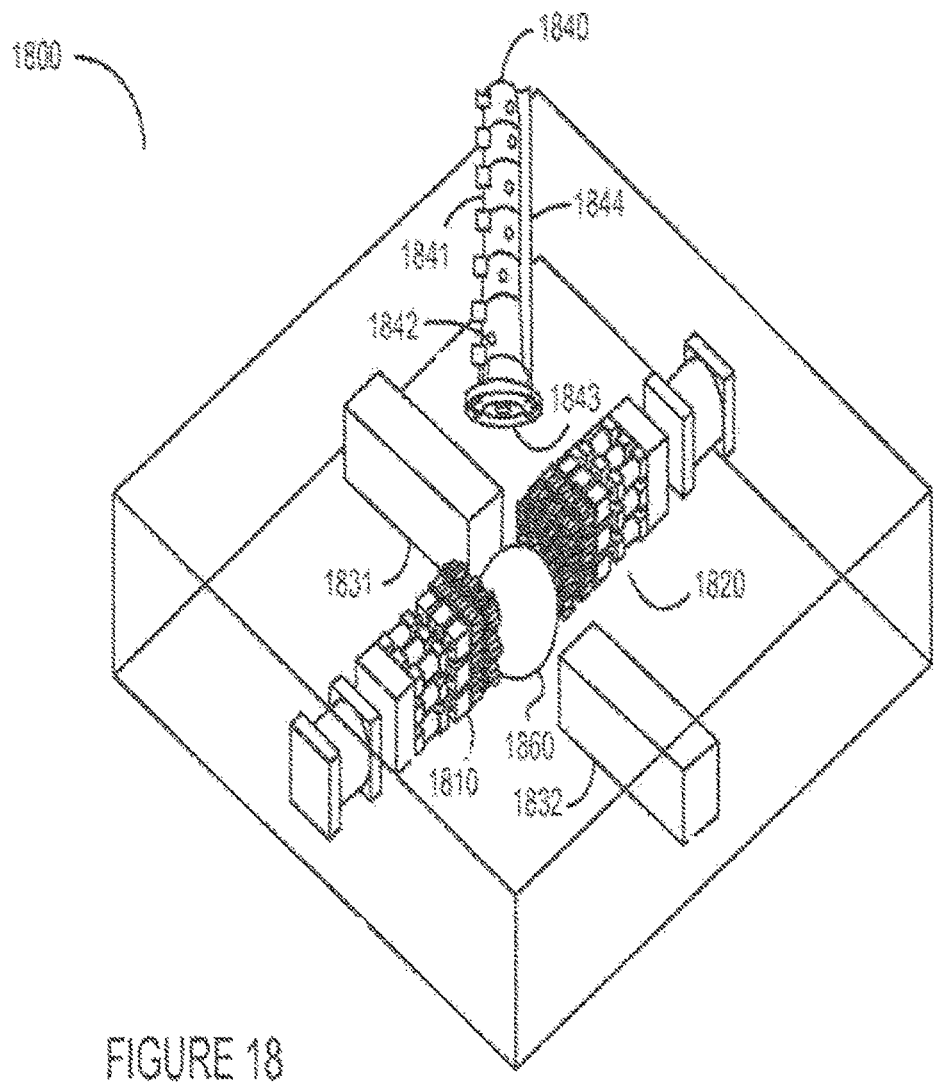
FIG. 18 is a side view of a quick-release gripping system with a cross-sectional view of a rotary joint.

FIG. 18 is a side view of a quick-release gripping system 1800 with a cross-sectional view of a rotary joint 1840. A fixed dimension gripper may comprise a pair of gripping sensor arrays 1810, 1820 with a maximum opening into which an object 1860 may be inserted. The fixed dimension gripper may grip the object 1860 from the inside or from the outside. The fixed dimension gripper may further comprise object constraining blocks 1831, 1832. In other embodiments, the object constraining blocks 1831, 1832 may be replaced by additional gripping sensor arrays 1810, 1820.

The rotary joint 1840 may be used to deliver a fluid to the object 1860 and/or to control the hydraulic cylinders in the sensor arrays 1810, 1820. The fluid may be water, oil, paint, conductive fluid, dielectric fluid, or the like. The rotary joint 1840 comprises a sheath 1844 with stationary inlets 1841 into which fluids may be input from stationary sources. Rotational outlets 1843 may output the fluids to the object 1860, and/or fluid transfer may be used in the sensors or grippers 1810, 1820. The rotational outlets 1843 may be rotated without disrupting the flow of fluids. Conversion holes 1842 may rotate with and transfer fluid to the rotational outlets 1843 while also accepting fluids from the stationary inlets 1841 via cyclical chambers. In embodiments, the rotary joint 1840 may also be able to transfer electrical or optical power including data using silver coated ball bearings, wire brush, conductive rings, liquid metal, or the like. Exemplary rotary joints 1840 may be the FO197 from Moog Corporation or Multiple Passage Systems from Rotary Systems, Inc.

Figure 19:
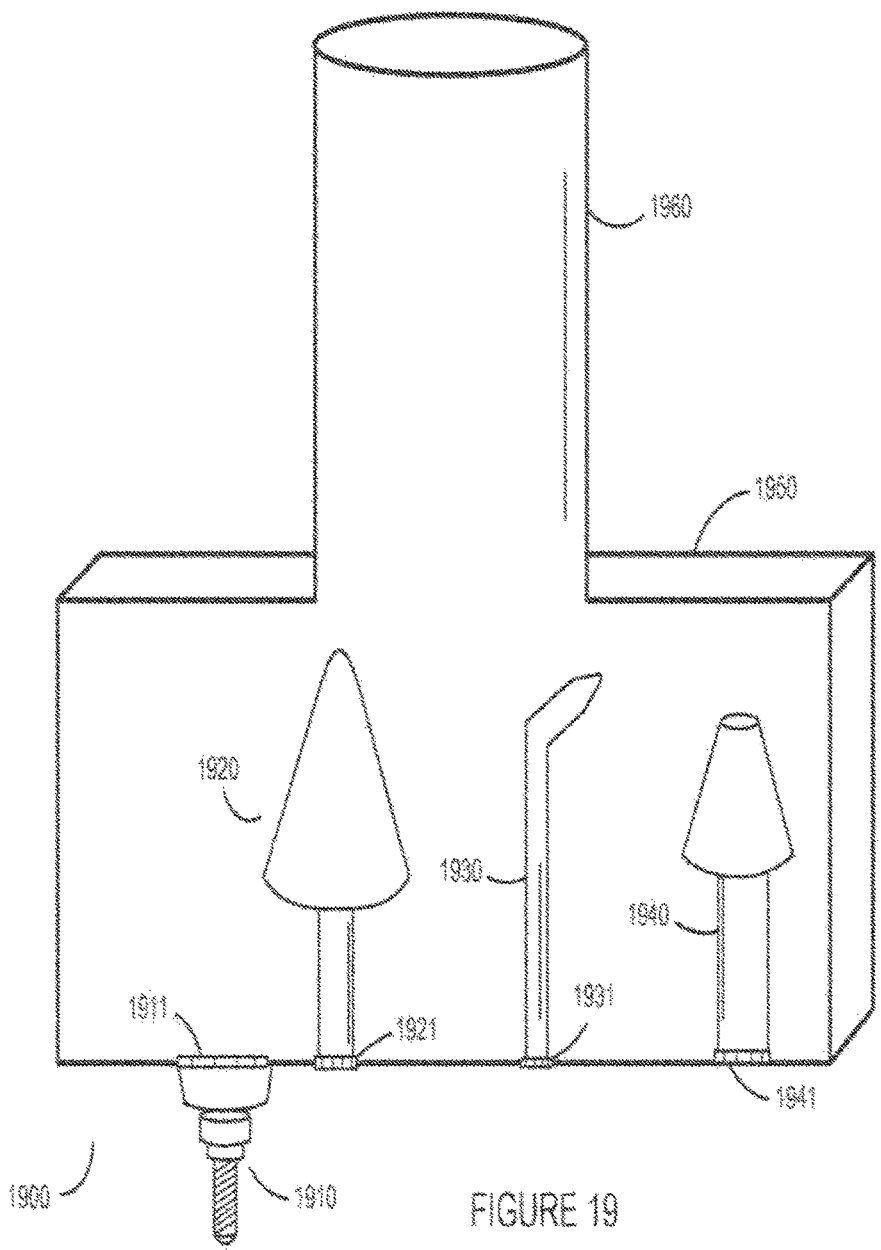
FIG. 19 is a side view of a quick-change turret that may comprise a rotary joint.

FIG. 19 is a side view of a quick-change turret 1900 that may comprise a rotary joint 1840. The quick-change turret 1900 may comprise a plurality of tools 1910, 1920, 1930, 1940, such as a drill 1910, a deburring tool 1920, a welding unit 1930, a fluid nozzle 1940, end mills (not shown), vacuum grippers (not shown), conventional grippers (not shown), and the like, to operate on an object. The tools 1910, 1920, 1930, 1940 may be exchanged with the quick release gripping system 1800 within a robotic arm. One gripper, such as gripper 700, 800*b*, 1100, 1700, 1800, or the like, may secure an object while the robotic arm uses the tools 1910, 1920, 1930, 1940 to perform operations on the object. It will be understood by those of skill in the art that several grippers and/or robotic arms may operate on a single or multiple objects at the same time and that grippers may be exchanged for tools.

The tools 1910, 1920, 1930, 1940 may be located on a turret head 1950, while a neck 1960 may comprise a rotary joint 1840. In some embodiments, the quick-change turret 1900 may further comprise one or more gripping sensor arrays. In some embodiments, a quick-release gripping system 1800 may act as a vice while the quick-change turret 1900 operates on the object or transfers tools to another gripper for operations on objects. If the quick-change turret 1900 comprises gripping sensor arrays, the quick-change turret may insert the object in and remove the object from the quick-release gripping system 1800. For a quick-change turret 1900 with gripping sensor arrays, a rotary joint 1840 for the quick-change turret 1900 may be required to rotate in at least one axis, transfer electrical power, transfer fluid, transfer data, open and close the gripper, and the like.

A tool 1910, 1920, 1930, 1940 may be selected by rotating to the proper tool and/or by folding down the tool of interest using hinges 1911, 1921, 1931, 1941. Tool selection may be controlled hydraulically, electrically, and/or pneumatically. A processor (not shown) may control operation of the quick-change turret 1900 including positioning and which tool 1910, 1920, 1930, 1940 to use. As a gripping system 1800 grasps and recognizes an object or is exchanged for a tool 1910, 1920, 1930, 1940, the processor may determine which tool 1910, 1920, 1930, 1940 to use and begin operating on the object, which may be held by another gripper. The gripping system 1800 may be exchanged for a tool 1910, 1920, 1930, 1940, or the gripping system 1800 may grasp a tool 1910, 1920, 1930, 1940.

Figure 20:
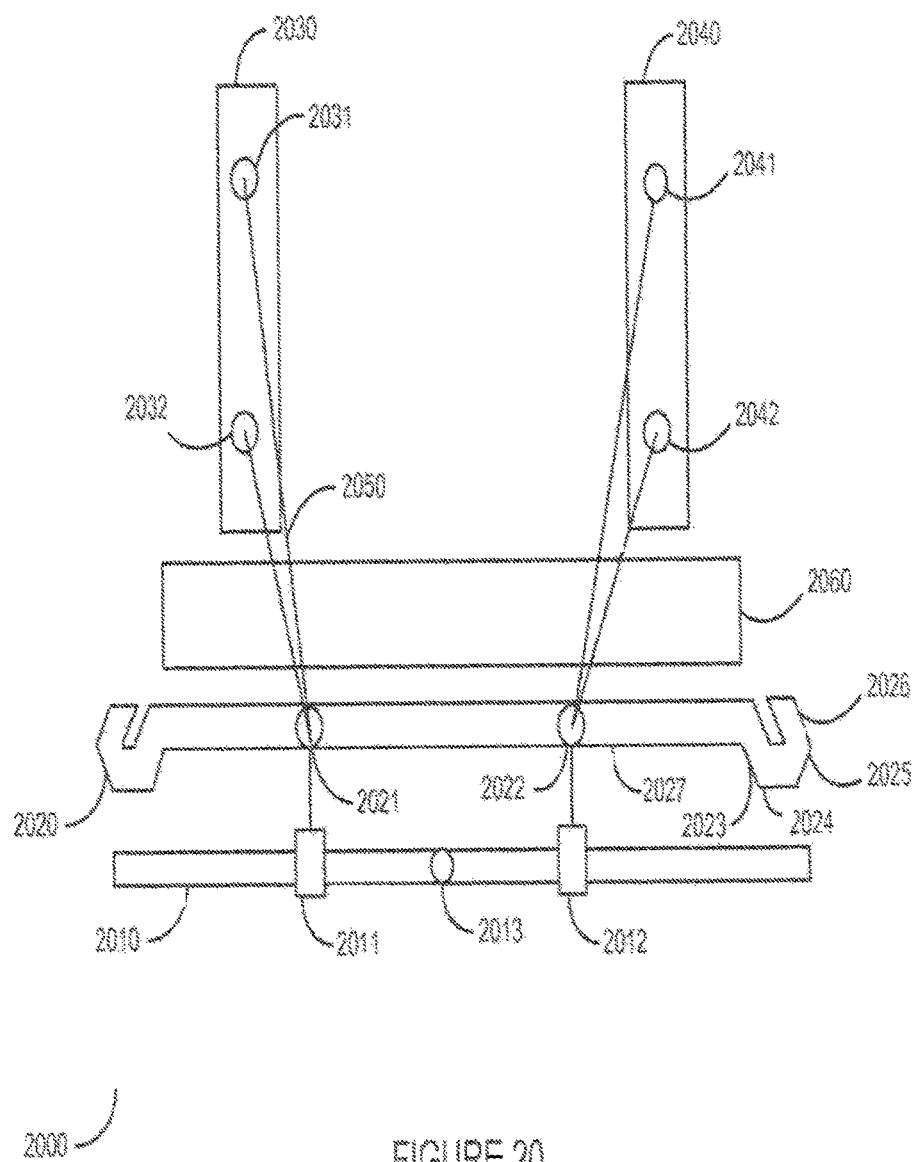
FIG. 20 is a cross-section view of a cam driven robotic gripper with a cam guide for manipulating gripping sensor arrays.

FIG. 20 is a cross-section view of a cam driven robotic gripper 2000 with a cam guide 2020 for manipulating gripping sensor arrays 2030, 2040, 2060. The gripping sensor arrays 2030, 2040, 2060 may comprise two cam-controlled jaws 2030, 2040 that grip with a base 2060. To manipulate the jaws 2030, 2040, an electric motor 2013 may turn a lead screw 2010. Two oppositely threaded nuts 2011, 2012 may move towards each other or away from each other depending on the direction the electric motor 2013 turns. Additionally or alternatively, the lead screw 2010 may have opposite threads on each side of its center point. The nuts 2011, 2012 may be attached to guide pins 2021, 2022 or guide balls located within the cam guide 2020. The guide pins 2021, 2022 also may be moved towards or away from each other with the operation of the electric motor 2013. Alternatively, the jaws 2030, 2040 may be manipulated by hydraulic displacement sensors, such as the sensor 600, to move the cam guides 2021, 2022, and the nuts 2011, 2012 may or may not be connected to the end of the piston shaft. One or more connecting lines 2050, such as wire, hinges, metal, or the like, may connect the guide pins 2021, 2022 to the jaws 2030, 2040 using bolts 2031, 2032, 2041, 2042, screws, pins, or the like. The connecting lines 2050 may be complex hinges that comprise multiple joints.

Different sections 2023, 2024, 2025, 2026, 2027 of the cam guide 2020 may be configured to angle the jaws 2030, 2040 in different directions. For example, when the guide pins 2021, 2022 are in section 2027, the jaws 2030, 2040 may be at a 90 degree angle to the base 2060. As the guide pins 2021, 2022 pass through section 2023, the jaws 2030, 2040 may rotate until they are parallel with the base 2060. In section 2024, the jaws 2030, 2040 may move laterally while continuing to be parallel with the base 2060. Section 2025 may move the jaws 2030, 2040 rotationally to return them to a 90 degree angle relative to the base 2060. Finally, section 2026 may cause the jaws 2030, 2040 to return to parallel with the base 2060 and to close on the base 2060 so sensors in the sensor arrays 2030, 2040, 2060 are completely covered.

Different sections 2023, 2024, 2025, 2026, 2027 may allow the gripper 2000 to perform different functions. For example, while the jaws 2030, 2040 are at 90 degree angles in section 2027, the gripper 2000 may be able to close on an object and hold it like a vice. In section 2024, when the jaws 2030, 2040 may be parallel to the base 2060, the gripper 2000 may be able to interact with another gripper (not shown) to grasp an object too large for the gripper 2000 to hold by itself. By returning the guide pins 2021, 2022 to section 2023 while grasping the large object, the jaws 2030, 2040 can be angled to improve the grip on the object. Pressure sensors in the sensor arrays 2030, 2040, 2060 may ensure that pressure is distributed evenly on the object, which will make the gripper 2000 self-centering. During section 2026, when the sensors are covered, the sensor arrays 2030, 2040, 2060 may be protected from damage or contamination. In some embodiments, there may be more than one cam guide 2020, such as a cam guide (not shown) on the lower end of the jaws 2030, 2040, which may have angles to account for the turning of the jaws 2030, 2040. The jaws 2030, 2040 can be further separated into separate fingers (not shown), which may be controlled by hydraulically, pneumatically, electrically, or the like. The fingers may move independently or together to grasp smaller objects or perform intricate operations before or after the gripper has identified the object being manipulated.

Figure 21A:
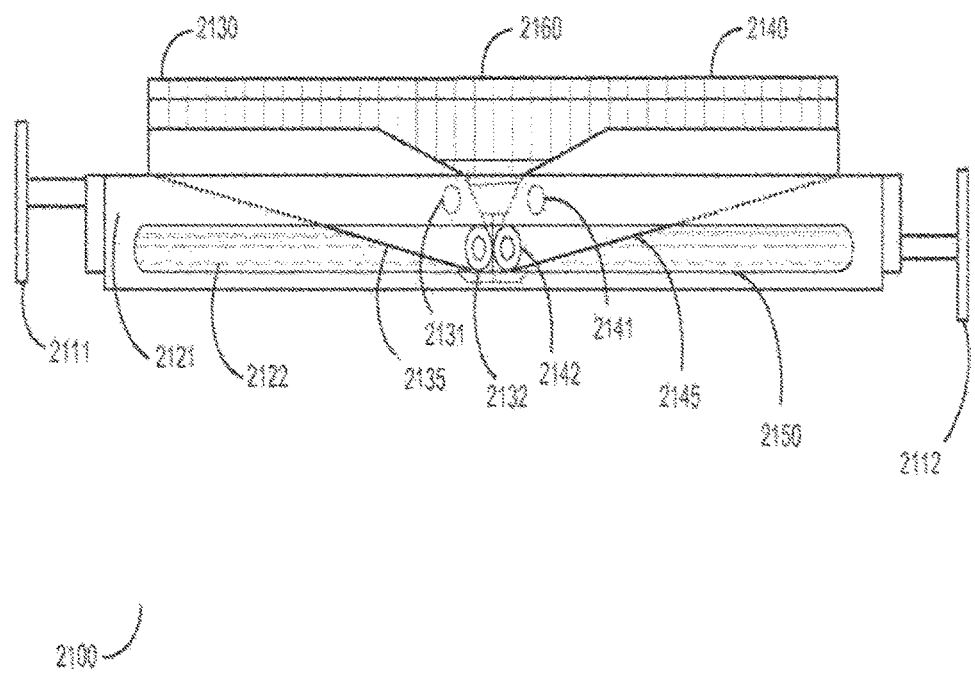
FIGS. 21A and 21B are side perspective views of a robotic gripper when side sensor array panels are in a flat position.
Figure 21B:
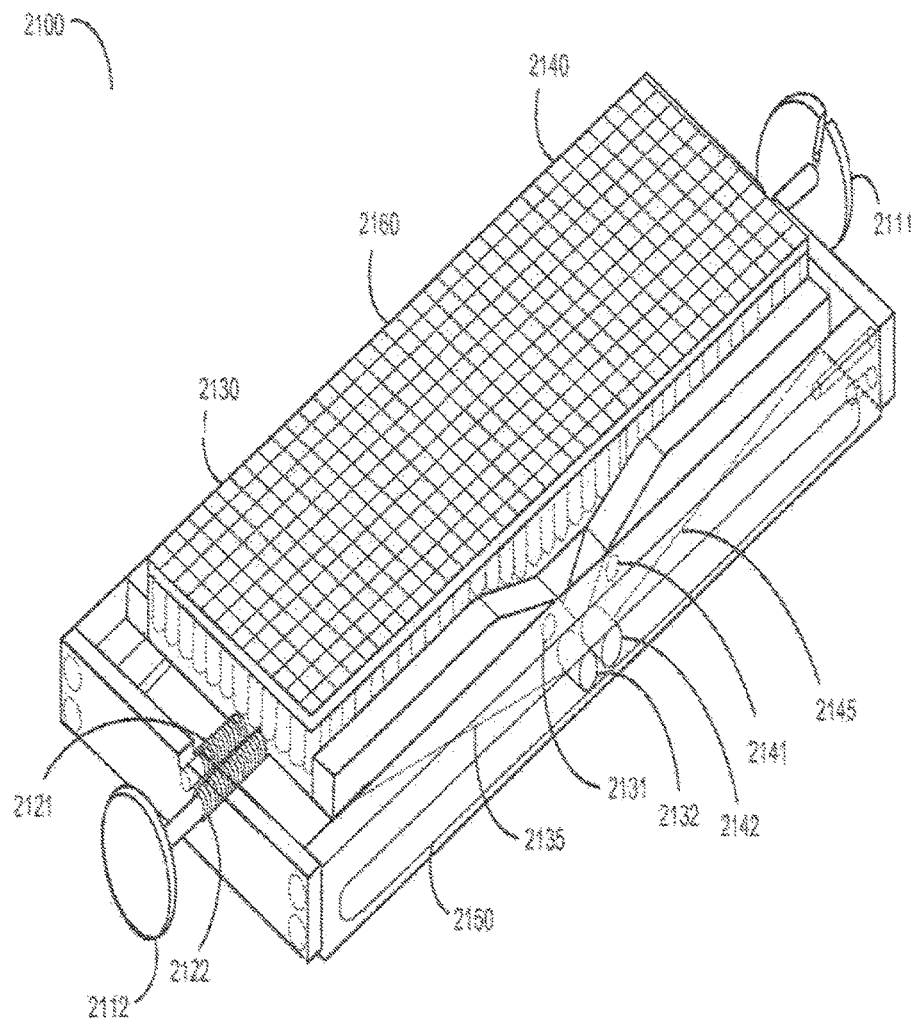
Figure 22A:
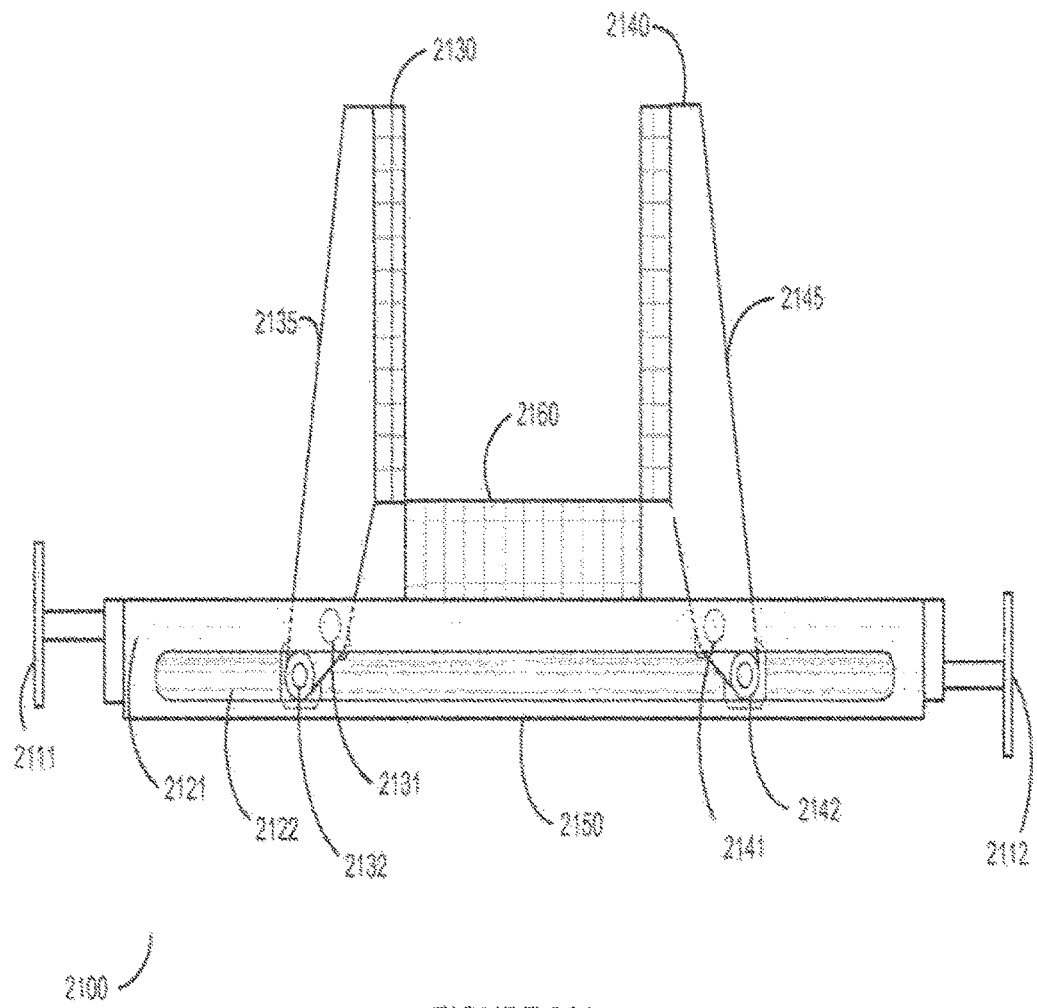
FIGS. 22A and 22B are side perspective views of the robotic gripper when the side sensor array panels are perpendicular to the bottom sensor array panel.
Figure 22B:
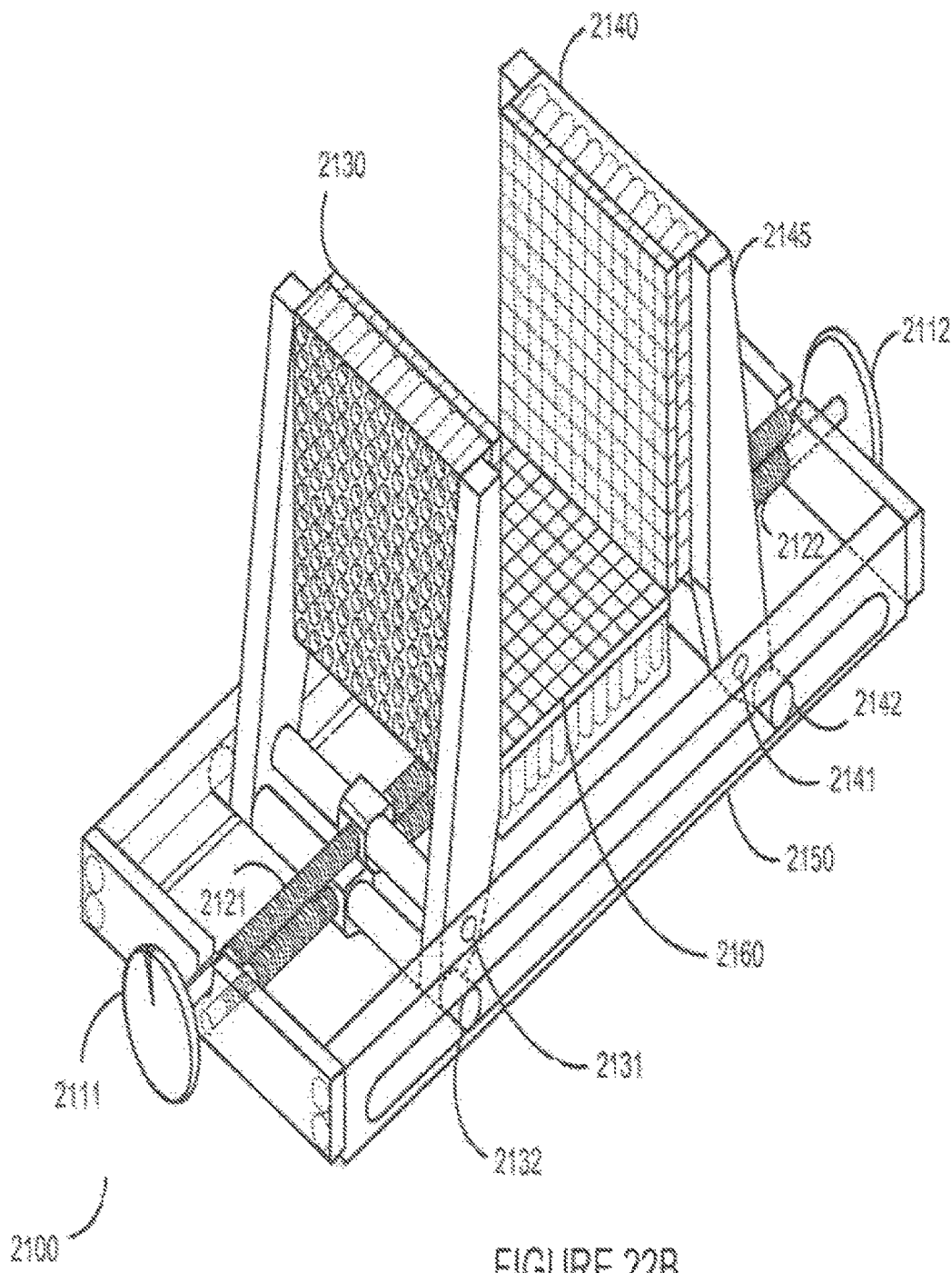
Figure 23:
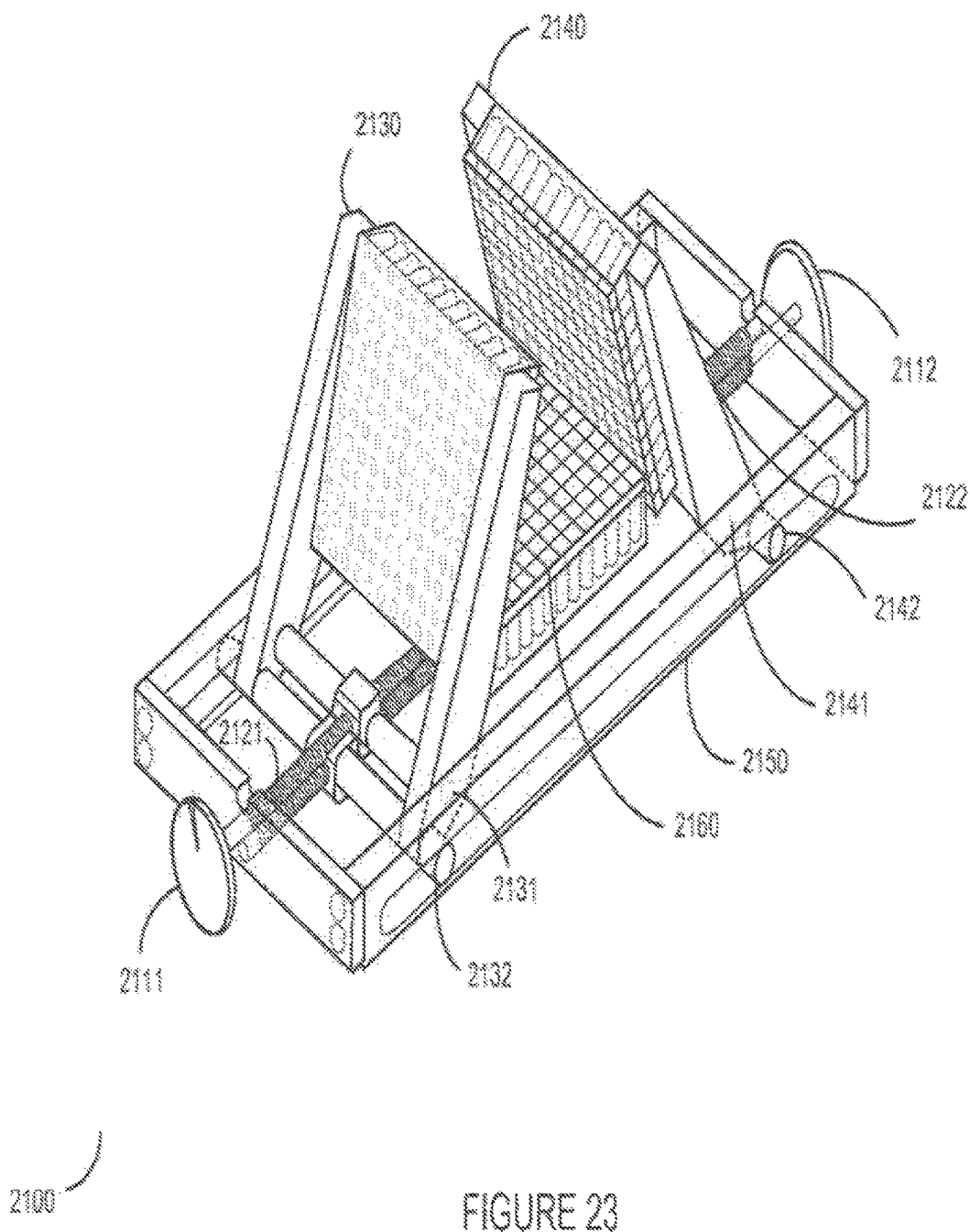
FIG. 23 is a side perspective view of the robotic gripper when the side sensor array panels are in an acutely angled position.

FIGS. 21A, 21B, 22A, 22B, 23 are side perspective views of a robotic gripper 2100 comprising lead screws 2121, 2122 to adjust the position of sensor array panels 2130, 2140, 2160. In some embodiments, the lead screws 2121, 2122 may be pistons of a linear hydraulic actuator. FIGS. 21A and 21B are side perspective views of the robotic gripper 2100 when the side sensor array panels 2130, 2140 are in a flat position. FIGS. 22A and 22B are side perspective views of the robotic gripper 2100 when the side sensor array panels 2130, 2140 are perpendicular to the bottom sensor array panel 2160. FIG. 23 is a side perspective view of the robotic gripper 2100 when the side sensor array panels 2130, 2140 are in an acutely angled position. In the illustrated embodiment, knobs 2111, 2112 control the turning of the lead screws 2121, 2122. In alternate embodiments, motors, cranks, pulleys, or the like may be used to turn the lead screws 2121, 2122, and/or hydraulic cylinders, pistons, and shafts may be used instead of or in addition to the lead screws 2121, 2122. The robotic gripper 2100 may use gears to augment the location of the drive actuator away from the shafts (e.g., below the gripper 2100). A processor (not shown) may control movement of the lead screws 2121, 2122. The processor may secure an object (not shown) with the gripper and use information gathered from the sensor array panels 2130, 2140, 2160 to determine how to operate on the object with another gripper and/or tool (not shown). For example, the robotic gripper 2100 may hold a base object and determine the location and/or material of the base object, and the other gripper (e.g., a robotic hand), the tool, etc. may perform operations on the base object, such as grasping and defining another object to be assembled to the base object.

The lead screws 2121, 2122 may be coupled to the side sensor array panels 2130, 2140 by braces 2135, 2145. Both lead screws 2121, 2122 may be turned simultaneously in a similar direction to cause the braces 2135, 2145 and the side sensor array panels 2130, 2140 to move laterally towards or away from the bottom sensor array panel 2160. Both lead screws 2121, 2122 may be turned in contrasting directions and/or only one lead screw 2121, 2122 to cause the braces 2135, 2145 to rotate about respective rotational axes 2131, 2141. The braces 2135, 2145 may rotate the side sensor array panels 2130, 2140 relative to the bottom sensor array panel 2160. Each brace 2135, 2145 may also include a rod 2132, 2142 configured to interface with one or more channels 2150. The one or more channels 2150 may support the rods 2132, 2142 and/or constrain their movement to a desired path.

The grippers 2000, 2100 may be configured to hold a base object (e.g., as a vice) so that a robotic hand (e.g., the robotic hand 3400) can perform operations upon it. The process may need to be repeatable and accurate. The hand position may be calibrated to the gripper position in order to correct positional errors between the hand and the gripper 2000, 2100. Alternatively, or in addition, the actual position of each hand may be calibrated with respect to each other. Calibration may allow accurate operations to be performed by the robotic hand on a base object held in the gripper 2000, 2100. To calibrate the hand position relative to the position of the gripper 2000, 2100, the robotic hand may touch the inside of the gripper 2000, 2100 on one or multiple surfaces. Alternatively, or in addition, positional sensors, such as the sensor 1200, may be located on the outside of the gripper 2000, 2100 and/or on the robotic hand. The robotic hand may grasp objects with known locations and dimensions to calibrate the position of each relative to each other, an object, and/or the gripper 2000, 2100. The robotic hand may touch more than one orthogonal place (e.g., non-coincident, non-linear, and/or non-coplanar points) to correct position in three dimensions. The actual position of the robotic hand in relation to the gripper 2000, 2100 may become known when the distance sensors of the gripper 2000, 2100 measure the position of the robotic hand.

The robotic gripper 2000, 2100 and robotic hand may be configured to ensure repeatability and accuracy. In an embodiment, the location of the robotic hand in relation to the robotic gripper 2000, 2100 may be measured. The robotic hand may touch the inside of the gripper 2000, 2100, and the gripper 2000, 2100 may measure the position of the robotic hand. The robotic hand may touch the touch sensors 2130, 2140, 2160 of the gripper, and the position of the robotic hand may be measured and calibrated to the position of the base object located in the gripper 2000, 2100. The robotic hand and the robotic gripper 2000, 2100 may be in close proximity to allow the robotic hand to operate on the base object in the gripper 2000, 2100 with precision and accuracy. In alternative embodiments, sensors in the robotic hand may touch external location points on the gripper 2000, 2100 to establish an exact location of the robotic hand and the robotic gripper 2000, 2100. The gripper 2000, 2100 and the robotic hand may include additional touch sensitive sensors, such as the touch sensors 600, 700, 1100, located on the outside expressly for calibrating the position of the gripper 2000, 2100 to the position of the hand. These outside position measuring sensors may be in two or more orthogonal planes to measure and calibrate the position of the hand and/or the gripper 2000, 2100 in three-dimensional space. Alternatively, or in addition, there may be mechanical location points the hand may touch on the gripper 2000, 2100 for calibration.

Integrated Robot Power Source

Mobile robots may be powered by a battery. There may be a tradeoff between the capacity of the battery and the total weight and/or the total volume of the robot. The energy capacity per unit volume of the robot may be referred to as its energy density and the energy capacity per unit mass of the robot may be referred to as its specific energy density. For some robots, a battery of suitable weight and volume may provide less than an hour of operating time. To save weight and volume, batteries may be incorporated into structural components of the robot to serve a structural function in addition to providing energy. Such incorporation may allow for increased energy density and/or increased specific energy density. For a robot with a predetermined weight and/or volume, the increased energy density and/or specific energy density may translate into an increased operating time. Structural components may comprise skin, walls, skeletal components, and/or the like. Other applications for integrated power sources may include powering electric vehicles. For example, batteries may be included in the vehicle's body panels or frame.

Figure 24A:
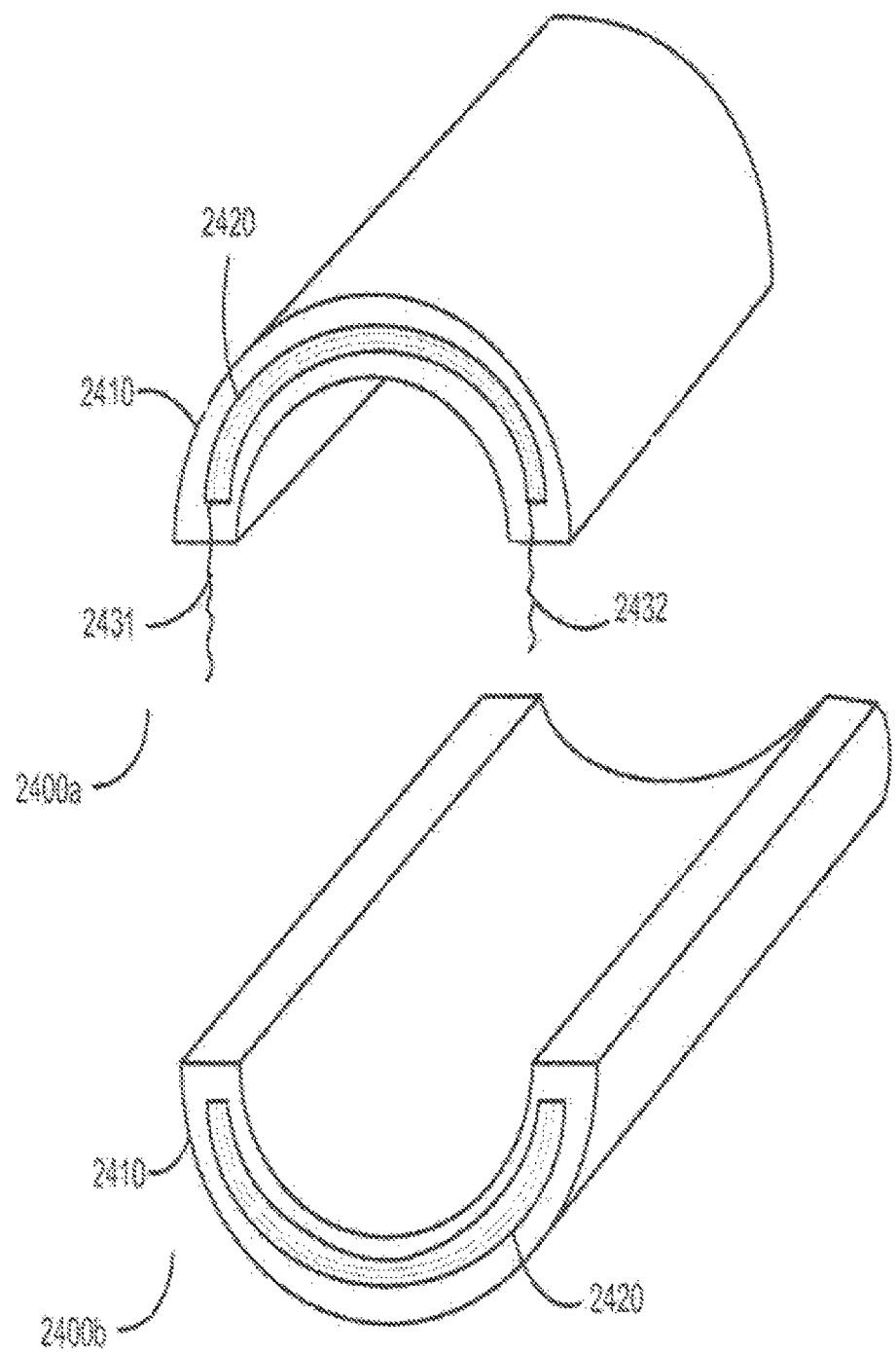
Figure 24B:
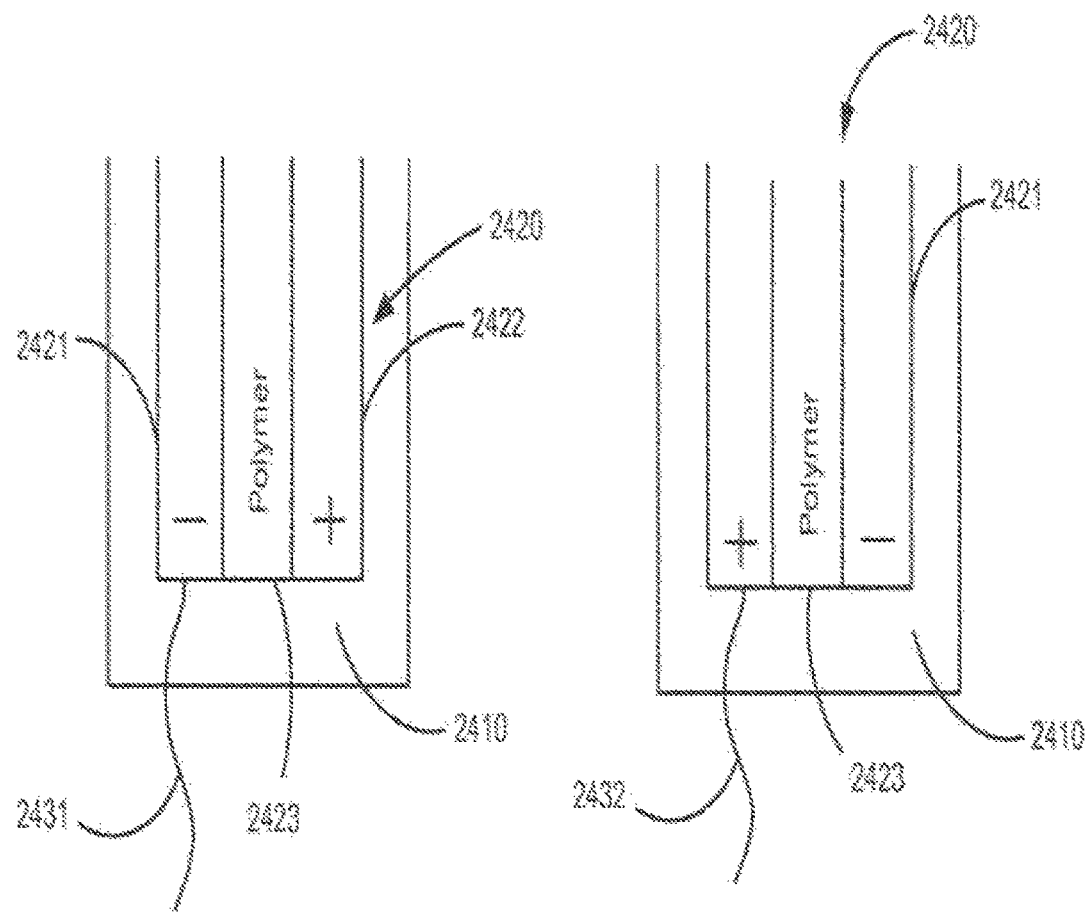

FIGS. 24A and 24B are cross-section views of skin panels 2400a,b configured to power a robot, such as to power a robotic gripper, to power robot mobility, and/or the like. In some embodiments, the skin panels 2400a,b may comprise a battery 2420 to store electricity and provide power when required. The battery 2420 may comprise an anode 2421, a cathode 2422, and a separator/electrolyte 2423. The battery 2420 may be surrounded by a wall 2410 that holds and protects the battery 2420. As a result, separate packaging is not required for the battery 2420, which can save weight and space and produce a high energy density and/or a high specific energy density for the robot.

Wires 2431, 2432 may connect the battery 2420 to external components. The wires 2431, 2432 may be connected to both a charging and a discharging apparatus and/or both a charging and a discharging port. The wires 2431, 2432 may connect to other batteries, positive and negative battery contact points, input and output power ports, or robot elements. The wires 2431, 2432 may connect to a quick release contact for external connection of the battery 2420 to other batteries, a charging power source, a discharging power drain, or the like. The wires may be incorporated into a contact element, such as one known to those of skill in the art. In some embodiments, the wall 2410 may completely surround the battery with the wires 2431, 2432 perforating the wall 2410 as the only external connections to the battery 2420.

The skin panels 2400a,b may be molded into a desired shape. For example, the skin panels 2400a,b may be shaped to conform to and encase or cover body parts of a robot, such as the legs, arms, torso, body, or the like. A plurality of skin panels 2400a,b may be fastened to one another to assemble an entire skin to cover the robot. For example, a pair of skin panels 2400a,b may be two halves configured to encircle an individual body part. The skin panels 2400a,b may be fastened together by various methods including screw and bolt, clips, or the like.

The wall 2410 may be rubber, silicon, polymer, polycarbonate polymer, or the like. The wall 2410 may be a flexible wall. The wall 2410 may comprise multiple layers with different layers configured to perform different functions. The materials that the wall 2410 is comprised of may be selected to provide a desired flexibility or rigidity and/or other desired properties. In some embodiments, the battery 2420 may ignite and/or explode when punctured or damaged. Accordingly, the wall 2410 may include a self-sealing material configured to flow, elongate, and/or expand to enter and seal any punctures. The sealed punctures may be electrically isolated by the wall 2410 to prevent short circuits between cells or other hazardous conditions. Alternatively, or in addition, the wall 2410 may include an outer layer comprising a polycarbonate resin thermoplastic, such as Lexan®, to prevent punctures or damage to the battery 2420.

In some embodiments, the battery 2420 may be a rechargeable lithium battery, such as a lithium polymer battery, a lithium ion battery, and/or a thin film lithium battery. The battery 2420 may be shaped to conform to the radius and/or angle of a desired body part. The battery 2420 may be formed and shaped by injection molding, deposition, and/or the like. The anode 2421, cathode 2422, and/or separator/electrolyte 2423 may be flexible and/or may comprise a plurality of layers. In some embodiments, the wall 2410 may be formed over the battery 2420. Alternatively, the battery 2420 may be inserted into a preformed wall 2410. The battery 2420 may comprise a plurality of battery cells. The battery cells may be off-the-shelf products, such as those produced by Leyden Energy Inc., Quallion LLC, LG Chem Power, Johnson Controls, or A123 Systems. The battery cells may be wired in parallel and/or series to achieve a desired voltage and energy capacity. Further, batteries 2420 from multiple panels 2400a,b may be wired together in parallel and/or series to increase the voltage and/or energy capacity.

The battery 2420 may include a pressure sensor (not shown) configured to detect increases in pressure, which may be indicative of a dangerous build up of gases. Charging may be interrupted or stopped when the pressure exceeds a predetermined level. The pressure sensor may be piezoresistive, PVDF, hydrostatic, a liquid column, aneroid, Bourdon, diaphragm, bellows, air pressure gradient, optoelectronic, Fabry-Perot, a strain gauge, a Pirani vacuum gauge, a capacitive pressure sensor, or the like. The battery 2420 may also or instead include a pressure relief valve (not shown) configured to release gases building up in the battery 2420 when a relief pressure is exceeded. The battery 2420 may include a temperature sensor configured to monitor battery temperature during charging and discharging. The battery-charging profile may be adjusted based on the detected temperature.

Figure 25:
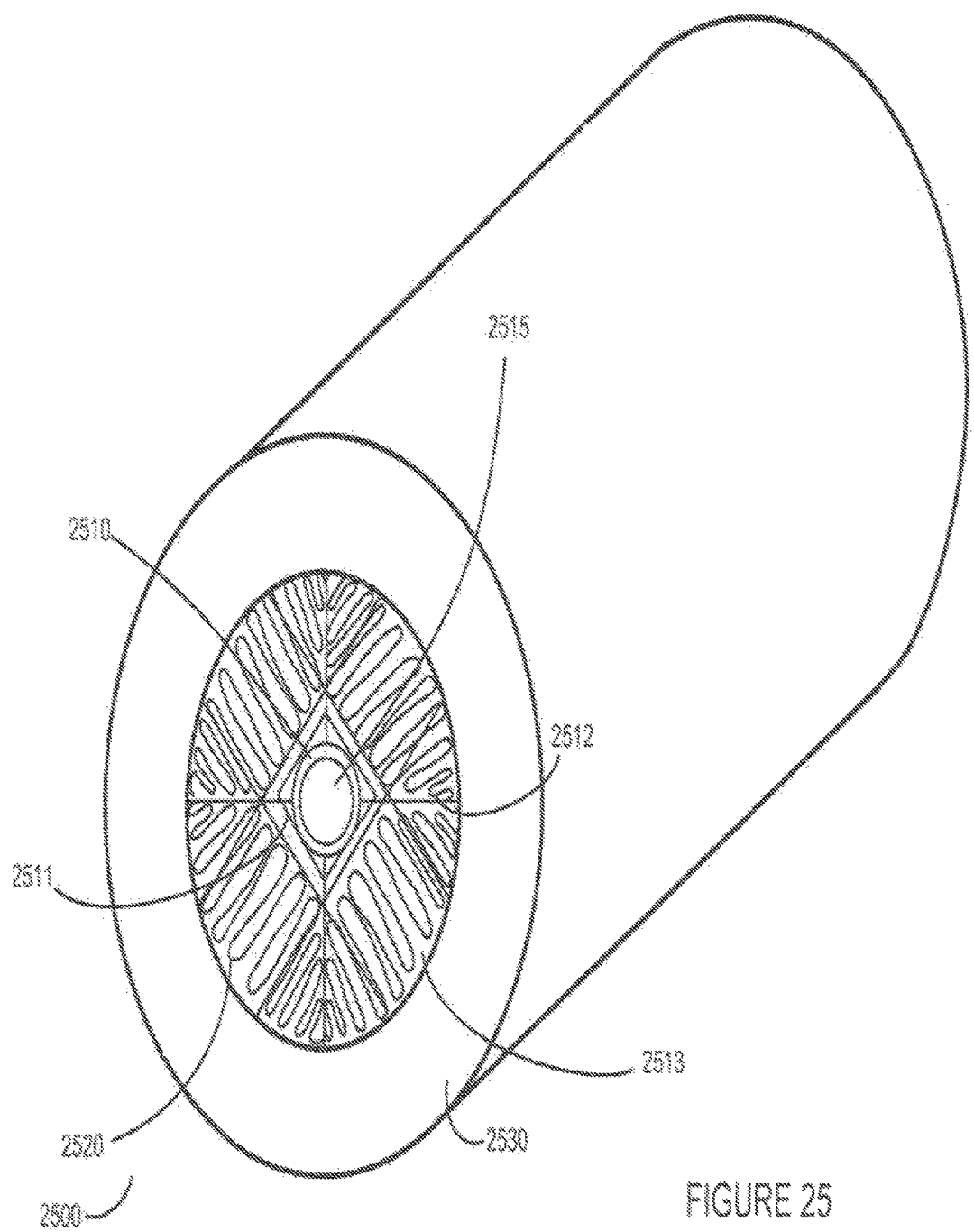
FIG. 25 is a cross-section view of a skeletal component comprising a plurality of integrated batteries.

FIG. 25 is a cross-section view of a skeletal component 2500 comprising a plurality of integrated batteries 2520, 2530. The skeletal component may comprise an inner core 2510 around which the plurality of batteries are wrapped. The inner core 2510 may be elongated and cylindrical, such as tube and/or pipe shaped, in some embodiments. The inner core 2510 may comprise a strong and/or light-weight material such as titanium, tungsten, osmium, carbon fiber, aluminum, magnesium, and/or the like. The high strength material may maintain stability and decrease the possibility of deformation of the inner core 2510.

The inner core 2510 may comprise a hollow interior section 2515 through which wires, fluids, or the like may be passed. Much of the infrastructure for a robot may be incorporated into the inner core 2510 including electric power transfer, fluid power transfer, data transfer, monitoring and control components, and the like. Monitoring and control components may include pressure and/or temperature sensors for the batteries 2520, 2530, multiplexers, fluid flow meters, switches to control charging and discharging of the batteries 2520, 2530, voltage meters for the batteries 2520, 2530, and the like. The wires may couple the batteries 2520, 2530 to electric motors, hydraulic pumps, charging interfaces, processing units, and/or the like, and/or the wires may transmit data between various components of the robot. The fluid may be transmitted by a hard plastic pipe, such as a polyvinyl chloride (PVC) pipe, polycarbonate polymer, or the like, that is encircled by the inner core 2510. The PVC pipe may reinforce the inner core 2510. Alternatively, the fluid may be transferred with no additional tubing. In some embodiments, the inner core 2510 may act as a hydraulic cylinder with a piston and a rod and with fill and drain sections as previously described. Data and power may be transferred via a separate tube, which may or may not be within the inner core 2510 and may run though the center of the piston and shaft if included. The fluid may be pressurized to strengthen the inner core 2510.

The core 2510 may be substantially circumscribed by an inner battery 2520. The inner battery 2520 may substantially conform to the shape of the core 2510. A plurality of base plates 2511 may surround the core to provide support and structure to the inner battery 2520 and the core 2510. Additionally, support plates 2512 may separate the inner battery 2020 into a plurality of sections and/or encase individual battery cells. The base plates 2511 and/or support plates 2512 may also comprise strong and/or light-weight materials such as those previously discussed. An individual battery cell may occupy multiple sections, and/or an entire battery cell may be in a single section. For example, in the illustrated embodiment, four battery cells occupy twelve sections to form the inner battery 2520. In alternate embodiments, twelve separate batteries may be contained in the twelve sections or different desired multiples may be used. The individual sections may be stacked together to encircle the inner core 2510. A fill material 2513, such as a thermoplastic or the like, may fill gaps between battery windings within a section to create a smooth concentric outer surface. In other embodiments, there may be no base plates 2511 and/or support plates 2512, and the inner battery 2520 may be wound concentrically around the inner core 2510. The outer battery 2530 may be wrapped around the smooth concentric outer surface and substantially circumscribe the inner battery 2520.

The outer battery 2530 may be enclosed in a casing (not shown). The outer casing may prevent stress and/or impact from causing a fracture and/or may prevent fractures that do occur from propagating to the batteries 2520, 2530. The casing may be a non-conducting material, such as plastic, rubber, or the like. In an embodiment, the outer casing may be a polycarbonate polymer, such as Lexan®. The outer casing may be a laminate that includes multiple layers of polycarbonate. The laminate may be applied to the batteries 2520, 2530 by dipping, injection molding, extrusion, and/or the like.

The outer battery 2530 and/or the cells of the inner battery 2520 may be coupled in series and/or parallel to achieve a desired voltage and/or electrical charge capacity. Similarly, the number of cells or the size of the batteries may be adjusted to achieve a desired capacity. Some batteries, such as lithium or lithium ion batteries, may become dangerously overcharged if the cells are charged unevenly. Accordingly, the batteries 2520, 2530 may be discharged and recharged in a manner that equalizes the voltage among batteries. For example, discharging and recharging may be controlled by power switching between charging and/or discharging individual battery cells. Such power switching may also allow for charging and discharging of cells with different voltages and/or capacities. Each individual battery cell may be controlled by a corresponding switch. Battery cells that are determined to be overcharged may be removed from charging. Overcharging may be detected from voltage measurements, gas pressure measurements, temperature measurements, or the like. Voltage monitoring may be used for applied charging voltage control and/or for regulation of voltage through switching. Control circuitry for charging and discharging may be connected to the batteries 2520, 2530 by wires that pass through the hollow section 2515 of the inner core 2510, and/or the control circuitry may be integrated into the batteries 2520, 2530. The control and/or power lines coupled to the batteries 2520, 2530 may be shielded, for example, by braided cable to prevent inductive interference. In an embodiment, a solid, single braid tube may circumscribe the control and power transfer lines coupled to the batteries 2520, 2530.

Figures 26A, 26B:
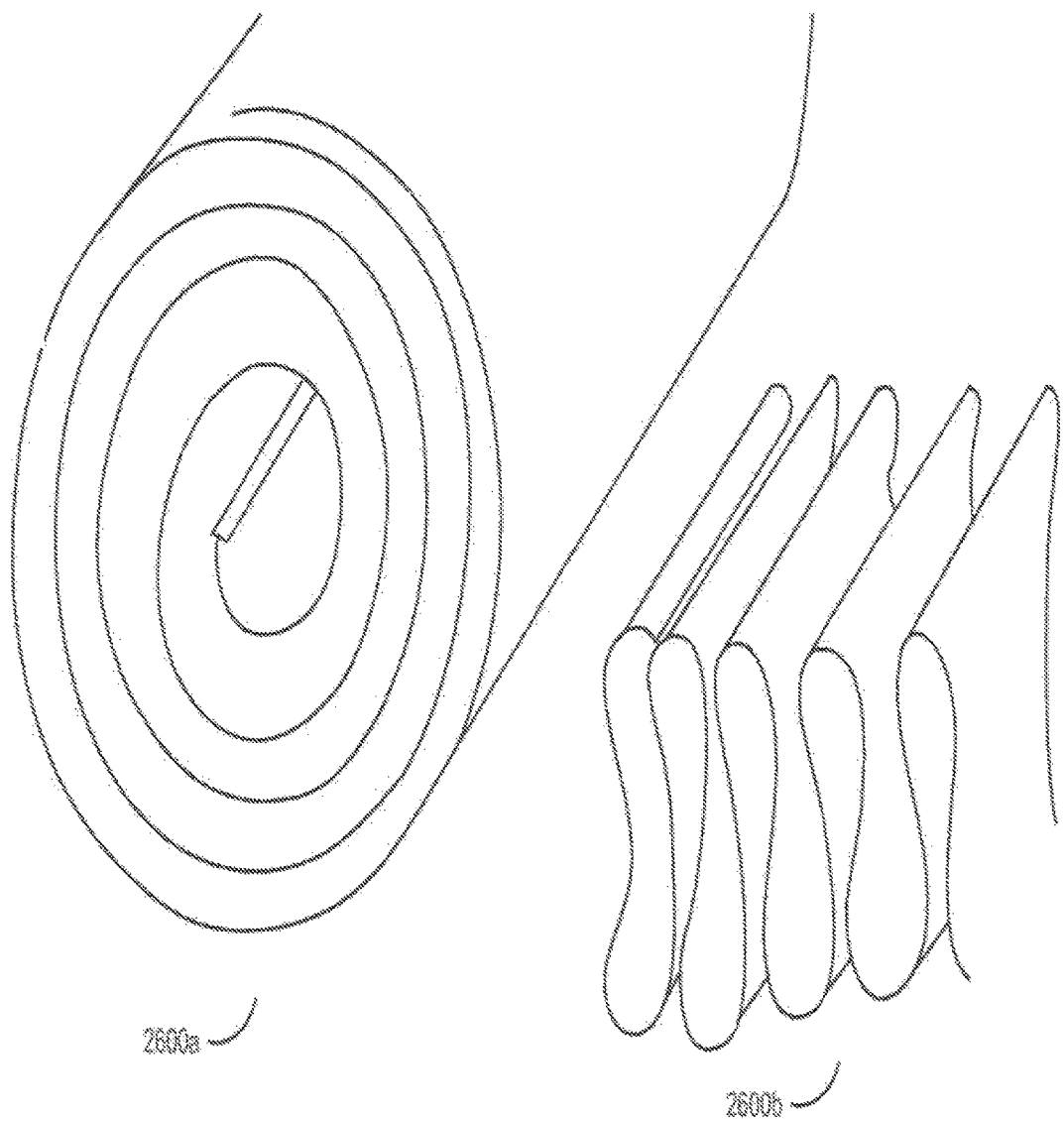
FIGS. 26A and 26B are front perspective views of different types of battery windings.

FIGS. 26A and 26B are front perspective views of different types of battery windings. A concentric battery winding 2600a may be wrapped about itself to form a plurality of layers. Alternatively, a parallel battery winding 2600b may comprise a plurality of substantially parallel, stacked layers. In other embodiments, windings may be perpendicular to each other. The direction of the winding may be referred to as its grain and/or grain structure. The grain structure of the battery windings 2600a, 2600b may be chosen to reinforce and strengthen the skeletal component. In an embodiment, the inner battery 2520 may include the parallel battery winding 2600b, and the outer battery 2530 may include the concentric battery winding 2600a. The winding 2600a of the outer battery 2530 may be substantially perpendicular to those of the inner battery 2520 to increase strength. Alternative battery designs, such as prismatic grids, may also or instead be incorporated into the winding design.

Figure 27A:
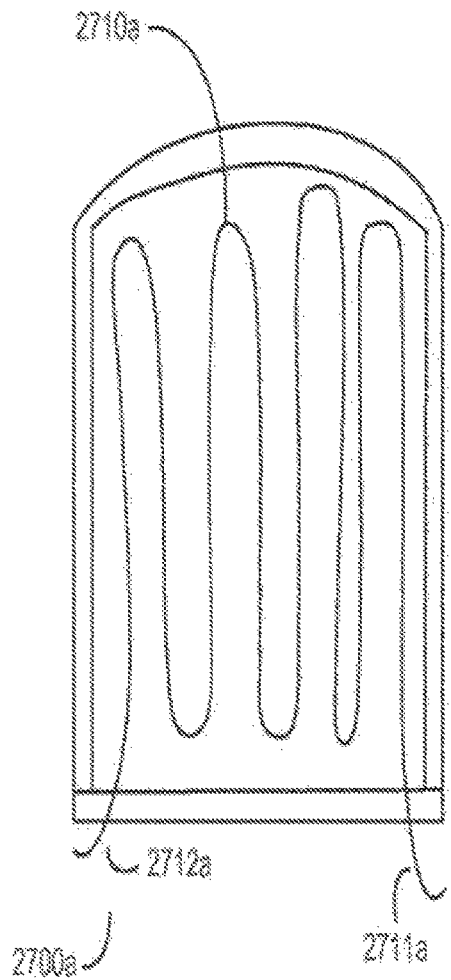
FIGS. 27A-27C are cross-section views of sections of the inner battery.
Figure 27B:
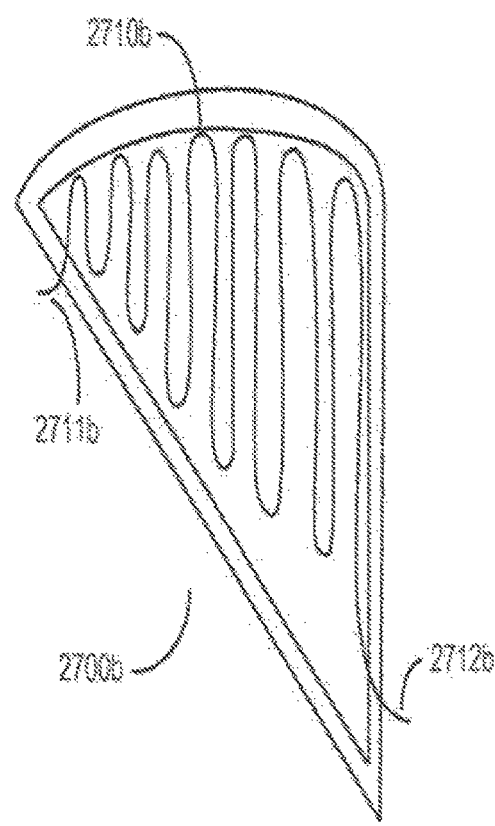
Figure 27C:
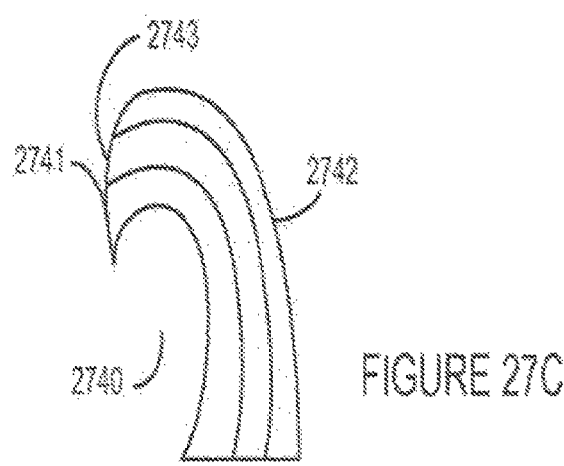

FIGS. 27A and 27B are cross-section views of sections 2700a, 2700b of the inner battery 2520. The windings 2710a, 2710b in each section 2700a, 2700b may be insert molded into that section to most efficiently use the space. The sections 2700a, 2700b may be assembled about the inner core 2710 to form the inner battery 2720. FIG. 27C is a cross-section view of a winding layer 2740 comprising an anode 2741, a cathode 2742, and an electrolyte 2743. Anode and cathode wires 2711a,b and 2712a,b may be coupled to the anode 2741 and the cathode 2742 respectively and may protrude from the sections 2700a, 2700b to provide external connections to the battery cells. The wires 2711a,b and 2712a,b may couple battery cells to each other and/or may connect to other robot components, charging ports, and/or discharging ports. A single pair of negative and positive leads may couple the skeletal component to other robot components, or there may be multiple pairs of leads for the batteries 2520, 2530 or sections 2700a, 2700b. Battery components may be available from Leyden Energy Inc., Quallion LLC, LG Chem Power, 3M, Johnson Controls, and A123 Systems.

The windings 2710a, 2710b may be tightly wound in the sections 2700a, 2700b to most efficiently use the space in the sections 2700a, 2700b and to increase the strength of the skeletal component 2500. The fill material 2513 may add to the strength and density as well as maintain the windings 2710a, 2710b in a tightly wound position. The packing of the sections 2700a, 2700b about the inner core 2510 may also be performed within very tight tolerances to maximize the density and strength of the skeletal component. Additionally, the wires 2711a,b and 2712a,b may be fed through a close tolerance tube or pipe. The tube may be made of a material comprising titanium, graphite, carbon fiber, and/or the like. For lithium polymer or lithium ion batteries, the inner and outer batteries 2520, 2530 may be able to flex thereby absorbing external stresses and reducing stresses on the inner core 2510. Thus, the structural stability of the inner core 2510 may be preserved despite significant flexing or bending of the outer layers of the skeletal component 2500.

Figure 28:
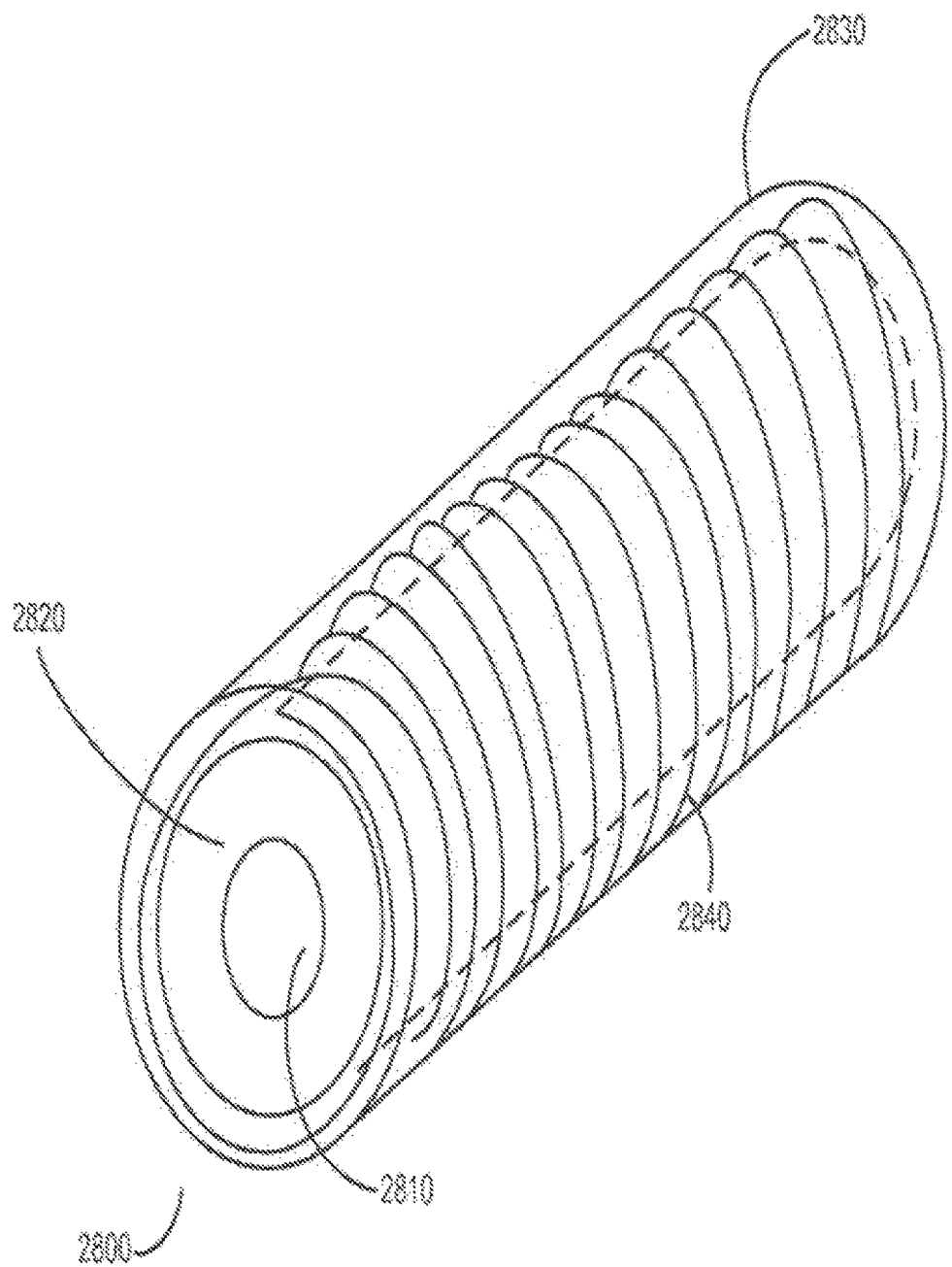
FIG. 28 is a front perspective view of a battery comprising a heating element.

FIG. 28 is a front perspective view of a battery 2800 comprising a heating element 2840. The battery 2800 may have a limited operating temperature range outside of which the performance of the battery degrades. The heating element 2840 may be configured to maintain the battery 2800 within the operating range. For example, the heating element 2840 may be a resistive heating element comprising a resistive wire. Alternatively or in addition, a thermoelectric element may be configured to cool and/or heat the battery 2800.

The heating element 2840 may wrap around the outer battery 2820 but be inside the casing 2830. Alternatively or in addition, the heating element 2840 may wrap around the inner core 2810. The base plates 2511 and/or support plates 2512 may comprise the heating element 2840 in some embodiments, and may be combined with an outer heating element in the casing 2830 to seal the heated battery environment. The heating element may be as close to the battery as possible while still being electrically insulated from the battery. The heating element may be round, such as being helically shaped, or it may also be square, rectangular, or the like. Heating elements 2840 may be used with skin panels comprising batteries and/or skeletal components with batteries.

Additionally, heating elements 2840 may be used with the displacement sensor cells. The precision of the displacement sensor cells may be affected by changes of temperature. Accordingly, the heating elements 2840 may increase the operational range of the gripper by maintaining the gripper at a substantially constant temperature. The temperature control of the gripper may be maintained by heating the conductive or dielectric fluid inside a reservoir, by a heating blanket in contact with the electrodes, and/or with heating elements embedded in the casing or skin of the gripper. For example, the gripper may include resistive wire and/or elements in the fluid reservoir and/or the gripper enclosure. Alternatively, the gripper may grasp a heating element, and/or a heat blanket, heated gloves, or clothing with heating elements may be applied to sections of a mobile robot. Temperature sensors in the gripper contacts, gripper enclosure, battery, joints, and/or the fluid reservoir may monitor the gripper and its components to accurately sense the temperature and allow corrections to the temperature to be made. Alternatively or in addition, for a sensor cell with an electrolyte, conducting fluid, such as a KCl electrolyte, or a dielectric fluid, the operating temperature range may be adjusted by changing the molar concentration of the electrolyte or by the addition of antifreeze. The hydraulic pump, hydraulic joints, robotic feet, robotic hands, and/or any other component that can control the temperature of the hydraulic fluid may include one or more heating elements to maintain the temperature of the hydraulic fluid. In an embodiment, the complete outer layer of the robot may be temperature controlled to increase battery performance in varying temperature conditions. Alternatively, or in addition, the temperature of the joints and/or the temperature of hydraulic fluid in a reservoir may be controlled to adjust the temperature of the batteries. For example, the hydraulic fluid may be transferred through the center of the batteries, and heat may be conducted to and from the battery.

Joints and Skeletal Components

A skeleton for a robot may include a plurality of joints and skeletal components configured to provide form and structure to the robot. The skeletal components may include an inner core with male and/or female ends. The inner core may couple to and/or include an end cap, couple to other skeletal components, couple to one or more joints, and/or the like. The skeletal component may provide support and allow for the transfer of fluid, electrical power, data, or the like. The joints may couple together skeletal components and allow movement in one or more degrees of freedom. The joints may allow skeletal components to rotate relative to one another in a manner similar to the bones in a human body rotating about a joint. For example, the joints may be configured to move skeletal components in a manner similar to the movement of fingers, elbows, waists, knees, wrists, shoulders, and/or the like. Other joints may also be included to allow the robot to perform any desired movement. The joints may include end caps to allow them to interface with the skeletal components. The joints may include heating elements to maintain the temperature of the fluid, joints, and/or batteries within a predetermined range and/or to maintain the working integrity of the joints. The heating element may be molded into the joint. The heating element may be a resistive heating element, such as a high resistance, flat, wire composite with, for example, nichrome, chromium, and/or the like as additives.

Figure 29A:
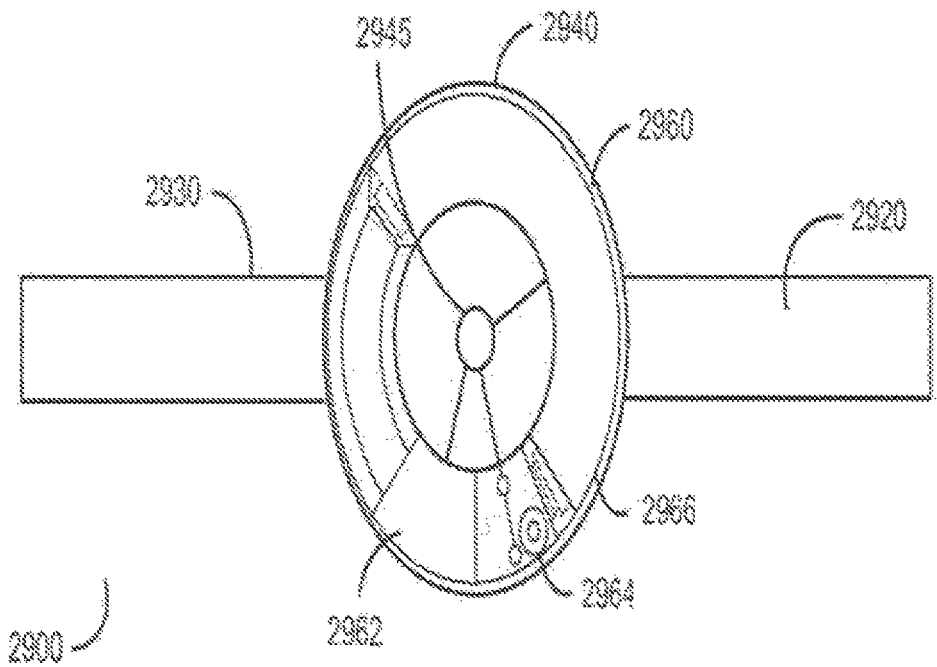
FIGS. 29A and 29B are front and top perspective views of a rotational hydraulic joint.
Figure 29B:
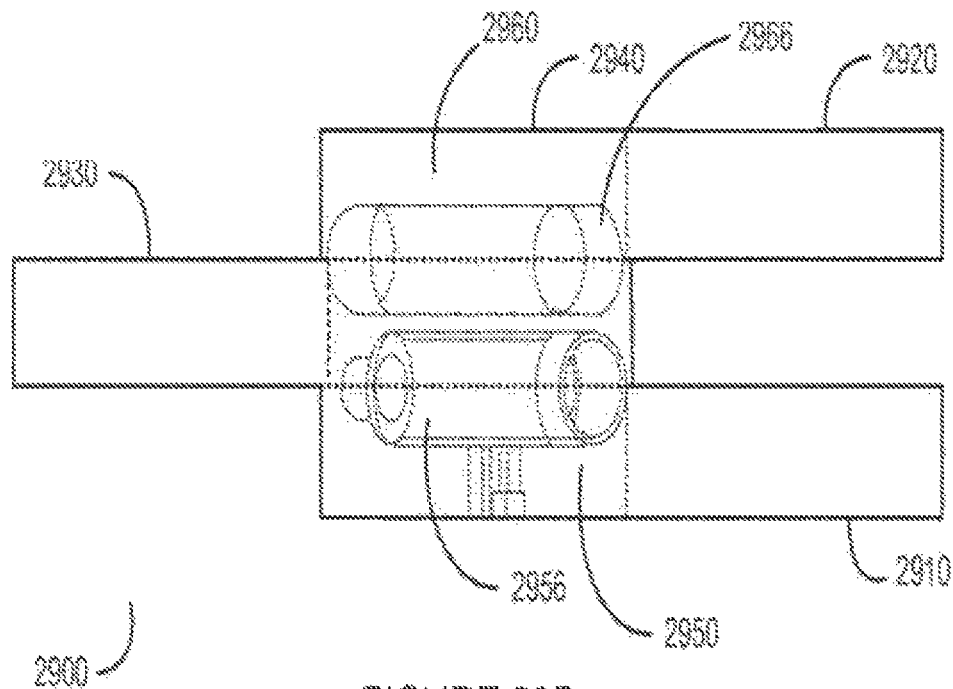

In an embodiment, the robotic joint may be composed of three sections assembled and held together by a rotating connector. The rotating connector may couple and transfer fluid power, electrical power, and/or data. FIGS. 29A and 29B are front and top perspective views of a rotational hydraulic joint 2900. The rotational hydraulic joint 2900 may include a center shaft 2930 and two outer shafts 2910, 2920 extending radially from a cylindrical coupling 2940, which couples the center shaft 2930 to the two outer shafts 2910, 2920. The cylindrical coupling 2940 may allow the center shaft 2930 to rotate relative to the two outer shafts 2910, 2920. The rotational joint may be constructed of a high strength material, such as polycarbonate polymer, titanium, steel, aluminum, carbon fiber, polyimide, or the like.

The center shaft 2930 may couple to a first skeletal component (not shown) and the outer shafts 2910, 2920 may couple to a second skeletal component (not shown) and allow the skeletal components to rotate relative to one another. The high strength joint 2900 may couple to high strength inner cores of the skeletal components. Alternatively, the center and/or outer shafts 2910, 2920, 2930 may couple to one or more additional joints to create a composite joint with multiple degrees of freedom. The center shaft 2930 may include a male end configured to mate with a female end of a skeletal component, and the outer shafts 2910, 2920 may couple to an end cap with a female end configured to mate with a male end of a skeletal component. Alternatively, the center and/or outer shafts 2910, 2920, 2930 may be configured to mate with male and/or female ends of the skeletal components instead.

A pin 2945 through the center of the cylindrical coupling 2940 may be the axis about which the center shaft 2930 rotates. The pin 2945 may be a rotary joint, such as rotary joint 1840, configured to transfer fluid, hydraulic power, electrical power, data, and/or the like between the outer shafts 2910, 2920 and the center shaft 2930. Alternatively, the pin 2945 may be a simple rod that does not transfer any fluid, hydraulic power, electrical power, or data. The pin 2945 may include bearings to facilitate rotation. The bearings may transfer electric power and/or data. The cylindrical coupling 2940 may be hydraulically actuated to cause rotation of the center shaft 2930 and may measure the extent of rotation. The cylindrical coupling 2940 may include two torus-shaped cavities 2950, 2960. In other embodiments, the cylindrical coupling 2940 may include one cavity or three, four, or more cavities. The joints may act as two hydraulic cavities 2950, 2960. One cavity 2960 may extend the joint and the other cavity 2950 may retract the joint.

Figure 29E:
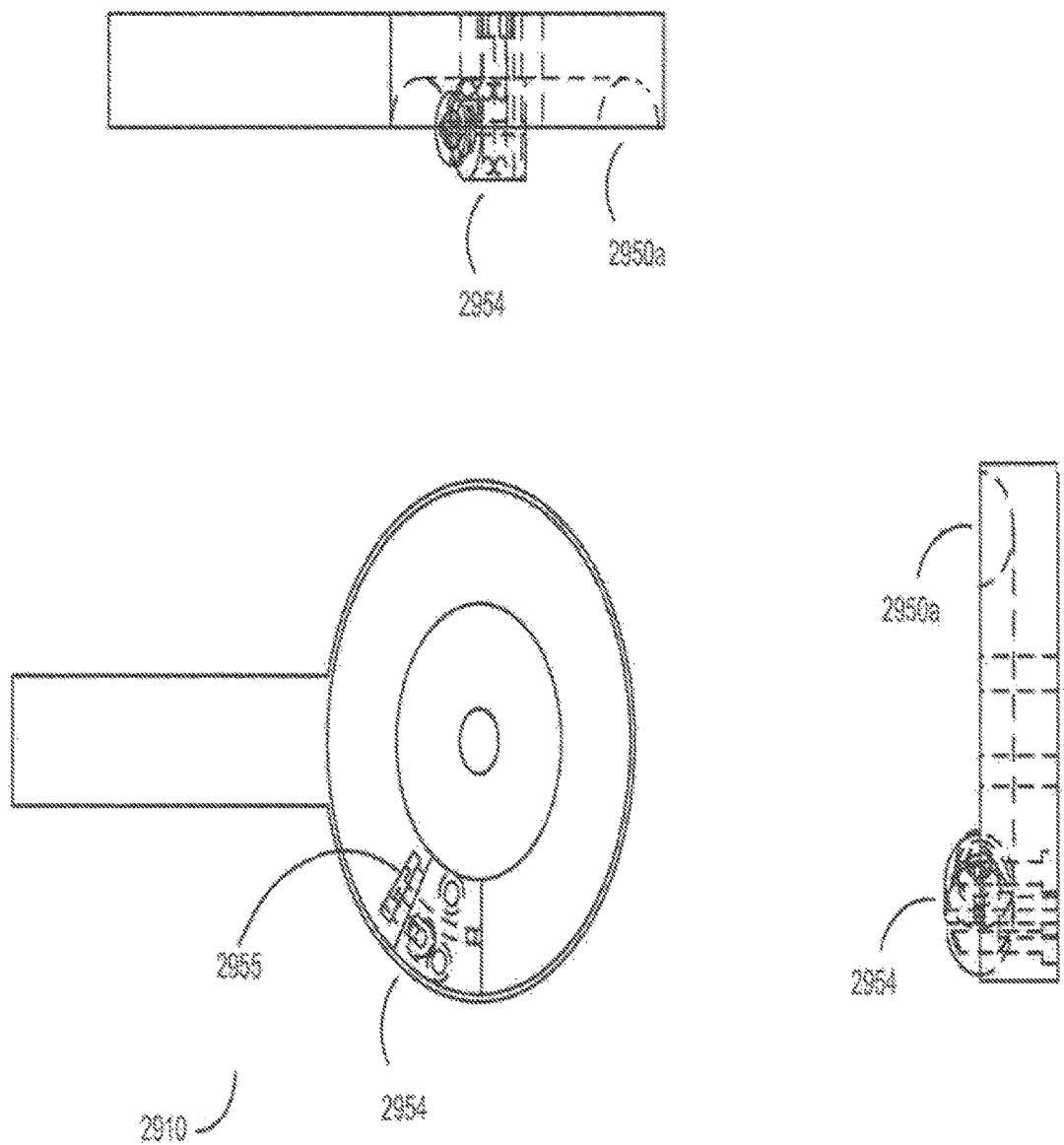
Figure 29F:
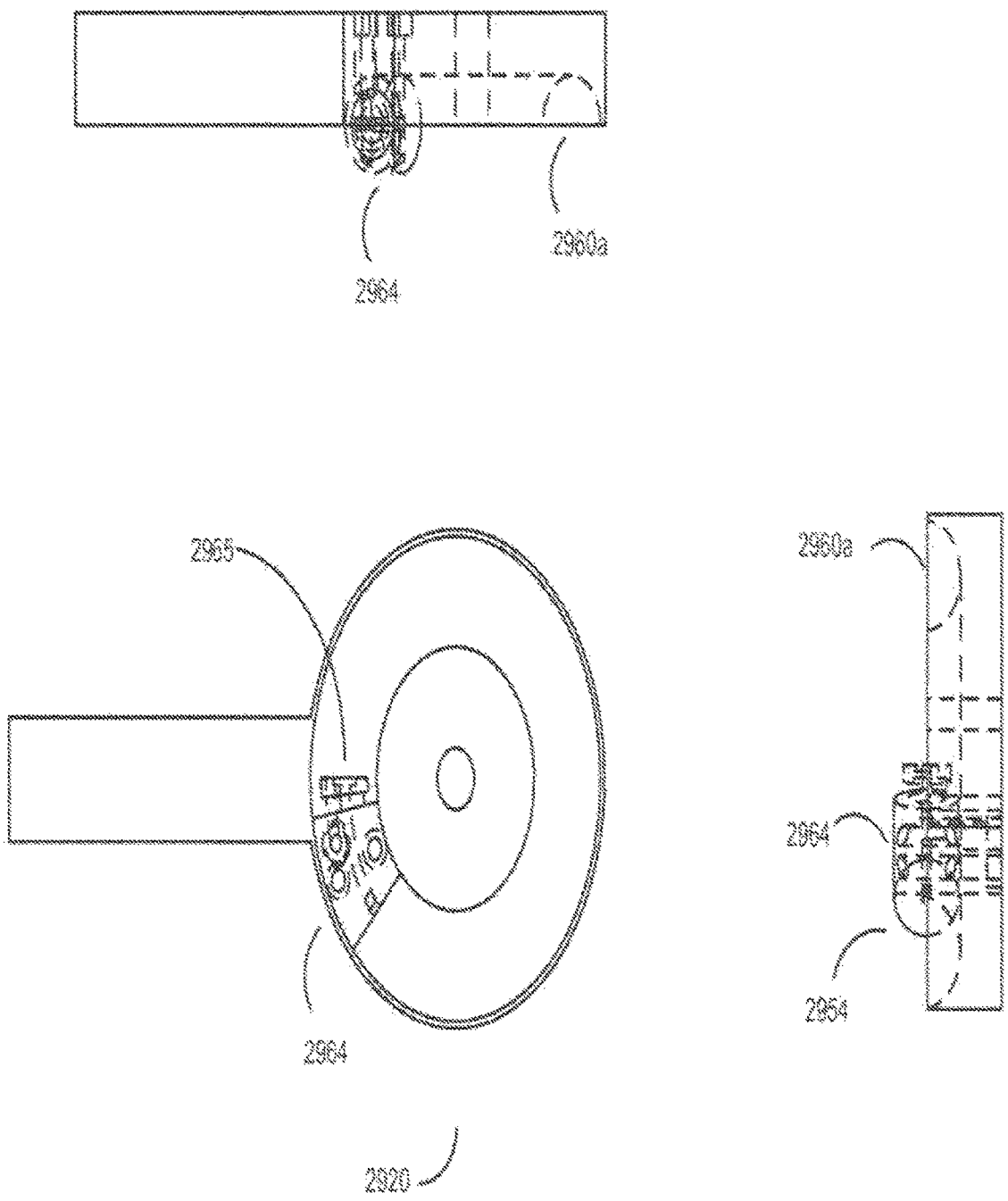

Referring also to FIGS. 29C-H, approximately one half of each cavity 2950a, 2960a may be in the outer shafts 2910, 2920, and the mating half for each cavity 2950b, 2960b may be in the center shaft 2930. Pistons 2952, 2962 in each cavity 2950, 2960 may be permanently attached to the center shaft 2930. The center shaft 2930 may be a part of the piston 2952, 2962 and shaft. The center shaft 2930 may be an extension of the piston shaft and piston 2952, 2962. End caps 2954, 2964 may be permanently attached to the outer shafts 2910, 2920. Each cavity 2950, 2960 may include the piston 2952, 2962, the bladder end cap 2954, 2964, and a bladder 2956, 2966. The pistons 2952, 2962, which are illustrated in FIGS. 29C and 29G, may both be affixed to and/or integrated into the center shaft 2930 to cause the center shaft 2930 to rotate when the pistons 2952, 2962 move within the cavities 2950, 2960. The bladder end caps 2954, 2964, which are illustrated in FIGS. 29D-F, may be stationary relative to the outer shafts 2910, 2920.

The bladders 2956, 2966 may each be permanently affixed at one end to their respective piston 2952, 2962 and permanently affixed at the other end to their respective bladder end cap 2954, 2964. The bladders 2956, 2966 may be attached and/or sealed to the pistons 2952, 2962 and bladder end caps 2954, 2964 by mechanical means, chemical means, and/or the like. The bladders 2956, 2966 may be attached by glue, such as Loctite® 401 from Henkel Corporation, and may be glued to a bushing at the top of the bladder 2956, 2966. Alternatively, or in addition, mechanical means, such as a groove and metal bushing, may be crimped to secure the bladder in the groove. The bladders 2956, 2966 may be made of neoprene, latex, a composite rubber, polyurethane composites, HNBR rubber, and/or the like. The bladders 2956, 2966 may be reinforced with nylon, Kevlar®, and/or the like. The reinforcement material may include strands parallel to a longitudinal axis of the cavity 2950, 2960 and/or may include a fiber mesh. The reinforcement material may allow a higher operating pressure to be used by preventing fluid from expanding the bladder 2956, 2966. For example, the pressure in front of the pistons 2952, 2962 during compression may cause expansion of the bladders 2956, 2966 in front of the pistons 2952, 2962 if reinforcement material is not included.

In the illustrated embodiment, a retraction cavity 2950 may be configured to cause the center shaft 2930 to retract towards the outer shafts 2910, 2920 when the retraction bladder 2956 is filled with fluid, and an extension cavity 2960 may be configured to cause the center shaft 2930 to extend away from the outer shafts 2910, 2920 when the extension bladder 2966 is filled with fluid. In each case, as the bladder 2956, 2966 is filled, the opposing bladder 2956, 2966 may be permitted to empty and compress (not shown). The compressed bladder 2956, 2966 may fold inside itself and around the piston 2952, 2962 as it is compressed. In other embodiments, one cavity may perform both extension and retraction. Smaller joints may have less fluid leakage when two or more cylinders are used.

During expansion or compression of the bladders 2956, 2966, the cavities 2950, 2960 may ensure that the bladders 2956, 2966 retain their shape. Each bladder 2956, 2966 may be fitted into a sleeve and/or inner liner (not shown) that moves with the bladder 2956, 2966 to prevent counter rotational friction that might result from rotation of the cavity walls relative to the bladder 2956, 2966. The sleeve and/or inner liner may be made from a fiber reinforced, aluminum, or other high strength material. Fill and/or drain ports (not shown) may allow fluid to be added and removed from the bladders 2956, 2966. The fluid may be carried by hoses and/or pipes (not shown) external to the joint 2900 and/or by cavities and/or channels (not shown) in the center and/or outer shafts 2910, 2920, 2930. Thus, movement of the joint and any attached skeletal components may be controlled via hydraulic actuation.

The cavities 2950, 2960 may each form a hydraulic measuring cell. The pistons and shafts 2952, 2962 may each include a movable electrode 2953, 2963, and the bladder end caps 2954, 2964 may each include a fixed electrode 2955, 2965. The movable electrodes 2953, 2963 may move along circular paths defined by the cavities. The bladders 2956, 2966 may fill with conductive or dielectric fluid. The bladders 2956, 2966 may reduce leakage of the fluid and electrically insulate the fluid from the walls of the cavities 2950, 2960, which may allow the walls to include high-strength, lightweight metals. Variations in the resistance, impedance, and/or capacitance between the movable electrodes 2953, 2963 and the fixed electrodes 2955, 2965 may be measured to determine the distance between the electrodes 2953, 2955, 2963, 2965 in the manner discussed above.

Figure 29H:
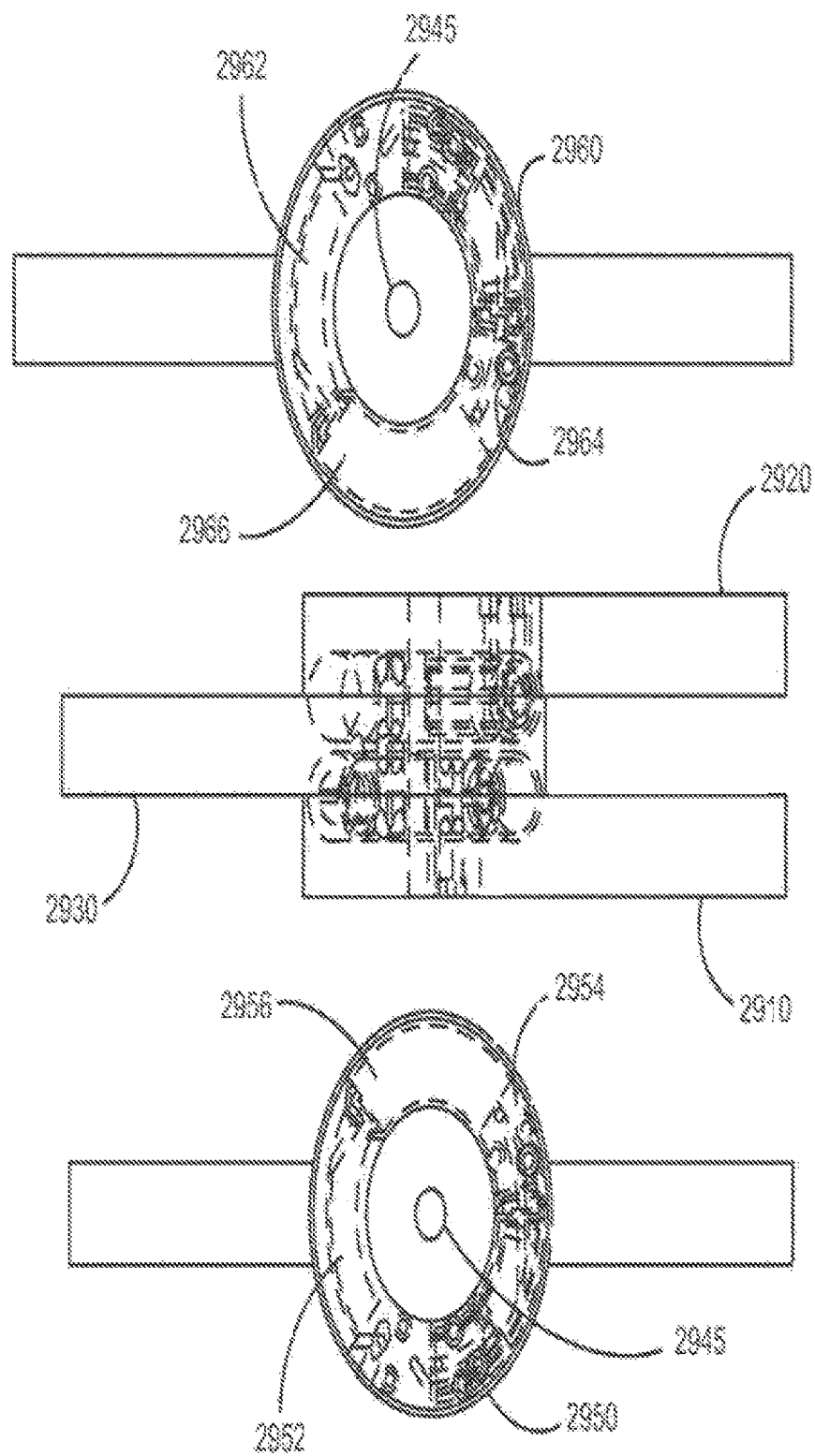

Because the piston and piston shafts 2952, 2962 may rotate relative to the bladder end cap 2954, 2964, the distance may be converted to an angle of the center shaft 2930 relative to the outer shafts 2910, 2920 and/or an angle of a skeletal component coupled to the center shaft 2930 relative to a skeletal component coupled to the outer shafts 2910, 2920 with a vertex at the cylindrical coupling 2940 (e.g., an angular displacement). The angle may be expressed in units of radians, gradians, degrees, minutes of degrees, and/or the like. Displacement measuring cells may be configured to measure displacement linearly, rotationally, and/or along any curve or shape with any desired units of measurement. FIG. 29H depicts front, top, and bottom views of the radial actuator. The bladders 2956, 2966 are shown in the fully extended position for clarity. During actual use, one bladder 2956, 2966 may be fully closed while the other is fully opened. For example, in this embodiment, the bladder 2966 may be fully opened, and the bladder 2956 may be fully closed. In the fully opened position, the sensor electrodes 2953, 2955, 2963, 2965 may be furthest apart, and in the fully closed position, the sensor electrodes 2953, 2955, 2963, 2965 may be closest together. The displacement between the electrodes 2953, 2955 in the retraction chamber 2950 may increase as the angle between the center and outer shafts 2910, 2920, 2930 decreases, whereas the displacement between the electrodes 2963, 2965 in the extension chamber 2960 may decrease as the angle between the center and outer shafts 2910, 2920, 2930 decreases.

A processor (not shown) may measure the displacement between the electrodes in each cavity 2950, 2960 individually or collectively, or an average may be taken. For larger joints, it may be advantageous to measure the separation distance in the cavity with the least separation between electrodes. The voltage to distance curves may not be linear, so closer electrodes may provide more accurate readings. The processor may switch from measuring the distance to measuring the distance in the other to obtain the voltage, resistance, impedance, capacitance, and/or the like of the cavity with the least separation between electrodes. A magnetic or optical encoder may be used to measure displacement for positions where the distance to voltage curve is flat or has a very small slope, such as may occur for large joints. The processor may compute the angle between the center and outer shafts 2910, 2920, 2930 from the electrical property measurements and may account for the different displacement-angle relationships in each cavity 2950, 2960. The processor may also reconcile the angles computed from the measurements in each cavity, such as by averaging the results or the like.

A calibration process similar to steps 902 to 906 of method 900 may be used to calibrate the angle measurements; Electrical property measurements from the maximum extension, minimum extension, maximum retraction, and/or minimum retraction positions may be compared with stored maximum and minimum joint angles and/or measured maximum and minimum joint angles to calibrate electrical property measurements from the rotational hydraulic joint. The computed angles for one or more joints may allow the processor to accurately determine the position and/or location of one or more grippers, one or more skeletal components, the limbs of the robot, hands, feet, and/or an object being gripped using trigonometry. The computed angles may allow the geometry of an object being gripped to be determined, and/or may enhance control over movements of the robot. In large joints, the displacement measurements may require a higher degree of accuracy than can be provided by fluid measurement. An encoder may be attached to large joints to measure the displacement of the electrodes relative to one another, for example, when the distance is greater than 1 or several inches. The encoders may measure displacement for positions where the displacement to voltage relationship of the cell is flat. The measurement of electrode separation, in radial and/or linear sensor cells, may switch between measurements by opposing cells, measurements by magnetic encoders, averaging of measurements from multiple methods, or any combination thereof. A magnetic or optical encoder may be mounted to the axis of a relatively large joint. The encoder may be an AMS22U5A1CLARL336 rotary position sensor available from Bourns.

FIGS. 29C and 29D are front perspective views of the piston 2952 and the end cap 2954 that may be used in a rotational hydraulic joint. The piston 2952 and end cap 2954 may each include a bladder interface 2952*b*, 2954*b* configured to couple to the bladder 2956. A plurality of ports 2952*a*, 2954*a* may be configured to add and/or remove fluid from the bladder 2956, to electrically couple to displacement sensor electrodes 2952*e*, 2954*e*, and/or to transfer power and/or data. In an embodiment, only the piston 2952 or only the end cap 2954 may have ports 2952*a*, 2954*a*. The piston 2952 may include a piston head 2952*c* and a piston rod/shaft 2952*d*. The electrodes 2952*e*, 2954*e* may be located in the piston rod bladder interface 2952*b* and/or end cap bladder interface 2954*b*. Lead wires may extend from the electrodes 2952*e*, 2954*e* into the piston 2952 and end cap 2954. The lead wires may be insert injection molded into the end caps 2954, 2964 and/or piston rods 2952, 2962. As a result, fluid may not be able to leak along the lead wires. The bladders 2956, 2966, pistons 2952, 2962, and end caps 2954, 2964, may completely seal the fluid without the use of O-rings and may eliminate the possibility of leaking under normal circumstances.

FIGS. 29E-29H are cross-section views of the center and outer shafts 2910, 2920, 2930 and the rotational hydraulic joint 2900 assembled therefrom. The center shaft 2930 and each outer shaft 2910, 2920 may be manufactured separately as shown in FIGS. 29E-29G. The outer shafts 2910, 2920 may each include half of a cavity 2950*a*, 2960*a*, and the center shaft may include the opposing half of each cavity 2950*b*, 2960*b*. The half cavities 2950*a,b*, 2960*a,b* in each shaft 2910, 2920, 2930 may have the same radius. The outer shafts 2910, 2920 may contain the bladder end caps 2954, 2964, and the center shaft may contain the pistons 2952, 2962. The bladders 2956, 2966 may be inserted, and the center and outer shafts 2910, 2920, 2930 may be coupled together to form the rotational hydraulic joint 2900 as shown in FIG. 29H. The pin 2945 may attach the center and outer shafts 2910, 2920, 2930 together.

Figure 30A:
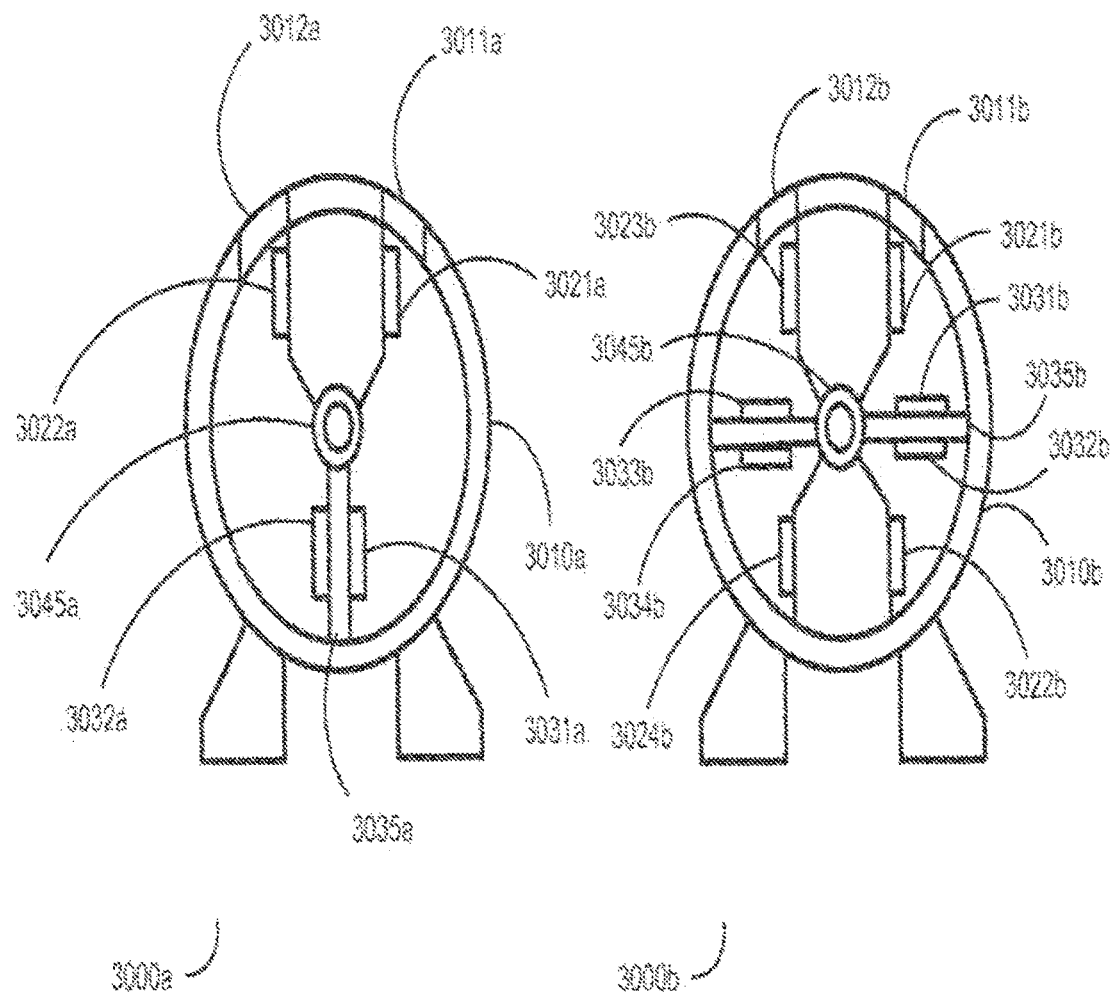
FIGS. 30A and 30B are cross-section views of additional rotational hydraulic joint embodiments.
Figure 30B:
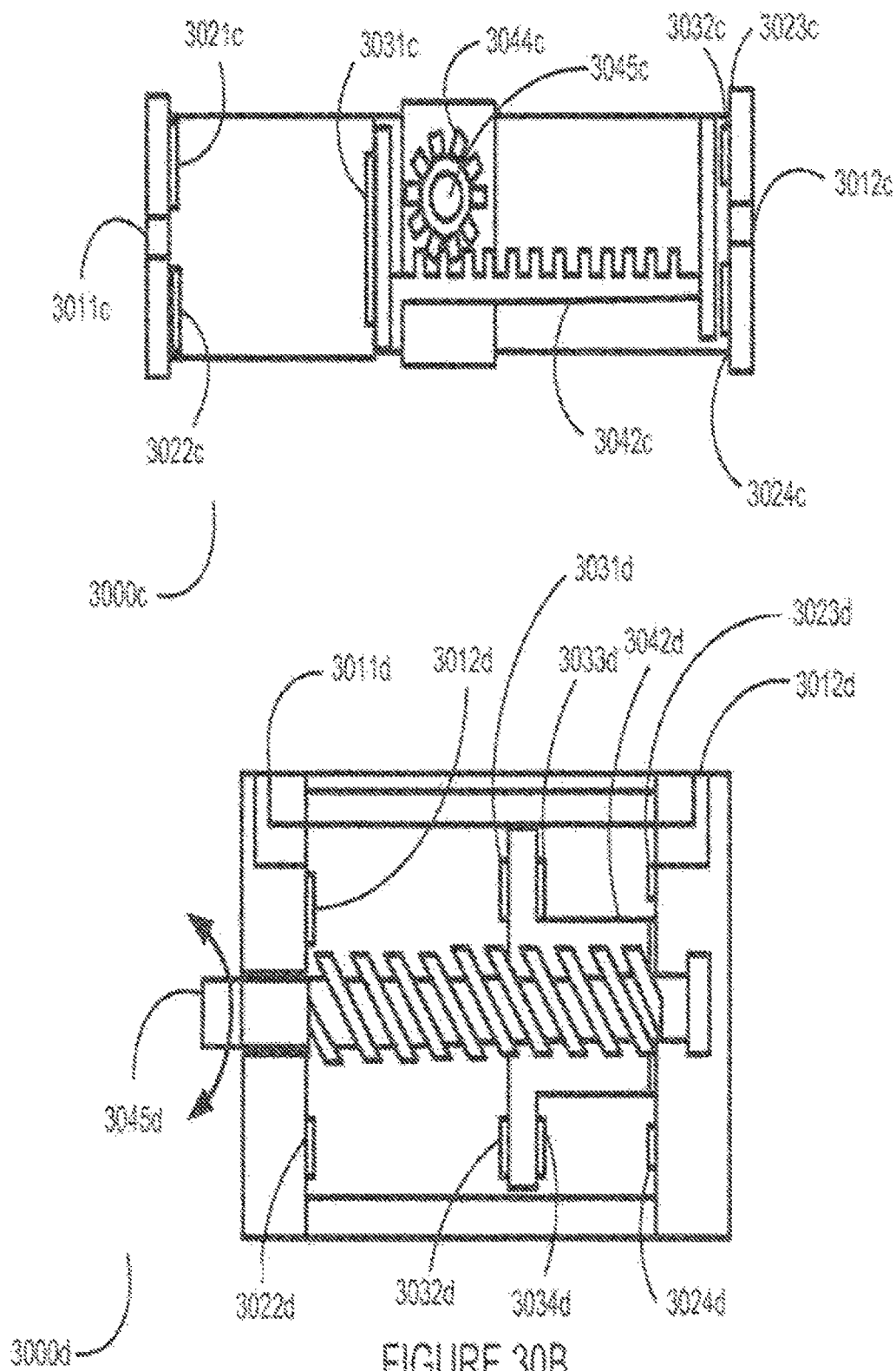

FIGS. 30A and 30B are cross-section views of additional rotational hydraulic joint embodiments 3000*a-d*. More joints and additional background on fluid dynamics are disclosed in Fluid Power Ebook Edition 1 and Fluid Power Ebook Edition 2 by Bud Trinkel, which are hereby incorporated by reference herein in their entirety. A first rotary hydraulic joint embodiment 3000*a* may include a single vane 3035*a*, and a second rotary hydraulic joint embodiment 3000*b* may include a double vane 3035*b*. Clockwise and counterclockwise ports 3011*a,b*, 3012*a,b* may allow injected fluid to rotate the vanes 3035*a,b* clockwise and counterclockwise. The vanes 3035*a,b* may be coupled to a center pin 3045*a,b* and may cause the center pin 3045*a,b* to rotate concomitantly with the vanes 3035*a,b*. The rotating center pin 3045*a,b* may cause one or more shafts (not shown) coupled to the center pin 3045*a,b* to rotate relative to one or more shafts (not shown) coupled to a housing 3010*a,b*.

One or more movable electrodes 3031*a,b*, 3032*a,b*, 3033*b*, 3034*b* may be affixed to the vanes 3035*a,b*, and one or more stationary electrodes 3021*a,b*, 3022*a,b*, 3023*b*, 3024*b* may be affixed to chamber dividers 3025*a,b*. The electrodes 3021*a,b*, 3022*a,b*, 3023*b*, 3024*b*, 3031*a,b*, 3032*a, b*, 3033*b*, 3034*b* may be used to determine the angle of the shafts coupled to the center pin 3045*a,b* relative to the shafts coupled to the housing 3010*a,b*.

A third rotary hydraulic joint embodiment 3000*c* may include a rack 3042*c* and pinion gear 3044*c* coupled to a center pin 3045*c*. A fourth rotary hydraulic joint embodiment 3000*d* may include a non-rotating piston 3042*d* and a spiral shaft 3045*d*. Inlets 3011*c,d*, 3012*c,d* may allow injected fluid to cause the rack 3042*c* and/or the non-rotating piston 3042*d* to move laterally. The pinion gear 3044*c* and the spiral shaft 3045*d* may translate the lateral movement of the rack 3042*c* and the non-rotating piston 3042*d* respectively into rotational motion. The center pin 3045*c* and/or the spiral shaft 3045*d* may rotate one or more shafts (not shown) coupled to the center pin 3045*c* and/or the spiral shaft 3045*d* relative to one or more shafts (not shown) coupled to a housing 3010*c,d*. Stationary and movable electrodes 3021*c,d*, 3022*c,d*, 3023*c,d*, 3024*c,d*, 3031*c,d*, 3032*c,d*, 3033*d*, 3034*d* may be used to determine the angle of the shafts coupled to the center pin 3045*c* and/or the spiral shaft 3045*d* relative to the shafts coupled to the housing 3010*c,d*.

Figure 31:
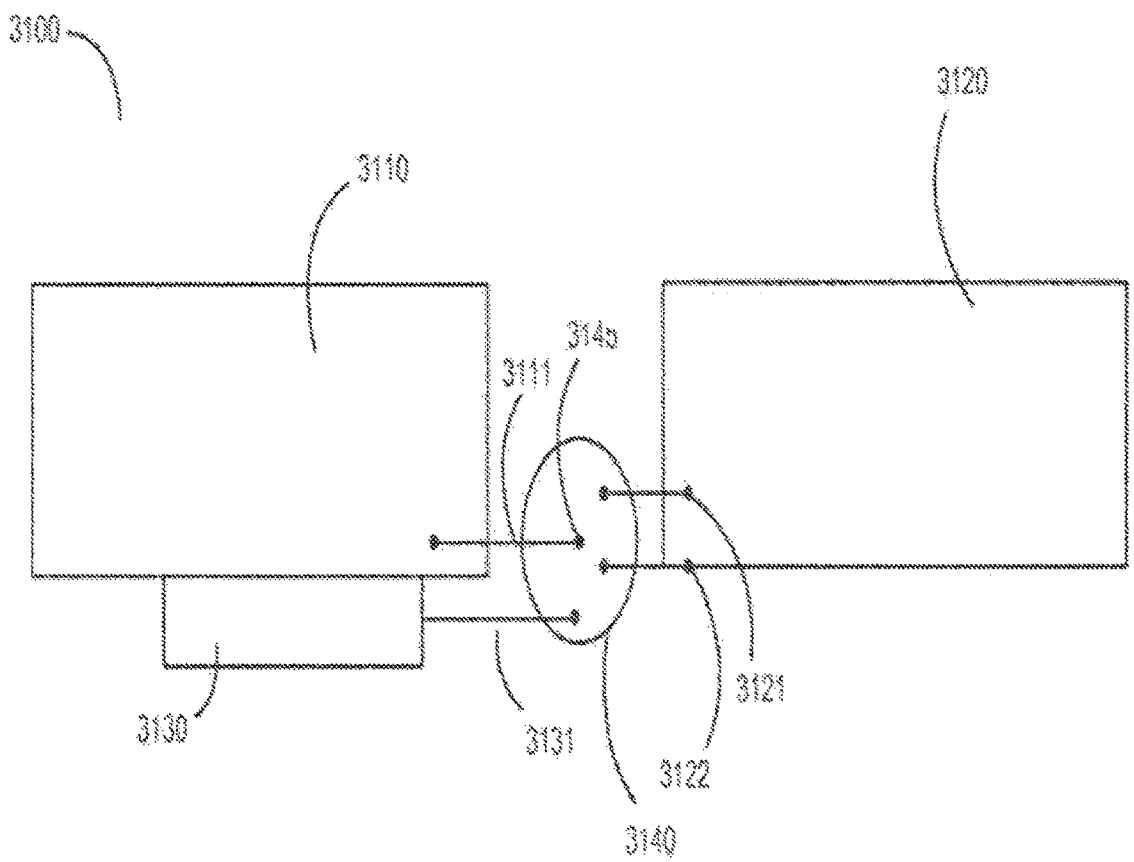
FIG. 31 is a schematic diagram of a mechanical joint rotated by a linear hydraulic cylinder.

FIG. 31 is a schematic diagram of a mechanical joint 3100 rotated by a linear hydraulic cylinder 3130. The mechanical joint 3100 may be configured to rotate a second sensor 3120 relative to a first sensor 3110. The first and second sensors 3110, 3120 may be coupled to a pivot 3140. The second sensor 3120 may be coupled to the pivot 3140 by a pair of fixed joints 3121, 3122. The first sensor 3110 may include a fixed joint 3111 coupled to an axis of rotation 3145 for the pivot 3140. The first sensor 3110 may also be coupled to the hydraulic cylinder 3130, which may be coupled to the pivot 3140 by a connecting rod 3131. The hydraulic cylinder 3130 may apply a force to the connecting rod 3131 and move the connecting rod 3131 longitudinally relative to the first sensor 3110. The pivot 3140 may translate the longitudinal movement from the connecting rod 3131 into rotation. The pivot 3140 may rotate the fixed joints 3121, 3122 and therefore the second sensor 3120 about the axis of rotation 3145. As a result, the second sensor 3120 may rotate relative to the first sensor 3110. The hydraulic cylinder 3130 may include a displacement measuring cell (not shown) that can be calibrated to allow a processor (not shown) to determine the angle of the second sensor 3120 relative to the first sensor 3110 based on the measurement of electrical properties.

Figure 32:
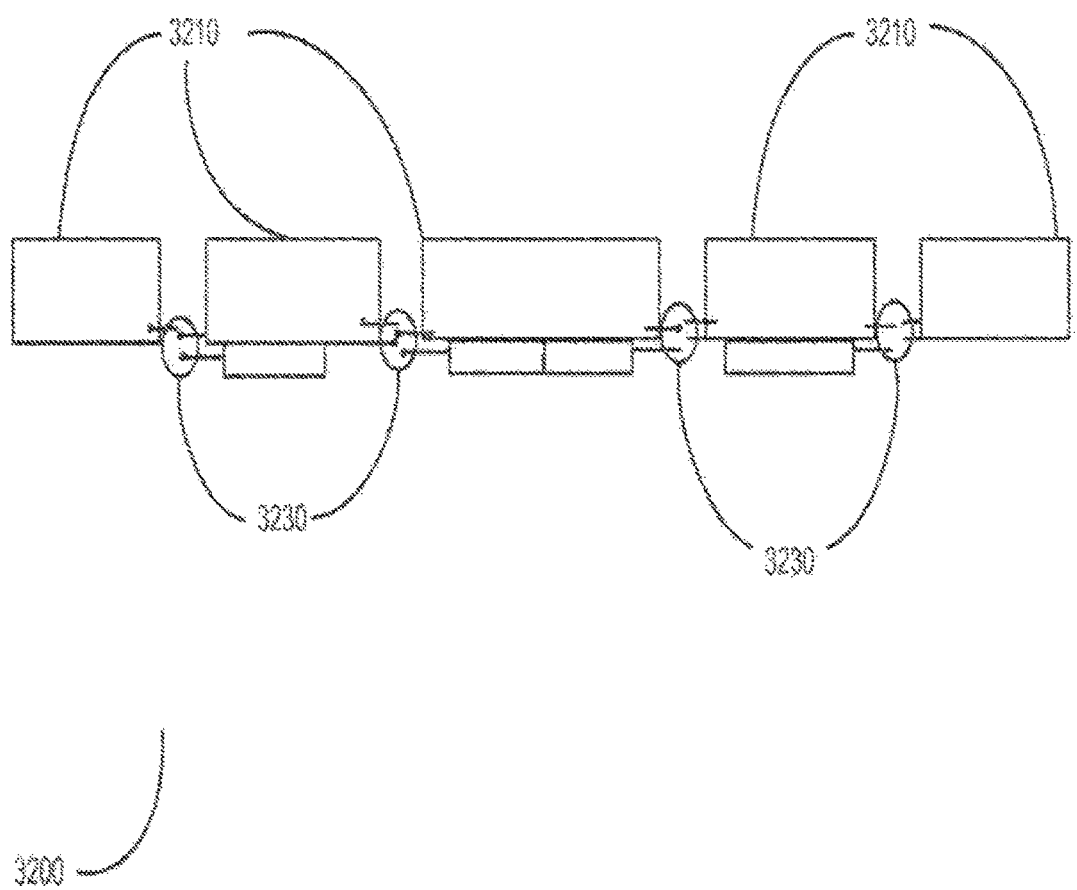
FIG. 32 is a schematic diagram of a plurality of sensors coupled by a plurality of mechanical joints to form a robotic finger.

FIG. 32 is a schematic diagram of a plurality of sensors 3210 coupled by a plurality of mechanical joints 3230 to form a robotic finger 3200. The robotic finger 3200 may be configured to behave like a human finger and/or may have more or fewer joints 3230 than a human finger. The mechanical joints 3230 may allow a plurality of sensor 3210 to encircle multiple sides of an object (not shown) and grasp the object. A processor (not shown) may use displacement measurements from the plurality of sensors 3210 and knowledge about the angle of each mechanical joint 3230 to determine the geometry of the object. Multiple fingers 3200 may be used to determine the geometry more completely, such as by interlocking about the object. For example, one finger 3200 may form a first U-shape in the Y and Z-axes while another may form a second U-shape in the X and Z-axes that is inverted in the Z-axis relative to the first U-shape.

Figure 33A:
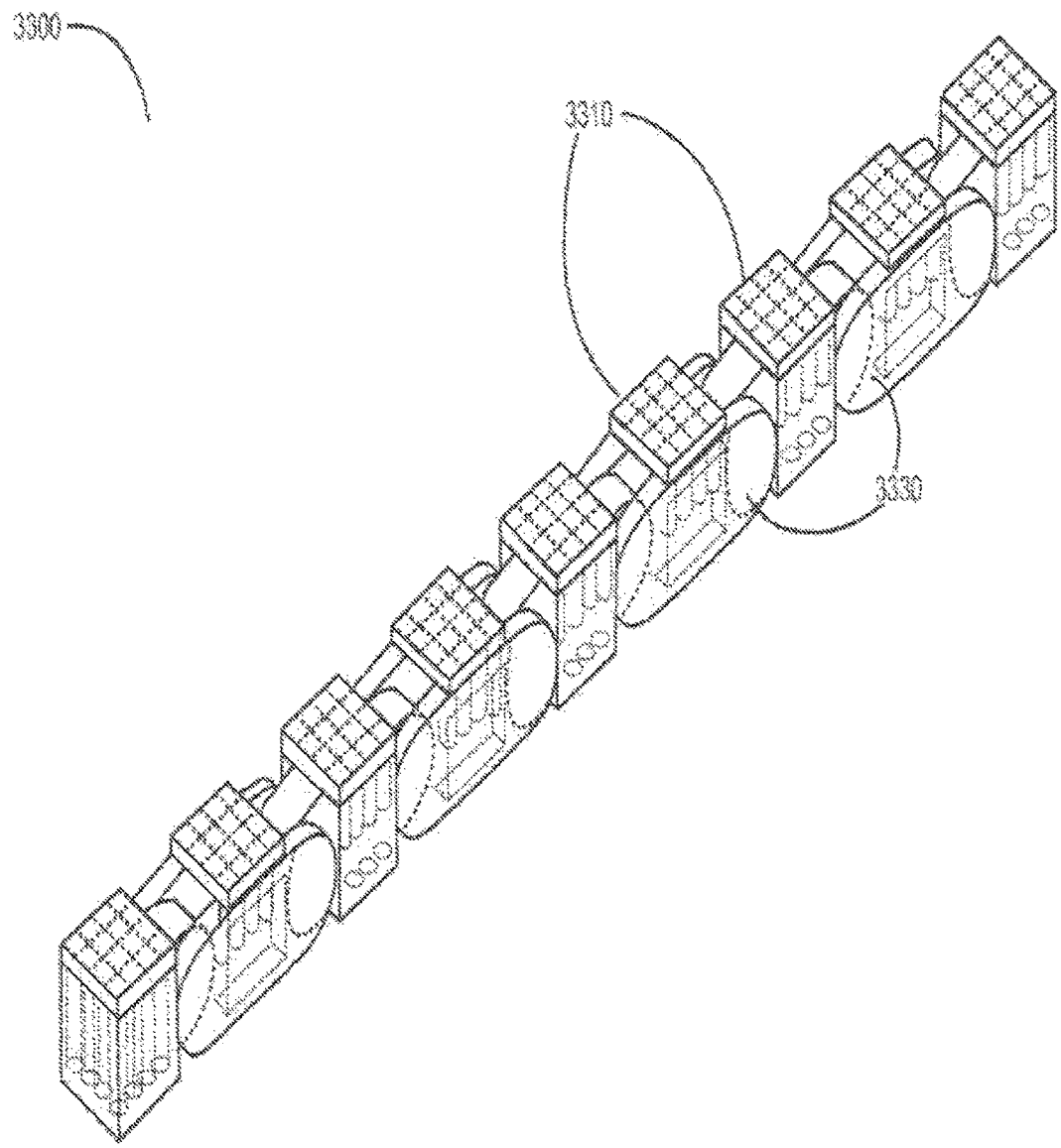
FIGS. 33A-33C are side perspective views of various configurations of a robotic finger formed from a plurality of sensors coupled by a plurality of joints.
Figure 33B:
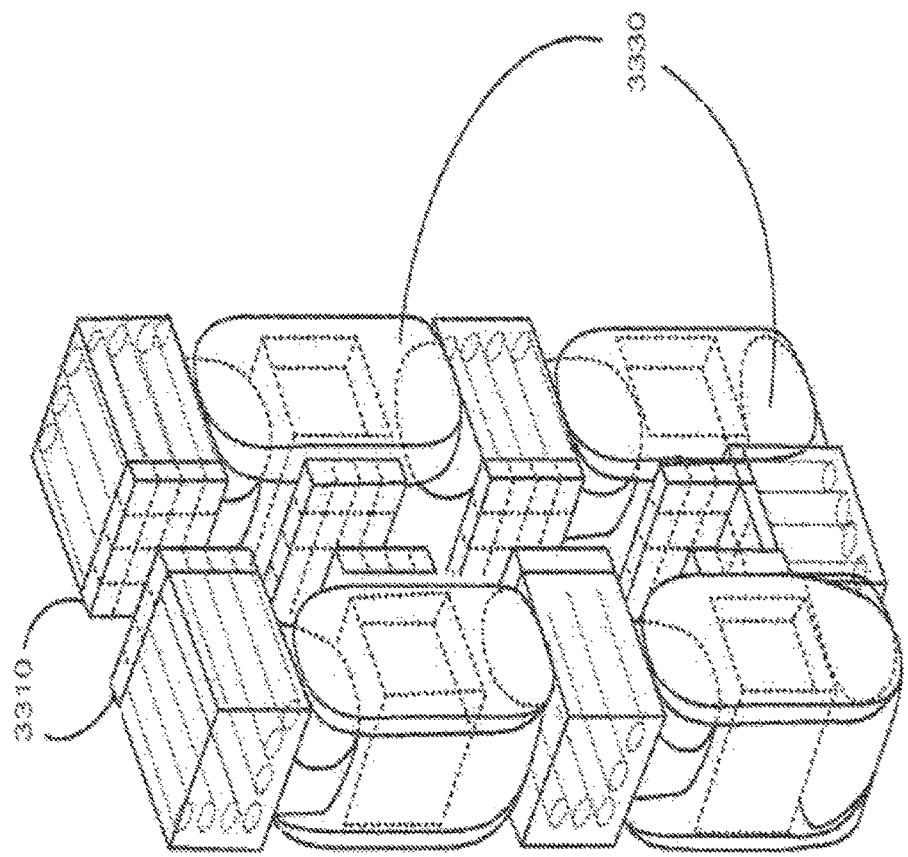
Figure 33C:
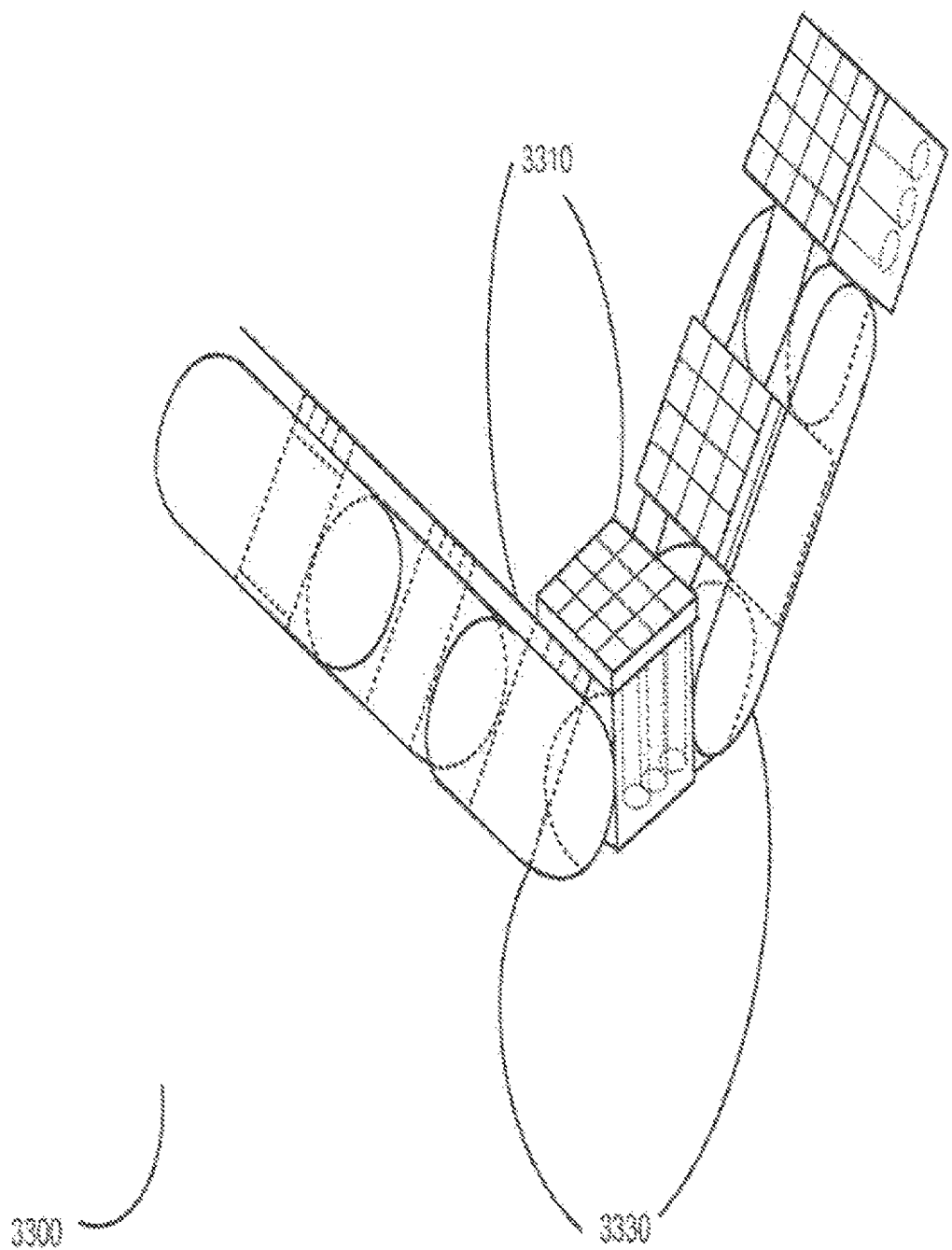

FIGS. 33A-33C are side perspective views of various configurations of a robotic finger 3300 formed from a plurality of sensors 3310 coupled by a plurality of joints 3330. The sensors 3310 may be a series of linear displacement measuring modules, such as the sensor module 700, may be a single cell, such as the sensor array 1100, or it may be a combination of linear sensors, such as the sensor module 700 and the sensor array 1100, with several to several hundred of the sensor arrays 1100. In an embodiment, the sensor arrays 3310 of the robot fingers may be one-inch modules, such as the sensor 700. The plurality of joints 3330 may include rotational hydraulic joints, mechanical joints operated by linear hydraulic cylinders, and/or the like. For example, the finger 3300 may include robotic joints 2900 with 1-inch diameter. The sensors 3310 may each be a single sensor array, such as the sensor arrays 1100, 1200, or may include a plurality of sensors, such as the sensor module 700, depending on the application. The joints 3330 may be rotated to form desired shapes with the robotic finger 3300. In FIG. 33A, all of the joints 3330 are at 0° angles resulting in a flat surface. The robotic finger 3300 may be placed in the flat position as part of calibration and/or before an object (not shown) is grasped. In FIG. 33B, one sensor 3310 has joints 3330 on each side of it rotated to 90° angles to form a U-shape. The maximum rotation for each finger joint 3330 may be 90°, 180°, or may be more or less than 90° or 180°. The illustrated configuration may be used as part of calibration and/or may be used to grasp opposing sides of an object (not shown) and/or to determine the geometry of the opposing sides. In other configurations, one or more joints at 0° angles may separate the two joints at 90° angles to form a wider base to the U-shape. FIG. 33C illustrates two joints 3330 at 45° angles on each side of a sensor 3310. The smaller angles may allow the finger 3300 to grasp a larger object (not shown). Additional joints 3330 may also be rotated to 45° to more completely encircle and enclose the object. The fingers 3300 may be able to grasp an object, and the radial robotic joints 3330 may be able to determine the grosser dimensions of the object through angle measuring sensors, such as the sensor 2900. The linear displacement sensor modules 700 and/or sensor arrays 1100, 1200 may be able to give a higher resolution to the surface of a grasped object.

FIG. 33D is a schematic diagram of an embodiment of the linear displacement sensors 3314 in a link 3311 between the joints of the fingers. In the illustrated embodiment, a single contact sensor 3312 without insulating walls is used rather than linear displacement sensors with pistons. The contact sensor 3312 may have as few as 9 linear displacement sensors 3314 or fewer, or it may have as many as several hundred per square inch or more. The contact sensor 3312 may include a bladder and/or flexible sidewalls like the contact sensors 1100, 1200, 1300. The electrodes can be made very small. For example, the electrodes may points with small diameters. The point electrodes can surround an electrode for capacitive measuring. A geographic model can be used to detail the angle of the capacitive electrodes to determine the material of an object. The calculation of dielectric constant may be calibrated to the angles of the electrodes. In an embodiment, the contact sensor 3312 may be a single elastomer filled with conductive solution, and the contact sensor 3312 may extend from one end of the finger to the other to completely enclose the finger joints.

Figure 33E:
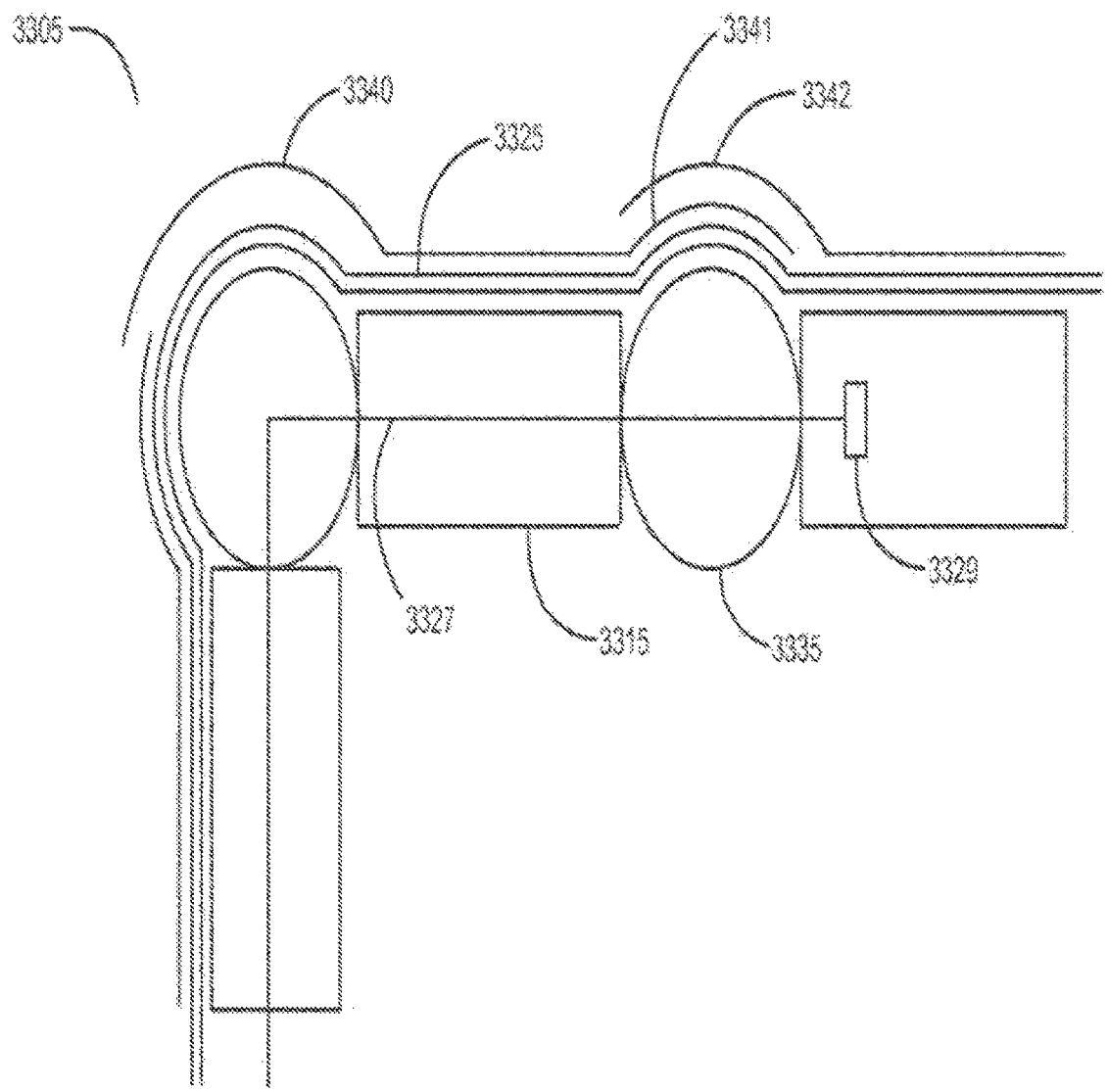
FIG. 33E is a schematic diagram of an embodiment of a finger with hydraulic hoses coupled to linear displacement sensors and joints in the finger.

FIG. 33E is a schematic diagram of an embodiment of a finger 3305 with hydraulic hoses 3325 coupled to linear displacement sensors 3315 and joints 3335 in the finger 3305. The hydraulic hoses 3325 may be coupled and/or attached to the backside of the finger 3305 and away from the linear displacement sensors 3315. The hydraulic hoses 3325 may be a bellows type design, a latex rubber, a synthetic rubber, or the like. The hoses 3325 may be enclosed inside a protective housing 3340 that includes an inner shield 3341 and an outer shield 3342. The housing 3340 may have a radius selected to maintain the hoses 3325 in a round shape when the finger 3305 is bent. The shields 3341, 3342 may be coupled and/or affixed to the fingers, and the inner shield 3341 may rotate inside the outer shield 3342 as the finger joints 3335 rotate.

Electrical wires 3327 to the sensors 3315, one or more multiplexers, and electronics of the sensors may be inside or outside the shields 3341, 3342. The electrical wires 3327 to the displacement sensors 3315 of the finger 3305 may include conventional wires and/or flexible printed circuits, and/or a conductive silicon wire may be used for each electrical lead wire. The electrical wires 3327 may be attached to the centerline of the joints 3335 to allow easy rotation. An electrical connector 3329 may be coupled and/or attached to the electrical wires 3327 for control of and communication with finger electronics. Heating elements may be incorporated into the inner and/or outer shields 3341, 3342 and may control the temperature of the fluid of the finger 3305. Additional heating wires may be encased in the walls surrounding the linear displacement sensors 3315 and even in the silicon of the linear displacement sensors 3315 that makes contact with an object. The heating elements and/or additional heating wires may provide full control over the temperature of the hydraulic fluid, which may be measured with a temperature transducer in the fluid lines.

Figure 34:
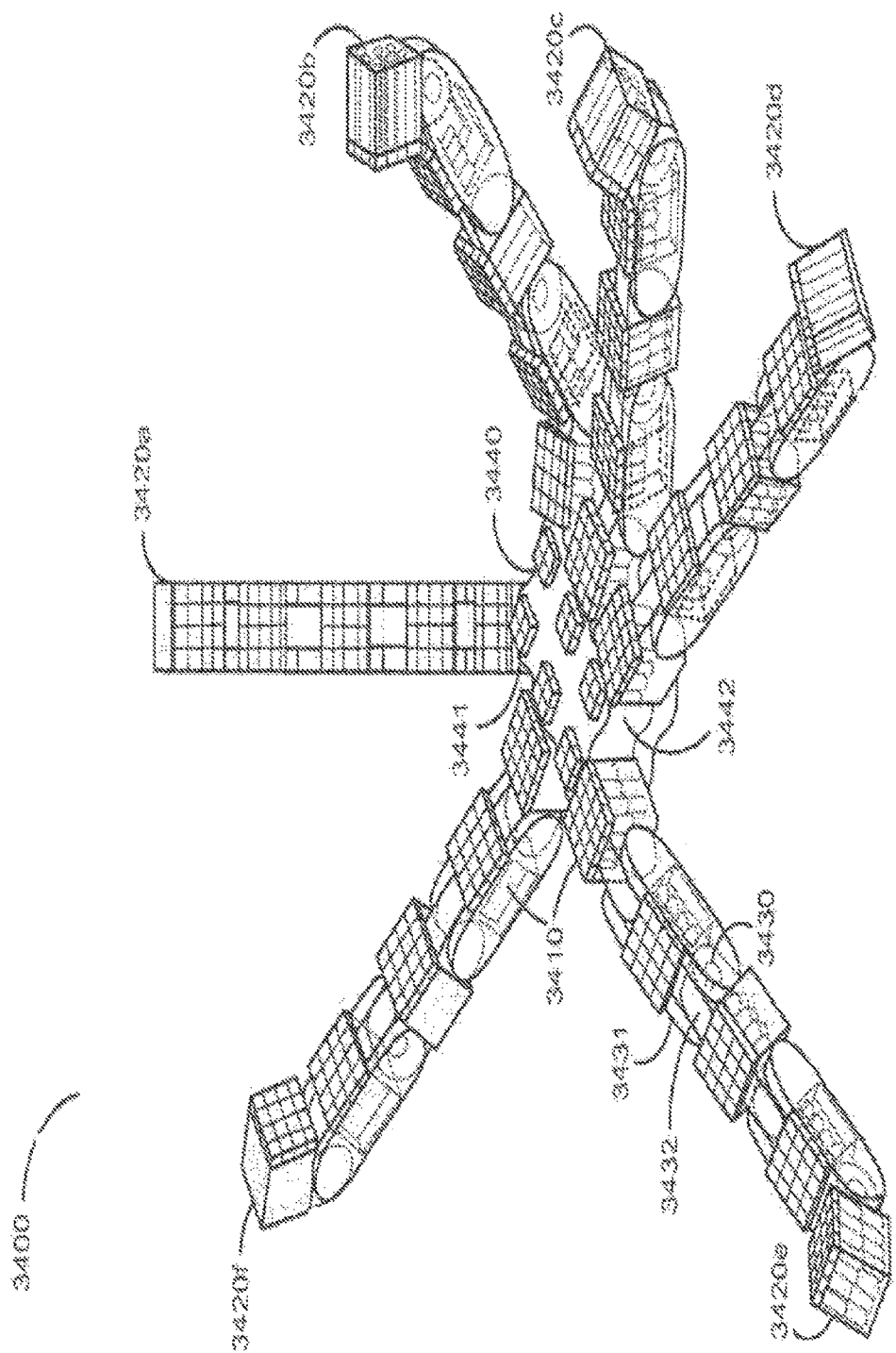
FIG. 34 is a front perspective view of a robotic hand comprising a plurality of fingers.

FIG. 34 is a front perspective view of a robotic hand 3400 comprising a plurality of fingers 3420a-f. In the illustrated embodiment, there may be six fingers. Alternatively, the finger 3300 may behave like a two-finger assembly. Each finger 3420a-f may include one or more linear sensor arrays 3410. The linear sensor arrays 3410 may include linear hydraulic actuators in series with contact sensors. The linear hydraulic actuators may include one or more linear displacement measuring cells with pistons, and the contact sensors one or more linear displacement measuring cells without pistons. Each finger 3420a-f may also, or instead, include one or more rotational hydraulic actuators 3430 configured to measure rotational displacement. The rotational hydraulic actuators 3430 may couple outer finger segment shafts 3431 to an inner finger segment shaft 3432. In the illustrated embodiment, each finger 3420a-f is composed of four rotational hydraulic actuators 3430, and each section contains outer finger segment shafts 3431 and an inner finger segment shaft 3432. In some embodiments, greater than or less than four rotational hydraulic actuators 3430 may be used per finger 3420a-f. The fingers 3420a-f may be connected to a palm 3440. Each finger 3420a-f may be coupled to the palm 3440 by a corresponding rotational hydraulic joint 3442, which may be able to rotate the corresponding finger 3420a-f laterally. The axis of rotation of the palm joint 3442 may be orthogonal to the axis of rotation of the finger joints 3430. The palm 3440 may also include a plurality of linear sensor arrays 3441.

The linear sensor arrays 3410, 3441 and/or the rotational hydraulic actuators 3430, 3442 may include internal bladders to contain conductive hydraulic fluid and prevent leaks. The bladders may completely seal the linear sensor arrays 3410, 3441 and the rotational hydraulic actuators 3430, 3442 without the use of O-rings and eliminate leaking under normal operating conditions. The hydraulic fluid in the linear sensor arrays 3410, 3441 may have positive pressure. When contact pressure is applied to the linear sensor arrays 3410, 3441, fluid may be forced out of the sensor arrays, and the bladders may roll up around corresponding internal pistons. The force from the contact pressure may act like a spring to remove the fluid, roll up the bladders, and cause the linear sensor arrays 3410, 3441 to conform to the object applying the contact pressure. The conformity may allow a geographic model to be determined from the displacement measurements of the linear sensor arrays 3410, 3441.

The flow of fluid into and out of the linear sensor arrays 3410, 3441 and/or rotational hydraulic actuators 3430, 3442 may be controlled by a plurality of control valves (not shown). In some embodiments, there may be one or two control valves for each linear sensor array 3410, 3441 and/or two control valves for each rotational hydraulic actuator 3430, 3442. One control valve may control extension and another control valve may control retraction. Alternatively, two control valves may control all of the rotational hydraulic actuators 3430, 3442 and/or linear sensor arrays 3410, 3441, or there may be two control valves for each finger 3420a-f. In an embodiment, opposing fingers (e.g., the fingers 3420a and 3420b) may operate in a manner similar to an index finger and thumb, and there may be common control valves for each set of joints. For example, a first joint in each of the two fingers may be controlled by two control valves, and the second, third, and fourth pairs of joints would each have a pair of common control valves. Alternatively, or in addition, two pairs of the fingers 3420a-f may be controlled by two control valves, and one pair may behave like an index finger and thumb and be controlled by another two, four, or eight control valves.

The control valves may be located on back sides of the fingers to remain out of the working area of the hand 3400 and away from the linear sensor arrays 3410. Alternatively, or in addition, the control valves may located in the palm of the hand 3400, on the back of the palm, in an arm, in a leg, in a wrist, in a body of a robot, and/or the like. In an embodiment, the control valves are located in the area between the wrist and the hand. Fluid supply lines may run to the rotational hydraulic actuators 3430, 3442 and/or the sensor arrays 3410, 3441. For example, the supply lines may run through skeletal components (e.g., skeletal components in the fingers) and/or the rotational hydraulic actuators 3430, 3442 to the sensor arrays 3410, 3441 and/or rotational hydraulic actuators 3430, 3442. The control valves may be electrohydraulic servo valves ("EHSVs"). The EHSVs for the fingers may have a low flow rate (e.g., less than one gallon per minute) and a small size to meet the requirements of the hand 3400. The EHSVs may be miniature solenoid valves, such as the LHDA2471215H valves available from The Lee Company.

One or more gripping algorithms may be used to control the fingers 3420a-f according to the type of grip desired. The gripping algorithms may provide for precise control when using a pair of the fingers 3420a-f. A separate gripping algorithm or instance of a gripping algorithm may control each pair of the fingers 3420a-f. For example, a pair of the fingers 3420a-f may be able to grasp small objects and/or tools, such as tweezers. Two pairs of the fingers 3420a-f may close, and the remaining pair may stay straight to manipulate objects. The fingers 3420a-f may be able to rotate out from the palm by 180 degrees or more so the fingers 3420a-f are flipped and can grasp an object from the inside. In an embodiment with four joints 3430 per finger 3420a-f and another joint 3442 in the palm 3440, the total degrees of freedom may be five per finger. Additional axes may be added to the fingers 3420a-f to allow for pitch, yaw, and/or roll of the finger 3420a-f, which may give more than five degrees of freedom to each finger.

The linear sensor arrays 3410, 3441 may be filled with fluid before an object is grasped. The control valves may allow fluid to drain from the linear sensor arrays 3410, 3441 as the object is grasped, which may only require one or two control valves per linear hydraulic actuator 3410, 3441 and/or one or two control valves for a plurality of linear hydraulic actuators 3410, 3441 (e.g., one or two control valves may control all draining). Pressure regulation may be used to ensure only the desired amount of fluid is permitted to drain. The pressure may be balanced between drain valve switching, pressure on the contact walls to cause the bladder to roll up, and pressure on the object being gripped. The wall thickness of the bladder may also affect rolling of the bladder and/or the applied pressure.

The rotational hydraulic actuators 3430, 3442 and the linear sensor arrays 3410, 3441, including the linear hydraulic actuators and/or the contact sensors, may be used to create a geographic model of an object being grasped. Measurements from the rotational hydraulic actuators 3430, 3442 and trigonometry may be used to create a gross model of the object. The linear sensor arrays 3410, 3441 may be used to determine fine details of the object and create a fine model with higher resolution. Software and/or custom logic may be configured to detect tilting of the electrode plates in the linear sensor arrays 3410, 3441, and measure and/or determine the angle of tilt, as previously discussed. For example, the processor may monitor the displacement measurements for instantaneous and/or unexpected changes. There may be gaps between the linear sensor arrays 3410, 3441, so several methods may be used to model the object where the gaps are. The model may be interpolated and/or extrapolated to fill in the gaps. The hand 3400 may move and/or index around the object to fill in any gaps. Because the locations of the gaps may be known, determined, and/or stored by the processor, the movements can be configured to ensure a fine model of every part of the object is created. Alternatively, or in addition, two hands 3400 may be used to grip the object and enclose the object on six or more or fewer sides. The method of filling in gaps may depend on the particular application and whether interpolation and/or extrapolation is sufficient or if a model created completely from measurements is required. The identity of the object may be determined from the measurements and any interpolation and/or extrapolation. The model may be compared to a CAD model stored in memory. The model may be compared to a model generated from a vision system to specify the location of the object in a gripper (e.g., the hand 3400) in relation to the vision model. The vision system may or may not compare the generated model to a CAD model, and a gripper processor may or may not compare the gripper generated CAD model to the vision generated CAD model. Two CAD parts may be discovered with one in each hand (e.g., the hand 3400) or smart vice (e.g., the grippers 2000, 2100), and the CAD model of each part may be followed by an assembly file to put the two parts together in an assembly operation. The CAD assembly file may be completed by a CAM program from the three CAD models of the two parts and their assembly.

Figure 35:
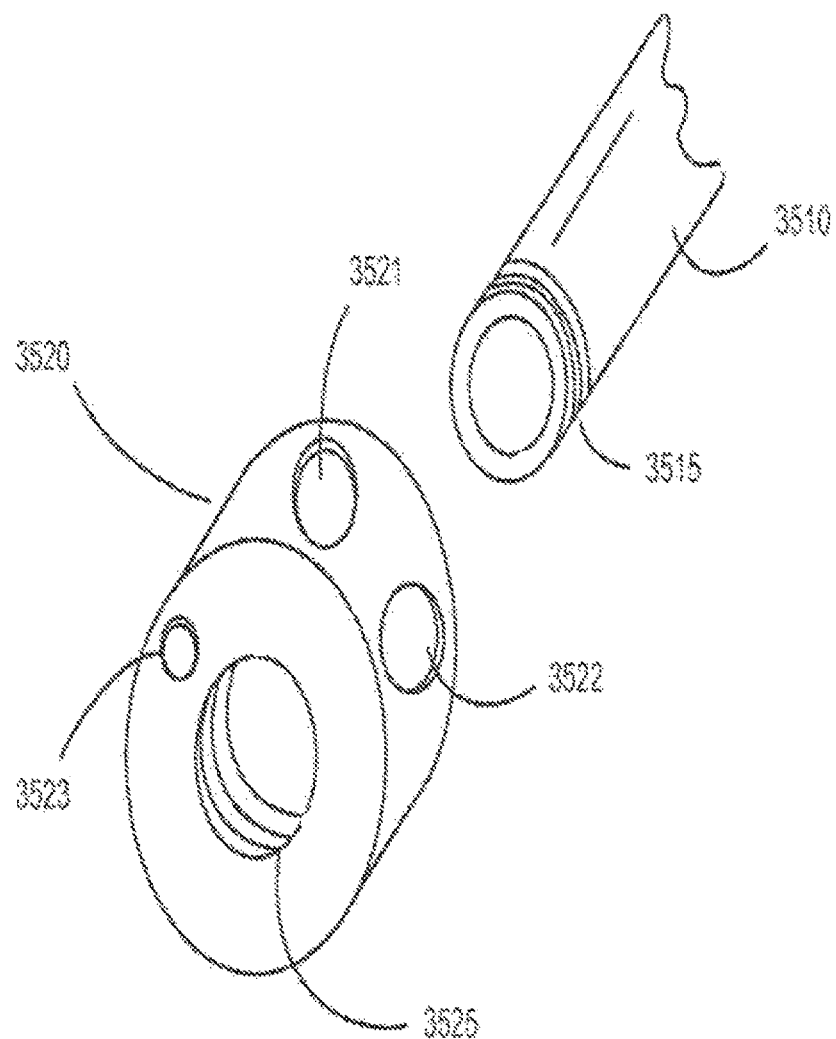
FIG. 35 is a front perspective view of an end cap that may be coupled to an inner core.

FIG. 35 is a front perspective view of an end cap 3520 that may be coupled to an inner core 3510. The inner core 3510 may be the male end of a skeletal component and/or joint. The end cap 3520 and inner core 3510 may have threads 3515, 3525 that interface to removeably couple the end cap 3520 to the inner core 3510. The end cap 3520 may comprise a fluid port 3521, an electrical power port 3522, and a data port 3523 to transfer fluid, electrical power, and data respectively to other robot components. External attachments to the power ports may be used to charge, discharge, and/or couple in series and/or parallel the batteries 2520, 2530 of the skeletal system. The ports may be located on the sides and/or the end of the end cap 3520. The ports 3521, 3522, 3523 may be self-sealing to allow for quick disconnection of the skeletal component 2500 from the robot without sparking or fluid loss for battery maintenance, repair, and replacement. Corresponding ports with which the end cap ports 3521, 3522, 3523 interface may also be self-sealing.

Alternatively or in addition, the inner core 3510 may interface with a joint, such as the rotational hydraulic joint 2900, the rotational hydraulic joints 3000*a*-*d*, the mechanical joint 3100, the robotic fingers 3300, or the like, to allow for moving and orienting a skeletal component 2500. The joint may include a quick release connection that removeably couples with a quick release system of the skeleton. The joint may be a prismatic, ball, screw, pin and socket, revolute joint, or the like. The joint may be a compound joint with a predetermined number of degrees of freedom. For example, the joint may be a hip with 3 degrees of freedom; a knee with 1 degree of freedom; an ankle with 2 degrees of freedom; an arm, including a shoulder, elbow, and wrist, with 7 degrees of freedom; a back with a plurality of degrees of freedom; or the like. The joint may be actuated by electric motor, hydraulic means, pneumatic means, or the like. Electrical power, data, and fluid may be passed through the joint to reduce wiring, hoses, and cables, and/or a rotary joint may be used to transfer electrical power. The inner core 3510 and joint may be connected by a thread and screw, quick release flange, or the like. For example, the inner core 3510 may have flanges on either or both ends that connect the inner core 3510 to the joint. A quick release connection may allow discharged batteries 2520, 2530 to be quickly replaced. Thus, panels in the robot may be opened to remove and exchange skeletal components, and/or the skin may be removed to replace the inner skeleton battery structure. The skeleton and skin may both have integrated batteries, so replacement of the skin batteries creates access to the inner skeleton battery structure for replacement. Robotic joints may be available from Boston Dynamics, Fanuc, Kuka, and Motoman Robotics.

Figure 36:
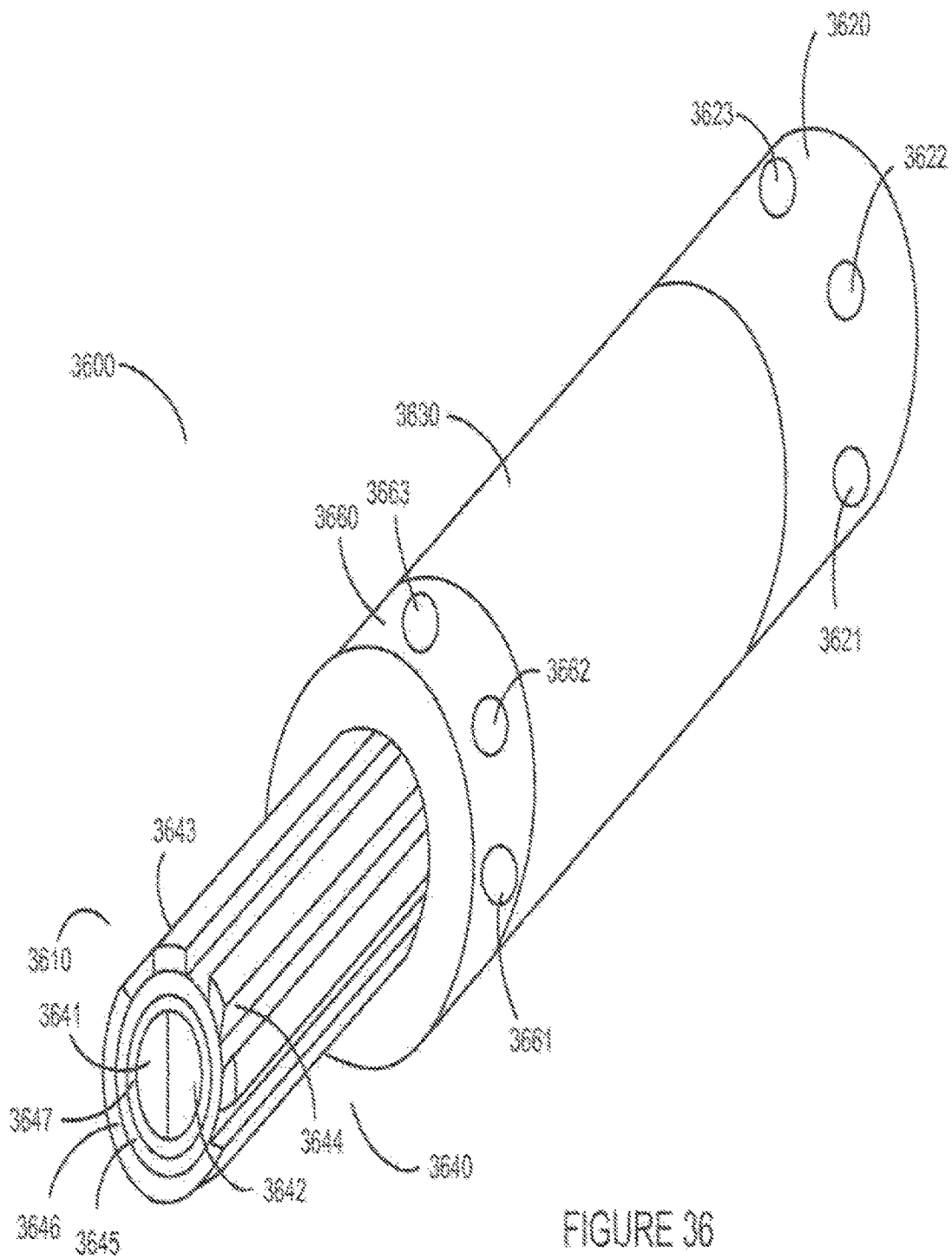
FIG. 36 is a front perspective view of a skeletal component with a male end and a female end.

FIG. 36 is a front perspective view of a skeletal component 3600 with a male end 3610 and a female end 3620. The male end 3610 may be configured to mate with the female end 3620, which may allow multiple skeletal components to be coupled to one another. The male and/or female ends 3610, 3620 may also be configured to mate with female and/or male receptacles of joints, such as the rotational hydraulic joint 2900, the mechanical joint 3100, or the like. The skeletal component 3600 may include an integrated battery 3630 surrounding an inner core 3640. The integrated battery 3630 may be cylindrically wound around the inner core 3640, such as using windings 2600*a* with or without additional support battery windings 2600*b*. The female end 3620 and an output section 3660 may enclose and/or bound the battery 3630 on each end to prevent longitudinal displacement of the battery 3630 relative to the inner core 3640. The battery may be electrically coupled to at least one of the output section 3660 and the female end 3620. For example, the female end 3620 may include one or more simple and/or complex switches, such as for connecting to switching power supplies, configured to switch the battery 3630 into and out of charging and discharging circuits to optimize battery and power usage.

The female end 3620 and the output section 3660 may each include hydraulic fluid ports 3621, 3661, electrical power ports 3622, 3662, data ports 3623, 3663, and/or the like. Fluid, electrical power, and/or data may be transferred from the female end 3620 to the output section 3660 and/or from the output section 3660 to the female end 3620. The fluid ports 3621, 3661 may be divided into two sections. One section may transfer fluid to and/or from one or more extension chambers (e.g., extension chamber 692 and/or extension cavity 2960) in one or more grippers, joints, and/or skeletal components, and the other section may transfer fluid to and/or from one or more retraction chambers (e.g., retraction chamber 694 and/or retraction cavity 2950) in one or more grippers, joints, and/or skeletal components. Alternatively, the female end 3620 and output section 3660 may each have two fluid ports (not shown); one fluid port may be for extension and one may be for retraction. In an embodiment, the female end 3620 may receive fluid from a pump directly or indirectly (e.g., the fluid port 3623 may be in fluid communication with the pump), and the output section 3660 may transfer the fluid to other components directly or indirectly.

Alternatively, or in addition, fluid, electrical power, and/or data may be transferred by the inner core 3640. The inner core 3640 may transfer fluid, electrical power, and/or data to a joint, to other skeletal components, and/or to other robotic systems. A plurality of non-interconnected fluid chambers 3641, 3642 may transport fluid longitudinally through the center of the inner core 3640. A first chamber 3641 may transfer fluid to and/or from one or more extension chambers and a second chamber 3642 may transfer fluid to and/or from one or more retraction chambers. Each chamber 3641, 3642 may include an insulator sleeve (not shown) configured to insulate the conductive fluid from the inner core 3640. The insulator sleeve may divide the cavity in the inner core 3640 into the two chambers 3641, 3642. In an embodiment, the first and second chambers 3641, 3642 may deliver fluid to a joint (not shown) connected directly to the skeletal component 3600, and the output section fluid port 3661 may deliver fluid to joints and skeletal components further away (not shown). In other embodiments, the first and second chambers 3641, 3642 may deliver fluid to both directly connected and further away joints and skeletal components. In an embodiment, the chambers and fluid ports 3641, 3642, 3621, 3661 may have control valves and circuitry located in the female end 3620 and/or the output section 3660. For example, the female end 3620 and output section 3660 may be an integrated hydraulic valve manifold and control circuit to monitor and control individual joints and batteries.

The inner core 3640 may include one or more highly conductive surface elements 3643, 3644 extending longitudinally along the outside of the inner core 3640. The highly conductive surface elements 3643, 3644 may comprise silver, gold, copper, aluminum, and/or the like. One or more surface elements 3643 may transfer electrical power, and one or more surface elements 3644 may transfer data. Alternatively, or in addition, the surface elements 3643, 3644 may be a thin film divided into a plurality of transfer lines. The electrical power transferred by the surface elements 3643 may be used to charge and/or discharge batteries 3630 in the skeletal component 3600 or in other skeletal components (not shown) and/or to power devices and components throughout a robot (not shown). The power transfer lines may be sized based on the expected electrical current requirements. The number of data lines may correspond to the requirements for communication between the joints, hands, feet, and the like with a controller and/or a PLC. Some joints may not need or transfer electrical power or data, so an insulator (not shown) may cover the surface elements 3643, 3644 at the male end 3610 in some embodiments. A core cylinder 3645 may provide form and strength to the inner core 3640. The core cylinder 3645 may be made from a high-strength, lightweight material, such as titanium, aluminum, carbon fiber, and/or the like. Insulators 3646, 3647 may electrically insulate the core cylinder 3645 from the fluid chambers 3641, 3642 and/or surface elements 3643, 3644 to prevent undesirable short circuits that might otherwise result. The fluid chambers 3641, 3642 and surface elements 3643, 3644 may be coupled to the ports 3621, 3622, 3623, 3661, 3662, 3663 of the female end 3620 and/or output section 3660. A braided wire may wrap around the highly conductive surface elements 3643, 3644 to prevent inductive interference of the data transfer lines. In an alternate embodiment, the high strength inner core may be on the outside of the battery to act as an exoskeleton. In an embodiment, high strength stability may be attained with a material such as aluminum or titanium on the outside of the bone section, and the battery may be contained inside the high strength material. An exoskeleton may have additional application in such devices as electric bicycles. In some embodiments, the outside exoskeleton may still have an inner core with data and power transfer.

Figure 37:
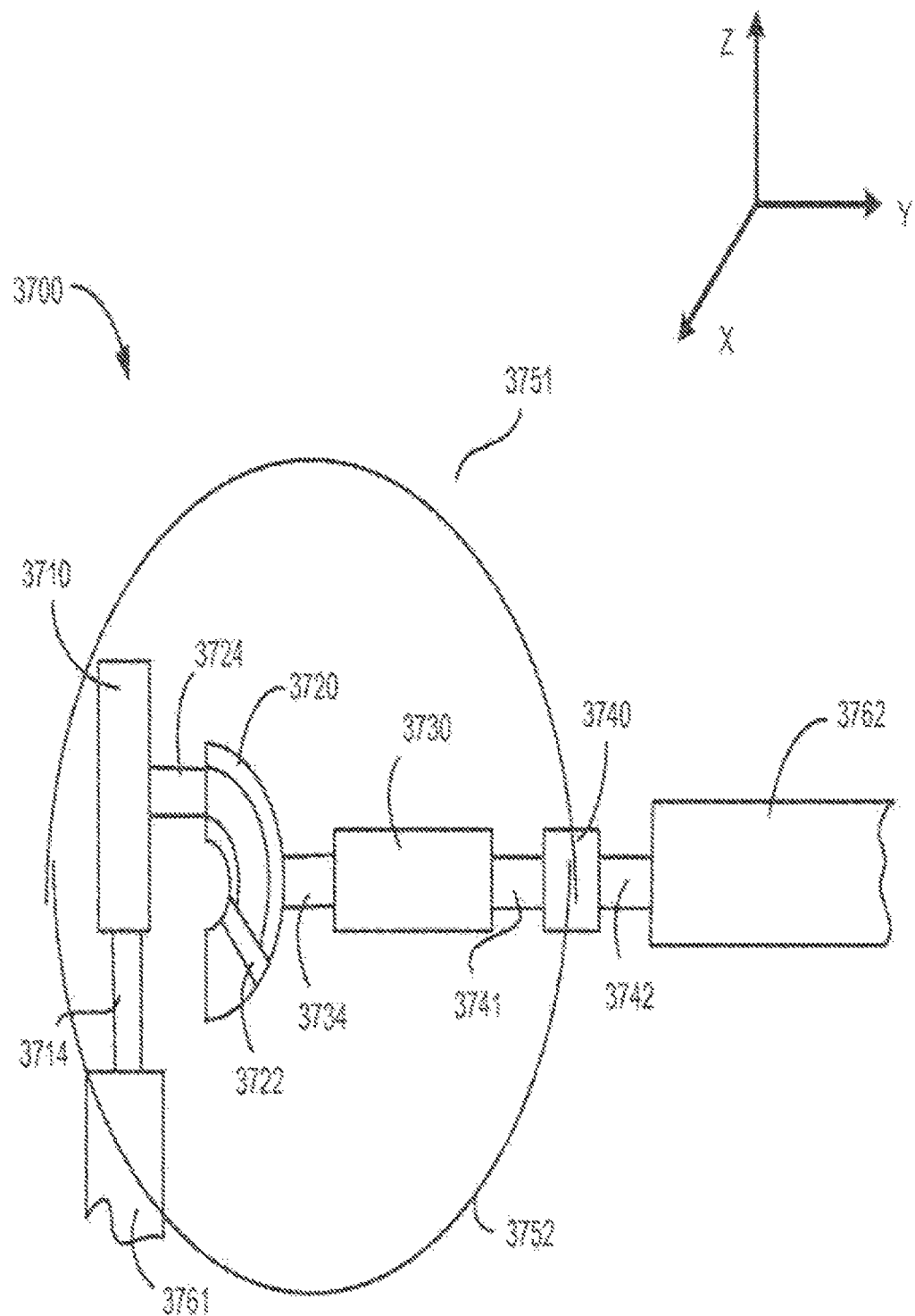
FIG. 37 is a schematic diagram of a compound ball joint with three degrees of freedom.

FIG. 37 is a schematic diagram of a compound ball joint 3700 with three degrees of freedom. The compound ball joint 3700 may include three constituent joints 3710, 3720, 3730, each having a single degree of freedom. More or fewer constituent joints 3710, 3720, 3730 may be included in other embodiments. Each constituent joint 3710, 3720, 3730 may be configured to rotate in a different orthogonal plane. For example, in the illustrated embodiment, a first constituent joint 3710 may rotate in the XZ plane, a second constituent joint 3720 may rotate in the YZ plane, and a third constituent joint 3730 may rotate in the XY plane. The constituent joints 3710, 3720, 3730 may each include a semicircular cavity through which a piston 3722 rotates. The constituent joints 3710, 3720, 3730 may each comprise the rotational hydraulic joint 2900. The constituent joints 3710, 3720, 3730 may be connected together by second and third piston shafts 3724, 3734. The third joint 3730 may rotate the first and second joints 3710, 3720, and the second joint 3720 may rotate the first joint 3710. Thus, a first skeletal component 3761 coupled to the first piston shaft 3714 may be rotated in one or more of the three orthogonal planes by the constituent joints 3710, 3720, 3730. Each constituent joint 3710, 3720, 3730 may include a measuring cell, such as the measuring cell in the rotational hydraulic joint 2900, to determine the angle of rotation of the constituent joint 3710, 3720, 3730. The joints may each have an encoder, such as a magnetic encoder from Bourns, to measure the rotation of each joint separately. A processor (not shown) may compute the position of the first skeletal component 3761 using trigonometry.

In an embodiment, the constituent joints 3710, 3720, 3730 include semicircular cavities and the piston shafts 3714, 3724, 3734 are also semicircular with a similar radius to allow the pistons 3722 to traverse the semicircular cavities. Each constituent joint 3710, 3720, 3730 may allow a maximum rotation of 90°, 135°, 180°, 225°, 240°, 270°, 360°, and/or the like. The pistons 3722 may or may not have one or more sets of ball bearings (not shown) to facilitate movement along the semicircular cavity. Also, a ring of ball bearings (not shown) may be in contact with the shaft 3714, 3724, 3734 where the shaft 3714, 3724, 3734 exits the semicircular cavity. The ball bearings may reduce stress on the piston 3722 movements and/or increase the amount of weight that may be applied to the piston 3722. A single semicircular cavity may be used for both retraction and extension. The constituent joints 3710, 3720, 3730 may include two end caps (not shown) coupled to each piston 3722 by two bellow bladders (not shown). The bellow bladder through which the piston shaft 3714, 3724, 3734 travels may surround the piston shaft 3714, 3724, 3734 to prevent leaking. In other embodiments, the constituent joints 3710, 3720, 3730 may include the rotational hydraulic joint 2900, the mechanical joint 3100, or the like.

A control module 3740 may be configured to adjust the position of the constituent joints 3710, 3720, 3730. The control module 3740 may include six control valves (not shown), and/or separate control valves and/or valve bodies for each joint and related circuitry may be mounted at the control module 3740, the piston shaft 3734, the piston shaft 3724, and/or the like. A pump (not shown) may apply positive pressure to a fluid, and the control valves may direct the fluid to one or more desired locations for movement of the constituent joints 3710, 3720, 3730. One control valve for each joint may control filling and draining of the extension chamber, and one control valve for each joint may control filling and draining of the retraction chamber. In other embodiments, there may be two control valves per chamber of each joint to control fluid flow into and out of the chambers. The control valves may be coupled to the constituent joints 3710, 3720, 3730 by hoses (not shown) and/or through a first control module connector 3741. In other embodiments, the control valves may be located in the joints that they control. The processor and/or a PLC may signal to the control module 3740, which valves to open and which to close. The control module 3740 may also include a multiplexer configured to multiplex together the signals and/or electrical property measurements from each joint.

Male and female housing components 3751, 3752 may house the constituent joints 3710, 3720, 3730 and may leave only the control module 3740 and a first skeletal component 3761 exposed for external connection. The male housing component 3751 may be coupled to the control module 3740, and the female housing component 3752 may be coupled to the first constituent joint 3710. A second control module connector 3742 and the first piston shaft 3714 may emerge from the housing to couple the compound ball joint 3700 to skeletal components 3761, 3762. The second control module connector 3742 may be the male end of the second skeletal component 3762, and a flange (not shown) may couple the second control module connector 3742 to the control module 3740. The skeletal components 3761, 3762 may or may not include integrated batteries and/or may be fingers or finger joints. Fluid, electrical power, and/or data may be delivered to the compound ball joint 3700 from the skeletal components 3761, 3762 and/or vice versa.

Figure 38:
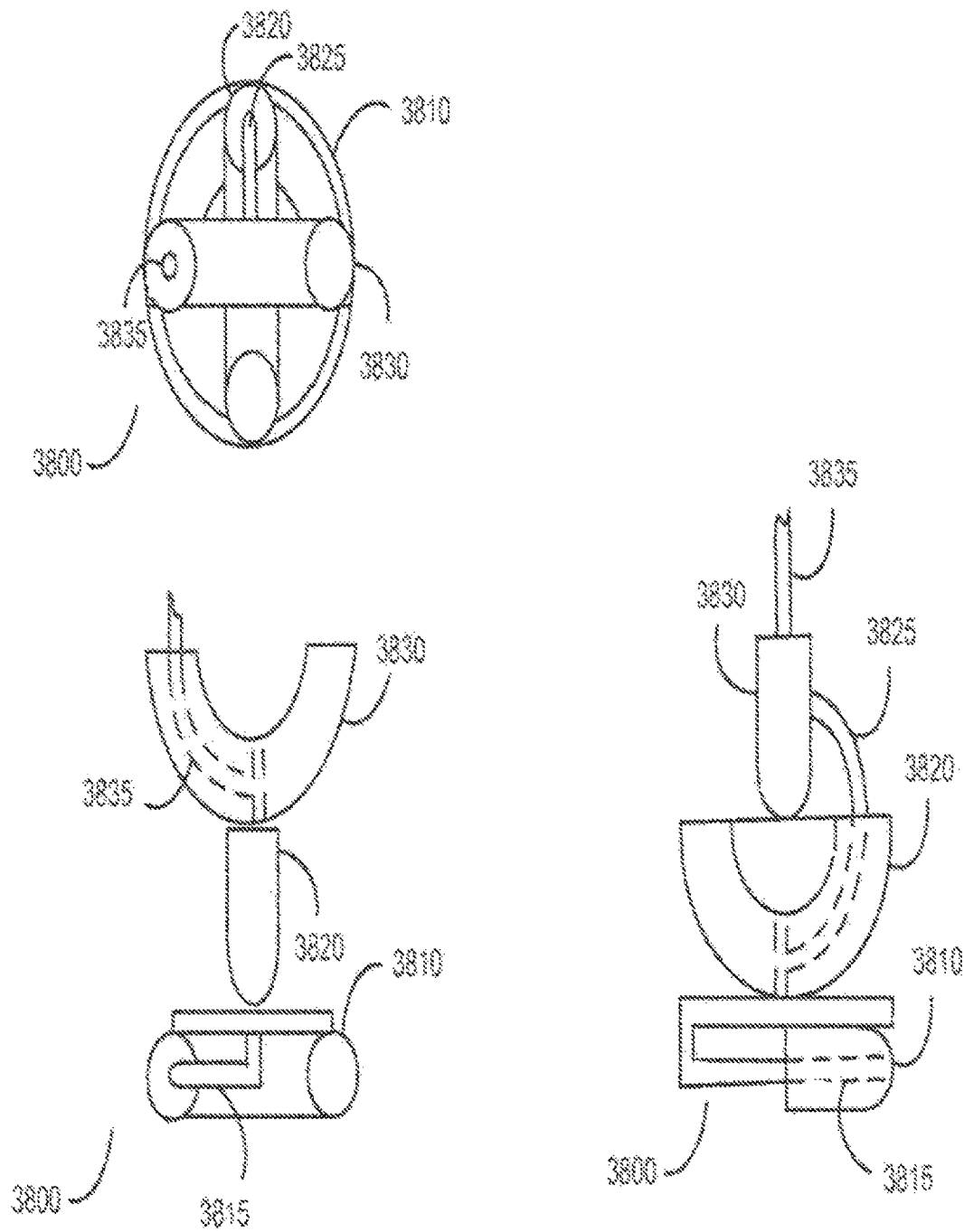
FIG. 38 includes top, front, and side perspective views of a compact, compound joint.

FIG. 38 includes top, front, and side perspective views of a compact, compound joint 3800. The compact, compound joint 3800 may include three constituent joints 3810, 3820, 3830, each having a single degree of freedom. More or fewer constituent joints 3810, 3820, 3830, such as only two constituent joints 3810, 3820, may be included in other embodiments. The constituent joints 3810, 3820, 3830 may have a configuration similar to that of the constituent joints 3710, 3720, 3730 in the compound ball joint 3700 and/or may include rotational hydraulic joints 2900, mechanical joints 3100, and/or the like. Each constituent joint 3810, 3820, 3830 may be configured to rotate in a different orthogonal plane. The constituent joints 3810, 3820, 3830 may be closer to each other than the constituent joints 3710, 3720, 3730 in the compound ball joint 3700 to reduce the volume of the compact, compound joint 3800. For example, each constituent joint 3810, 3820, 3830 may be positioned with at least one portion near the center of one or more adjacent constituent joints 3810, 3820, 3830. Piston shafts 3815, 3825, 3835 may couple the constituent joints 3810, 3820, 3830 together. The piston shafts 3815, 3825, 3835 may be coupled to adjacent constituent joints 3810, 3820, 3830 near their center.

Figure 39A:
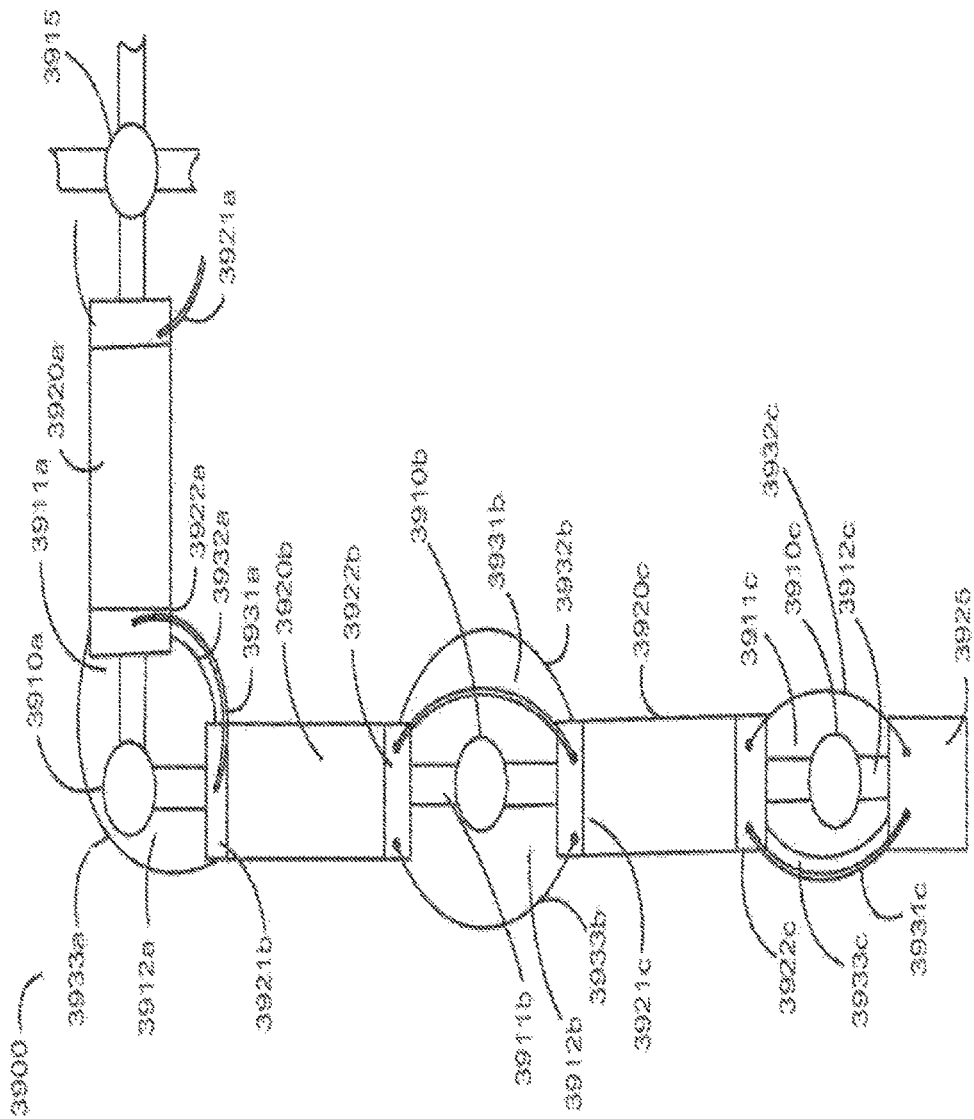
FIG. 39A is a schematic diagram of an arm including a plurality of joints with multiple degrees of a freedom and a plurality of skeletal components.

FIG. 39A is a schematic diagram of an arm 3900 including a plurality of compound joints 3910a-c with multiple degrees of a freedom and a plurality of skeletal components 3920a-c. The joints 3910a-c and skeletal components 3920a-c may include male and female connections that may interface with one another. Flanges, fittings, or the like may also or instead be used to attach the joints 3910a-c and skeletal components 3920a-c. The arm 3900 may be part of a larger skeletal system for a robot. For example, a spinal joint 3915 may couple a head (not shown), another arm (not shown), additional spine joints (not shown) coupled to a waist (not shown) and/or legs (not shown), and/or the like to a proximal end of the arm 3900. The arm 3900 may include or couple to a hand 3925 or other gripper at a distal end, such as the hand 3400. The arm 3900 may be configured to have a functionality similar to that of a human arm. Accordingly, a shoulder joint 3910a may have three degrees of freedom, an elbow joint 3910b may have one degree of freedom, and a wrist joint 3910c may have two degrees of freedom. Those of skill in the art will understand the joints 3910a-c may have more or fewer degrees of freedom depending on the desired application of the arm 3900.

The arm 3900 may be configured to transfer fluid, electrical power, data, and/or the like to components of the arm 3900 and/or components outside the arm 3900. The fluid, electrical power, and data may be conveyed by the joints 3910a-c and skeletal components 3920a-c. Transfer lines, such as wires 3932a-c, 3933 a-c, hoses 3931a-c, or the like, may transfer fluid, electrical power, and/or data between skeletal components 3920a-c instead of or in addition to the joints 3910a-c. Some embodiments may not include transfer lines apart from the joints 3910a-c and skeletal components 3920a-c and may instead transfer fluid, electrical power, and/or data through the joints 3910a-c and/or skeletal components 3920a-c.

The skeletal components 3920a-c may include one or more control modules 3921a-c, 3922a-c. The skeletal components 3920a-c may each include a plurality of batteries (not shown) that have their charging regulated and/or controlled by a first control module 3921a-c in each skeletal component 3920a-c. The first control modules 3921a-c may include and/or be communicatively coupled with temperature, pressure, and/or voltage sensors that monitor the temperature, pressure, and/or voltage of the batteries. The first control modules 3921a-c may also include control mechanisms and/or circuitry configured to regulate charging and discharging of the batteries. The first control modules 3921a-c may monitor and control a charge profile for the batteries by switching a charging current. An exemplary charge profile is disclosed in U.S. Pat. No. 5,633,576 to Rose et al., which is hereby incorporated herein by reference in its entirety. The first control modules 3921a-c may monitor and control the voltage of each battery as a function of measured temperature, pressure, charging voltage, discharging voltage, and/or the like.

A second control module 3922a-c in each skeletal component 3920a-c may transfer fluid, electrical power, and/or data to the joints 3910a-c and/or the hand 3925. In some embodiments, only fluid and data may be output to the joints 3910a-c. The joints 3910a-c may include a joint control module, such as the control module 3740, inside the joint housing. The joint control module may include a plurality of valves to control extension and retraction of the joints 3910a-c in one or more degrees of freedom in the manner previously discussed. A plurality of joint connections 3911a-c, 3912a-c may convey fluid, electrical power, and/or data between the joints 3910a-c and the skeletal components 3920a-c and/or the hand 3925. In some embodiments, second joint connections 3912a-c may only provide a mechanical connection and may not transfer fluid, electrical power, and/or data. First joint connections 3911a-c for each joint 3910a-c may be comprised of a male receptacle from the skeletal component 3920a-c and a female receptacle from the joint 3910a-c, which may interface to transfer fluid, electrical power, and/or data between the skeletal component 3920a-c and the joint 3910a-c.

Figure 39B:
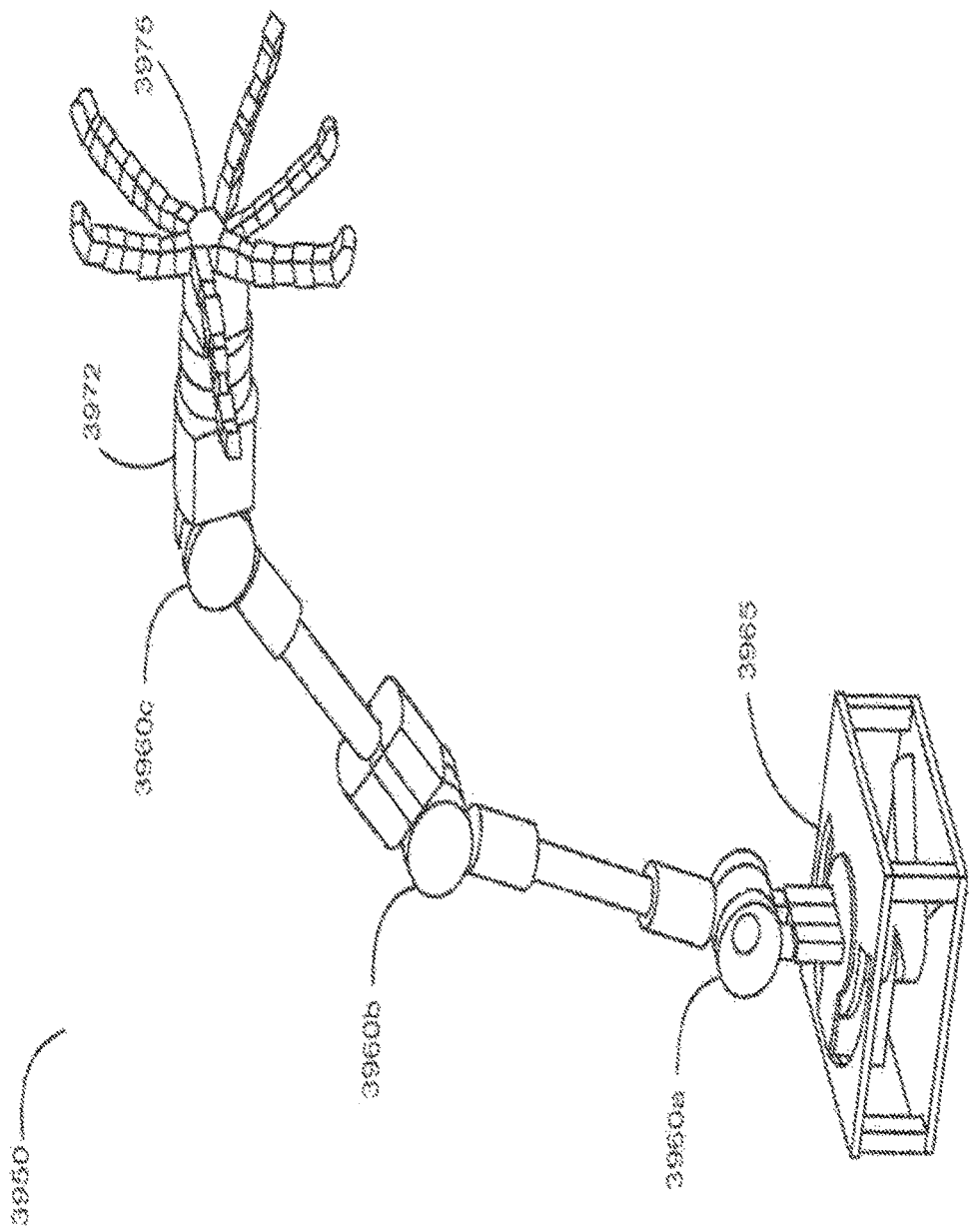
FIG. 39B is a perspective view of an arm including a plurality of joints and a hand.

FIG. 39B is a perspective view of an arm 3950 including a plurality of joints 3960a-c and a hand 3975. Controls, measuring electronics, and hydraulics may be located between the rotating joint of the wrist 3960c and the hand 3975, e.g., in a wrist module 3972. For example, a hydraulic control valve package, a processor to determine contact location, multiplexer controls, data storage (e.g., for pressure data, capacitance data, shear data, etc.), and/or the like may be located in the wrist module 3972 and/or the hand 3975. Information may be transferred to a PLC from the wrist joint 3960c and/or the hand 3975 for higher level calculations. Basic sensor measurements, multiplexer control, and/or other data gathering may be performed in the back of the fingers close to the sensors in order to reduce wiring to and from the hand 3975. In an embodiment, there may be 12 or more lines running from the finger joints and/or links to the wrist module 3972. A cable, such as a universal serial bus (USB) cable, may run through the center of the robotic arm 3950 and may include three or more data and power lines to the arm base 3965. The robotic arm base 3965 may include, inter alia, joint control valves and electronics. Different pressures may be present in the hand 3975, fingers, and/or arm joints 3960a-c as a result of pressure regulation. A valve package may be used in both the wrist module 3972 and the base 3965, such as a valve package available from The Lee Company.

Figure 40:
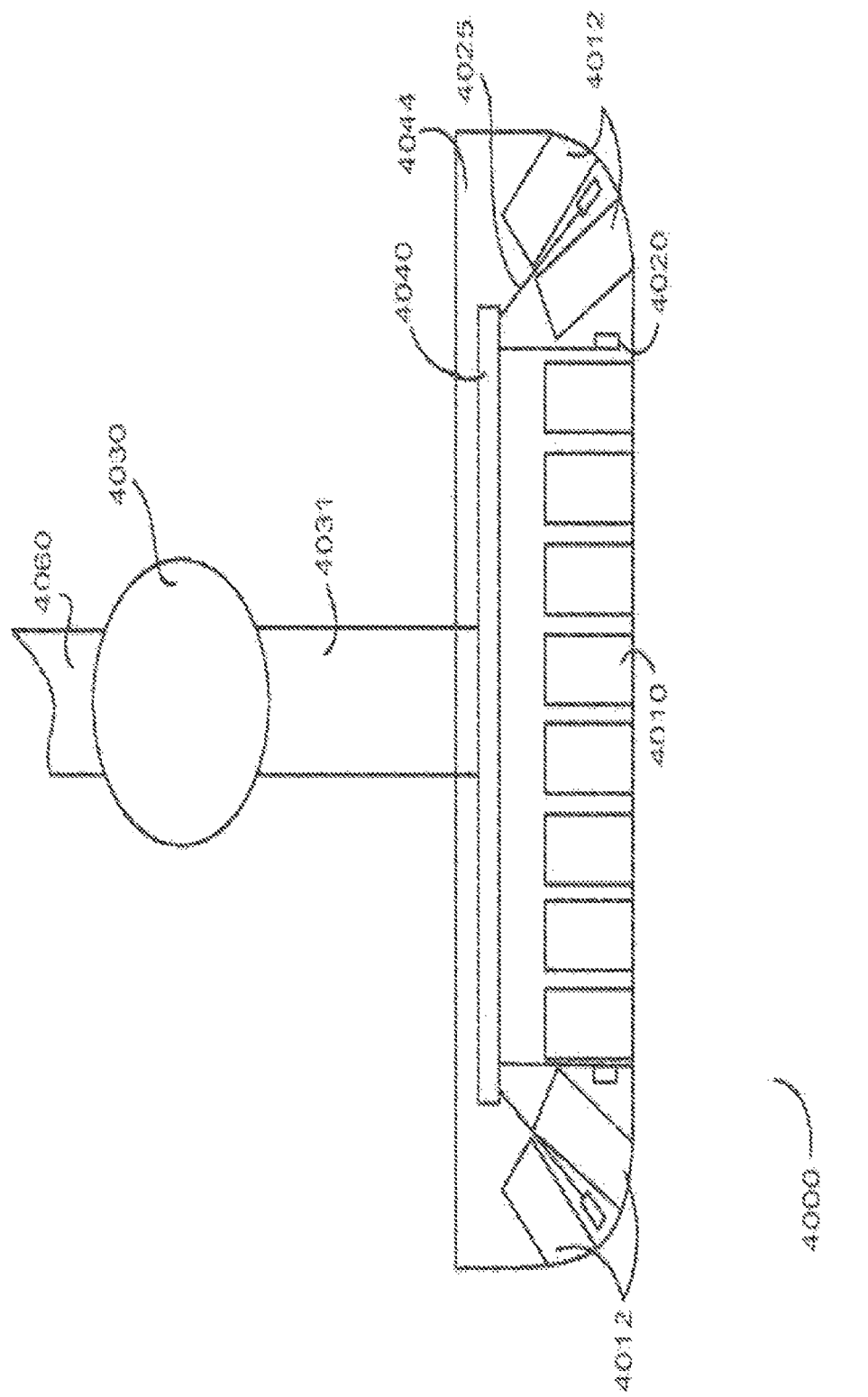
FIG. 40 is a schematic diagram of a robotic foot configured to provide mobility and balance.

FIG. 40 is a schematic diagram of a robotic foot 4000 configured to provide mobility and balance. The robotic foot 4000 may be connected to a robot skeletal component 4060 by an ankle ball joint 4030. A mechanical connection 4031 may couple the ankle ball joint 4030 to the foot 4000. The foot 4000 may include a plurality of sensors 4010, 4012, 4020 that can be used to determine balance. A support element 4040, stabilizers 4025, and a housing 4044 may provide structure and stability to the foot 4000. The support element 4040 may comprise a hard material, such as thermoplastic, carbon fiber, or metal.

The ankle ball joint 4030 may be configured to have two, three, or more or fewer degrees of freedom. The ankle ball joint 4030 may include one or more rotational hydraulic joints (not shown) configured to control movement of the foot 4000 and/or measure the angle of the foot 4000 relative to the robot skeletal component 4060. A processor (not shown) may control movement of the ankle ball joint 4030 to maintain balance based on feedback from the sensors 4010, 4012, 4020, measurements of the angle of the ankle joint 4030, measurements of the angles of other joints (not shown), and/or measurements and/or determinations of the speed of movement. In an embodiment, the foot 4000 may walk using a rolling effect similar to the rolling from heel to toe of a human foot during walking/running. The foot 4000 may be symmetrical and able to roll forward and backward or in three or four possible directions, and/or the foot 4000 may be unsymmetrical and only able to roll in one direction.

The foot 4000 may comprise a plurality of hydraulic linear displacement sensors 4010, 4012 in contact with the bottom of the foot 4000. In some embodiments, the linear displacement sensors 4010, 4012 may include hydraulic cylinders with pistons and not include hydraulic cylinders without pistons, because the foot 4000 may require less perpendicular resolution and higher resilience to strong forces. The linear displacement sensors may be configured with components able to withstand the higher pressures that may result from supporting the weight of a robot. In an embodiment, each linear displacement sensor 4010, 4012 may have a contact surface area of 1 square inch, and there may be a 12 by 4 array of linear displacement sensors 4010, 4012. Fewer linear displacement sensors 4010, 4012 may be suitable in other embodiments.

The linear displacement sensors 4010, 4012 may be configured to measure the contour of the ground and/or to measure the pressure on each sensor 4010, 4012. The contour and/or pressure measurements may be sent to the processor for use in determining weight shifting, weight distribution, and/or the like to maintain balance. A geographic contour map may be computed from displacement measurements by the linear displacement sensors 4010, 4012. The linear displacement sensors 4010, 4012 may be configured to detect rolling, shifting, and/or moving objects under the foot 4000 (e.g., when the foot 4000 is standing on marbles). Pressure sensors, such as series elastic or strain gauges, may be used to determine the pressure in each of the linear displacement sensors 4010, 4012, and/or the pressure may be determined from the displacement of each piston. Absolute and/or relative pressures may be computed. A robot may be loaded with a weight. The displacement of the linear displacement sensors 4010, 4012 may be load dependent for a given hydraulic line pressure, and the weight or mass of the load may be determined by the displacement of the sensors in the linear displacement sensors 4010, 4012. The load may be determined by knowing the weight of the robot, and the amount of pressure needed to linearly displace the pistons in the linear displacement sensors 4010, 4012. In some embodiments, the total weight of the robot including any load may be used to determine the pressure. The displacement-to-pressure calculation may be calibrated with any changes in load, and/or changes in load may be detected by the linear displacement sensors 4010, 4012. Angled linear displacement sensors 4012 may include angled end effectors and may detect ground contour, pressure, and/or shear forces as the foot 4000 leaves or touches the ground during rolling.

The linear displacement sensors 4010, 4012 may be able to level or alter the angle of the foot 4000 and/or conform the foot 4000 to the ground by regulating the pressure of fluid in each of the linear displacement sensors 4010, 4012. In an embodiment, the pressures may be equalized. The pressure in the linear displacement sensors 4010, 4012 may be controlled in response to the changing contact area during walking, such as when the foot 4000 is rolled during walking. The foot 4000 may include one or more pressure control valves (not shown) configured to regulate the pressure of each linear displacement sensor 4010, 4012. The pressure control valves may regulate the pressure with respect to the total weight of the robot and/or any load carried. The pressure control valves may regulate the pressure based on a known load. The pressure may be increased or decreased to maintain a desired separation distance of the sensor electrodes in 4010, 4012.

The foot 4000 may comprise one or more shear sensors 4020. The shear sensors may be located between one or more of the linear displacement sensors 4010, 4012, on each side of each linear displacement sensor 4010, 4012, and/or, the like. The shear sensors 4020 may be coupled to the support element 4040 by stabilizers 4025. The shear sensors 4020 may measure shear forces in one or more directions, such as two orthogonal directions (e.g., in the direction of travel and perpendicular to the direction of travel). The shear sensors 4020 may be used to determine the coefficient of friction between the foot 4000 and the ground. The coefficient of friction may be computed based on the pressure, total weight, angle, and/or shear force experienced by the foot 4000. The processor may use the determined coefficient of friction to improve mobility and/or balance on surfaces with different coefficients of friction. For example, a plurality of walking algorithms may be stored, and one or more appropriate walking algorithm may be selected based on the determined coefficient of friction. Alternatively, the parameters of one or more walking algorithms may be changed based on the determined coefficient of friction. The walking algorithms may control movement of the linear displacement sensors 4010, 4012 and/or ankle ball joint 4030. Measurements on a plurality of dry and/or wet surfaces, such as ice, sand, snow, dirt, mud, concrete, etc., may be used for calibration. The shear sensors 4020 may be configured to measure shear from when the foot 4000 first touches the ground until the foot 4000 leaves the ground even if the foot 4000 is rolled. Exemplary shear sensors may include piezoresistive sensors, PVDF sensors, electromagnetically coupled coils, such as are available from Blue Line Engineering, optoelectronic sensors, quartz sensors, capacitive sensors, and/or the like. Some shear sensors, such as a quartz sensor or fiber optic sensor, may be configured to measure more than one quantity, such as shear, pressure, and/or temperature The shear sensors 4020 may include cantilevers configured to be perpendicular to the ground as the foot rotates.

The housing 4044 may be an elastic sheet comprising thermoplastic, an elastomer, such as rubber, or the like. The housing 4044 may be configured to have a large coefficient of friction with certain and/or most materials, and/or the housing 4044 may include texture and/or roughness configured to increase traction like the tread of human shoes. In some embodiments, the foot 4000 and/or the housing 4044 may include a plurality of pressure sensors instead of or in addition to the linear displacement sensors 4010, 4012. The pressure sensors may be used to determine a weight and/or pressure distribution pattern. An array of pressure sensors may be able to determine the scalar differences of the distribution of pressure. The pressure sensors, shear sensors 4020, and/or linear displacement sensors 4010, 4012 may be insert molded into the housing 4044.

Figure 41A:
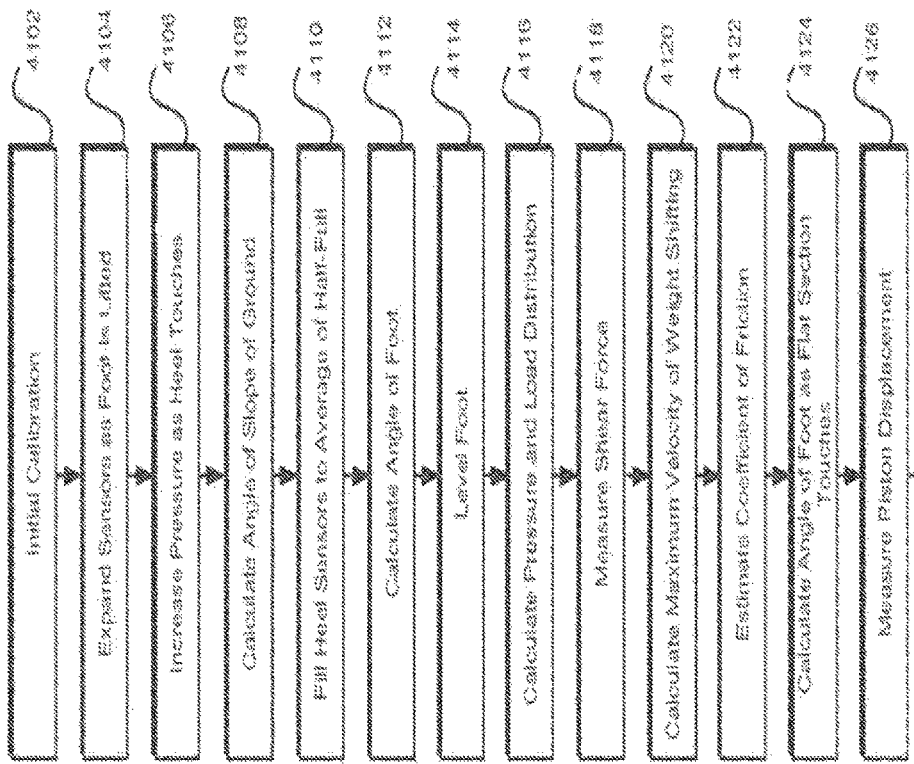
FIGS. 41A and 41B are a flow diagram of a method for walking using the robotic foot.
Figure 41B:
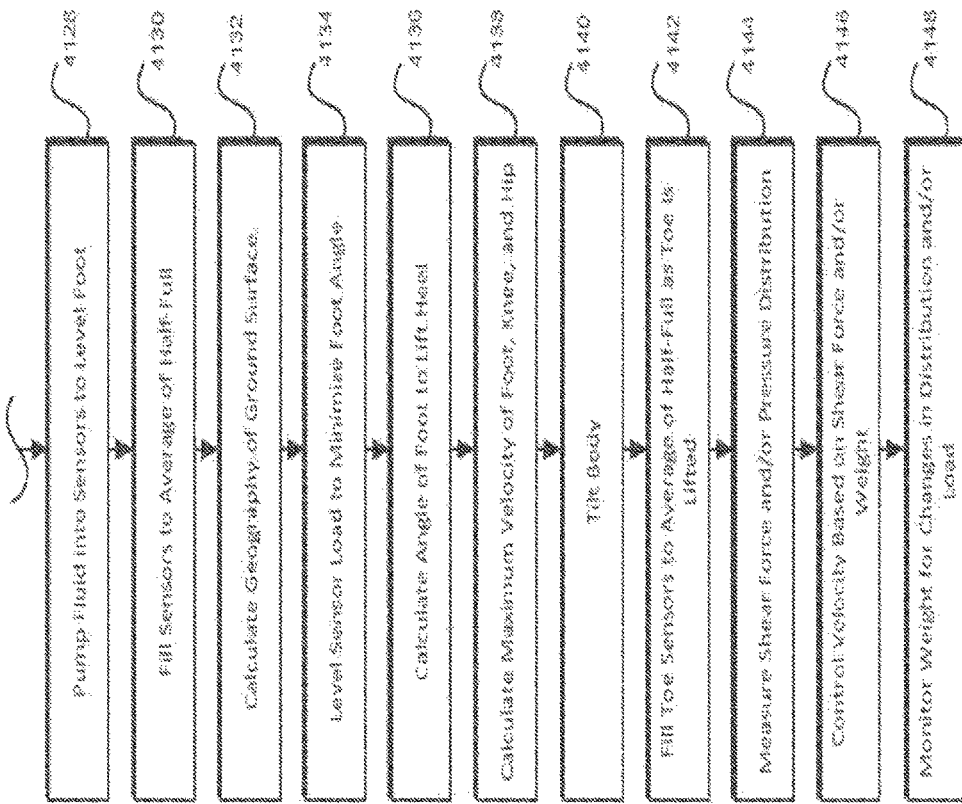

FIGS. 41A and 41B are a flow diagram of a method 4100 for walking using the robotic foot 4000. Various configurations of the robotic foot 4000 and/or alternate embodiments of robotic feet may be used with the method 4100 for walking. A robotic foot may include at least one shear sensor and/or at least one sensor from which a weight and/or load of the robot can be determined. A processor may be communicatively coupled with any sensors in the robotic foot. The processor may be configured to determine the coefficient of friction of a surface in contact with the robotic foot based on the sensor measurements.

An exemplary robotic foot 4000 for performing the method 4100 for walking may include a flat section with an 8 by 4 array of linear displacement sensors 4010 and heel and toe sections of the robotic foot 4000 each with a 2 by 4 array of linear displacement sensors 4012. The linear displacement sensors 4010, 4012 may be configured to act as hydraulic actuators and may each have a surface area of 1 square inch. The shear sensors 4020 may be located between the linear displacement sensors 4010, 4012 as needed. In some embodiments, a hydraulic pump may output a pressure of 30 psi or more to each displacement sensor. Higher pressures may be used in some embodiments depending on the application. A robot supported by the robotic foot 4000 may be 150 lbs. with a maximum load of 80 lbs in an embodiment. The hydraulic fluid may be distributed and/or controlled by servo control valves. The heel, toe, and flat section may each have one, two, or more separate servo control valves that control the corresponding section in common. A separate algorithm may be used to control the ankle joint 4030. The separate ankle algorithm may allow the ankle 4030 to angle the foot to conform to a desired surface, and/or a maximum tilt angle may be programmed into the processor. The ankle 4030 may be configured to enable higher force on specific portions of the foot's linear displacement sensors 4010, 4012. Ankle shifting may be detected on shifting surfaces, such as rocks, when the weight is shifted from one foot to the other, and weight distribution can be adjusted to correspond to surface stability.

The method 4100 may begin with initial calibration 4102 of the robot and load. Calibration may include mapping electrical property measurements for maximum and minimum extension positions to displacements, determining the weight of the robot and/or load, and/or the like. When walking begins, the robotic foot 4000 may be lifted from the ground, and all the linear displacement sensors 4010, 4012 may be expanded 4104 to the maximum extension position and filled with fluid. The robotic foot 4000 may return to the ground heel first. As the heel touches the ground, the force from the contact may push fluid out of the linear displacement sensors 4012 in the heel. A processor may detect that the linear displacement sensors 4012 are contracting and activate servo valves to increase 4106 pressure in and add fluid to the linear displacement sensors 4012 in the heel. From measurements by the linear displacement sensors 4012 in the heel, leg joints, and/or ankle joints 4030, the processor may calculate 4108 the angle of the slope of the ground.

The processor and servo control valves may maintain 4110 the linear displacement sensors 4012 at a level of half-full based on the measurements from the linear displacement sensors 4012. The level of the fluid within the linear displacement sensors 4012 may be averaged, and the average level may be maintained at half-full. The processor may calculate 4112 the angle of the robotic foot 4000. Based on the calculations, the robotic foot may be leveled 4114 by actuating the linear displacement sensors 4012. The processor may calculate 4116 the pressure distribution and/or the load attributed to each linear displacement sensor 4012. The load attributed to each linear displacement sensor may be calculated from the foot angle, hydraulic fluid pressure in the linear displacement sensors 4012 of the heel, displacement measured by the linear displacement sensors 4012, total robot weight, slope between the feet, and/or the like. The shear force (e.g., deflection of cantilevers within the shear sensors 4020) may be measured 4118. A maximum velocity for shifting weight between feet may be calculated 4120 based on the shear force, estimated load, ground slope, weight distribution, foot angle, and/or the like. A coefficient of friction may be estimated 4122 from the total weight, velocity, pressure distribution, foot angle, shear force, and/or the like.

As the flat section of the foot touches the ground, the processor may calculate 4124 the angle of the robotic foot 4000. The processor may measure 4126 piston displacement in the linear displacement sensors 4010 in the flat section of the robotic foot 4000. If some of the linear displacement sensors 4010 do not move during contact, the lack of movement may indicate that those linear displacement sensors 4010 are not touching the ground and/or bearing weight. Fluid may be pumped 4128 into the linear displacement sensors 4010 to level the robotic foot 4000. The processor may fill 4130 the linear displacement sensors 4010 to half-full. The processor may attempt to make all the linear displacement sensors 4010 half-full. If it is not possible to make all the linear displacement sensors 4010 half-full, the processor may settle with the average fluid height for the linear displacement sensors 4010 being half-full. Filling 4130 the linear displacement sensors 4010 may comprise increasing the pressure in the linear displacement sensors 4010 until the linear displacement sensors 4010 are distributed from maximum to minimum. In some embodiments, the pressure may be increased in only linear displacement sensors 4010 making contact with the ground.

The processor may calculate 4132 the geography of the ground surface from linear displacement measurements by the linear displacement sensors 4010. A pressure distribution profile may be used to level 4134 the load among the linear displacement sensors 4010 and minimize the angle of the robotic foot 4000. The processor may calculate 4136 the angle of the robotic foot 4000 necessary to lift the foot off the ground when rolling the foot from heel to toe. The angle may be calculated 4136 while the ankle joint 4030 rotates and the leg lifts to remove the heel and flat section of the robotic foot 4000 off the ground. The robotic foot 4000 may be held at an angle that maximizes pressure distribution on the toe section. The maximum velocity of the foot 4000, knee, and/or hip sections are calculated 4138 from the shear force, estimated coefficient of friction, pressure distribution, total weight, ground slope, and/or the like. The body may be tilted 4140 to correspond to the maximum velocity of the hip and/or the slope of the ground.

The linear displacement sensors 4012 in the toe may be filled 4142 to an average of half-full as the toe rotates, lifts, and pushes from the ground based on displacement measurements by the linear displacement sensors 4012. The processor may attempt to make the average fluid height half-full and as many of the linear displacement sensors 4012 half-full as possible. The shear force and/or pressure distribution may be measured 4144. The velocity may be controlled 4146 based on the shear force detected and/or the weight measurement. The maximum possible velocity may be directly proportional to the shear force detected with a higher shear force allowing for a faster possible velocity. The weight may be monitored 4148 for changes in distribution and/or load.

The total weight of the robot and load may be calculated from the pressure distribution of the linear displacement sensors 4010, 4012, the pressure output from the servo control valves, and/or the cumulative deflection of the pistons of the linear displacement sensors 4010, 4012 when all the weight is on one foot. The calculated value for total weight may be carried over from the previous step if no change is detected, and/or the weight may be detected with each step from the linear displacement sensor 4010, 4012 measurements and/or the hydraulic valve pressure necessary to elevate the foot as a load is lifted. The values for weight and coefficient of friction may be estimated as the heel touches the ground, as the flat section touches the ground, and/or as the toe leaves the ground. An initial estimated weight and/or mass may be determined from the weight of the robot without load. The weight of the robot without load may be input into and/or stored by the robot. The maximum velocity, acceleration, and/or deceleration may be calculated from the momentum (mass times velocity) of the robot, the estimated coefficient of friction between the foot and the ground surface, and/or the like. The maximum acceleration and/or deceleration may be the maximum change in velocity that will not cause the robotic foot 4000 to slip. If a loss of traction and/or slipping is detected, a new coefficient of friction may be calculated based on the amount of force being applied when the slipping occurred. The shear sensors 4020, linear displacement sensors 4010, 4012, displacement sensors in the ankle 4030, knee, and/or hip, and/or the like can be monitored to detect slipping. The processor may closely monitor slippage as a variable used when calculating the coefficient of friction.

It may be advantageous to keep a relatively low applied pressure to the linear displacement sensors 4010, 4012 before contact is made with the ground and increase the pressure as contact is made with the ground. Continuous feedback from the linear displacement sensors 4010, 4012, the shear sensors 4020, and/or the servo control valves may allow the processor to make instantaneous adjustments to the pressure in the linear displacement sensors as various changes in conditions are detected, such as a change in the perceived weight. The linear displacement sensors 4010, 4012 may be calibrated for weight as a function of servo control valve pressure regulation.

Figure 42:
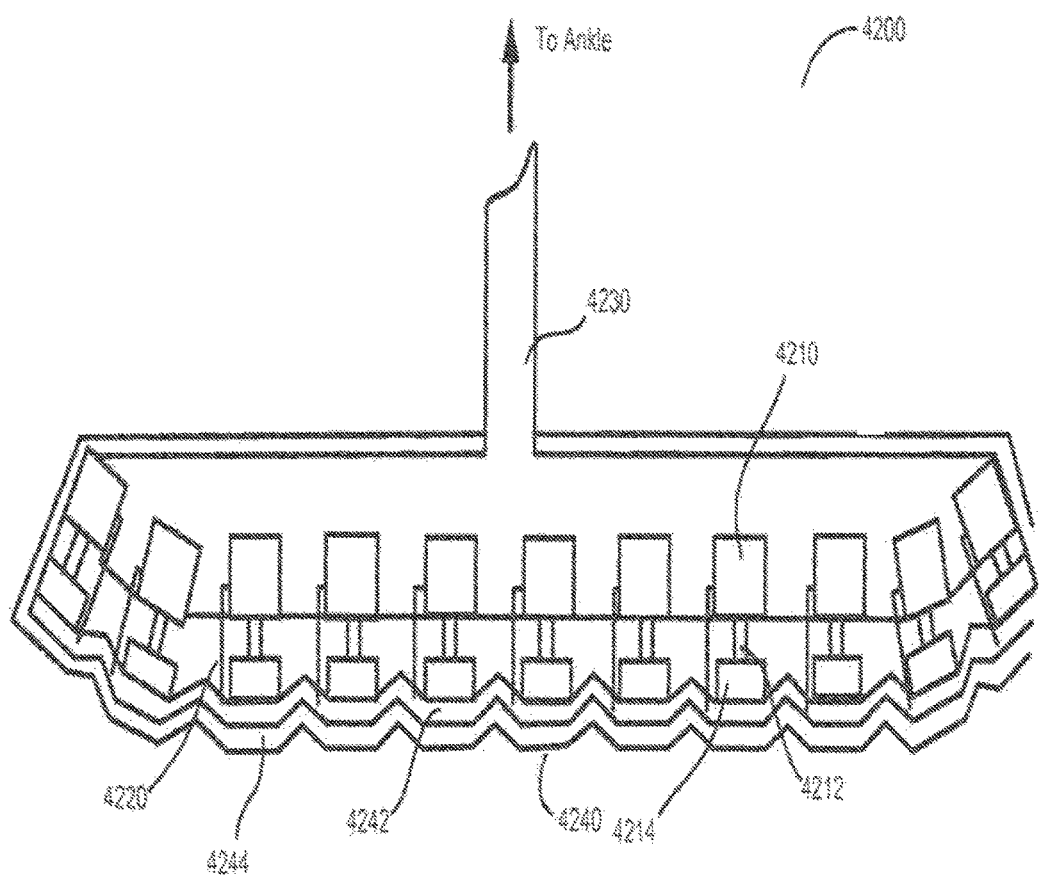
FIG. 42 is a schematic diagram of another embodiment of a robotic foot.

FIG. 42 is a schematic diagram of another embodiment of a robotic foot 4200. The robotic foot 4200 may use tactile sensing to determine walking variables. The robotic foot 4200 may include a plurality of linear hydraulic actuators/linear displacements sensors 4210. The linear displacement sensors 4210 may be mechanically coupled to a rigid support element 4230. The rigid support element 4230 may comprise a strong, light-weight material, such as aluminum, titanium, carbon fiber, thermoplastic, and/or the like. The linear displacement sensor 4210 may include a piston rod 4212 and a piston head 4214. The piston head 4214 may be coupled to a housing 4240 for a sole of the foot 4200. The linear displacement sensors 4210 and/or the housing 4240 may compress to cushion the impact of walking, running, and/or the like by the robot in a manner similar to foam rubber in human shoes. The bodies of the shear sensors 4220 may be integrated into and/or affixed to the piston and/or the piston head 4214 so that a constant distance may be maintained between the shear sensor cantilever and the housing 4240.

The housing 4240 may include one or more layers. In an embodiment, the housing 4240 may include a flexible layer 4244 in contact with the ground and a non-rigid layer 4242 coupled to the piston head 4214 and between the piston head 4214 and the flexible layer 4244. Alternatively, the foot 4200 may not include the non-rigid layer 4242 and/or the non-rigid layer 4242 and the flexible layer 4244 may be combined. The non-rigid layer 4242 may include foam, gel, air, liquid, and/or the like. The flexible layer 4244 may flex in response to movement of the linear displacement sensors 4210. For example, the flexible layer 4244 may include inverted v-shaped apexes between the linear displacement sensors 4210. The inverted v-shaped apexes may act as hinges to allow the housing 4240 to adhere to the linear displacement sensors 4210. A half-circle at the peak of the inverted v-shaped apexes may create the hinging action.

The foot 4200 may include a plurality of shear sensors 4220. A body of each shear sensor 4220 may be couple to and/or embedded in the rigid support element 4230 to act as a stationary reference. A movable cantilever of each shear sensor 4220 may be coupled to and/or embedded in the housing 4240 to maximize deflection. In some embodiments, the body of each shear sensor 4220 may be coupled to a corresponding linear displacement sensor 4210 so the shear sensor 4220 moves up and down with the linear displacement sensor 4210 (e.g., to prevent compression of the linear displacement sensors 4210 from causing deflection of the shear sensors 4220). Alternatively, or in addition, dowel rods (not shown) may allow the bodies of the shear sensors 4220 to move with the linear displacement sensors 4210.

The linear displacement sensors 4210 and the shear sensors 4220 may be rigidly coupled to a leg (not shown) and ankle (not shown) of the robot by the rigid support element 4230. The linear displacement sensors 4210 and shear sensors 4220 may be free to float and measure pressure, shear force, and/or the like with the rigid support element 4230 serving as a reference. The non-rigid layer 4242 and the flexible layer 4244 may create a region of shear that can be used to measure shear on the foot 4200 and determine the coefficient of friction between the ground surface and the foot 4200. The piston rod 4212 may be designed to deflect and/or to not deflect when undergoing shear. For example, the piston rod 4212, non-rigid layer 4242, and flexible layer 4244 may all deflect relative to the rigid support element 4230 for sufficiently high coefficients of friction.

Figure 43:
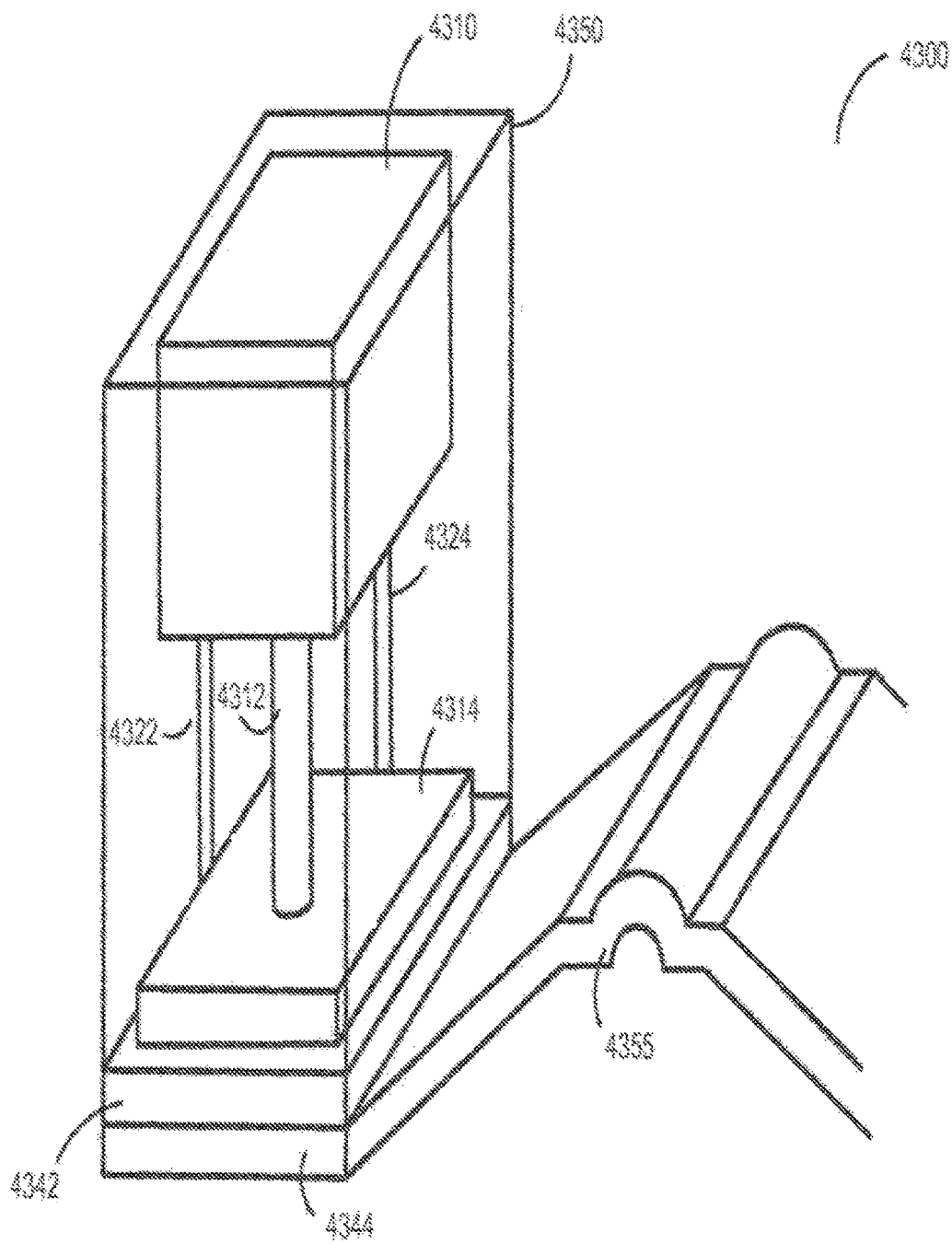
FIG. 43 is a schematic diagram of an individual sensing element from a robotic foot.

FIG. 43 is a schematic diagram of an individual sensing element 4300 from a robotic foot (e.g., the robotic foot 4200). The sensing element 4300 may be self-contained and may be attached to a rigid support element (e.g., the rigid support element 4230). The entire sensing element 4300 and the rigid support element may be insert molded into the flexible layer 4344, which may be a sealed rubber composite. The flexible layer 4344 may contain treads to increase the traction of the sole of the foot. The sensing element 4300 may include a housing 4350 in some embodiments. The sensing element 4300 may include a linear displacement sensor 4310 with a piston rod 4312 and a piston head 4314. Variously shaped linear displacement sensors 4310 may be used including the rectangular sensor illustrated, a circular sensor, a hexagonal sensor, and/or the like.

The sensing element 4300 may include a plurality of shear sensors 4322, 4324. The shear sensors 4322, 4324 may extend into a non-rigid layer 4342 and/or a flexible layer 4344. In some embodiments, the shear sensors 4322, 4324 may be coupled to the linear displacement sensor 4310, the piston rod 4312, and/or the piston head 4314 to maintain a constant distance between the shear sensors 4322, 4324 and the flexible layer 4344. The shear sensors 4322, 4324 may be located on non-opposing sides of the linear displacement sensor 4310 and may be configured to measure shear in two orthogonal directions. Alternatively, or in addition, the shear sensors may be self-contained and positioned on the end of the piston shaft heads 4314, and only electrical wires to the processor may be exposed. For example, the shear sensor may be an Integrated Shear Sensor available from Vista Medical. The linear displacement sensor 4310 and shear sensors 4322, 4324 may be able to measure force and/or force per unit area in three orthogonal directions.

The sensing element 4300 may include and/or be coupled to the non-rigid layer 4342 and/or the flexible layer 4344. Each sensing element 4300 may also include and/or be coupled to one or more hinges 4355 (e.g., an elastomer hinge). The hinge 4355 may be molded into the flexible layer 4344. In some embodiments, the hinge 4355 may include different materials and/or have a different thickness than the flexible layer 4344. The non-rigid layer 4342 may include a liquid, gel, gas, foam, and/or the like that allow the piston head 4314 to move easily relative to the flexible layer 4344. The adjustable depth of the non-rigid layer 4342 may improve precision and/or accuracy of the deflection measurements of the flexible layer 4344 by the shear sensors 4322, 4324. The amount of deflection of the shear sensors 4322, 4324 may depend on the angle of the foot, weight applied to the linear displacement sensor 4310, velocity, position of the linear displacement sensor 4310, fill substance for the non-rigid layer 4342, ground material, and/or the like.

When weight is applied to the linear displacement sensor 4310, the rate of change of the displacement measurements may be used to identify the substance on which the foot is walking (e.g., concrete, mud, foam, snow, sand, etc.). A processor may continually monitor the ground substance in relation to leg velocity, fluid pressure to the linear displacement sensor 4310, weight, foot angle, and/or the like. A processor may monitor a rate of change of weight transferred to the foot relative to the compression velocity of the linear displacement sensor 4310 once contact with the ground by the foot is detected. Based on the rate of change, the processor may detect a pressure sensitive ground surface (e.g., a ground surface, such as mud, that compresses significantly when weight is applied). The processor may compute a compression rate according to the equation:

$$\text{Ground Compression Ratio} = \frac{\frac{dx_S}{dt}}{\frac{dx_F}{dt}} \quad (13)$$

where $$\frac{dx_S}{dt}$$

is compression velocity of the linear displacement sensor 4310 (e.g., the rate of change of the displacement measurements) and $$\frac{dx_F}{dt}$$

is the velocity of a robot leg/foot in a vertical and/or horizontal direction (e.g., the velocity of ankle joint in the direction of descent). The hand may also measure the compression ratio, for example, to determine the hardness of an object in the hand.

The ground compression ratio may compare the velocity of the leg with the velocity determined from the measurements of the linear displacement sensor 4310. A lower ratio value may indicate a more pressure sensitive ground surface material. Because the ratio may depend on the pressure of hydraulic fluid being supplied to the linear displacement sensor 4310, the processor may calibrate measurements of ground compression ratio and/or store ratio values for various ground surfaces. The processor may predict characteristics of the ground from the ratio. The processor may use a threshold to determine whether the ground is compressible, movable, deformable, and/or the like (e.g., a ratio less than the threshold may indicate unsolid ground, such as mud, snow, sand, etc.). The threshold may be determined from calibration and/or the linear displacement sensor 4310 be calibrated to have a predetermined threshold (e.g., a threshold less than one or greater than one depending on the selection of numerator and denominator). The ratio may vary for different robot weights, so the compression ratio may be calibrated for different weights. Alternatively, or in addition, a plurality of ratios may be stored for different materials and weights.

During walking, the processor may measure the rate of change over time of the position measured by the linear displacement sensor 4310 and divide by the rate of change over time of the position of the ankle joint as determined by the processor. The processor may only begin computing the ratio when the foot begins touching the ground. In embodiments that pump additional fluid to the linear displacement sensor 4310 as the foot touches, the expected movement due to the additional fluid may be subtracted and/or corrected for when computing the compression velocity. Knowing the horizontal and/or vertical components of the velocity of the ankle may aid in determining the expected compression velocity for a solid surface, which may be compared to the actual compression velocity detected when the foot touches the ground. The processor may adjust walking algorithms based on the computed ground compression ratio. The ability to identify ground surfaces with different amounts of compression may improve versatility of the robot by allowing it to walk over varied ground surfaces. The compression rate may also, or instead, be computed for a robotic hand gripping an object to determine compressibility and/or rigidity of the object being grasped, which may be used for calculating the pressure applied to the object.

Figure 44:
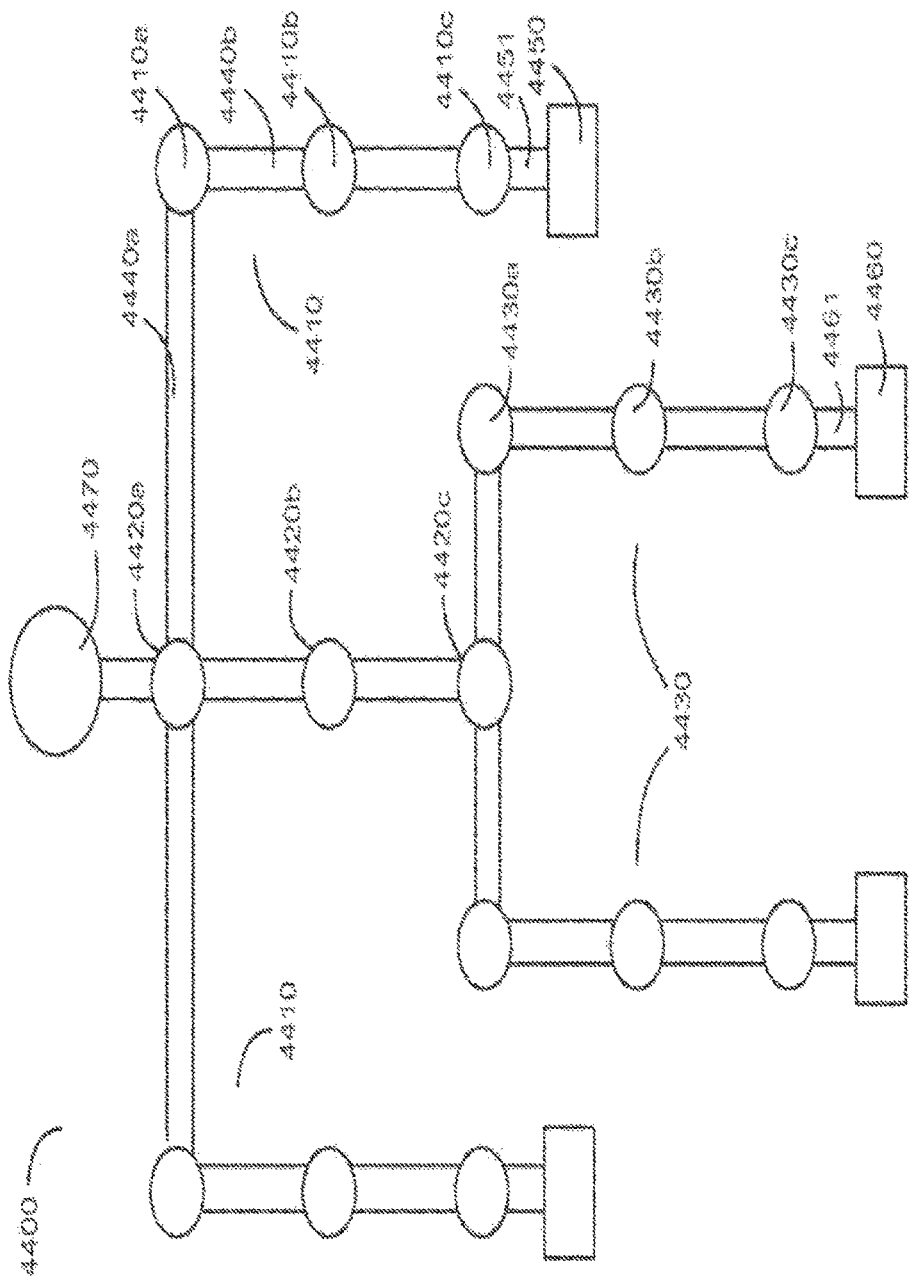
FIG. 44 is a schematic diagram of a complete skeleton system for a robot.

FIG. 44 is a schematic diagram of a complete skeleton system 4400 for a robot. The skeleton system 4400 may include a plurality of compound joints (e.g. joints 4410a-c, 4420a-c, 4430a-c) connected together by skeleton sections (e.g., skeleton sections 4440a, 4440b) including one or more skeletal components, each of which may or may not include batteries. The plurality of joints may be configured to move in a manner similar to human joints. For example, a shoulder joint 4410a may have three degrees of freedom, an elbow joint 4410b may have one degree of freedom, a wrist joint 4410c may have two degrees of freedom, a neck joint 4420a may have two degrees of freedom, a spinal column joint 4420b may have one or two degrees of freedom, a waist joint 4420c may have two degrees of freedom, a hip joint 4430a may have three degrees of freedom, a knee joint 4430b may have one degree of freedom, and an ankle 4430c joint may have two degrees of freedom. More or fewer degrees of freedom may be included in some embodiments. Hands 4450 and feet 4460 may be coupled to the skeleton 4400 by mechanical connections (e.g., mechanical connections 4451, 4461).

The skeleton system 4400 may include a head 4470. The head 4470 may be coupled to the skeleton system 4400 by a joint (not shown) with two degrees of freedom. The head 4470 may include vision systems, audio systems, various sensory systems, and/or the like. Examples of sensory systems may include gyroscopes, stereo cameras, sonic sensors, LIDAR, optical sensors, and the like. The skeleton system 4400 may also include a central hydraulic pumping system (not shown) and reservoir (not shown). One pump may be configured to deliver fluid to all of the joints 4410a-c, 4420a-c, 4430a-c; one pump may be used for each limb 4410, 4430; and/or the skeleton system 4400 may include more or fewer than one pump or one pump per limb. In an embodiment, the hydraulic pumping system and reservoir are located in a torso and/or body of the robot. The joint motions may be controlled by hydraulic valves for each joint individually with a central hydraulic pump. The pump may supply a positive pressure to the hydraulic valves.

Each compound joint 4410a-c, 4420a-c, 4430a-c may contain one or more flow meters, and/or each constituent joint within the compound joints 4410a-c, 4420a-c, 4430a-c may contain or be coupled to one or more flow meters. Each pump and/or reservoir (not shown) may also include flow meters. By monitoring the total flow of fluid through each joint 4410a-c, 4420a-c, 4430a-c, leaks may be detected. The flow of fluid into each joint 4410a-c, 4420a-c, 4430a-c may be compared with the flow of fluid out of each joint 4410a-c, 4420a-c, 4430a-c, and/or the total flow out of the pump and/or reservoir may be compared with the total flow through all the joints 4410a-c, 4420a-c, 4430a-c. If it is determined that the hydraulic system is leaking, the hydraulic system and/or components of the hydraulic system may be deactivated. Grippers and/or the skeletal components 4440a, 4440b may also include flow meters to detect leaks.

One or more processors (not shown) may send signals to control valves for each joint 4410a-c, 4420a-c, 4430a-c to control movement of each joint 4410a-c, 4420a-c, 4430a-c, the hands 4450, and the feet 4460. In an embodiment, different processors may perform different functions, such as one processor implementing a walking algorithm and another implementing a gripping algorithm, and/or one or more processors may include multiple cores configured to perform different functions and/or to process different threads. The one or more processors may receive measurements from joint measurement cells and/or encoders to determine the locations of the limbs 4410, 4430, the hands 4450, and/or the feet 4460 and/or identify objects in hands 4450 and/or grippers. The one or more processors may be located in the head 4470, torso, body, or the like and/or may be distributed throughout the robot 4400 based on function. The skeleton system may include a power inlet for receiving electrical power and battery charging and discharging hardware and/or software. The inlet, hardware, and/or software may be located in the head 4470, torso, body, or the like. The robot may include an outer suit (not shown) that covers the skeleton 4400 and thermally insulates internal components from extreme external temperatures. The outer suit may include heating elements and/or cooling elements (e.g., thermoelectric elements) to regulate temperature of the robot.

Control Systems

A robot may include control systems, such as one or more general or specific processors that run software programs configured to control movement of the robot. The control systems may control mobility and manipulation, such as walking, assembly, and/or the like, by the robot. For the processors to correctly determine which action to take, the processors may need to receive data that accurately represents the environment and/or objects with which the robot is interacting. The environment and/or objects information may be derived from vision systems. Such vision system may or may not model an object and compare to models from CAD programs, such as AutoCAD, or real-time imaging. Much of the data may be derived from tactile sensing, and the data may correlate tactile sensing with vision data (e.g., a 3D or 2D model of an object). The data may include a geographic model of an object in a gripper (e.g., a geographic model computed from distance measurements and/or vision generated models/imaging); a material of the object (e.g., determined from permittivity and/or resistivity measurements); a pressure distribution of weight on one or more robotic feet; a mapped contour of a surface in contact with the feet; positions of the joints, feet, hands, objects, and/or the like; an angle of the feet; a weight of the object; a detection of ground shifting and/or instability, an angle and/or position of a body of the robot; a coefficient of friction between the feet and the surface in contact with the feet; the slope of the surface under the feet; and/or the like. The system may correlate ground surface conditions from visual sensors to establish a proper placement of a foot. The placement of the foot may constitute a command to go to a coordinate position. The processors may confirm a position of the foot from tactile sensors of the foot, an angle of the foot, a slope of the ground, and a distance between the feet, which may or may not be derived from vision system data, such as may be acquired by stereo vision, RADAR, LIDAR, and/or the like.

The control system may determine values for the data based on measurements received from one or more sensors.

The data may be stored as a plurality of variables. The control system may monitor sensor measurements continually, at predetermined intervals, when needed, and/or the like to update the variables as the measurements change. Decisions by the control system may be updated based on the variables to form a feedback loop. Variables may include body angle, velocity (e.g., leg displacement), acceleration, foot angle, ground surface contour, surface conformity of a foot to the ground, ground surface material, coefficient of friction for the foot, ground slope, robot weight, and/or the like. Additional variables may include measurements from flywheels, gyroscopes, and/or the like.

For example, one or more control systems may be configured to control walking according to one or more walking algorithms. The walking algorithms may be configured to control movement of various legged or non-legged robots using the variables. The control systems may calculate variables from relevant sensor measurements and use the walking algorithms to determine control system responses. The control system responses may be modified based on feedback received in the form of updated variable values. The variables may be determined based on measurements from foot, ankle, knee, and hip sensors, vision, and/or the like. In an embodiment, foot and/or ankle sensors may be used to calculate the coefficient of friction, and hip and/or knee sensors may be used to calculate ground slope, acceleration, velocity, and/or the like.

The rotational displacement sensors in the hip and/or knee may be used for trajectory planning and/or to compute the velocity and/or acceleration of the robot. The velocity of the feet can be determined from the angular velocity of the rotational displacement sensors and the lengths of the upper and lower portions of the leg. The velocity of the robot can be extrapolated from the velocity of the feet. Alternatively, or in addition, the velocity of the feet and/or the robot may be determined from flow rates of hydraulic fluid and/or by using velocity meters. The acceleration of the robot may be determined based on the rate of change of the velocity, and/or one or more acceleration sensors, such as accelerometers, flywheels, tilt meters, and the like, may be used to determine the acceleration.

The body angle may also affect the velocity and/or balance, and the body angle may be controlled and/or coordinated based on a projected and/or desired velocity. The current velocity may be computed based on the body angle, foot angle, ground slope, leg joint displacement speed, and/or the like. The velocity, the body angle, and/or the like may be modified appropriately based on the detected conditions. For example, different velocities, accelerations, and/or body angles may be used for uphill walking versus downhill walking or climbing stairs or ladders. The measured angle of the ground slope, the coefficient of friction, leg joint displacement speed, foot data measurements, and/or the like may be used by the walking algorithms to determine a desired body angle and/or leg velocity. The body angle may be adjusted based on feedback from one or more variables, and/or the body angle may be used to control motion of the robot. In an embodiment, a tilt sensor and/or an accelerometer may provide feedback to the processors for controlling the body angle and/or motion of the robot. Variables used in determining body angle may include the coefficient of friction between one or more feet and the ground, a desired and/or current velocity, a desired and/or current acceleration, the ground slope, conformity of the foot to the ground, pressure distribution of the foot on the ground, and/or the like.

Foot placement and balance may also be important for robot mobility. Pressure sensors in the robotic foot may create a pressure distribution profile as the foot is placed on the ground. Based on the pressure distribution profile, the foot can be leveled and/or the pressure equalized by angling the ankle, adjusting linear displacement sensors in the foot, and/or the like. In some embodiments, the angle of the foot, angle of the body, velocity, coefficient of friction, ground surface contour, and/or the like may be used by the processor in combination with the pressure distribution profile to optimally control balance and mobility.

The angle of the foot may be adjusted to match the angle of the ground to maintain balance. The ankle joint may include 1, 2, 3, or more axes in some embodiments to allow the foot to align with the gross ground surface contour. Rotational hydraulic joints controlling movement in 2 or 3 axes of the ankle joint may allow the foot to adapt to complex surface angles and roll during walking. The ankle joint may also provide feedback on the angle of the foot, which may be determined relative to horizontal. Based on the feedback on the foot angle, body angle, pressure distribution, and/or the like, the processor may adjust the robot weight to maximize balance. The processor may detect shifting of the ankle joint, which may indicate shifting of the ground, an instability in the ground, and/or the like (e.g., movement of unstable rocks). The angle between the leg and the ankle may also be monitored.

The linear displacement sensors in the foot may allow the foot to conform to the surface of the ground and/or geographically map the surface of the ground to give a detailed description of the pressure distribution. The geographic mapping may improve weight shifting and/or distribution during movement of the robot. The linear displacement sensors may be integrated into the bottom of the foot and therefore may need to withstand higher pressure loads than, for example, sensors in the hand. The pressure inside the linear displacement sensors may be regulated with respect to total weight. The displacement measurements by the linear displacement sensors may be calibrated based on fluid pressure, weight, and/or the like. Because high resolution may not be needed in many embodiments and strength may be needed, the smallest, most fragile displacement sensors used in, for example, the hand may be omitted from the foot. In an embodiment, the side of the contact head may be one inch long, and the linear displacement sensor may displace longitudinally by ¼ to ½ inch.

An elastic covering (e.g., a single elastic sheet) may be attached to the linear displacement sensors and may cover the bottom of the foot. For example, the linear displacement sensors may be insert molded into a thermoplastic and/or rubber housing. The elastic covering may include pressure sensors for determining a weight distribution pattern. The pressure sensors in the elastic covering may obviate the need for any other pressure sensors. The pressure sensors may be placed in series with the linear displacement sensors to form a series elastic element that can better characterize measurements of normal force/pressure. The series elastic element may include a series elastic actuator, a linear variable differential transformer, a rotary variable differential transformer, a strain gauge, a PVDF sensor, a force-sensing resistor, a vacuum diode force sensor, a capacitive tactile sensor, a piezoelectric force sensor, and/or the like. Based on the measured pressures, the control system may adjust the linear displacement sensors to regulate the pressure distribution and level the robotic foot. The measured pressures may also, or instead, be used to determine a pressure distribution profile.

As the robot walks, the control system may mimic human walking by adjusting the angle of the foot to roll the foot from heel to toe. The walking algorithms may be configured to control the angle of the ankle joint in one, two, three, or more axes during walking. Additionally, the pressure of fluid in the linear displacement sensors may be adjusted as the foot rolls to compensate for variations in pressure distribution as the contact area of the foot changes and/or based on the contour of the ground surface. Pressure may be increased for small and/or shrinking contact areas and decreased for large and/or growing contact areas. The pressure may be kept relatively low before the foot contacts the ground, and the pressure may be increased as contact is made with the ground. Instantaneous adjustments to the pressure may be made based on measured changes to the weight profile on the foot. The pressure may also, or instead, be adjusted based on feedback from pressure and/or displacement sensors. The control system may detect which linear displacement sensors are not in contact with the ground due to the contour of the ground from the displacement measurements of the linear displacement sensors. The pressure may be adjusted so the linear displacement sensors in contact with the ground can support the weight of the robot and any load. Additionally, the pressure levels may be adjusted based on the measured coefficient of friction.

In determining movements, the walking algorithms may compensate for the variations in the coefficient of friction to allow for walking over different surfaces. The coefficient of friction may be calculated from the foot angle, shear sensor deflection, weight, and/or the like. The control system may determine the friction force operating on the bottom of the foot, for example, by measuring deflection of the shear sensors. Some deflection may occur due to elongation of the covering on the bottom of the foot, so the covering may be selected to elongate by a predetermined amount, and/or the control system may compensate for elongation. The coefficient of friction may be monitored throughout rolling of the foot from when the heel touches the ground until the toe leaves the ground. Deflection of the shear sensors may occur when the foot touches the ground and continue throughout rolling of the foot, since friction is required for movement. The walking algorithms may determine the maximum velocity and/or body angle that maintains traction from the measured coefficient of friction, the slope angle, the foot angle, and/or the like. The coefficient of friction may be continuously updated as the pressure distribution changes. The walking algorithms may monitor the coefficient of friction during walking and make instantaneous adjustments based on updates to the coefficient of friction.

The control system may detect a loss of traction by monitoring for a sudden drop in the measured coefficient of friction and/or a sudden decrease in the shear force measured by the shear sensors. For example, the control system may determine anticipated changes in the coefficient of friction as the foot rolls, and a loss of traction may be recognized if the coefficient of friction drops more than anticipated. The actual coefficient of friction may be determinable only when the foot loses traction, calculation prior to a loss of traction may be minimum bounds for the coefficient of friction. The maximum coefficient of friction just before traction was lost may be saved as the coefficient of friction. When traction is lost, static friction may change to kinetic friction. Because a kinetic coefficient of friction may be less than a static coefficient of friction, the control system may estimate maneuvers that will cause a loss of traction and adjust walking to maintain static friction.

Figure 45:
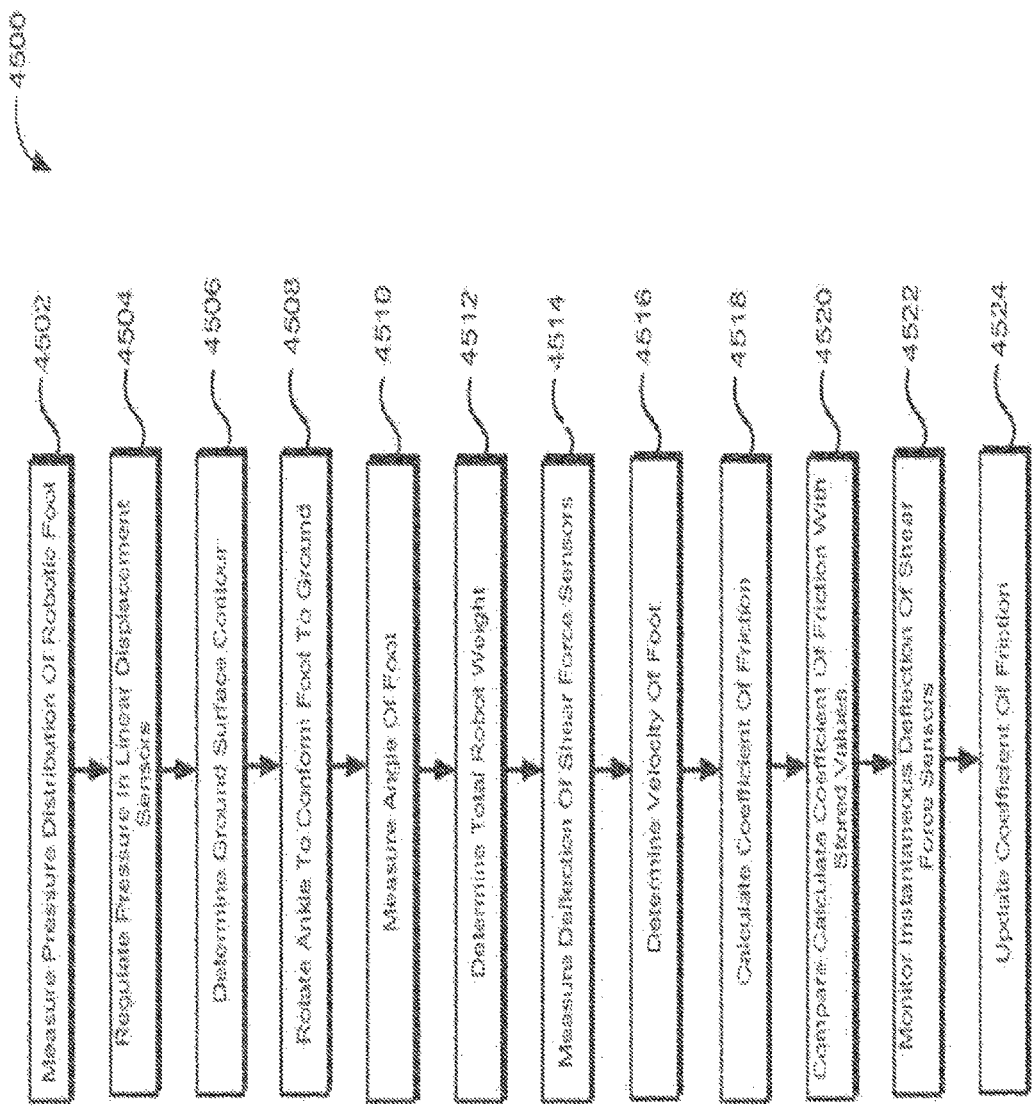
FIG. 45 is a flow diagram of a method for calculating a coefficient of friction from measurements by foot sensors during walking.

FIG. 45 is a flow diagram of a method 4500 for calculating a coefficient of friction from measurements by foot sensors during walking. The coefficient of friction may be used to determine an appropriate walking algorithm and/or to determine one or more parameters of a walking algorithm. The coefficient of friction may be determined from the friction force and the normal force according to the equation:

$$F_f \leq \mu F_n \tag{14}$$

wherein $F_f$ is the friction force, $\mu$ is the coefficient of friction, and $F_n$ is the normal force. A single coefficient of friction may be calculated for a robotic foot (e.g., the robotic foot 4000) and/or a plurality of coefficients of friction may be computed at a plurality of locations on the robotic foot based on measurements from shear sensors.

For example, the shear stress r at an area of the robotic foot may be:

$$\tau = \frac{F_s}{A} \tag{15}$$

wherein $F_s$ is the shear force and A is the area on which the shear force is acting. The pressure P at an area of the robotic foot may be:

$$P = \frac{F_g}{A} \tag{16}$$

wherein $F_g$ is the force from gravity. Because the shear force may equal the friction force, the coefficient of friction may be computed as:

$$\mu \geq \frac{F_f}{F_n} = \frac{F_s}{F_g \cos\theta} = \frac{\tau}{P \cos\theta} \tag{17}$$

wherein θ is the angle between the normal force and the gravitational force, if the areas over which the shear stress and pressure are measured are equal. Accordingly, the coefficient of friction for any area of the foot may be computed from the shear stress and the pressure for that area (e.g., as the frictional force per unit area divided by the normal force per unit area). For example, if the shear stress and pressure are measured over increments of one square inch, the coefficient of friction may be determined down to increments of one square inch. The area over which the coefficient of friction is determined may be the area of the foot, the area of a sensor, the total area of the all foot sensors in the foot, and/or the like for each foot separately or collectively.

A minimum, maximum, average, and/or median value from a plurality of coefficient of friction values and/or the like may be used as an overall coefficient of friction for the foot. The overall coefficient of friction may be a single number that indicates the ability of the foot to maintain traction. The coefficient of friction may be sufficient to characterize the material of the ground, and the robot may not need to otherwise identify the ground material. The overall coefficient of friction may be used to calculate a maximum velocity and/or body angle before loss of traction will likely occur for particular angles of the ground surface. Alternatively, or in addition, coefficient of friction values for individual areas and/or differentials determined based on the individual coefficient of friction values may be monitored by the processor, for example, to detect loss of traction for the individual areas.

Shear sensors (e.g., the shear sensors 4020) and pressure/force sensors (e.g., the linear displacement sensors 4010, 4012) may be used to determine the shear stress and pressure for different areas of the robotic foot 4000. In some embodiments, there may be a plurality of pressure/force sensors, and each pressure/force sensor may be in series mechanically with one or more of the linear displacement sensors 4010, 4012. The pressure/force sensor may include a series elastic actuator, a linear variable differential transformer, a rotary variable differential transformer, a strain gauge, a polyvinylidene fluoride sensor, a force-sensing resistor, a vacuum diode force sensor, a capacitive tactile sensor, a piezoelectric or piezoresistive force sensor, and/or the like. The linear displacement sensors 4010, 4012 and the shear sensors 4020 may be configured to measure pressure and shear stress over corresponding, identically sized areas (e.g., areas of one square inch).

To determine the coefficient of friction, the linear displacement sensors 4010, 4012 may begin by measuring 4502 the pressure distribution of the robotic foot 4000 among the linear displacement sensors 4010, 4012. A processor may regulate 4504 pressure in the linear displacement sensors to equalize pressure distribution for the robotic foot 4000. The processor may then determine 4506 the ground surface contour in contact with the robotic foot 4000 from linear displacement measurements received from the linear displacement sensors 4010, 4012.

An ankle joint (e.g., the ankle joint 4030) may be rotated 4508 to allow the foot 4000 to conform to the ground surface. The pressure of the ankle joint 4030 may be controlled based on the total weight to allow the robotic foot 4000 to rotate to conform to the ground surface on contact. The ankle joint 4030 may include one, two, three, or more rotational displacement sensors configured to measure 4510 an angle of the foot 4000, for example, in three orthogonal direction. The angle of the foot 4000 may be determined from an ankle angle, a knee angle, a hip angle, and/or the like. The angle of the foot 4000 may be determined relative to a direction of a gravitational force. For example, an accelerometer, a gyroscope, and/or the like may be used to determine the direction of the gravitational force. The angle of the foot 4000 may then be used to determine the angle θ from equation 17. Using the angle θ, the normal force and/or normal pressure may be determined from the total robot weight including load. The foot angle may be controlled for rolling of the foot during normal walking/movement. The foot angle determined from the rotational displacement sensor in the ankle joint may be used rather than the ground slope when calculating the coefficient of friction, normal force, friction force, and/or shear force. In other embodiments, the ground slope may be used.

The processor may determine 4512 the total robot weight including load and/or the pressure at each of the linear displacement sensors 4010, 4012, which may be used to determine the normal force and/or normal pressure. The processor may also receive 4514 measurements of the deflection of the shear force sensors 4020. The processor may determine the shear force and/or the shear stress from the deflection measurements of the shear force sensors 4020. For example, the processor may have calibrated the shear sensors 4020 so that the processor can determine the shear stress and/or shear force based on deflection measurements. The shear sensors 4020 may be calibrated for different ground surface materials with and/or without lubricants and/or liquids on the surface. In some embodiments, the processor may determine 4516 the velocity of the foot. The deflection of the shear sensors 4020 may be dependent on the velocity at the point of contact of the foot 4000 with the ground. The velocity of the foot 4000 may be calibrated to the weight, ground surface materials and/or conditions, and/or the like to determine the velocities effect on the shear sensor 4020 deflection.

The processor may calculate 4518 the coefficient of friction. The coefficient of friction may be calculated based on the total robot weight including load, the pressure distribution, the shear sensor deflection, a velocity of the robotic foot 4000 and/or the robot, the ground slope, the foot angle, and/or the like. The coefficient of friction may be computed for the plurality of linear displacement sensors 4010, 4012 and/or shear sensors 4020 collectively and/or for each linear displacement sensor 4010, 4012 and/or shear sensor 4020 separately. The processor may be calibrated to determine the coefficient of friction from measured ratios of shear force to weight and/or shear stress to pressure for various ground surface materials with or without an angle of the foot 4000. The calculated coefficient of friction may be compared 4520 by the processor with stored coefficient of friction values to determine walking parameters (e.g., maximum velocity, maximum acceleration, and/or the like). Balancing, velocity, acceleration, and/or the like for the robot may be controlled based on the calculated coefficient of friction and/or the total weight, the body angle, the foot angle, the shear sensor deflection, a contact surface area between the foot 4000 and the ground, the ground slope, and/or the like. The body angle may be adjusted based on the calculated velocity, acceleration, coefficient of friction, ground slope, and/or the like.

The processor may continue to monitor 4522 the instantaneous deflection of the shear sensors and update 4524 the coefficient of friction. When the foot 4000 is not moving, the calculated coefficient of friction may be a lower bound for a static coefficient of friction. While monitoring 4522, the processor may save the maximum (or minimum) calculated coefficient of friction as the static coefficient of friction. For example, if the processor calculates a current coefficient of friction as being greater (or lower) than a previously saved coefficient of friction, the processor may replace the previously saved coefficient of friction with the current coefficient of friction. When a loss of traction is detected, a calculated coefficient of friction may be stored as a kinetic coefficient of friction.

A loss of traction may be detected by monitoring the shear sensor deflection for unexpected reductions in deflection (e.g., the processor expects the shear force to increase based on commands to the robotic foot but instead detects a sudden decline in shear force). In some embodiments, the processor may assume that at least some amount of shear will be detected before a loss of traction occurs. The processor may also detect changes in ground material and/or changes in the static coefficient of friction by detecting a loss of traction when the static coefficient of friction indicates a loss of traction should not occur. An unexpected loss of traction may indicate the estimated coefficient of friction was too high. The static coefficient of friction may then be updated to the maximum coefficient of friction calculated immediately prior to the loss of traction, below the point of loss of traction, and/or at the point of loss of traction.

When the change to kinetic friction is detected, the processor may also attempt to adjust velocity, acceleration, body angle, and/or the like to restore static friction based on the instantaneous measurements of shear, weight, pressure, body angle, foot angle, ground slope, and/or the like. The algorithms for adjusting to loss of static friction may be optimized based on the section of the foot in contact with the ground (e.g., based on whether the heel, toe, and/or flat section of the foot is in contact with the ground). It may be advantageous to detect the static coefficient of friction at the point of loss of traction when weight is transitioned to or from the heel or toe sections, since more pressure may be applied and it may be easier to recover from the loss of traction. Additionally, differences in the pressure of each linear displacement sensors 4010, 4012 may allow a single shear sensor 4020 to detect loss of traction without a complete loss of traction. A loss of traction at a single shear sensor 4020 may be easier to recover from than a complete loss of traction.

Although the method 4500 of calculating the coefficient friction is described with specific reference to the robotic foot 4000, those of skill in the art will recognize many different embodiments of robotic feet with which the method 4500 may be implemented.

Figure 46:
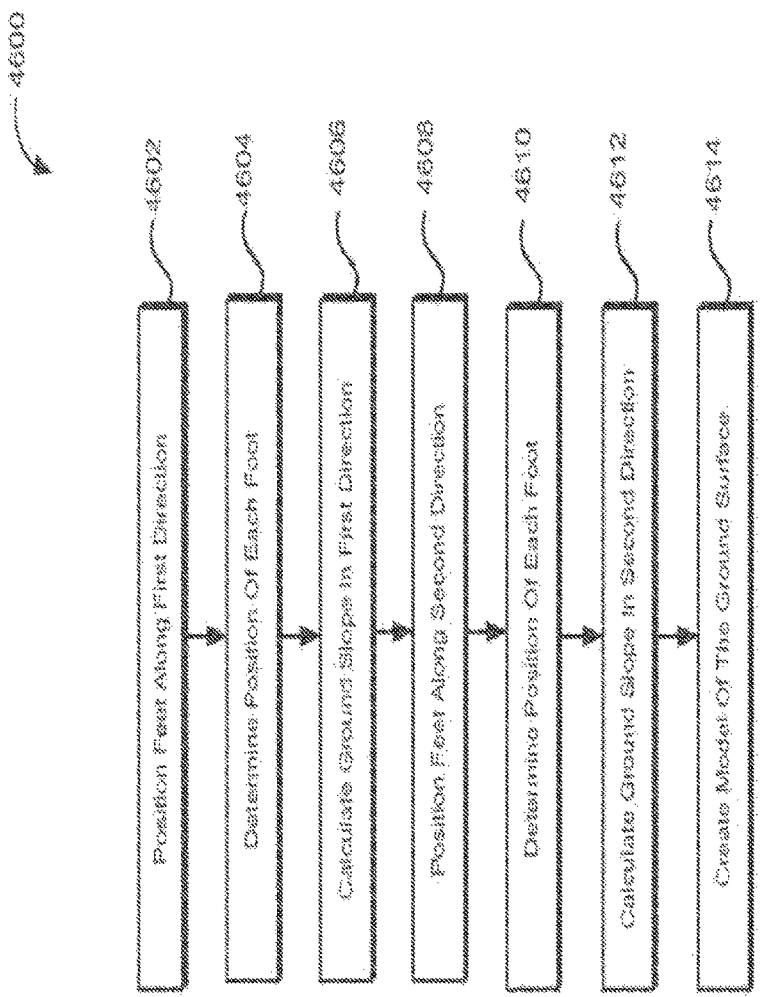
FIG. 46 is a flow diagram of a method for calculating a ground slope in two or more directions from the relative position of two or more robotic feet.

FIG. 46 is a flow diagram of a method 4600 for calculating a ground slope in two or more directions from the relative position of two or more robotic feet. The ground slope may be calculated based on the angle of one robotic foot and/or based on the relative positions of two or more robotic feet. Two different slopes may be calculated. One slope may be an angle of the foot, which may be used for coefficient of friction calculations. A second slope may be the angle between the feet. For simplicity, the ground slope between the legs may be computed from the center of each ankle joint for a biped robot. Determining the ground slope may aid in robotic walking by allowing a walking and/or balancing algorithm to compensate for the ground slope and/or to determine that a route is impassible by the robot and may result in damage. Knowing the ground slope may allow the robot to maintain balance dynamically while on uneven surfaces, difficult terrain (e.g., slopes of more than 30 degrees or the like), and/or the like. The robot may adjust its velocity, acceleration, body angle, and/or the like based on the ground slope to maintain balance. For example, the robot may avoid excess acceleration and/or too extreme a body angle when walking down hill to prevent a potentially damaging loss of balance. Different walking algorithms may be used depending on the ground slope. For example, a robot walking down stairs may detect a negative slope and point the toe to touch first rather than walking heel to toe. The slope may be monitored as the foot descends during walking, and a negative slope may be detected if the foot drops below horizontal. A similar algorithm may be used for positive slopes.

To determine the ground slope in a first direction, the feet may be positioned 4602 at distinct points along that direction. For example, to determine the ground slope in a direction of travel, the robot may step one foot forward. Once the feet are positioned, the processor may determine 4604 the position of each foot. Various coordinate systems may be used by the processor to identify the positions, such as Cartesian, polar, cylindrical, spherical, and/or the like, and the positions of the feet may be expressed as points, vectors, line or line segments, and/or the like. The processor may determine 4604 the position of each foot (or the position of the center of each ankle joint) during positioning 4602 of the feet (e.g., through continuous monitoring), and/or the steps 4602 and 4604 may be performed sequentially.

The ground slope in the first direction may be calculated 4606 from the positions of the feet, ankles, knees, and/or hips. For example, in Cartesian coordinates, the ground slope may be calculated as the difference in vertical position divided by the difference in horizontal position. In an embodiment, the processor may only determine the difference in horizontal position in the first direction and may ignore any difference in horizontal position perpendicular to the first direction. The angle of the ground relative to horizontal may be determined by computing the arctangent of the slope. In some embodiments or situations, the ground slope may only need to be determined for one direction, and the method 4600 may end. For example, it may be assumed that the walking may occur in a single plane defined by the direction of movement and vertical (relative to gravity) and that the legs do not move outward from this plane, so the ground slope in the direction perpendicular to the plane may be ignored.

It may also be desirable to determine the ground slope in a second direction, such as the direction perpendicular to the direction of travel (e.g., if the legs may move out to the side). The feet may be positioned 4608 in distinct points along the second direction. For a direction perpendicular to the direction of travel, one foot may be stepped to the side. Once the feet are positioned, the processor may determine 4610 the position of each foot (e.g., the center of each ankle joint). The processor may calculate 4612 the ground slope in the second direction from the position of each foot. The ground slope may be computed as the difference in vertical position divided by the difference in horizontal position. The processor may ignore any differences in horizontal position perpendicular to the second direction.

A model of the ground may be created 4614 by the processor based on the calculations of the ground slope in the first and second directions. For example, the slopes in the first and second directions may define a plane, and the processor may compute a description of the plane (e.g., a normal vector, one or more points on the plane, unit vectors in the first and second directions, and/or the like). The plane may give a gross description of the ground surface that can be complemented and or refined by other sensors. For example, optical or vision sensors, distance sensors (e.g., LIDAR, RADAR, ultrasonic, and/or the like), linear displacement sensors in the feet, and/or the like may provide a fine description of the ground surface. The model of the ground may be used by walking algorithms (e.g., to determine where a foot is likely to hit the ground when stepping).

Figure 47A:
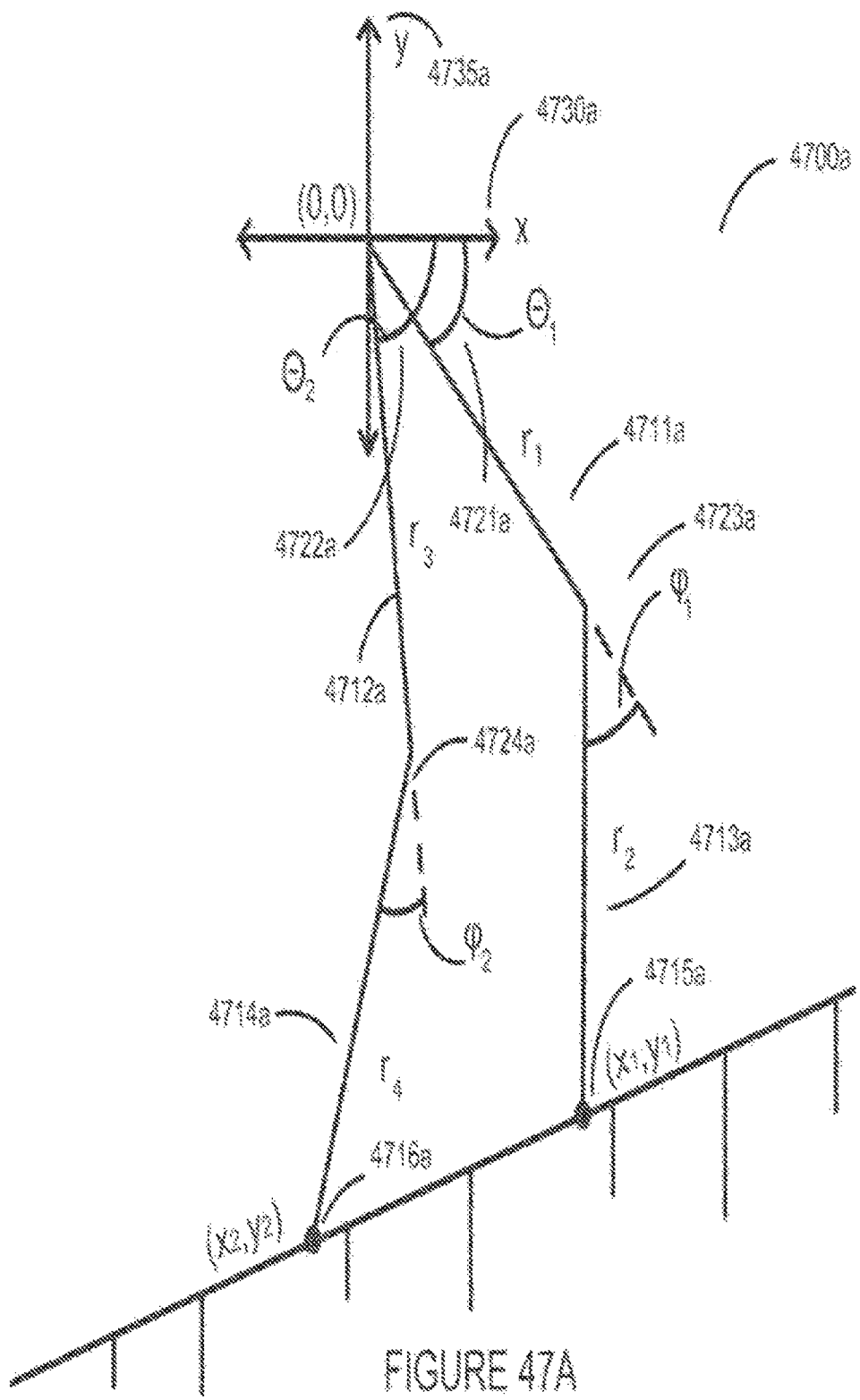
FIG. 47A is a schematic diagram of a model that may be used by the processor to determine foot positions along a direction of travel.

FIG. 47A is a schematic diagram of a model 4700a that may be used by the processor to determine foot positions along a direction of travel. The feet 4715a, 4716a may be modeled as points at the center of ankle joints connected to hip joints 4721a, 4722a by upper leg skeletal components 4711a, 4712a (e.g., thigh bones) and lower leg skeletal components 4713a, 4714a (e.g., shin bones). The thigh bones 4711a, 4712a and shin bones 4713a, 4714a may be connected to each other by knee joints 4723a, 4724a. The thigh bones 4711a, 4712a may be modeled as line segments of length $r_1$ and $r_3$ respectively, and the shin bones 4713a, 4714a may be modeled as line segments of length $r_2$ and $r_4$ respectively. The hip joints 4721a, 4722a may include rotational displacement sensors from which angles $\theta_1$, $\theta_2$ of the thigh bones 4711a, 4712a relative to horizontal may be determined. An inertial reference device (e.g., an accelerometer, tiltmeter, inclinometer, etc.) may be used to determine horizontal. The knee joints 4723a, 4724a may include rotational displacement sensors from which angles $\phi_1$, $\phi_2$ of the shin bones 4713a, 4714a relative to the thigh bones may be determined. In an embodiment, the foot positions may be determined in Cartesian coordinates relative to the center of the hip joints 4721a, 4722a. An X-axis 4730a may be horizontal and a Y-axis 4735a may be vertical as determined by the inertial reference device. The positive direction for each axis 4730a, 4735a may be arbitrary as long as positive direction is consistent across calculations. For example, the Y-axis may be positive in an up direction (e.g., away from the feet 4715a, 4716a), and the hip and knee angles may be represented by values less than zero (e.g., represented by the negatives of the absolute values of the angles) when the angles are below the horizon. Thus, although the angles are depicted as spanning in a clockwise direction from the horizon, the values of the angles may nonetheless be negative when used in calculations.

FIG. 47B is a schematic diagram of a vector model 4700b that may be used by the processor to calculate the foot positions and slope along a direction of travel using vectors. From the thigh lengths $r_1$, $r_3$ and the hip angles $\theta_1$, $\theta_2$, vectors $P_1$, $P_3$ may be determined to model the thigh bones 4711b, 4712b. Using i as the unit vector along the X-axis and j as the unit vector along the Y-axis, the vectors $P_1$, $P_3$ may be represented in Cartesian coordinate as:

$$P_1 = r_1 \cos\theta_1 i + r_1 \sin\theta_1 j \quad (18)$$

$$P_3 = r_3 \cos\theta_2 i + r_3 \sin\theta_2 j \quad (19)$$

Similarly, from the shin lengths $r_2$, $r_4$ and the hip and knee angles $\theta_1$, $\theta_2$, $\phi_1$, $\phi_2$, vectors $P_2$, $P_4$ may be determined to model the shin bones 4713b, 4714b. The vectors $P_2$, $P_4$ may be represented in Cartesian coordinates as:

$$P_2 = r_2 \cos(\theta_1 + \phi_1) i + r_2 \sin(\theta_1 + \phi_1) j \quad (20)$$

$$P_4 = r_4 \cos(\theta_2 + \phi_2) i + r_4 \sin(\theta_2 + \phi_2) j \quad (21)$$

Vectors Q, U from the hip joints 4721b, 4722b to the feet 4715b, 4716b may be calculated by summing the vectors for the respective leg $P_1$, $P_2$ and $P_3$, $P_4$. The vectors Q, U may model the distance and direction from the center of the hip joints 4721b, 4722b to the center of the ankle joints 4715b, 4716b. Using the hip joints 4721b, 4722b as the center of a Cartesian coordinate system, the Cartesian coordinates for the feet 4715b, 4716b may be calculated according to the equations:

$$Q = P_1 + P_2 = \begin{bmatrix} x_1 \\ y_1 \end{bmatrix} = \begin{bmatrix} r_1 \cos\theta_1 + r_2 \cos(\theta_1 + \phi_1) \\ r_1 \sin\theta_1 + r_2 \sin(\theta_1 + \phi_1) \end{bmatrix} \quad (22)$$

$$U = P_3 + P_4 = \begin{bmatrix} x_2 \\ y_2 \end{bmatrix} = \begin{bmatrix} r_3 \cos\theta_2 + r_4 \cos(\theta_2 + \phi_2) \\ r_3 \sin\theta_2 + r_4 \sin(\theta_2 + \phi_2) \end{bmatrix} \quad (23)$$

From the foot positions, the ground slope may be calculated. The ground slope calculation may ignore any horizontal distance between the legs in the direction perpendicular to the direction of travel (e.g., a Z-axis projecting into or out of the figure), and may be equivalent to projecting the foot positions onto a plane defined by vertical (relative to gravity) and the direction of travel. The slope may be represented by a vector V=Q−U and/or may be calculated as the difference in the vertical foot positions over the difference in the horizontal foot positions. For example, the slope may be:

$$\text{Slope} = \frac{\text{Rise}}{\text{Run}} = \frac{y_1 - y_2}{x_1 - x_2} = \frac{r_1 \sin\theta_1 + r_2 \sin(\theta_1 + \phi_1) - r_3 \sin\theta_2 - r_4 \sin(\theta_2 + \phi_2)}{r_1 \cos\theta_1 + r_2 \cos(\theta_1 + \phi_1) - r_3 \cos\theta_2 - r_4 \cos(\theta_2 + \phi_2)} \quad (24)$$

Figure 48:
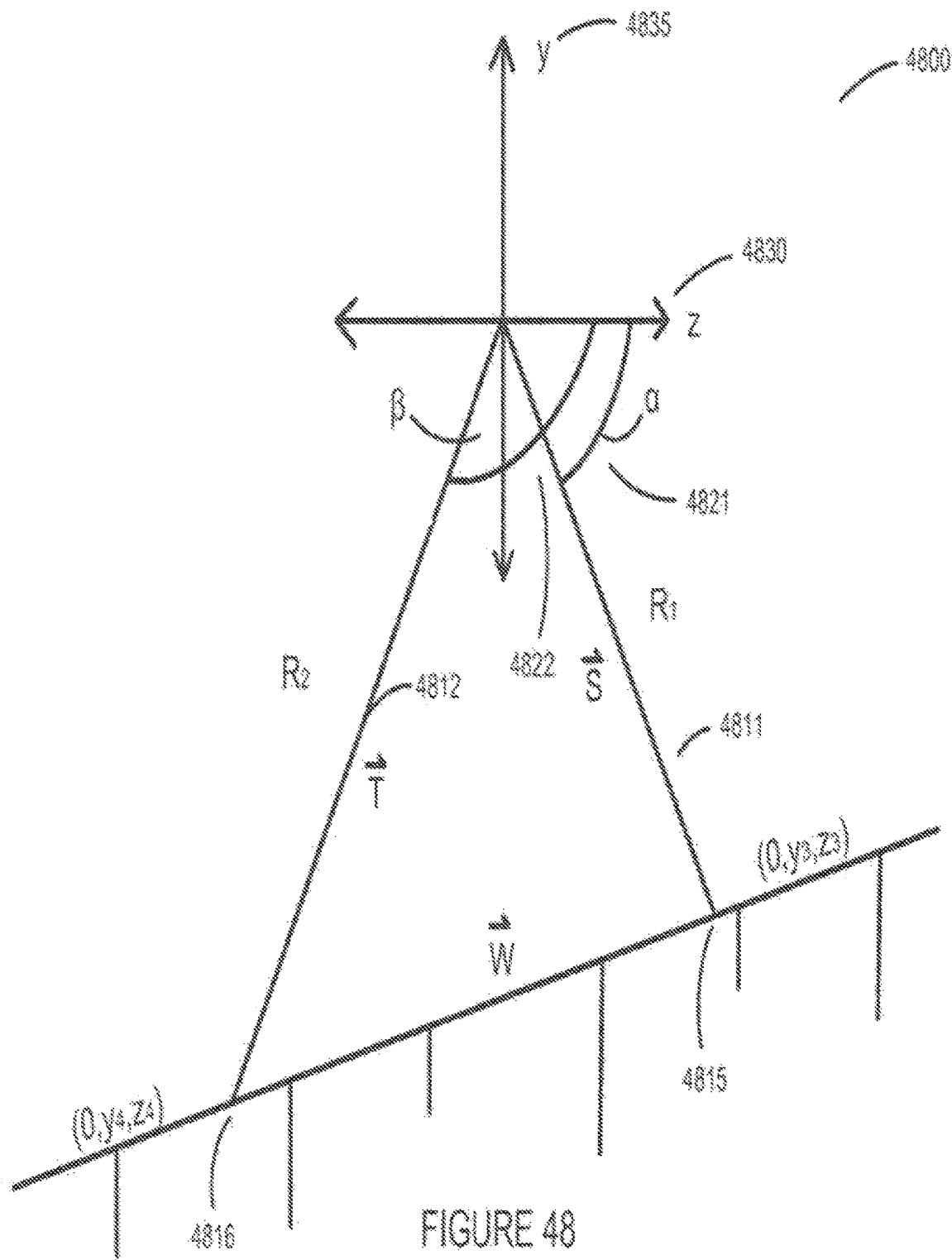
FIG. 48 is a schematic diagram of a vector model that may be used by the processor to calculate the foot positions and slope along a direction perpendicular to travel using vectors.

FIG. 48 is a schematic diagram of a vector model 4800 that may be used by the processor to calculate the foot positions and slope along a direction perpendicular to travel using vectors. In many cases, a robot may traverse a ground surface with the feet remaining in or near the plane defined by vertical (relative to gravity), the direction of travel, and a point in the center of the hips, and/or the slope in the direction perpendicular to the direction of travel may be relatively flat. So, the robot may not need to determine the slope perpendicular to the direction of travel. When the legs are spread wide in a sideways direction and/or the slope is steep in the direction perpendicular to the direction of travel, it may be important for the walking algorithms to determine the slope in the direction perpendicular to the direction of travel. Walking may be modified by the walking algorithms to cope with a steep sideways slope, for example, by keeping an uphill knee bent during walking. It may also be advantageous for the robot to know the slope perpendicular to the direction of travel so the robot can step to the side when balance is lost.

The feet 4815, 4816 may be positioned to have very little displacement in the direction of travel relative to the hip joints 4821, 4822. The feet 4815, 4816 may be modeled as points at the center of ankle joints with the points connected to the hip joints 4821, 4822 by legs 4811, 4812 with length $R_1$, $R_2$. The hip joints 4821, 4822 may include rotational displacement sensors from which angles $\alpha$, $\beta$ of the legs 4811, 4812 relative to horizontal in the plane normal (e.g., perpendicular) to the direction of horizontal travel may be determined. In some embodiments, knee joints (not shown) may not rotate in the plane normal to the direction of travel, so the knee joints may not affect the angle of the legs 4811, 4812 in the plane normal to the direction of horizontal travel. The foot positions may be determined in Cartesian coordinates relative to a horizontal Z-axis 4830 and a vertical Y-axis 4835 with an origin at the center of the hip joints 4821, 4822.

Vectors S, T from the hip joints 4821, 4822 to the feet 4815, 4816 may be calculated from the leg lengths $R_1$, $R_2$ and the angles $\alpha$, $\beta$ of the legs 4811, 4812. Because the hip joints 4821, 4822 are taken to be the center of the Cartesian coordinate system, the foot positions can be determined directly from the vectors according to the equations:

$$S = \begin{bmatrix} y_3 \\ z_3 \end{bmatrix} = \begin{bmatrix} R_1 \sin\alpha \\ R_1 \cos\alpha \end{bmatrix} \quad (25)$$

$$T = \begin{bmatrix} y_4 \\ z_4 \end{bmatrix} = \begin{bmatrix} R_2 \sin\beta \\ R_2 \cos\beta \end{bmatrix} \quad (26)$$

From the foot positions, the ground slope in the plane normal to the direction of horizontal travel may be calculated. The ground slope calculation may ignore any horizontal distance in the direction of travel (e.g., any distance along the X-axis) and may be equivalent to projecting the foot positions onto a plane defined by vertical (relative to gravity) and a non-vertical vector perpendicular to the direction of horizontal travel. The slope may be represented by a vector W=S−T and/or may be calculated as the difference in the vertical foot positions over the difference in horizontal foot positions according to the equation:

$$\text{Slope} = \frac{y_3 - y_4}{z_3 - z_4} = \frac{R_1 \sin\alpha - R_2 \sin\beta}{R_1 \cos\alpha - R_2 \cos\beta} \quad (27)$$

In some situations, it can be assumed that $R_1$, $R_2$ are the total length of the leg. It may also be possible that the hip angles $\theta_1$, $\theta_2$ and/or the knee angles $\phi_1$, $\phi_2$ in the XY plane may be other than 90 degrees and 0 degrees respectively, and the vectors S, T of the legs 4811, 4812 projected into the YZ plane may have a magnitude smaller than the length of the leg. Even though the foot position may have an X-axis component near zero, the legs 4811, 4812 may extend out of the YZ plane and reduce the apparent length of the leg in the YZ plane. In such situations, the lengths $R_1$, $R_2$ may be calculated using the Y-components of equations 22 and 23. The vector and slope equations then become:

$$S = \begin{bmatrix} y_3 \\ z_3 \end{bmatrix} = \begin{bmatrix} (r_1 \sin\theta_1 + r_2 \sin(\theta_1 + \phi_1))\sin\alpha \\ (r_1 \sin\theta_1 + r_2 \sin(\theta_1 + \phi_1))\cos\alpha \end{bmatrix} \quad (28)$$

$$T = \begin{bmatrix} y_4 \\ z_4 \end{bmatrix} = \begin{bmatrix} (r_3 \sin\theta_2 + r_4 \sin(\theta_2 + \phi_2))\sin\beta \\ (r_3 \sin\theta_2 + r_4 \sin(\theta_2 + \phi_2))\cos\beta \end{bmatrix} \quad (29)$$

$$\text{Slope} = \frac{(r_1 \sin\theta_1 + r_2 \sin(\theta_1 + \phi_1))\sin\alpha - (r_3 \sin\theta_2 + r_4 \sin(\theta_2 + \phi_2))\sin\beta}{(r_1 \sin\theta_1 + r_2 \sin(\theta_1 + \phi_1))\cos\alpha - (r_3 \sin\theta_2 + r_4 \sin(\theta_2 + \phi_2))\cos\beta} \quad (30)$$

The arctangent of the slope may be computed to express the slope as an angle relative to the horizon.

Once slope has been measured in two non-parallel directions, the ground surface may be roughly approximated as a plane defined by the vectors V, W and at least one point on the ground. The point on the ground may be selected as any of the foot positions $(x_1, y_1, 0)$; $(x_2, y_2, 0)$; $(0, y_3, z_3)$; $(0, y_4, z_4)$; or any other known point in the ground plane. The vectors V, W may not be orthogonal to each other or be unit vectors, so one or both vectors may be normalized (e.g., divided by their magnitude) and/or modified to be an orthogonal vector. However, the vectors V, W may have the advantage that any point with an unknown vertical height (e.g., an unknown Y coordinates) but known X and Z coordinates may be easily characterized in terms of the vectors V, W to quickly compute an estimated vertical height. The vectors V, W may be normalized and/or projections of the vectors V, W on the XZ plane may be normalized. The definitions of the coordinate system used and the particular slope measurements performed to compute the vectors V, W are one possible way to compute vectors describing a plane that approximates the ground surface. Many others ways to compute a description of the plane approximating the ground surface will be apparent to those of skill in the art.

Figure 49:
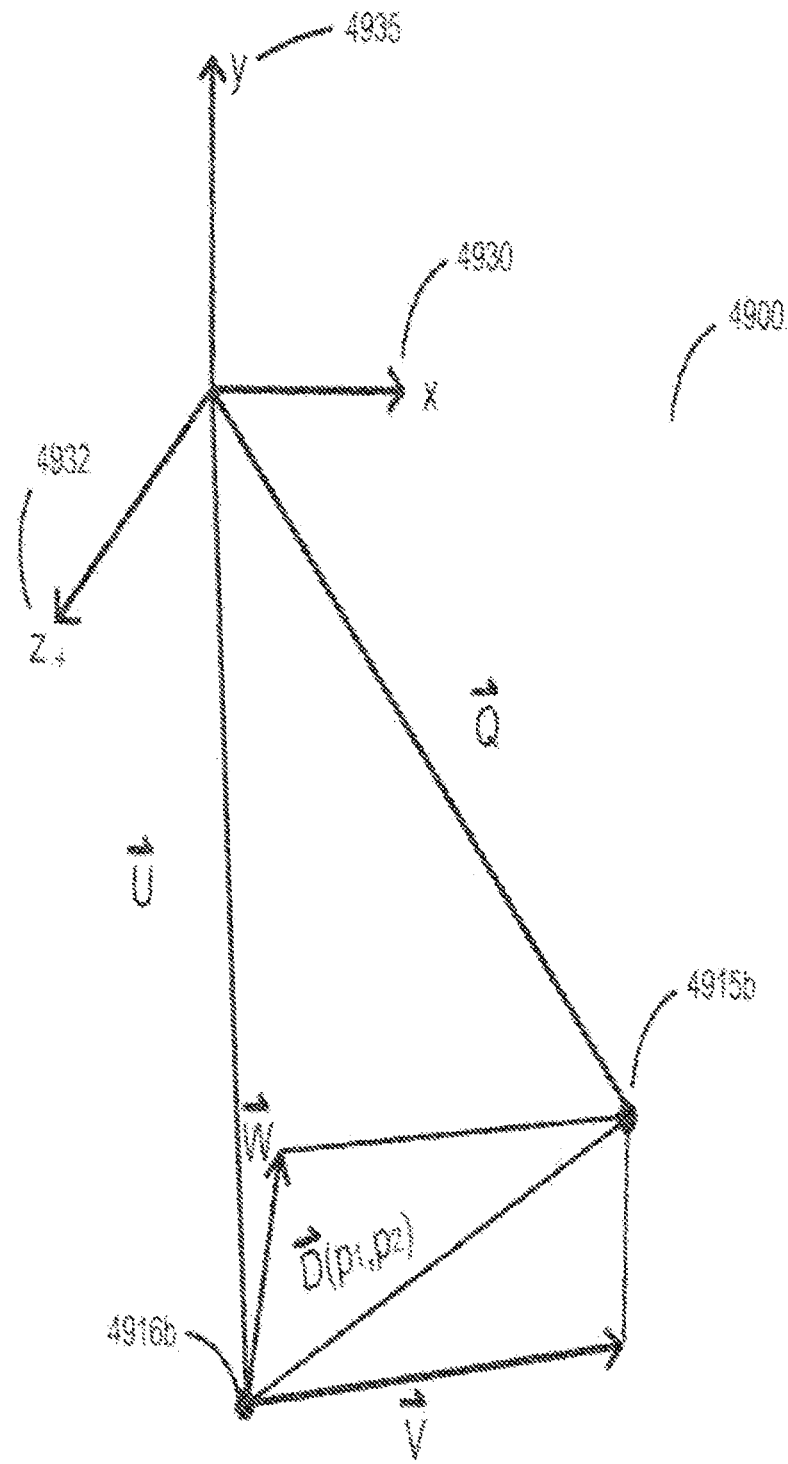
FIG. 49 is a schematic diagram of a vector model that may be used by the processor to calculate an anticipated location of, slope to, and/or distance to an unknown point.

FIG. 49 is a schematic diagram of a vector model 4900 that may be used by the processor to calculate an anticipated location of, slope to, and/or distance to an unknown point. The processor may desire to move a foot to a position with a known horizontal position (e.g., known positions along the X-axis 4930 and Z-axis 4932 as defined above) but an unknown vertical position (e.g., an unknown position along the Y-axis 4935 as defined above). Determining the position of, slope to, and/or distance to the unknown point may allow the processor to calculate stability with respect to velocity, coefficient of friction, ground surface material, and/or the like; estimate body angle for different velocities (e.g., gaits); and/or estimate how to balance the body when encountering a complicated angle. The processor may optimize mobility of the robot based on knowledge of the ground slope as well as coefficient of friction, foot angle, weight, velocity, and/or the like.

A robot may have a first foot 4916b located at a first point $p_1$ with coordinates $x_1$, $y_1$, $z_1$ and may seek to place a second foot 4915b at a second point $p_2$ with known coordinates $x_2$, $z_2$ and unknown coordinate $y_2$. The robot may compute a vector D that points from $p_1$ to $p_2$ and calculate the value of $y_2$ from $p_1$ and D. D may be computed according to the equation:

$$D = aV + bW = \begin{bmatrix} x_2 - x_1 \\ y_2 - y_1 \\ z_2 - z_1 \end{bmatrix} \quad (31)$$

where a and b are constants. Because the Z component of the vector V is 0 and the X component of the vector W is zero, a and b can be determined according to the equations:

$$av_x = x_2 - x_1 \quad (32)$$

$$bw_z = z_2 - z_1 \quad (33)$$

where $v_x$ is the magnitude of the X component of the vector V and $w_z$ is the magnitude of the Z component of the vector W. Once a and b have been computed, $y_2$ can easily be calculated from the Y components of the vectors V, W and the value of $y_1$. The processor may calculate the distance and slope between the points $p_1$, $p_2$ using the equations:

$$\text{Distance} = \sqrt{d_x^2 + d_y^2 + d_z^2} \quad (34)$$

$$\text{Slope} = d_y / \sqrt{d_x^2 + d_z^2} \quad (35)$$

where $d_x$, $d_y$, and $d_z$ are the X, Y, and Z components respectively of the vector D.

The processor may determine the positions of the feet 4915b, 4916b from the angles of the hips and knees, and/or the processor may determine the angles of the knees and/or hips from the positions of the feet 4915b, 4916b. For a robot with at least two degrees of freedom at the hip and one degree of freedom at the knee, the equations relating foot positions to hip and knee angles may be:

$$p_1 = \begin{bmatrix} x_1 \\ y_1 \\ z_1 \end{bmatrix} = \begin{bmatrix} r_1\cos\theta_1 + r_2\cos(\theta_1 + \phi_1) \\ (r_1\sin\theta_1 + r_2\sin(\theta_1 + \phi_1))\sin\alpha \\ (r_1\sin\theta_1 + r_2\sin(\theta_1 + \phi_1))\cos\alpha \end{bmatrix} \quad (36)$$

$$p_2 = \begin{bmatrix} x_2 \\ y_2 \\ z_2 \end{bmatrix} = \begin{bmatrix} r_3\cos\theta_2 + r_4\cos(\theta_2 + \phi_2) \\ (r_3\sin\theta_2 + r_4\sin(\theta_2 + \phi_2))\sin\beta \\ (r_3\sin\theta_2 + r_4\sin(\theta_2 + \phi_2))\cos\beta \end{bmatrix} \quad (37)$$

where $p_1$, $p_2$ are unknown points and $r_1$, $r_2$, $r_3$, $r_4$, $\theta_1$, $\theta_2$, $\phi_1$, $\phi_2$, $\alpha$, and $\beta$ are defined as described above regarding FIGS. 47A and 48. Equations for more than two feet and/or for joints with different numbers of degrees of freedom will be apparent to those of skill in the art.

The foot positions, slope angle, distance, and/or the like may be continuously monitored by the processor. The processor may control balance, mobility, and/or the like based on the calculated values for position, slope, and distance as well as ground surface conditions and the like. The processor may monitor the values over time, so velocity, acceleration, and the like can be calculated and/or the trajectory of the legs can be plotted. For example, the processor may compute derivatives, such as $$\frac{dx}{dt}, \frac{dy}{dt}, \frac{dz}{dt}, \frac{d^2x}{dt^2}, \frac{d^2y}{dt^2}, \frac{d^2z}{dt^2}, \frac{d\theta}{dt}, \frac{d\phi}{dt}, \frac{d\alpha}{dt}, \frac{d\beta}{dt}, \frac{dp}{dt}$$

(the change in overall position over time), $$\frac{dv}{dt}$$

(the change in overall velocity over time), and/or the like. Alternatively, or in addition, the processor may compute a non-instantaneous rate of change, such as $$\frac{\Delta v}{\Delta t}.$$

The processor may plan the trajectory of the legs based on the computed derivatives and/or rates of change.

Figure 50:
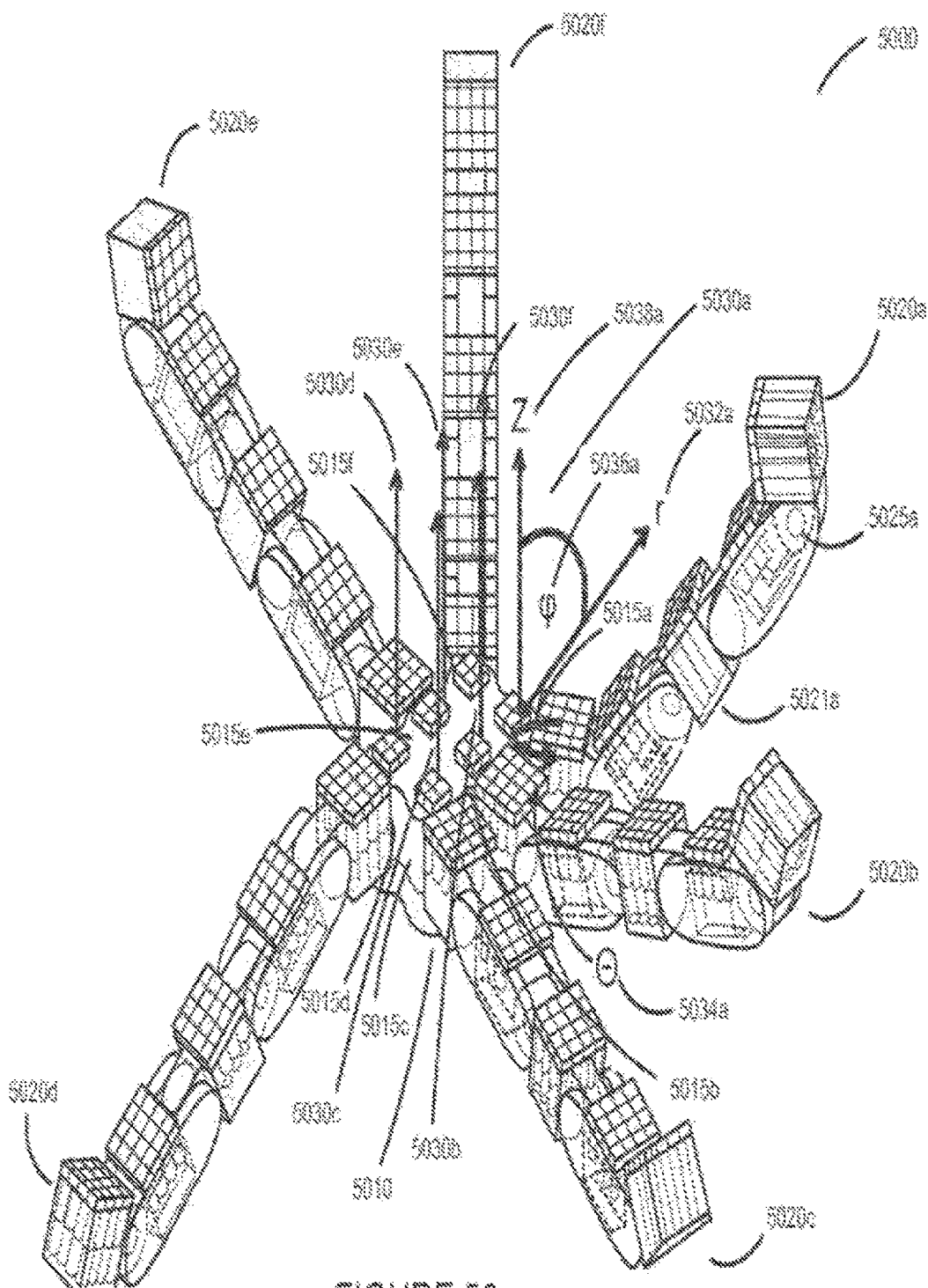
FIG. 50 is a perspective view of a robotic gripper with a plurality coordinate systems overlaid on it.

FIG. 50 is a perspective view of a robotic gripper 5000 with a plurality coordinate systems 5030a-f overlaid on it. A plurality of fingers 5020a-f may be coupled to a palm 5010 by a plurality of rotational displacement sensors 5015a-f. Each coordinate system 5030a-f may be centered at the center of a respective rotational displacement sensor 5015a-f. One or more of the coordinate systems 5030a-f may be spherical coordinate systems. Accordingly, a coordinate system 5030a may include r, a radial distance coordinate 5032a, θ, an azimuthal angle coordinate 5034a, and φ, a polar angle coordinate 5036a (e.g., an angle relative to Z, a zenith 5038a).

To create a model of an object in the gripper, a processor (not shown) may need to determine the location of displacement sensors (e.g., the location of a linear displacement sensor array 5021a, a rotational joint 5025a, etc.). The processor may describe the displacement sensor locations using one or more coordinate systems, such as the plurality of coordinate systems 5030a-f. Each of the plurality of coordinate systems 5030a-f may be used to independently describe the location of the linear displacement sensors in a respective finger 5020a-f. In an embodiment, the processor may compute the locations of each linear displacement sensor using the corresponding spherical coordinate system 5030a-f to simplify calculations. Then, the processor may convert the spherical coordinate locations to coordinates in a master Cartesian coordinate system (not shown). Conversion between spherical and Cartesian coordinates may be performed using the equations:

$$x = r \sin \phi \cos \theta \quad (38)$$

$$y = r \sin \phi \sin \theta \quad (39)$$

$$z = r \cos \phi \quad (40)$$

$$r^2 = x^2 + y^2 + z^2 \quad (41)$$

where X, Y, and Z are coordinates in a Cartesian coordinate system centered at the same location as the spherical coordinate system.

The processor may determine the locations of the linear displacement sensors based on measurements by the palm rotational displacement sensors 5015a-f and rotational displacement sensors in each finger joint (e.g., the rotational displacement sensor 5025a). The value of θ may be readily determined from angle measurements by the rotational displacement sensor 5015a coupling the finger 5020a to the palm 5010. The finger 5020a may index around an object to characterize the object, and the value of θ may be recorded each time the finger rotates to a new position. The values of r and φ may need to be determined from angle measurements by the plurality of rotational displacement sensors 5025a in the finger 5020a. Angular and/or linear velocities, accelerations, and/or the like may be calculated from changes in the coordinates and/or corresponding arc lengths (e.g., an arc length calculated by multiplying the polar and/or azimuthal angle by the radial distance and/or a projection of the radial distance respectively).

Figure 51:
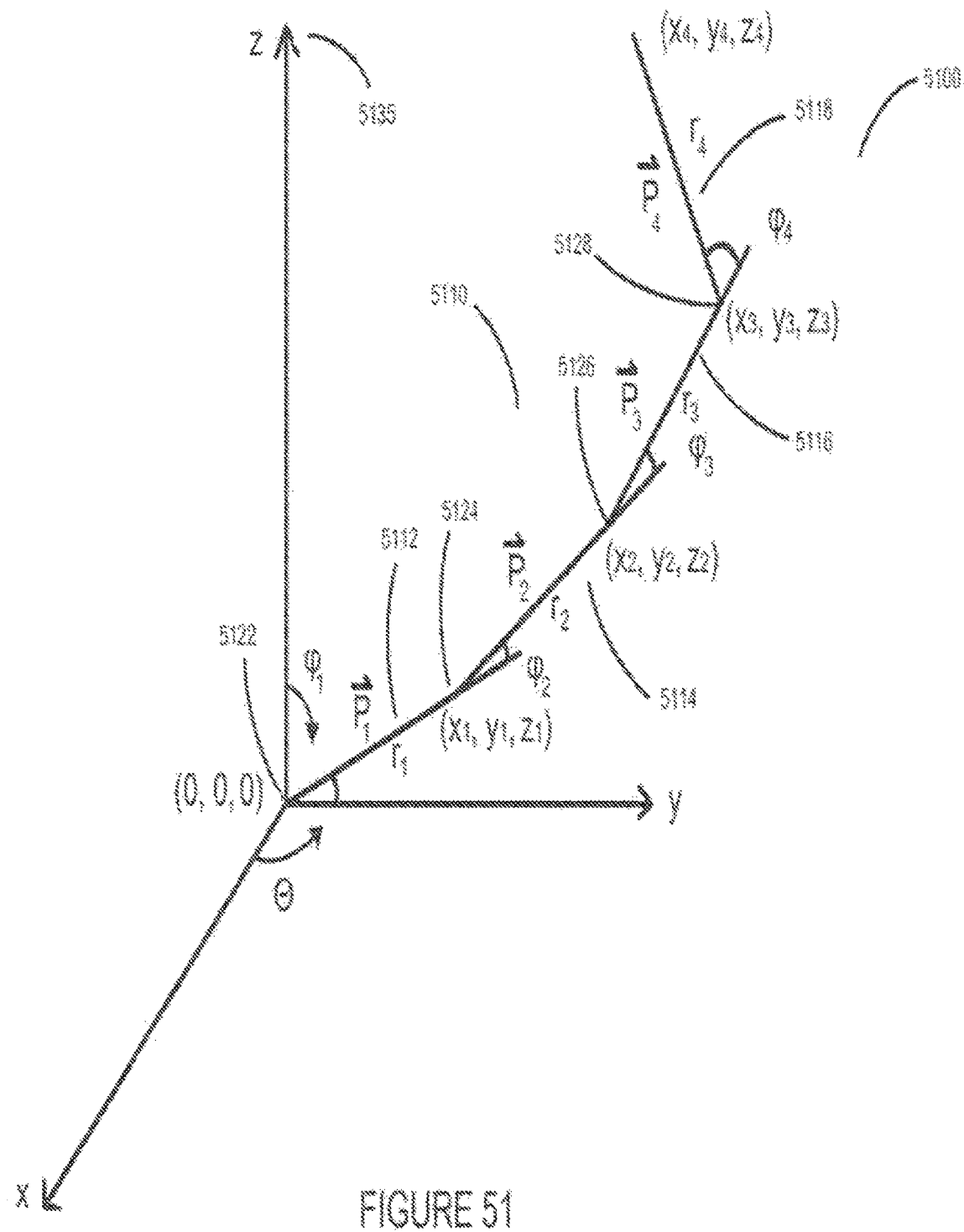
FIG. 51 is a schematic diagram of a vector model that may be used by the processor to determine coordinates of linear displacement sensors on a finger.

FIG. 51 is a schematic diagram of a vector model 5100 that may be used by the processor to determine the r and φ coordinates for linear displacement sensors on a finger 5110. The finger 5110 may be modeled as a plurality of vectors $P_1$, $P_2$, $P_3$, $P_4$ corresponding to a plurality of finger segments 5112, 5114, 5116, 5118. The plurality of vectors $P_1$, $P_2$, $P_3$, $P_4$ may model the distance and direction from the center of one rotational displacement sensor 5122, 5124, 5126, 5128 to the center of another. A vector P may represent the sum of the vectors for individual finger segments. Angles $\phi_1$, $\phi_2$, $\phi_3$, $\phi_4$ for the vectors may be determined based on measurements by the plurality of rotational displacement sensors 5122, 5124, 5126, 5128. The angle $\phi_1$ may be measured away from a zenith 5135 whereas the angles $\phi_2$, $\phi_3$, $\phi_4$ may be measured towards the zenith 5135. Alternatively, or in addition, the angles $\phi_2$, $\phi_3$, $\phi_4$ may have values less than zero when measured towards the zenith 5135, and/or the angles $\phi_2$, $\phi_3$, $\phi_4$ may be measured away from the zenith 5135.

One or more of the plurality of vectors $P_1$, $P_2$, $P_3$, $P_4$ may be summed to determine the locations of various linear displacement sensors (not shown) on the finger and/or the locations of the rotational displacement sensors 5122, 5124, 5126, 5128. Measurements by the linear displacement sensors and knowledge of their location may give a detailed contour of an object being gripped, and/or knowledge of the location of the rotational displacement sensors 5122, 5124, 5126, 5128 may give a gross shape of the object. Assuming the finger segments 5112, 5114, 5116, 5118 are equal length (e.g., $r_s = r_1 = r_2 = r_3 = r_4$), the vectors $P_1$, $P_2$, $P_3$, $P_4$ may be computed according to the equations:

$$P_1 = \begin{bmatrix} x_1 \\ y_1 \\ z_1 \end{bmatrix} = \begin{bmatrix} r_s \sin\phi_1 \cos\theta \\ r_s \sin\phi_1 \sin\theta \\ r_s \cos\phi_1 \end{bmatrix} \quad (42)$$

$$P_2 = \begin{bmatrix} x_2 - x_1 \\ y_2 - y_1 \\ z_2 - z_1 \end{bmatrix} = \begin{bmatrix} r_s \sin(\phi_1 - \phi_2)\cos\theta \\ r_s \sin(\phi_1 - \phi_2)\sin\theta \\ r_s \cos(\phi_1 - \phi_2) \end{bmatrix} \quad (43)$$

$$P_3 = \begin{bmatrix} x_3 - x_2 \\ y_3 - y_2 \\ z_3 - z_2 \end{bmatrix} = \begin{bmatrix} r_s \sin(\phi_1 - \phi_2 - \phi_3)\cos\theta \\ r_s \sin(\phi_1 - \phi_2 - \phi_3)\sin\theta \\ r_s \cos(\phi_1 - \phi_2 - \phi_3) \end{bmatrix} \quad (44)$$

$$P_4 = \begin{bmatrix} x_4 - x_3 \\ y_4 - y_3 \\ z_4 - z_3 \end{bmatrix} = \begin{bmatrix} r_s \sin(\phi_1 - \phi_2 - \phi_3 - \phi_4)\cos\theta \\ r_s \sin(\phi_1 - \phi_2 - \phi_3 - \phi_4)\sin\theta \\ r_s \cos(\phi_1 - \phi_2 - \phi_3 - \phi_4) \end{bmatrix} \quad (45)$$

where $x_n$, $y_n$, $z_n$ is the location in Cartesian coordinates of the nth rotational displacement sensor 5122, 5124, 5126, 5128. The locations of the rotational displacement sensors 5122, 5124, 5126, 5128 may be computed according to the equations:

$$\begin{bmatrix} x_1 \\ y_1 \\ z_1 \end{bmatrix} = P_1 = \begin{bmatrix} r_s \sin\phi_1 \cos\theta \\ r_s \sin\phi_1 \sin\theta \\ r_s \cos\phi_1 \end{bmatrix} \quad (46)$$

$$\begin{bmatrix} x_2 \\ y_2 \\ z_2 \end{bmatrix} = P_1 + P_2 = \begin{bmatrix} r_s(\sin\phi_1 + \sin(\phi_1 - \phi_2))\cos\theta \\ r_s(\sin\phi_1 + \sin(\phi_1 - \phi_2))\sin\theta \\ r_s(\cos\phi_1 + \cos(\phi_1 - \phi_2)) \end{bmatrix} \quad (47)$$

$$\begin{bmatrix} x_3 \\ y_3 \\ z_3 \end{bmatrix} = P_1 + P_2 + P_3 = \begin{bmatrix} r_s(\sin\phi_1 + \sin(\phi_1 - \phi_2) + \sin(\phi_1 - \phi_2 - \phi_3))\cos\theta \\ r_s(\sin\phi_1 + \sin(\phi_1 - \phi_2) + \sin(\phi_1 - \phi_2 - \phi_3))\sin\theta \\ r_s(\cos\phi_1 + \cos(\phi_1 - \phi_2) + \cos(\phi_1 - \phi_2 - \phi_3)) \end{bmatrix} \quad (48)$$

$$\begin{bmatrix} x_4 \\ y_4 \\ z_4 \end{bmatrix} = P_1 + P_2 + P_3 + P_4 = \begin{bmatrix} r_s(\sin\phi_1 + \sin(\phi_1 - \phi_2) + \sin(\phi_1 - \phi_2 - \phi_3) + \sin(\phi_1 - \phi_2 - \phi_3 - \phi_4))\cos\theta \\ r_s(\sin\phi_1 + \sin(\phi_1 - \phi_2) + \sin(\phi_1 - \phi_2 - \phi_3) + \sin(\phi_1 - \phi_2 - \phi_3 - \phi_4))\sin\theta \\ r_s(\cos\phi_1 + \cos(\phi_1 - \phi_2) + \cos(\phi_1 - \phi_2 - \phi_3) + \cos(\phi_1 - \phi_2 - \phi_3 - \phi_4)) \end{bmatrix} \quad (49)$$

The linear displacement sensors may be modeled as being partially along the vectors $P_1$, $P_2$, $P_3$, $P_4$. For example, the locations of the linear displacement sensors may be computed from a vector $P_1 + c*P_2$, where c is a constant, and from a constant times a vector orthogonal to $P_1 + c*P_2$ and $P_2$ (e.g., the vector given by the cross product of $P_1 + c*P_2$ and $P_2$). The constant c may specify the position of the linear displacement sensor lengthwise, and the constant for the orthogonal vector may specify the position along the width. Based on the locations of the linear displacement sensors and the distance measurements by the linear displacement sensors, the processor may determine the locations of a plurality of points on the surface of the object. The fingers may index around the object, and/or a second gripper may grasp the object to obtain a more complete set of surface points for the entire object surface. The gripper may determine the location of points of interest by comparing the surface measurements of an object to a model generated by a vision system. The vision system may or may not attempt to recognize the object by comparing it to a CAD model drawing. The surface shape measured by the gripper may confirm the pose of the object in the hand as recognized by a vision system to create robotic hand-eye coordination. For example, the hand may interact with a robot operating system and/or programs from the Point Cloud Library to provide hand-eye coordination. The design of the sensors in the hand may work with haptic systems.

The processor may model a surface contour of the object based on the locations of the plurality of points on the surface of object. For example, the processor may interpolate locations on the surface between points to model the surface (e.g., to create a model usable by programs from the Point Cloud Library). In an embodiment, an output device may display a wireframe depiction of the object to a user. Alternatively, or in addition, the processor may identify objects based on the model of the surface. The processor may compute a volume of the object from the plurality of surface points, the surface contour, and/or the like (e.g., to identify the object, determine density, etc.). The volume may be computed based on the equation:

$$\text{Volume} = \iiint_{Object} r^2 \sin\phi \, dr \, d\phi \, d\theta \quad (50)$$

The radial distance may vary for different azimuthal and polar angles and may be expressed as a function of azimuthal and polar angle. Accordingly, the volume integral may simplify to:

$$\text{Volume} = \iint_{Surface} \int_0^{f(\phi,\theta)} r^2 \sin\phi \, dr \, d\phi \, d\theta = \iint_{Surface} \frac{f^3(\phi,\theta)}{3} \sin\phi \, d\phi \, d\theta \quad (51)$$

The processor may calculate the volume by approximating the integral from equation 51 as a sum across all the calculated points on the surface of the object (e.g., $\phi$ may range from 0 to $\pi$ and $\theta$ may range from 0 to $2*\pi$), where $f(\phi, \theta)$ is the radial distance at a particular point and $d\phi d\theta$ is approximated by $\Delta\phi\Delta\theta$, which is determined in square radians based on the proximity of points immediately neighboring the particular point. Alternatively, or in addition, the surface points identified using each finger may be converted to one or more Cartesian coordinate systems (e.g., a master Cartesian coordinate system), and the volume may be determined from the Cartesian coordinates of the surface points.

A volume may be computed for each finger based on the corresponding spherical coordinate system and the plurality of surface points identified using the finger. The volume measurements by the fingers may be summed to compute a total volume, and/or sections of the total volume may be identified. A processor may compare the volume measurements of the grasped object to a CAD model and/or real-time imaging to estimate or measure the pose of the object in the hand. In some embodiments, the total volume may also include a volume of the object above the palm that is not captured by the fingers. The total volume may computed according to the equation:

$$V_{Tot} = \sum_{n=1}^{6} V_n = \sum_{n=1}^{6} \iiint_{nth\,Section} r^2 \sin\phi \, dr \, d\phi \, d\theta \quad (52)$$

where $V_{Tot}$ is the total volume and $V_n$ is the volume measurement of the nth section. In equation 52, the six volume sections correspond to the six fingers. There may be more or less than six volume sections in other embodiments, for example, if there are more or less than six fingers and/or a volume measurement is computed for the palm.

Volume may also, or instead, be calculated based on the volume displaced by the linear displacement sensors. As the fingers of the robotic gripper enclose on an object, the linear displacement sensors may be displaced by the object. The volume displaced by the object in each of the plurality of linear displacement sensors can be summed to compute the total volume displaced by the object. The fingers may index around the object to measure the displaced volume at a plurality of locations, and/or additional measurements may be made by a second robotic gripper. Partial volume measurements may suffice for some applications, or the processor may attempt to measure the volume over the entire surface of the object. Accordingly, when indexing, the finger may move laterally by one finger width between measurements. The processor may store each measured volume and the corresponding location (e.g., a location determined based on the position of the finger measured the rotational displacement sensors and the known locations of the linear displacement sensors along the finger). A total volume may be computed by summing across all locations, and/or a partial model may be created/estimated from the partial volume measurements (e.g., to determine the position of an object in the gripper). Alternatively, or in addition, the total volume may be calculated using a running total.

For oddly shaped sections and/or complicated surface structures, the processor may measure the section/structure from multiple sides and/or angles to determine the volume and/or shape. For example, two adjacent fingers may be rotated to a same point in sequence by the rotational actuators in the palm, and the fingers may measure the volume at the same point from different angles. The processor may determine if the volume measurements of the same point overlap and if so, by how much. The processor may determine a composite volume for the point based on the multiple measurements.

An interior section of the object may not displace any volume in the linear displacement sensors, so the processor may estimate the volume of the interior section. For example, the processor may determine the theoretical locations of the linear displacement sensors if fully extended based on the angles of the rotational displacement sensors in each finger. The volume of the interior section may be computed based on the theoretical locations, and the displacement volume of the outer section measured by the linear displacement sensors may be added to the volume of the interior section to yield the total volume. Viewed another way, a gross estimate of volume may be determined from measurements by the rotational displacement sensors, and the gross estimate may be fine-tuned based on measurements by the linear displacement sensors. Indeed, various gross estimates may be used, such as theoretical locations of fully contracted linear displacement sensors, 50% contracted linear displacement sensors, and/or the like, with corrections using the fine measurements consistent with the particular gross estimate used.

The volume displaced in each linear displacement sensor may be calculated by multiplying the contact area of the linear displacement sensor by the length by which the linear displacement sensor was contracted. One or more values specifying contact area for the linear displacement sensors may be stored in memory. Alternatively, the processor may treat the linear displacement sensors as a differential volume element in spherical coordinates. The processor may compute the volume according to the equation:

$$dv = r^2 \sin \phi dr d\phi d\theta \quad (53)$$

where dv is the displaced volume for a linear displacement sensor, r and $\phi$ correspond to the location of the linear displacement, d$\phi$d$\theta$ corresponds to the area of the linear displacement sensor, and dr may correspond to the length by which the linear displacement sensor was contracted. Computing the volume as length times area may yield a more accurate computation of volume for individual linear displacement sensors. However, computing the volume as a differential element in spherical coordinates may compensate for overlapping volume elements near the poles when indexing around a spherical object. The selection of spherical coordinate or rectangular parallelepiped volume elements may be made in advance (e.g., based on an application for the gripper), and/or the gripper may select the volume element to use based on the positions of the fingers. The error for spherical coordinate volume elements may be smaller for smaller sized linear displacement sensors. The measurements of the locations of the finger joints and/or the sensors between joints may be used both for positioning of the fingers for grasping and for pose estimation of an object in the hand. For instance, grasping a small object with two fingers may require that the last section of linear sensors of each finger be maintained parallel to one another so that the linear sensors are maintained orthogonal at the point of object contact.

Figure 52:
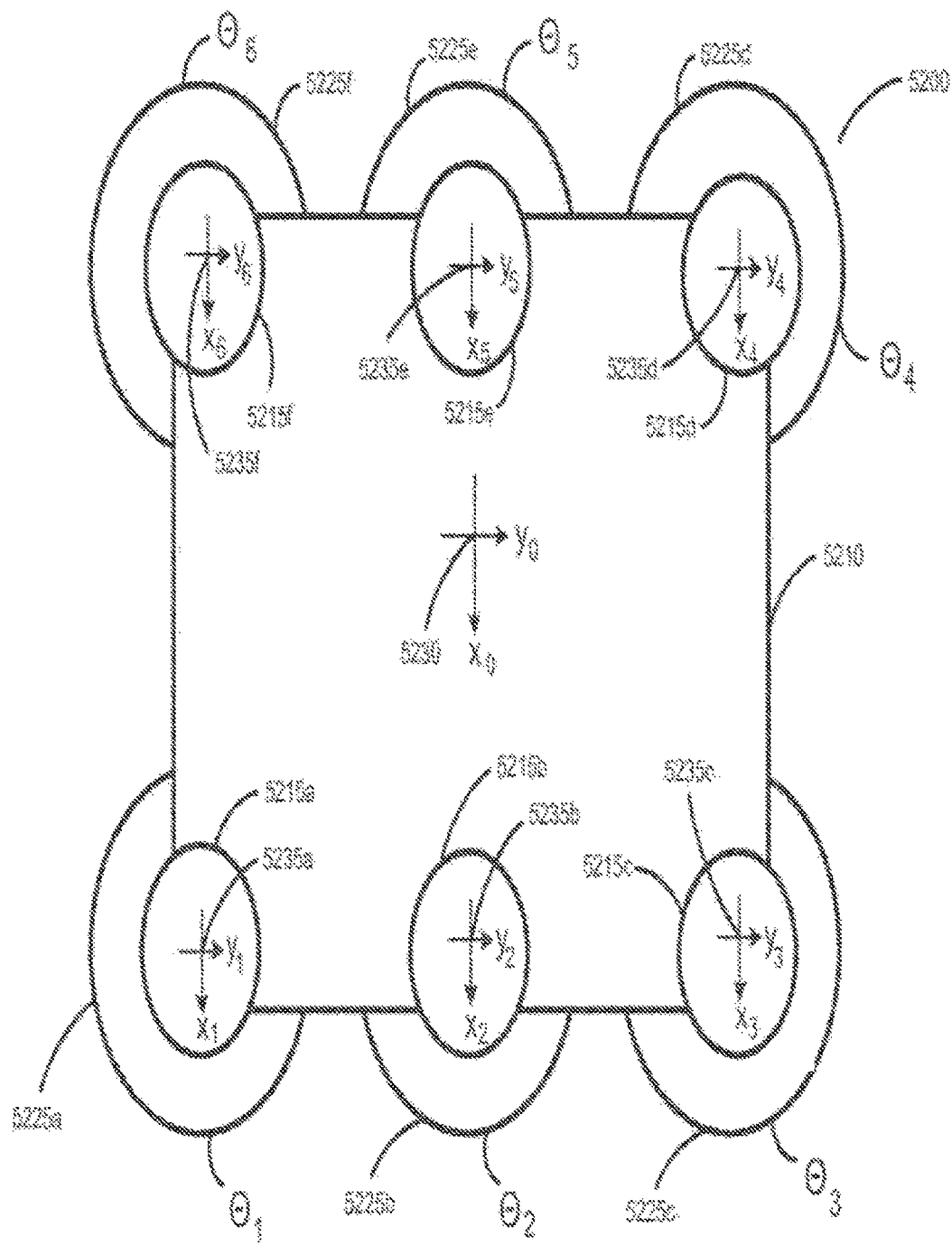
FIG. 52 is a schematic diagram of a palm of a robotic gripper.

FIG. 52 is a schematic diagram of a palm 5210 of a robotic gripper 5200. Because a different coordinate system 5235a-f may be used for each finger, the processor may compensate for the differences between the coordinate systems 5235a-f when modeling an object and/or determine the volume of an object. In an embodiment, the processor may use a master coordinate system 5230 at the center of the palm 5210 (e.g., an $x_0$-axis and a $y_0$-axis), but any location for the master coordinate system 5230 may be used depending on the embodiment. The finger-specific coordinate systems 5235a-f may be centered at respective rotational displacement sensors 5215a-f that control rotation of each finger along a respective azimuthal angle coordinate 5225a-f. The master coordinate system 5230 may be a Cartesian coordinate system, so the finger-specific coordinate systems 5235a-f may be converted to Cartesian coordinates if necessary.

The distance of each finger-specific coordinate system 5235a-f from the master coordinate system 5230 may be saved in memory, and/or the coordinates of each finger-specific coordinate system 5235a-f in the master coordinate system 5230 may be saved. The coordinate systems 5230, 5235a-f may all be centered in a common plane (e.g., the XY plane for the master coordinate system 5230 and the $$\phi = \frac{\pi}{2}$$

plane for finger-specific coordinate systems 5235a-f using spherical coordinates). The Z-axis for the master coordinate system 5230 may project out of the palm according to the right-hand rule and may be zero for all the coordinate systems 5230, 5235a-f. Accordingly, only an X coordinate and a Y coordinate may need to be known for each finger-specific coordinate system 5235a-f when mapping coordinates to the master coordinate system 5230.

Figure 53:
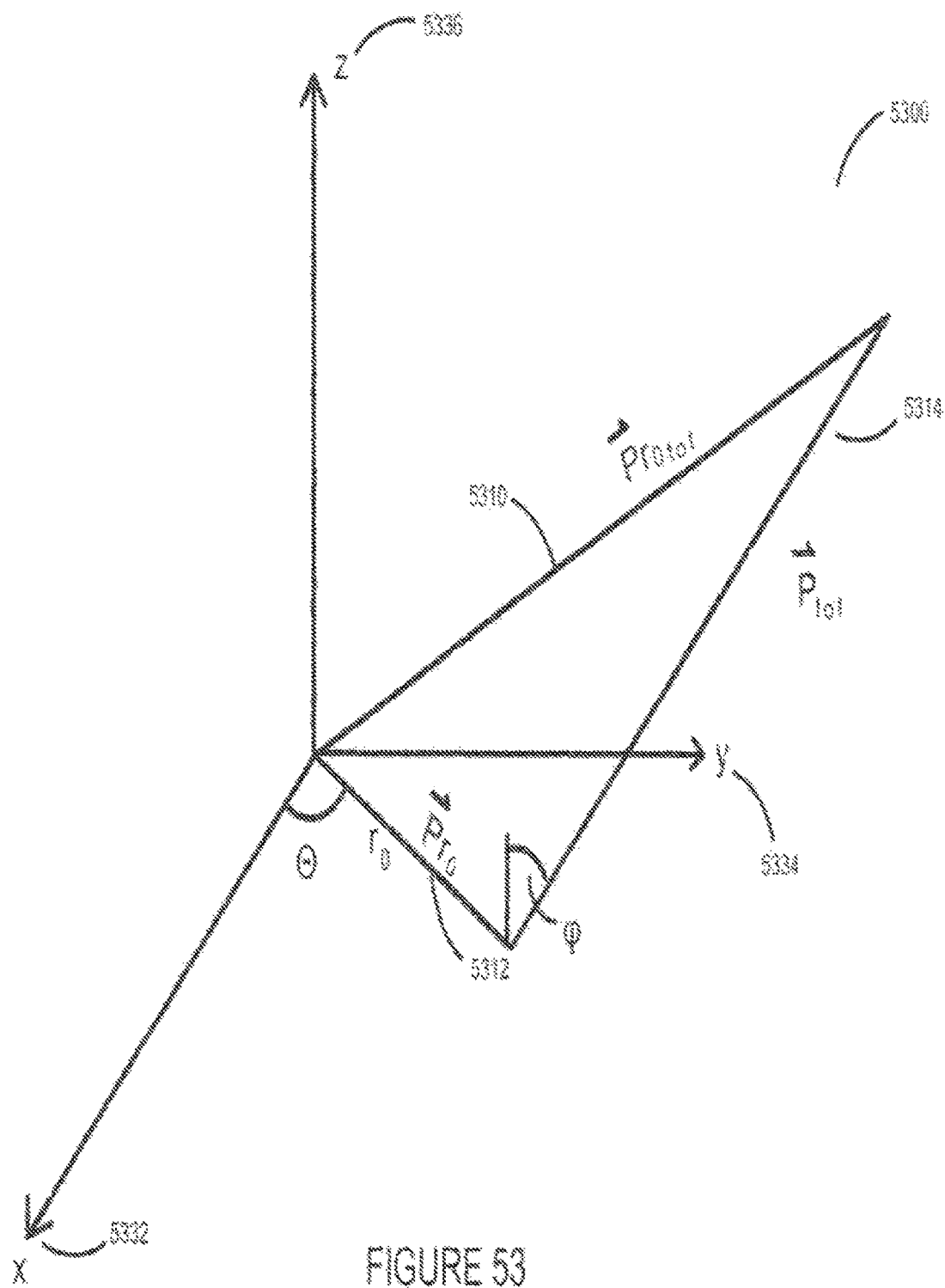
FIG. 53 is a schematic diagram of a vector model that may be used by the processor when mapping finger-specific coordinates to a master coordinate system.

FIG. 53 is a schematic diagram of a vector model 5300 that may be used by the processor when determining the finger-specific coordinates for a point on a finger that includes a first segment lying in the XY plane. The first segment of the finger may be modeled as a vector $P_{r_0}$ 5312 pointing from the center of a rotational displacement sensor located in a palm to the center of the first rotating joint of the finger (e.g., a first joint configured to rotate the polar angle of a second finger segment). The remaining finger segments may be modeled as a vector $P_{tot}$ 5314 pointing from the center of the first rotating joint of the finger to the point on the finger. The vector $P_{tot}$ 5314 may be computed according to one of the equations 46-49 and/or the like. The position of the point on the finger in the finger-specific coordinate system may be computed according to the equation:

$$P_{r_0 tot} = P_{r_0} + P_{tot} = \begin{bmatrix} x_{tot} + x_{r_0} \\ y_{tot} + y_{r_0} \\ z_{tot} \end{bmatrix} \quad (54)$$

where the vector $P_{r_0 tot}$ 5310 points from the center of the rotational displacement sensor located in the palm to the point on the finger, where $x_{tot}$, $y_{tot}$, $z_{tot}$ are the components of the vector $P_{tot}$ along the X, Y, and Z axes respectively, and where $x_{r_0}$, $y_{r_0}$, 0 are the components of the vector $P_{r_0}$ in the coordinates of the finger-specific coordinate system. The processor may identify locations on the surface of the object in the master coordinate system based on the vector $P_{r_0 tot}$ 5310 (e.g., to create a geographic model of the object, compute the volume of the object, etc.).

In some embodiments, the vector $P_{r_0}$ may be specified as a radial distance $r_0$ and an azimuthal angle $\theta_0$ from the center of the rotational displacement sensor located in the palm to the first rotating joint of the finger. Cartesian coordinates may then be calculated according to the equation:

$$\begin{bmatrix} x_{r_0} \\ y_{r_0} \\ z_{r_0} \end{bmatrix} = \begin{bmatrix} r_0 \cos\theta_0 \\ r_0 \sin\theta_0 \\ 0 \end{bmatrix} \quad (55)$$

The rate of change of the location of the point on the finger may be used to determine velocity, acceleration, and/or the like. The velocities, accelerations, positions, and/or the like may be calculated for specific components of the finger position (e.g., $$\frac{dx}{dt}, \frac{dy}{dt}, \frac{dz}{dt},$$

etc.) and/or for the overall finger position. The calculated locations, velocities, accelerations, and/or the like may be stored by the processor, and/or the processor may plot the trajectory of the fingers based on one or more of the calculated values. The processor may plan the trajectory of the fingers based on the computed derivatives and/or rates of change.

The finger-specific coordinate systems may need to be oriented so the azimuthal angle of each finger-specific coordinate system is consistent with the master coordinate system. The processor may grasp the object with the fingers unseparated to ensure the azimuthal angles are consistent with each other and perpendicular to the palm. The finger may then rotate outward from each other to analyze surface for the entire object and/or to strengthen the grip on the object. Alternatively, or in addition, linear displacement cylinders may be used in addition to, or instead of, the rotating cylinders in the palm to spread the fingers about the object to allow for lateral and rotational motion. Using lateral and rotational displacement cylinders may enhance dexterity of the fingers by providing additional degrees of freedom (e.g., six degrees of freedom when modifying the embodiment of FIG. 50), which may enable the gripper to have a greater range of motion than a human hand. The benefits of including the linear displacement cylinders may be weighed against the additional costs for manufacture when determining whether or not to include the linear displacement cylinders.

Pattern Recognition for Object Identification, Pose, and Assembly

Assembly operations may include any operation that puts two items together. Even pick and place operations may be considered assembly processes. Several steps may need to be performed in order to accomplish robotic assembly using CAM. A geographic representation of an object in the gripper may be used to perform automated assembly. Various types of models may be created. A full model of an object may be generated from a point cloud produced from measurements by the tactile sensors of a robotic hand and/or smart vice; a full model may be generated from vision systems; and/or a partial model may be used to relate the position of the object in the robotic hand or vice. Knowledge of the precise location of objects may allow assembly of precision parts with procedures such as micro twisting and sawing motions of the robotic hand.

There may be multiple methods for generating geographic models. A first method may include pattern recognition by a vision system and tactile sensor correlation for automated assembly. The vision system may be used to locate an object in 3D space. The object located by the vision system may be compared with stored models to identify the object. For example, random object identification may be used. The object may be compared using a design program, such as AutoCAD, or a real-time image to create a match between a stored model and a model generated by vision pattern recognition. After the object has been identified, the pose (e.g., location and orientation) of the object may be determined.

The position of the hand may be adjusted using visual serving to grasp the object. The pose of the arm and hand may be measured for control purposes. Once the object is grasped, the pose of the object in the robotic hand is determined based on tactile sensor data from the hand. The measured angles of finger joints and displacements of linear displacement sensors may be used to compute the pose of the object. For example, point cloud data computed from the measurements may be matched to point cloud data computed from measurements by the vision system. For assembly operations, the hand may place the object into a vice, or an assembly or manufacturing operation may be performed between the object and another object in a vice or another hand. The pose of both objects may need to be known for them to be assembled, so the pose of the other object may be determined, e.g., using pattern recognition. The orientation may be corrected dependent on the location in the hand. The vice and hand and/or hand and hand may be act as a pair for performing the assembly and/or manufacturing operations.

A second method may include teaching automated assembly using tactile sensing. In some embodiments, object recognition by a vision system may be reduced or omitted. Rather, a grasp pose may be manually taught to the robot. Data from tactile sensors may be used to correct the pose of the objects to be assembled. Initially, the pose of each object may be determined. The object pose needed for assembly may be taught to the gripping system using a teaching program in lieu of using a vision system. A baseline orientation may be set in the vice and/or hand, and the assembly may be manually taught by an operator. The manually taught assembly operation may be recorded (e.g., a representation of the operation may be stored in persistent storage). A correction factor for the object pose in both the hand and the vice or other hand may be required for each subsequent assembly cycle.

To correct for object pose in subsequent cycles, the pose of a first object in a vice (or first hand) may be measured to create a baseline measurement. The difference in pose relative to the baseline may be measured in subsequent cycles. The pose of a second object in a hand (or second hand) may be measured to create a baseline measurement. The difference in pose relative to the baseline in subsequent cycles may be measured. The pose of the object in the hand may be compared to (e.g., subtracted from) the pose of the object in the vice to generate a correction factor. The position of the hand may be moved in X, Y, and/or Z directions based on the correction factor to compensate for object pose at the point of assembly, and/or the orientation may be adjusted according to the correction factor. The positions of the objects may be corrected in relation to the originally recorded baseline poses during each cycle.

In an embodiment, the correction factor may be determined based on point correlation. When determining initial object pose, two points on each side of an object may be recorded to create a baseline measurement, which may act as a simple, manually taught geographic model. The baseline measurement may be recorded for objects in the hand(s) and/or in the vice. During each cycle, the same two points on each side may be measured. The relative poses may be corrected based on the change in position of the points measured each cycle from the baseline measurements. The relative position of the points may be all that matters, so only one object may need to be manipulated until its deviation from the baseline matches that of the other object. Maintaining consistent angles between two or more objects may keep the relative orientation and/or position between the objects constant. The relative angles in one or more dimensions between the baseline measurements of each object may be computed when determining initial object pose. The correction factor may include the difference of the angles between objects measured during subsequent cycles from the angles between the baseline measurements of the objects. Aligning the angles may correct for differences in orientation.

For example, a baseline measurement may be created as manipulation is manually taught to the robotic hand(s) and/or vice. The baseline for each object may include at least two points on two or more sides of the object (e.g., four or more points) as measured by tactile sensors. Alternatively, the baseline may include a total of three or more points on any number of sides, and/or the like. The geographic model may include a straight line on at least two sides of the object and/or other sets of straight lines drawn from the measured points. Each hand and/or vice may be taught to manually grasp a respective object, and the points and/or lines for each object may be computed from measurements by the hand and/or vice grasping that particular object.

The objects may be brought together for an assembly operation. During the teaching of the manipulations for the assembly operation, the measured points and/or lines on each object (e.g., four or more lines from eight or more points on two or more objects) may be tracked. The tracked points may be used to create a geographic baseline for the manipulation operation. In an embodiment, the relative slope and/or angle of the lines may be maintained (e.g., the lines may be parallel, perpendicular, or any other angle). To correct the pose of the object in the robotic hand relative to the pose of the object in the vice (or other hand), the differences between the measured points on the two objects may need to be made consistent with the baseline. To maintain consistent pose, the coordinates of each point on the object in the hand may be subtracted from each point on the object in the vice. By comparing the differences for the baselines with the later measured differences, the amount the robotic hand(s) must change the position of each point (e.g., in X, Y, or Z directions) to maintain relative pose between the objects may be determined.

The points may also be used to compute lines. The slopes of the lines may also need to be made consistent. The lines may occur on each plate of a vice, between the vice plates, on one finger (e.g., for small objects, between fingers (e.g., in parallel across the palm, side by side (e.g., for fingers in series), and/or the like. In some instances, it may be desirable to calculate lines both on the same plane and on orthogonal planes (e.g., between the vices jaws and on the same vice jaw). As a result, it may be possible to have at least one line in parallel and one perpendicular to each set of points on a vice-hand pair (e.g., eight lines for a set of eight points with four lines parallel and four perpendicular for two objects).

The lines and points may be identified in variously shaped objects, such as cones, cylinders, spheres, cubes, hexagonal prisms, more complicated shapes, etc. The identification of points may need to be measurable and repeatable. Accordingly, locations identifiable from displacement sensor measurements, such as edges, indentations, and/or protruding surfaces, may be used as points. The point locations may be a part of simple geometric models of straight lines, arcs, radiuses, holes, etc. that can be located on an object. For example, parallel lines on the edges of each object being manipulated may be used. A simple geometric model of a section of an object may be determined based on point recognition. The gripper may be commanded to remember and find the points that relate to a dimension on the object. The points may correspond to a simple and/or recognizable geometric component, such as a straight line, an arc, a radius, etc. The length of the geometric component may be recorded, and the pose of the object may be calculated from the identification of this length and corresponding points.

Figure 54:
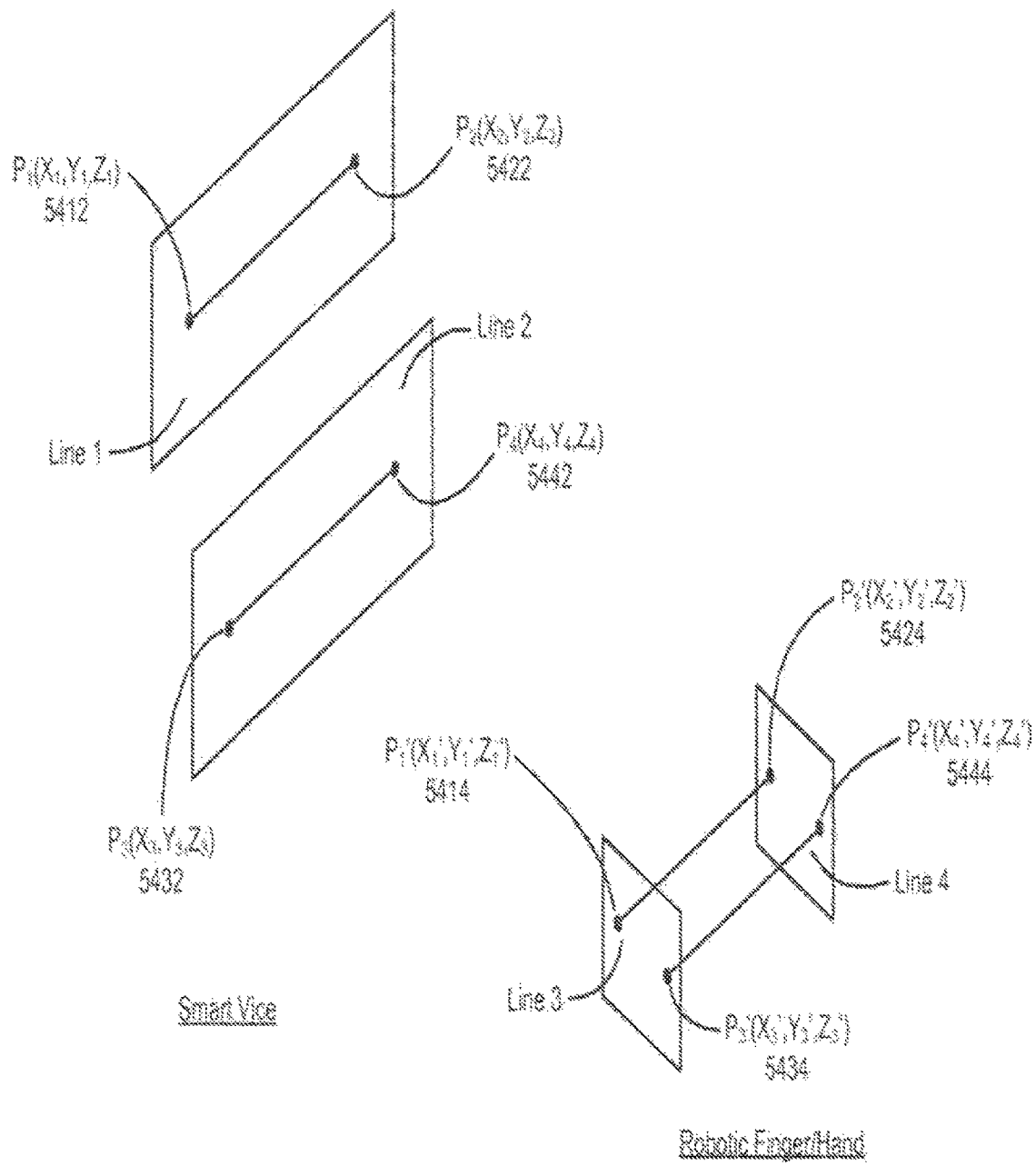
FIG. 54 is a schematic diagram of points on an object measured by tactile sensors located on robotic fingers and/or a vice.

FIG. 54 is a schematic diagram of points 5412-5442 on an object measured by tactile sensors located on robotic fingers and/or a vice. The points $P_1(x_1, y_1, z_1)$ 5412 and $P_2(x_2, y_2, z_2)$ 5422 may be points determined from measurements by linear displacement sensors on one side of a vice, and the points $P_3(x_3, y_3, z_3)$ 5432 and $P_4(x_4, y_4, z_4)$ 5442 may be points determined from measurements by linear displacement sensors on an opposing, parallel jaw of the vice. The points on the object may remain constant and may be able to be measured repeatedly. The points may define the orientation and position of an X, Y, Z coordinate system of the vice. In other embodiments, another coordinate system may be used. A known length between the points may be programmed into a geographic model and/or stored as part of a geographic model. The known length may help to establish the pose of the object in the vice. A second object may be located in a robotic hand. The linear displacement sensors of the robotic hand may be used to determine the points $P_1'(x_1, y_1, z_1)$ 5414, $P_2'(x_2, y_2, z_2)$ 5424, $P_3'(x_3, y_3, z_3)$ 5434, and $P_4'(x_4, y_4, z_4)$ 5444. In the illustrated embodiment, the points may be measured across the palm between fingers in parallel, however the points may be on the same finger or the side of the hand (e.g., fingers in series) in other embodiments.

In the illustrated embodiment, the line connecting the points $P_1(x_1, y_1, z_1)$ 5412 and $P_2(x_2, y_2, z_2)$ 5422 and the line connecting the points $P_3(x_3, y_3, z_3)$ 5432 and $P_4(x_4, y_4, z_4)$

5442 may go across or through the object in the vice, and the lines connecting the points $P_1'(x_1, y_1, z_1)$ 5414 to $P_2'(x_2, y_2, z_2)$ 5424 and $P_3'(x_3, y_3, z_3)$ 5434, to $P_4'(x_4, y_4, z_4)$ 5444 may go across or through the object in the hand. This may yield four lines from eight points. These eight points can be used to draw an additional four lines that are perpendicular to the illustrated lines. Thus, the eight points may yield a possibility of eight or more lines.

A correction factor may be computed from the points and/or lines. The initial placement of the objects during manual teaching may be used to determine one or more zero point for the baseline calculations. For example, one or more points on the object in the hand and/or in the vice may be chosen as an origin point (e.g., a point 0,0,0). The coordinate system for the positions of the objects in the vice and hand may be set off of the origin(s). The same object may be re-grasped, and/or an identical object may be grasped; a second measurement of the positions of the points on the object may be made. The correction may be calculated by comparing (e.g., subtracting) the change in position of one object from the change in position of the other object (e.g., the change in position of an object in a vice/first hand from the change in position of an object in a hand/second hand. By subtracting the change in position of the first object from the change in position of the second object, an amount of movement required by the hand and/or vice to maintain relative pose may be determined for the selected coordinate system. An example of the calculations of change in position are included in Table 1 (points P3, P4, P3' and P4' are omitted for brevity but could be similarly calculated):

TABLE 1

Parallel Lines Correction Example - Pose Subtraction

| Parameter | Set Baseline Initial Value | Difference from baseline New Value 1 | Hand Coordinate Correction 1 | Difference from baseline New Value 2 | Hand Coordinate Correction 2 |
|---|---|---|---|---|---|
| x1 | 0 | 0.5 | | 0.1 | |
| y1 | 0 | 0.6 | | 0.1 | |
| z1 | 0 | 1 | | 0.1 | |
| x2 | 0 | 0.2 | | 0.1 | |
| y2 | 0 | 0 | | 0.1 | |
| z2 | 0 | 0 | | | |
| x'1 | 0 | 0.2 | 0.3 | 0.1 | 0 |
| y'1 | 0 | 0.2 | 0.4 | 0.1 | 0 |
| z'1 | 0 | 0.2 | 0.8 | 0.2 | −0.1 |
| x'2 | 0 | 0.2 | 0 | 0.3 | −0.2 |
| y'2 | 0 | 0.2 | −0.2 | −0.5 | 0.6 |
| z'2 | 0 | 0.2 | −0.2 | −0.2 | 0.2 |

Since a robotic arm may move through rotation around one or more points, the pose correction may need to correct for changes in angle of the objects in the vice and/or hand. The change in angle may be computed from the baseline measurements. To compute the change in angle, the equation for a line may be used, and/or the arctangent of the slope of the line may be calculated from the new points on each side of the vice jaw, hand, fingers, etc. While the method of pose subtraction may yield the change in position to be made, additional calculations may be necessary to determine the actual directions and angles to rotate to achieve the desired position. To calculate the directions and/or angles of rotation, the change in angle between the measured points and the baseline may be computed. The change in the angle of the slope between the measured points may be calculated for each of the lines between the points. The angles and directions to rotate the object may be determined based on the difference between the orientation of the object in the vice measured from the baseline and the orientation of the object in the hand measured from the baseline.

For example, the difference between the slope of the line from $P_1(x_1, y_1, z_1)$ 5412 to $P_2(x_2, y_2, z_2)$ 5422 and the slope of the line from $P_1'(x_1, y_1, z_1)$ 5414 to $P_2'(x_2, y_2, z_2)$ 5424 may be made consistent with the baseline. Similarly, the difference between the slope of the line from $P_3(x_3, y_3, z_3)$ 5432, to $P_4(x_4, y_4, z_4)$ 5442 and the slope of the line from $P_3'(x_3, y_3, z_3)$ 5434, to $P_4'(x_4, y_4, z_4)$ 5444 may be made consistent as well. In an embodiment, one of the measured line may initially be made coplanar with the corresponding baseline in a selected plane (e.g., the contact surface); the measured line and baseline may be made parallel to each other in the selected plane; and the object may be rotated around an axis parallel to the measured line or baseline until the distance between the first measured line and the second measured line when projected on a line (or plane) normal to the selected plane matches a correspondingly measured distance between the baselines. In many instances, the correction angles may only need to be calculated for two orthogonal directions (e.g., in the plane of the sensor contact surface) for pose correction. The point locations may need to be determined in three orthogonal dimensions (e.g., including the depth determined by the displacement sensors) for object pose determination. In some instances, more than one joint movement may be needed to affect the correction (e.g., more than a wrist movement in one direction). The arm kinematics may be determined by the pose correction requirements. The XY plane may be defined to be normal to the vice jaw, and the YZ plane may be defined as normal to a finger contact surface. Thus, in an embodiment, movement in the Z direction may not be required for pose correction in the vice, and movement in the X direction may not be required for pose correction by the hand. The displacement sensor movement may be measured for pose determination.

Symmetry may allow pose correction to include a simple rotation of one object with respect to the other object. Alternatively, or in addition, the rotation may be determined by computing the change in orientation of an object in a vice from a baseline minus the change in orientation of an object in a robotic hand from a baseline. For a particular plane, the orientation may be represented by the slope of the line in that plane. Rotation in other planes may remain fixed while rotation in a particular plane is occurring. The change in each slope can be compared to determine the amount of rotation. For example, the difference between the change in slope of line 1 and the change in slope of line 3 in the XY plane may be computed using the equation:

$$\Delta AngleLine1 - \Delta AngleLine3 = \qquad (56)$$
$$\arctan\left(\frac{P_{y2} - P_{y1}}{P_{x2} - P_{x1}}\right) - \arctan\left(\frac{P_{y2baseline} - P_{y1baseline}}{P_{x2baseline} - P_{x1baseline}}\right) -$$
$$\arctan\left(\frac{P'_{y'2} - P'_{y'1}}{P'_{x'2} - P'_{x'1}}\right) + \arctan\left(\frac{P'_{y'2baseline} - P'_{y'1baseline}}{P'_{x'2baseline} - P'_{x'1baseline}}\right)$$

Similarly, the difference between the change in slope of line 2 and the change in slope of line 4 in the XY plane may be computed using the equation:

$$\Delta AngleLine2 - \Delta AngleLine4 = \qquad (57)$$

$$\arctan\left(\frac{P_{y2} - P_{y1}}{P_{x2} - P_{x1}}\right) - \arctan\left(\frac{P_{y2baseline} - P_{y1baseline}}{P_{x2baseline} - P_{x1baseline}}\right) -$$

$$\arctan\left(\frac{P'_{y'2} - P'_{y'1}}{P'_{x'2} - P'_{x'1}}\right) + \arctan\left(\frac{P'_{y'2baseline} - P'_{y'1baseline}}{P'_{x'2baseline} - P'_{x'1baseline}}\right)$$

where $P_{x1baseline}$, $P_{x2baseline}$, $P_{x3baseline}$, $P_{x4baseline}$ are the baseline X coordinates of line 1 and line 2 on an object located in a vice; $P_{y1baseline}$, $P_{y2baseline}$, $P_{y3baseline}$, $P_{y4baseline}$ are the baseline Y coordinates of line 1 and line 2 of an object located in the vice; $P'_{x1baseline}$, $P'_{x2baseline}$, $P'_{x3baseline}$, $P'_{x'4baseline}$, are the baseline X coordinates of line 3 and line 4 on an object located in a robotic hand; $P'_{y'1baseline}$, $P'_{y'2baseline}$, $P'_{y'3baseline}$, $P'_{y'4baseline}$ are the baseline Y coordinates of line 3 and line 4 on an object located in the robotic hand; $P_{1x}$, $P_{2x}$, $P_{3x}$, $P_{4x}$ are the subsequent X coordinate measurements of line 1 and line 2 of an object located in the vice; $P_{1y}$, $P_{2y}$, $P_{3y}$, $P_{4y}$ are the subsequent Y coordinate measurements of line 1 and line 2 of the object located in the vice; $P'_{1'x}$, $P'_{2'x}$, $P'_{3'x}$, $P'_{4'x}$, are the subsequent X coordinate measurements of line 3 and line 4 on an object located in the robotic hand; $P'_{1'y}$, $P'_{2'y}$, $P'_{3'y}$, $P'_{4'y}$ are the subsequent Y coordinate measurements of line 3 and line 4 on the object located in the robotic hand.

Figure 55:
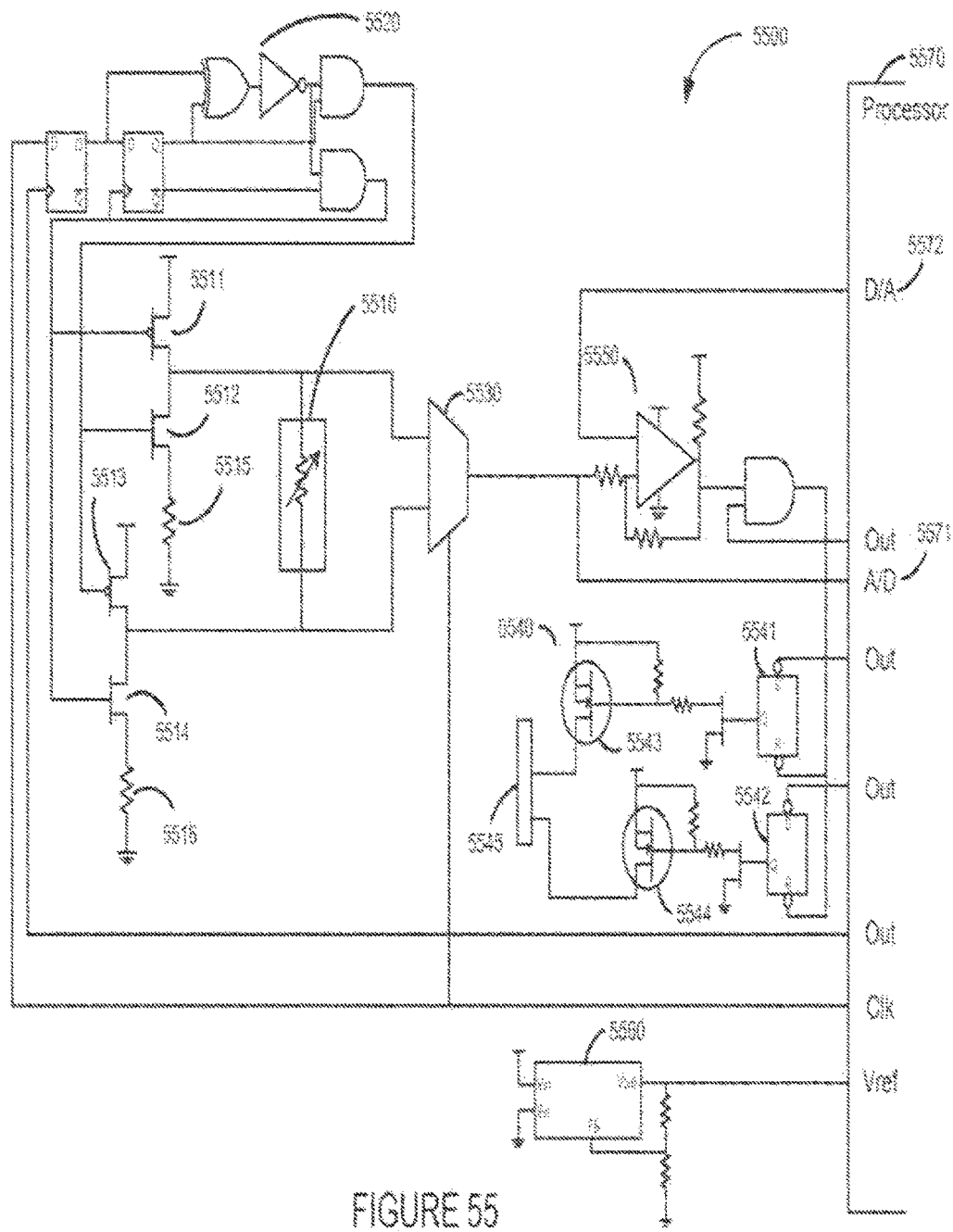
FIG. 55 is a schematic diagram of an embodiment of a circuit for measuring distance and actuating hydraulic cylinders and joints.

FIG. 55 is a schematic diagram of an embodiment of a circuit 5500 for measuring distance and actuating hydraulic cylinders and joints. The circuit 5500 may include a displacement measuring cell 5510 with a resistance that varies with displacement. For example, the displacement measuring cell 5510 may include a conductive fluid that can be added or removed from the displacement measuring cell 5510 to move electrodes in the displacement measuring cell 5510 and vary the resistance. The displacement measuring cell 5510 may be configured as part of a voltage divider circuit so that the change in resistance can be measured. A first transistor 5511 (e.g., a p-type metal-oxide-semiconductor (PMOS) field effect transistor (FET)) may control coupling of a first terminal of the displacement measuring cell 5510 to a voltage source, and a fourth transistor 5514 (e.g., an n-type metal-oxide-semiconductor (NMOS) FET) may control coupling of a second terminal to a second resistor 5516 that forms a voltage divider with the displacement measuring cell 5510 when current is flowing across the measuring cell 5510 in a first direction. To increase precision, the circuit 5500 may include a third transistor 5513 (e.g., a PMOSFET), which may control coupling of the second terminal of the displacement measuring cell 5510 to the voltage source, and a second transistor 5512 (e.g., an NMOSFET), which may control coupling of the first terminal to a first resistor 5515 that forms a voltage divider with the displacement measuring cell 5510 when current is flowing across the measuring cell 5510 in the opposite direction. The resistor 5515, 5516 may be precision resistors having resistance values within a predetermined tolerance of a desired value and/or having resistance values with a predetermined stability.

A processor 5570 may be configured to switch the transistors 5511-5514 from allowing current to flow in the first direction to allowing current to flow in the opposite direction periodically and/or aperiodically. For example, the circuit 5500 may include a break-before-make circuit 5520 communicatively coupled with the processor 5570 in some embodiments. The processor 5570 may indicate the desired direction of current flow to the break-before-make circuit 5520. When the processor 5570 indicates a change in the desired direction of current flow, the break-before-make circuit 5520 may switch active transistors to an off state before activating the transistors for the desired direction of current flow.

The processor 5570 may include an analog-to-digital converter (ADC) input 5571 that receives an analog voltage and converts it to a digital value. The ADC input 5571 may be coupled to the terminals of the measuring cell 5510 by a multiplexer 5530. The multiplexer 5530 may receive the indication from the processor 5570 of the desired direction for the current flow and may couple the ADC input 5571 to the appropriate terminal of the measuring cell 5510 to receive the output of the voltage divider. Based on the voltage measurement, the processor 5570 may determine the displacement of the electrodes of the measuring cell 5510 (e.g., based on previous calibration). The processor 5570 may receive a stable reference voltage from a voltage regulator 5560 that may be used by the processor 5570 to determine the voltage received by the ADC input 5571.

The circuit 5500 may include an actuation circuit 5540. The actuation circuit 5540 may be configured to adjust the displacement of the measuring cell 5510, for example, by adding/removing fluid, driving an actuator, and/or the like. The actuation circuit 5540 may include latches 5541, 5542 configured to receive a desired displacement direction from the processor 5570 and to maintain actuation in the desired direction until cleared. The latches 5541, 5542 may be coupled to drive transistors 5543, 5544 configured to deliver power to one or more actuators 5545 that adjust displacement of the measuring cell 5510. The drive transistors 5543, 5544 may control the one or more actuators 5545 based on indications received from the latches 5541, 5542. For example, the one or more actuators 5545 may include control valves to let conductive fluid into and out of the measuring cell 5510, such as an inlet valve and an exhaust valve for each chamber in the measuring cell. An inlet valve may be opened to allow conductive fluid to be pumped into a first chamber while an exhaust valve on an opposing chamber may be opened simultaneously to allow fluid to be released to produce movement in a first direction. The inlet valve in the opposing chamber and the exhaust valve in the first chamber may be opened (and the previous valves closed) to produce movement in an opposite direction.

A comparison circuit 5550 may be configured to compare the output of the voltage divider to an output of a digital-to-analog converter (DAC) 5572 of the processor 5570. Alternatively, peak voltage detection may be used to measure or determine a specific distance or angle. When the output of the voltage divider reaches a desired value received from the processor 5570, the comparison circuit 5550 may transmit an indication to the actuation circuit 5540 to terminate actuation. The comparison circuit 5550 may respond to the displacement measurements much more quickly than the processor 5570 to allow for more precise control of the actuators 5545. Accordingly, the processor 5570 may determine a desired position for the displacement measuring cell 5510 and may transmit an indication of the desired position to the comparison circuit 5550 via the DAC 5572. The desired position may be expressed as a desired voltage of the voltage divider. The comparison circuit 5550 may compare the desired position to the measured position. Once the measured position reaches the desired position, the comparison circuit 5550 may transmit reset the latches 5541, 5542 to prevent the one or more actuators 5545 from causing further movement of the measuring cell 5510. FIG. 55 includes an example of a break-before-make circuit 5520, an example of an actuation circuit 5540, and an example of a comparison circuit 5550, but many other designs of these circuits that would be apparent to those of skill in the art are contemplated.

Figure 56:
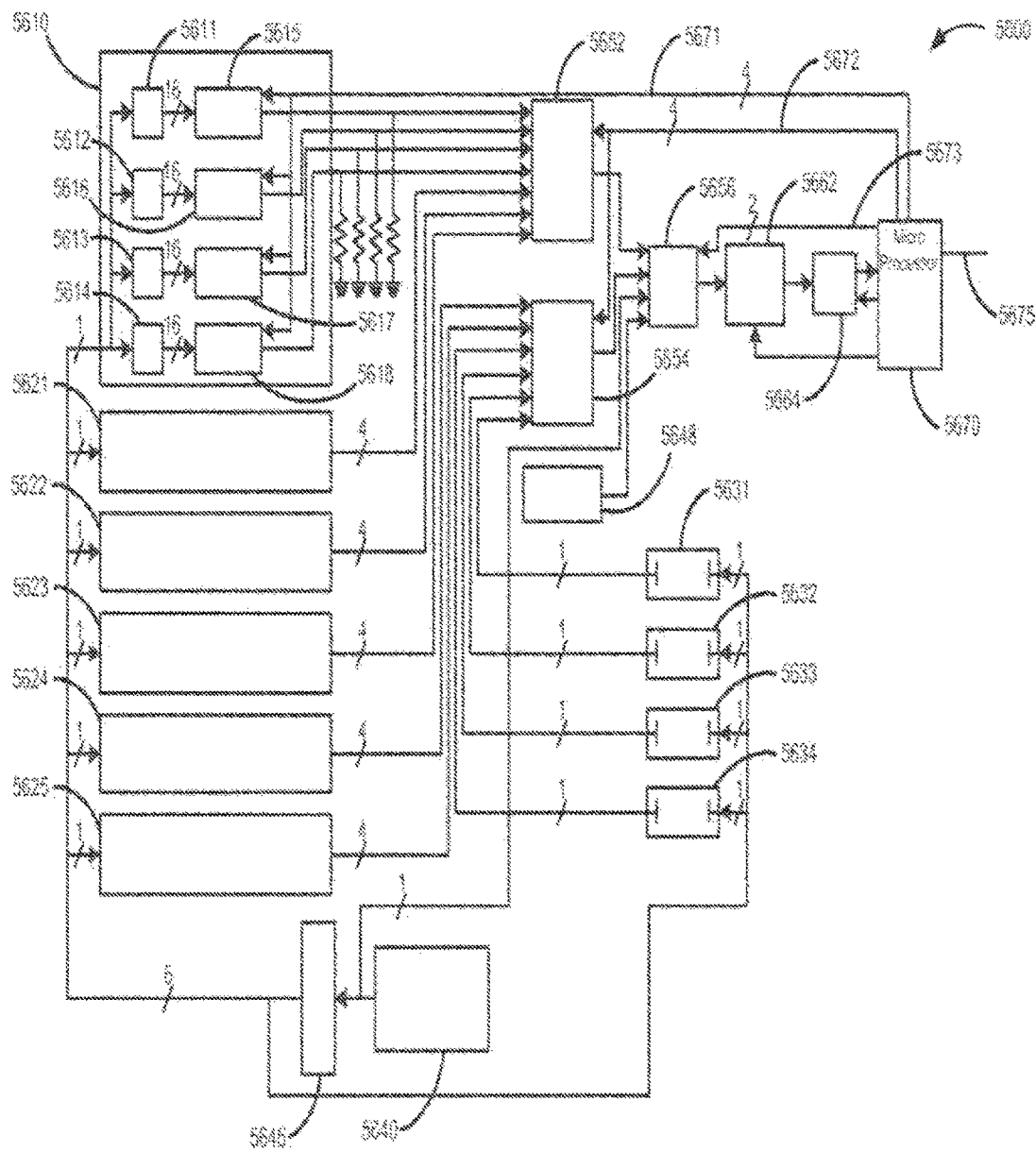
FIG. 56 is a schematic diagram of an embodiment of a circuit for measuring displacement in a plurality of linear contact sensors and a plurality of rotational displacement sensors.

FIG. 56 is a schematic diagram of an embodiment of a circuit 5600 for measuring displacement in a plurality of linear contact sensors 5611-5614 and a plurality of rotational displacement sensors 5631-5634. For example, the circuit 5600 may be configured to acquire distances measured by sensors in a robotic hand. The circuit 5600 may include plurality of sensor groupings 5610, 5621-5625, which may each correspond to a robotic finger in an embodiment. An exemplary sensor grouping 5610 may include a plurality of contact sensors 5611-5614. In the illustrated embodiment, each contact sensor 5611-5614 may include 16 linear displacement sensors. Other embodiments may include more or fewer linear displacement sensors per contact sensor 5611-5614. Each contact sensor may be electrically coupled to a corresponding multiplexer 5615-5618. The multiplexers 5615-5618 may combine signals from the linear displacement sensors in each contact sensor 5611-5614 onto a single wire per contact sensor 5611-5614. The multiplexers 5615-5618 may be physically located near the corresponding contact sensors 5611-5614.

Additional multiplexers 5652, 5654, 5656 may combine the signals from each sensor grouping 5610, 5621-5625 onto a single wire. The multiplexers 5652, 5654, 5656 may also combine measurements from the plurality of rotational displacement sensors onto the single wire. The circuit 5600 may also include a sine wave generator 5640 and corresponding buffers 5645 for providing power to the sensor groupings 5610, 5621-5625 and the rotational displacement sensors 5631-5634. The signal from the sine wave generator 5640 may also be multiplexed onto the single wire. The circuit 5600 may further include a temperature circuit 5648 (e.g., a thermistor temperature circuit) to measure the temperature of the conductive fluid provided to the sensor groupings 5610, 5621-5625 and the rotational displacement sensors 5631-5634. A measurement signal from the temperature circuit 5648 may also be multiplexed onto the single wire.

A peak detection circuit 5662 may receive the signal on the single wire from the multiplexer 5656. Because the sensor groupings 5610, 5621-5625 and the rotational displacement sensors 5631-5634 are driven by a sine wave generator 5640, the signals from those sensors may also be sinusoidal. The peak detection circuit 5662 may measure the magnitude of the sinusoidal signals and provide a DC output corresponding to the magnitude. An ADC 5664 may convert the signal output by the peak detection circuit 5662 from analog to digital. The ADC 5664 may provide a digital representation of the signal to a microprocessor 5670 for processing. Alternatively, or in addition, the microprocessor 5670 may comprise the ADC 5664. The microprocessor 5670 may include a plurality of control lines 5671, 5672, 5673 that control which signal the multiplexers 5615-5618, 5652, 5654, 5656 provide to the peak detection circuit 5662. The microprocessor 5670 may also include a data connection 5675 (e.g., a high speed data connection, such as a USB connection) to one or more other processors (not shown). More or fewer sensors 5611-5614, 5631-5634 and different arrangements of multiplexers are also contemplated. For example, additional ADCs may allow more than one sensor to be measured at once in some embodiments.

Figure 57:
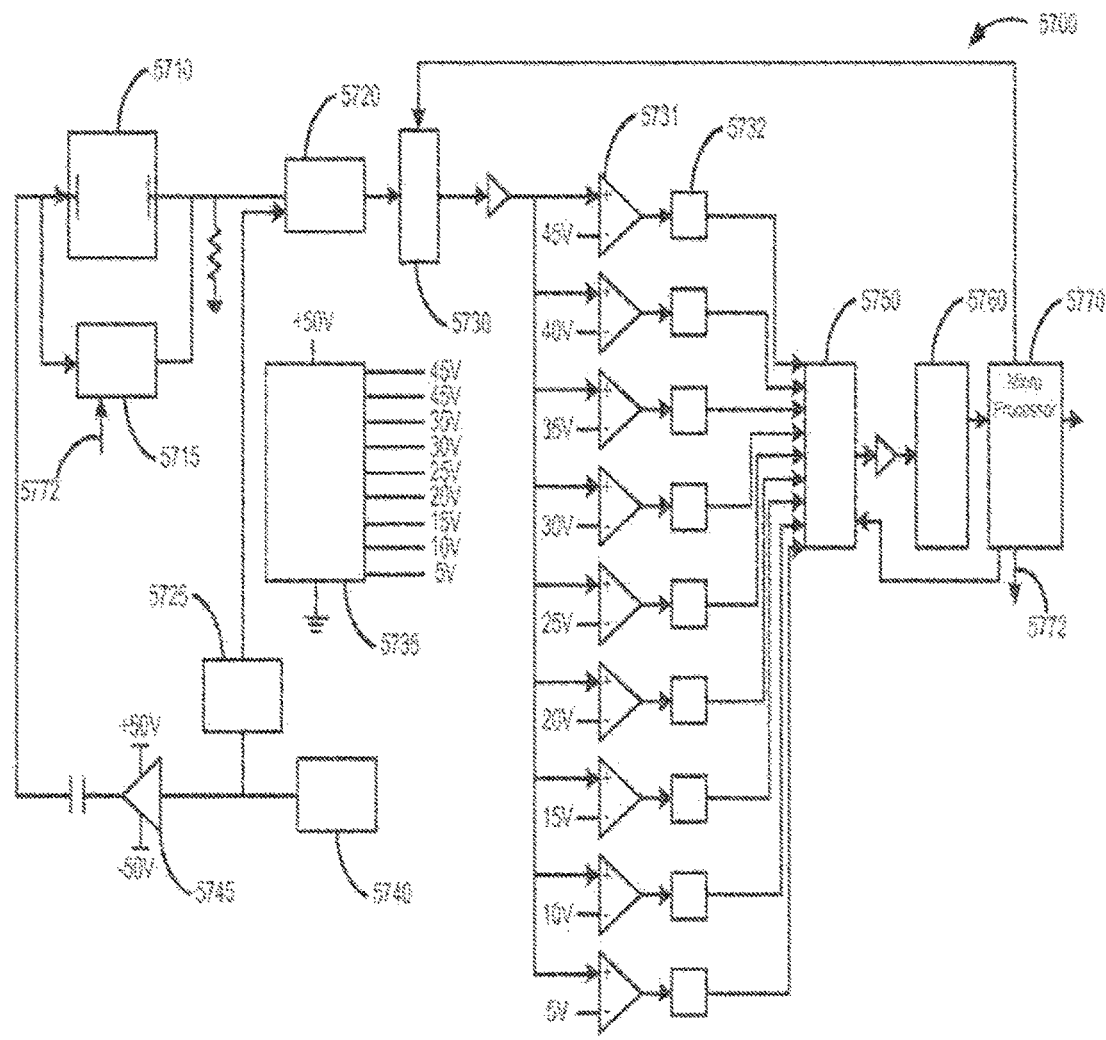
FIG. 57 is a schematic diagram of an embodiment of a circuit for measuring high voltage values applied to a sensor cell.

FIG. 57 is a schematic diagram of an embodiment of a circuit 5700 for measuring high voltage values applied to a sensor cell 5710. A signal from a sine wave generator 5740 may be amplified by an amplifier (e.g., to plus or minus 50 volts in the illustrated embodiment) and be delivered to the sensor cell. The output from the sensor cell 5710 may be provided to a peak detector 5720 to convert the output from AC to DC. The peak detector 5720 may receive an indication of zero crossings of the input signal from a zero crossing detector 5725 coupled to the sine wave generator 5740. The peak detector 5720 may output the DC signal to a sample and hold circuit 5730.

The sample and hold circuit 5730 may provide a held output signal to an array of voltage subtractors 5731. Each voltage subtractor 5731 may receive a corresponding reference voltage from a precision voltage reference generator 5735. The reference voltages may be separated by a fixed increment. The voltage subtractors 5731 may reduce the input voltage signal by the reference voltage. In an embodiment, the voltage subtractors may include a high voltage, high current operational amplifier, such as the OPA454 available from Texas Instruments.

Each of a plurality of voltage limiters and/or buffers 5732 may receive an output from a corresponding voltage subtractor 5731. The buffers 5732 may be coupled to a multiplexer 5750 which may output the signal received from a selected buffer 5732. The selected signal may be converted to a digital format by an ADC 5760. The ADC 5760 may have only a limited voltage range, so the array of voltage subtractors 5731 and corresponding buffers 5732 may reduce the held output signal to a level measurable by the ADC 5760 and prevent high voltage signals from damaging the ADC 5760. However, the ADC 5760 may still benefit from the increased voltage to provide higher accuracy and/or precision measurements of the voltage across the sensor cell 5710. The increased voltage may result in a larger voltage change per distance increment moved by the electrodes in the sensor cell 5710, which may be easier to measure and less susceptible to random electromagnetic noise.

The output from the ADC 5760 may be provided to a microprocessor 5770. The microprocessor 5770 may be configured to control the multiplexer 5750 and/or the sample and hold circuit 5730. The microprocessor 5770 may process the output from the ADC 5760 and/or send the measurement to other processors (not shown) for processing. The microprocessor 5770 may output a calibration signal 5772 that can be used to control a calibration circuit 5715. The calibration circuit 5715 may include a pass through that allows the input signal to the sensor cell 5710 to be directly measured by the circuit 5700.

It will be understood by those having skill in the art that many changes may be made to the details of the above-described embodiments without departing from the underlying principles of the disclosure. For example, components and/or configurations disclosed in relation to one embodiment may be used in other embodiments unless the disclosure explicitly states otherwise. The scope of the present disclosure should, therefore, be determined only by the following claims.

The invention claimed is:

1. A robotic gripping system comprising:
  a robotic hand including,
    a plurality of displacement measuring cells configured to measure a contour of a surface in contact with the robotic hand, and
    a plurality of linear displacement sensors, each linear displacement sensor in series with a corresponding displacement measuring cell of the plurality of displacement measuring cells; and a processor configured to:
compute a volume of an object based on measurements by the plurality of displacement measuring cells.

2. The robotic gripping system of claim 1, wherein the robotic hand further includes a plurality of fingers, wherein the plurality of displacement measuring cells include a plurality of rotational finger joints configured to measure angular displacement, and wherein the processor computes the volume by determining positions of the fingers when holding the object based on angular displacement measurements.

3. The robotic gripping system of claim 1, wherein the processor computes the volume by determining a detailed surface model based on measurements by the linear displacement sensors.

4. The robotic gripping system of claim 3, further comprising a plurality of springs, wherein each linear displacement sensor comprises a linear potentiometer, and wherein each spring is configured to return a corresponding linear potentiometer to an original position after the robotic hand releases the object.

5. The robotic gripping system of claim 3, wherein the processor is configured to determine locations of the plurality of linear displacement sensors based on measurements of angular displacement by a plurality of rotational finger joints.

6. The robotic gripping system of claim 1, wherein the processor is further configured to compare a model of the object computed from measurements by the plurality of linear displacement sensors with a model generated by a vision system.

7. The robotic gripping system of claim 6, wherein the vision system is selected from the group consisting of a two dimensional vision system and a three dimensional vision system.

8. The robotic gripping system of claim 6, wherein the processor is configured to compare the vision system generated model with a stored, computer aided design model.

9. The robotic gripping system of claim 6, wherein the model computed from the measurements by the plurality of linear displacement sensors comprises a computer aided design model.

10. The robotic gripping system of claim 6, wherein the model computed from the measurements by the plurality of linear displacement sensors comprises a real-time image.

11. The robotic gripping system of claim 6, wherein the processor is configured to identify surface asperities from the measurements by the plurality of linear displacements sensors; and determine a pose of the object by comparing the identified surface asperities to the vision system model.

12. The robotic gripping system of claim 6, wherein the processor is configured to control the object based on the vision system model and an object pose identified based on the measurements by the plurality of linear displacement sensors.

13. The robotic gripping system of claim 1, wherein the plurality of linear displacement sensors comprise a conductive fluid.

14. The robotic gripping system of claim 1, wherein the robotic hand includes a plurality of fingers, and wherein the processor causes the fingers to index around the object to gather measurements for computing the volume.

15. The robotic gripping system of claim 1, further comprising another robotic hand, and wherein the processor causes the robotic hand and the other robotic hand to completely enclose the object to gather measurements for computing the volume.

16. The robotic gripping system of claim 1, wherein the processor is configured to generate a point cloud model of the object and store the point cloud model to a stored computer aided design model.

17. The robotic gripping system of claim 1, wherein the processor is configured to compute the volume of the object using spherical coordinates.

18. The robotic gripping system of claim 1, wherein the robotic hand includes a plurality of fingers, wherein the processor is configured to compute partial volumes based on measurements by individual fingers.

19. The robotic gripping system of claim 18, wherein the processor is configured to compute the total volume based on the partial volumes.

20. The robotic gripping system of claim 1, further comprising a vice, wherein the vice comprises a vice jaw including a plurality of linear displacement sensors.

21. The robotic gripping system of claim 20, wherein the robotic hand is configured to touch the plurality of linear displacement sensors of the vice jaw to calibrate positioning of the robotic hand relative to the vice.

22. The robotic gripping system of claim 21, wherein the robotic hand is configured to touch a plurality of orthogonal surfaces to calibrate positioning in a plurality of orthogonal directions.

23. The robotic gripping system of claim 21, wherein the plurality of linear displacement sensors of the vice jaw are located on an outside of the vice.

24. The robotic gripping system of claim 1, further comprising a wrist coupled to the robotic hand, wherein the wrist comprises one or more valves for controlling the flow of a fluid to the robotic hand.

25. The robotic gripping system of claim 1, wherein the processor is further configured to determine a pose of the object while the object is being gripped by the robotic hand.

26. The robotic gripping system of claim 25, wherein the processor is further configured to compute one or more rotations of the robotic hand and/or a robotic arm coupled to the robotic hand to correct an orientation of the object.

27. The robotic gripping system of claim 25, wherein the processor is further configured to control movement of the robotic hand based on the pose of another object in a pose measuring gripping apparatus.

28. A method for computing a volume of an object by contact with a robotic hand, the method comprising:
measuring a contour of the object in contact with a plurality of displacement measuring cells disposed on the robotic hand;
measuring pressure with a plurality of linear displacement sensors, each linear displacement sensor in series with a corresponding displacement measuring cell of the plurality of displacement measuring cells;
transmitting the pressure measurements to a processor; and
calculating, using the processor, the volume based on pressure measurements.

29. A non-transitory computer readable storage medium comprising program code configured to cause a processor to perform a method for computing a volume of an object by contact with a robotic hand, the method comprising:
measuring a contour of the object in contact with a plurality of displacement measuring cells disposed on the robotic hand;
measuring pressure with a plurality of linear displacement sensors, each linear displacement sensor in series with a corresponding displacement measuring cell of the plurality of displacement measuring cells;

transmitting the pressure measurements to a processor; and calculating, using the processor, the volume based on pressure measurements.

* * * * *